US012282920B1

(12) United States Patent
Katzin

(10) Patent No.: US 12,282,920 B1
(45) Date of Patent: Apr. 22, 2025

(54) COMPLIANCE COMMERCE TRANSACTION MANAGEMENT APPARATUSES, PROCESSES AND SYSTEMS

(71) Applicant: Kompliant, Inc., Los Angeles, CA (US)

(72) Inventor: Edward Katzin, Hillsborough, CA (US)

(73) Assignee: Kompliant Inc., Boise, ID (US)

(*) Notice: Subject to any disclaimer, the term of this patent is extended or adjusted under 35 U.S.C. 154(b) by 44 days.

(21) Appl. No.: 17/585,539

(22) Filed: Jan. 26, 2022

Related U.S. Application Data

(60) Provisional application No. 63/300,046, filed on Jan. 16, 2022, provisional application No. 63/238,771,
(Continued)

(51) Int. Cl.
*G06Q 10/06* (2023.01)
*G06Q 10/067* (2023.01)
(Continued)

(52) U.S. Cl.
CPC ......... *G06Q 20/401* (2013.01); *G06Q 10/067* (2013.01); *G06Q 10/0835* (2013.01); *H04L 9/3239* (2013.01)

(58) Field of Classification Search
CPC .. G06Q 20/401; G06Q 10/067; H04L 9/3239; H04L 9/3247
See application file for complete search history.

(56) References Cited

U.S. PATENT DOCUMENTS 8,448,126 B2 * 5/2013 Laight .................... G06Q 10/06 705/7.11
2019/0102734 A1 * 4/2019 Kawamukai ..... G06Q 10/06395
(Continued)

FOREIGN PATENT DOCUMENTS

CN 104794570 7/2015
CN 104794570 A * 7/2015

OTHER PUBLICATIONS

"Design and development of simulation tool for testing seo compliance of a webpage", Dr. P.G. Naik, International Journal of Advanced Research in Computer Science, vol. 9, No. 1, Feb. 2018 (Year: 2018).*

*Primary Examiner* — Duan Zhang

(74) *Attorney, Agent, or Firm* — Hanchuk Kheit LLP.; Walter G. Hanchuk

(57) ABSTRACT

The Compliance Commerce Transaction Management Apparatuses, Processes and Systems ("CCTM") transforms entity onboarding application input, assessment data, authentication data inputs via CCTM components into entity onboarding application output, entity compliance datastructure, transaction compliance datastructure outputs. An entity object identifier of an entity object flagged for compliance monitoring is obtained. A set of compliance monitoring criterion objects and a range of previous compliance datastructures to utilize for the entity object are determined. A set of previously stored compliance datastructures is retrieved and their cryptographic signatures are verified. Updated entity assessment data corresponding to a set of deficient entity assessment data is obtained. Each factor of compliance rule specified in the set of compliance monitoring criterion objects is evaluated. A dimension compliance score is calculated for each dimension of compliance data channel. An overall compliance score is calculated. An entity compliance datastructure for the entity object is generated, cryptographically signed, and stored.

18 Claims, 74 Drawing Sheets

Related U.S. Application Data filed on Aug. 30, 2021, provisional application No. 63/142,465, filed on Jan. 27, 2021.

(51) Int. Cl.

| | |
|---|---|
| ***G06Q 10/0835*** | (2023.01) |
| ***G06Q 20/40*** | (2012.01) |
| ***H04L 9/32*** | (2006.01) |

(56) References Cited

U.S. PATENT DOCUMENTS

| | | | | |
|---|---|---|---|---|
| 2020/0074410 | A1* | 3/2020 | Binder .................. | G06F 16/182 |
| 2020/0159942 | A1 | 5/2020 | Nadler | |
| 2020/0273046 | A1 | 8/2020 | Biswas | |

* cited by examiner

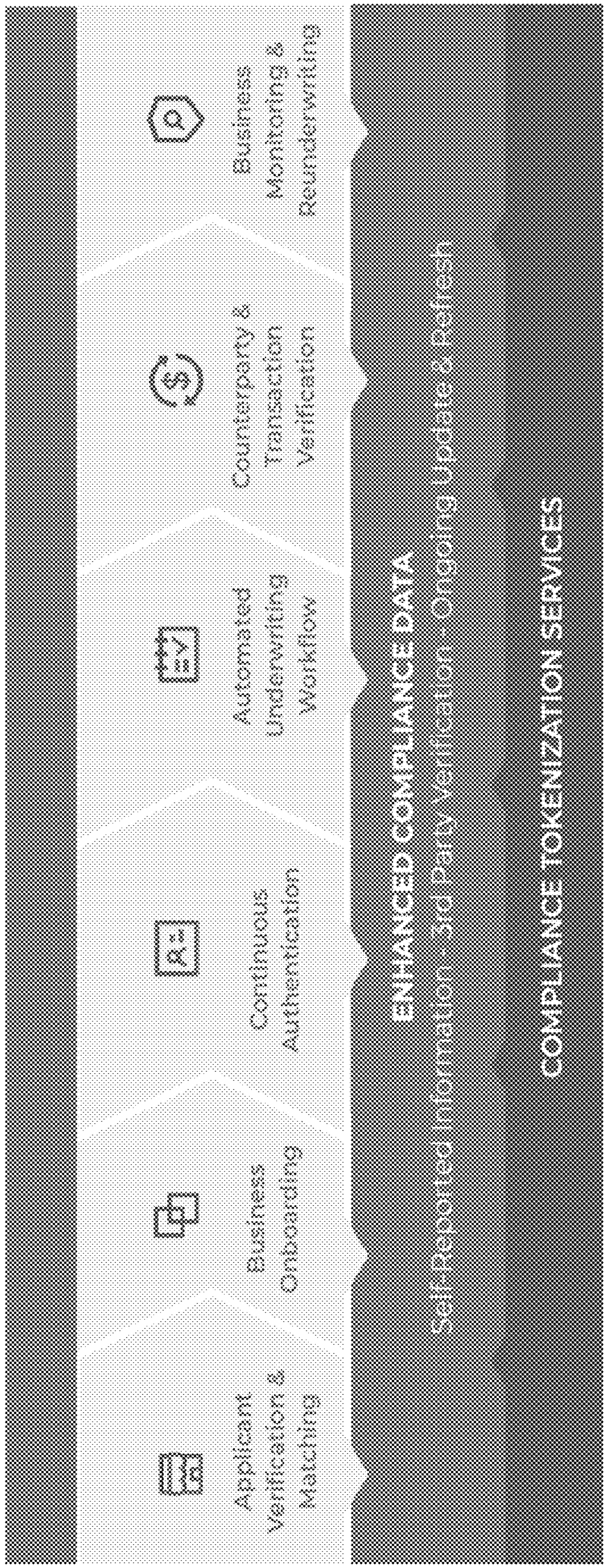
FIGURE 1A: CCTM ARCHITECTURE

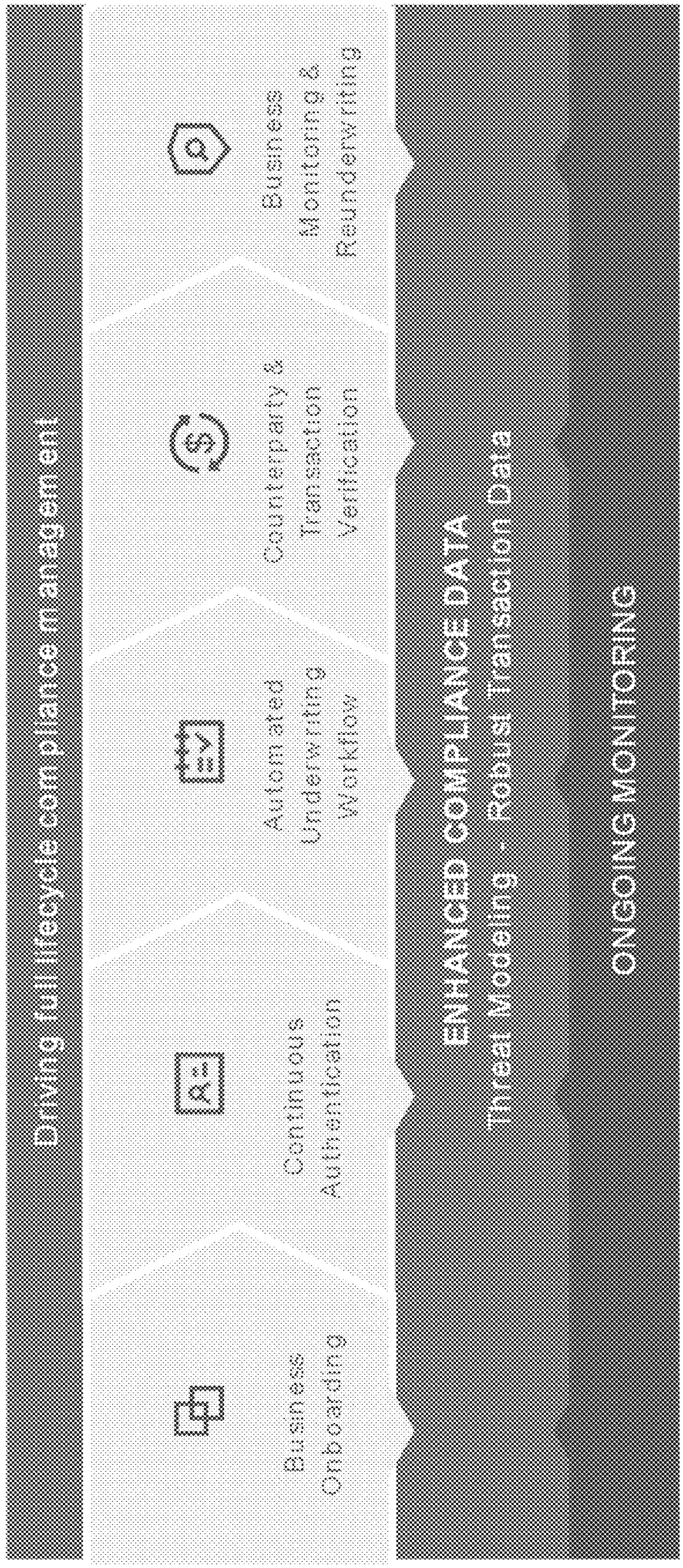
FIGURE 1B: CCTM ARCHITECTURE

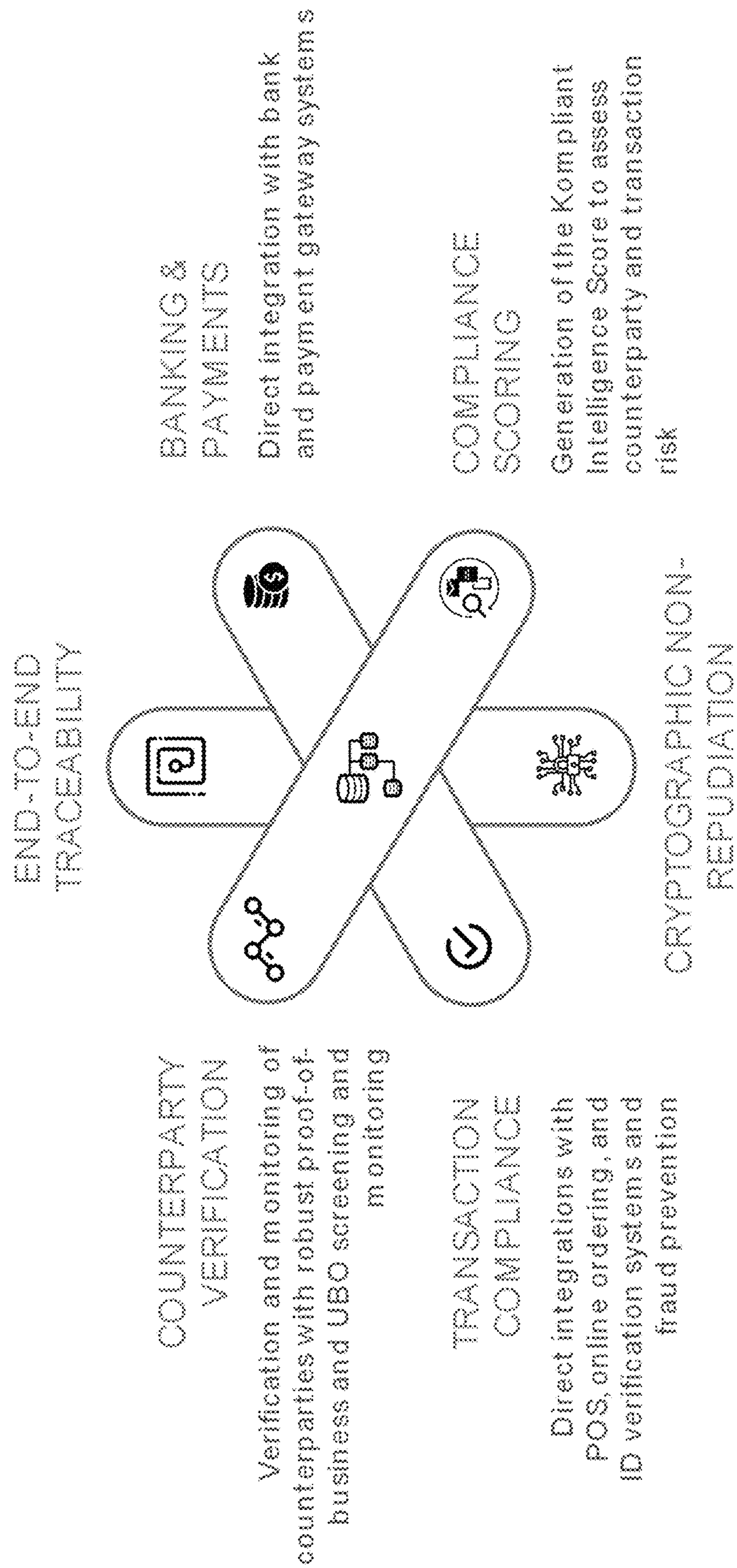
FIGURE 2A: CCTM ARCHITECTURE

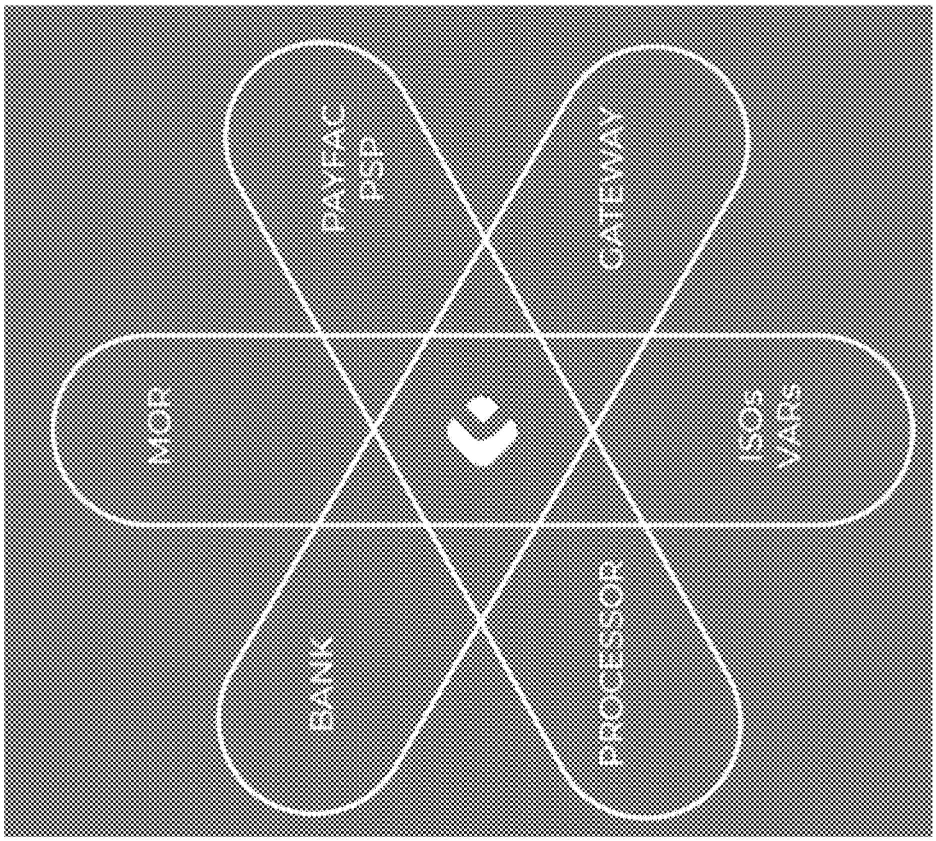
FIGURE 2B: CCTM ARCHITECTURE

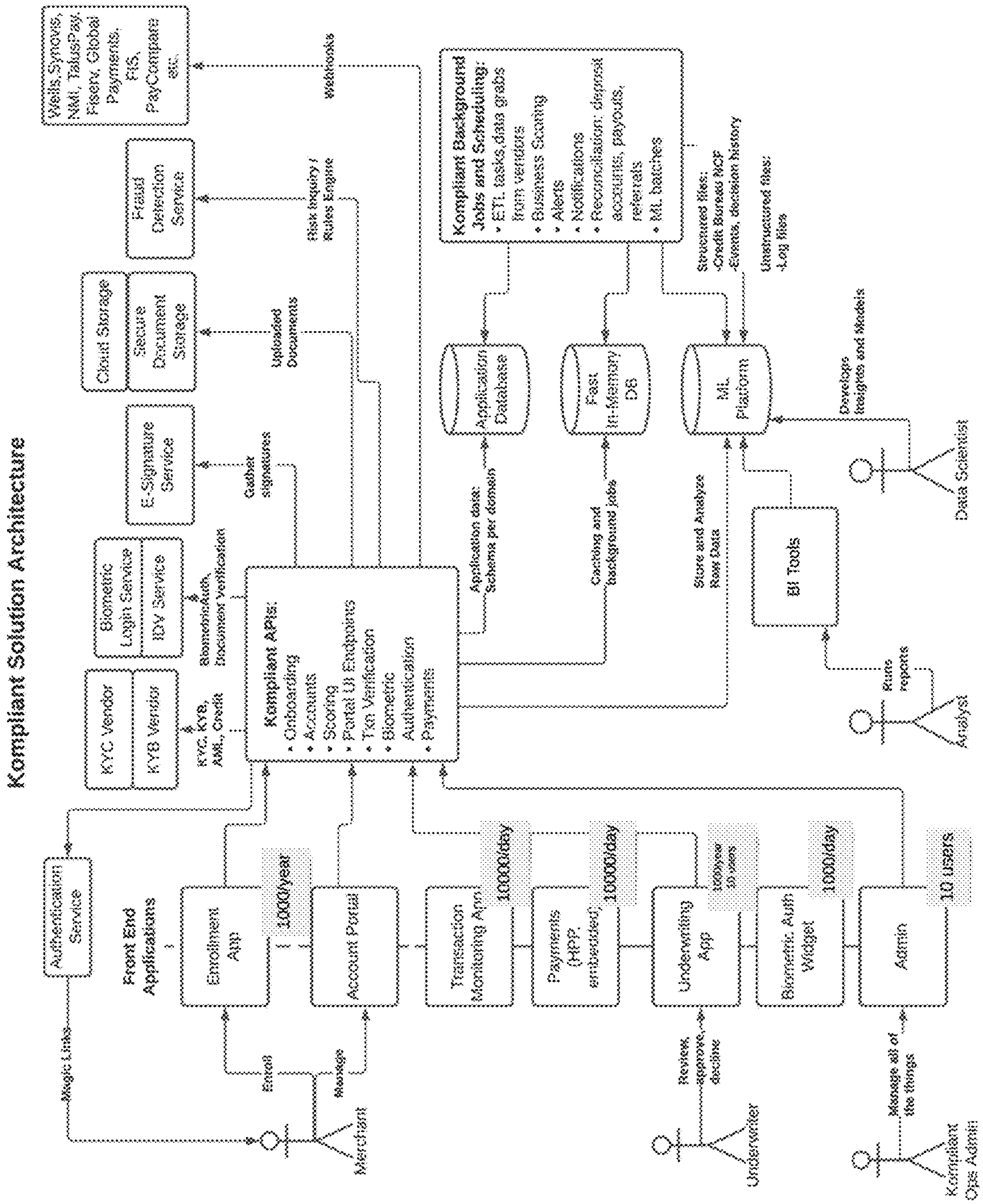
FIGURE 3A: CCTM ARCHITECTURE

FIGURE 3B: CCTM ARCHITECTURE
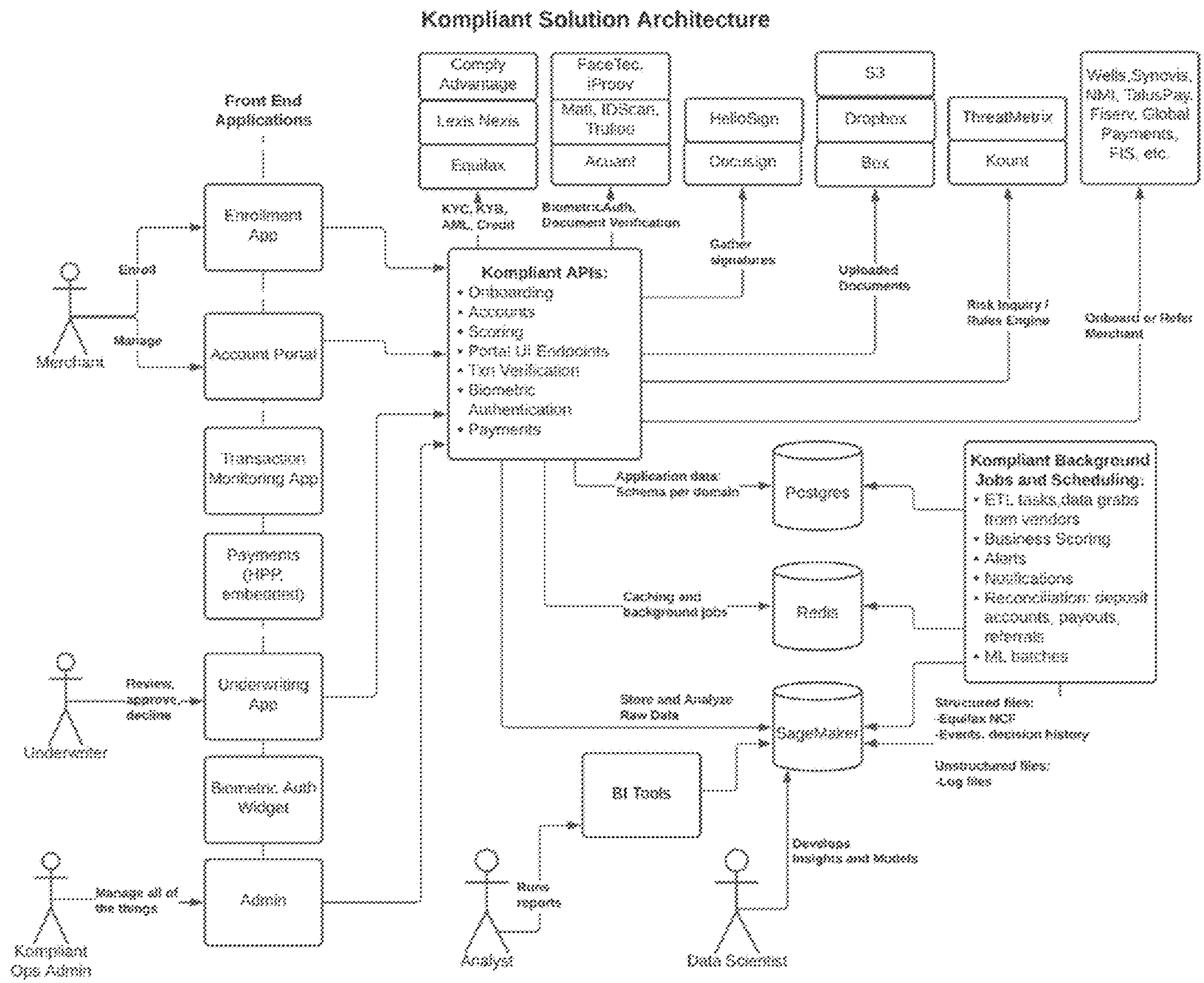

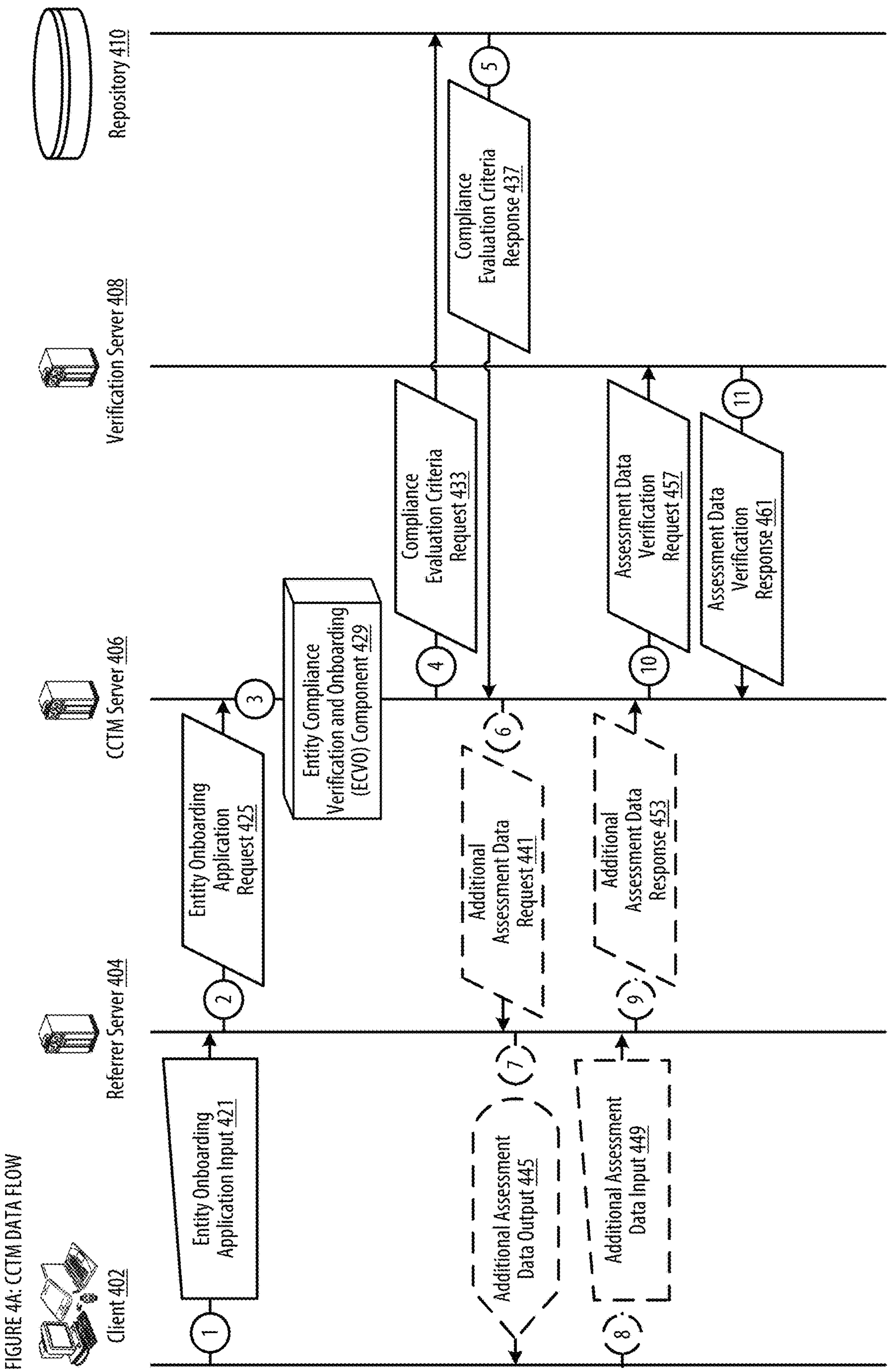
FIGURE 4A: CCTM DATA FLOW
Client 402
Referrer Server 404
CCTM Server 406
Verification Server 408
Repository 410
1
Entity Onboarding Application Input 421
2
Entity Onboarding Application Request 425
3
Entity Compliance Verification and Onboarding (ECVO) Component 429
4
Compliance Evaluation Criteria Request 433
5
Compliance Evaluation Criteria Response 437
6
Additional Assessment Data Request 441
7
Additional Assessment Data Output 445
8
Additional Assessment Data Input 449
9
Additional Assessment Data Response 453
10
Assessment Data Verification Request 457
11
Assessment Data Verification Response 461

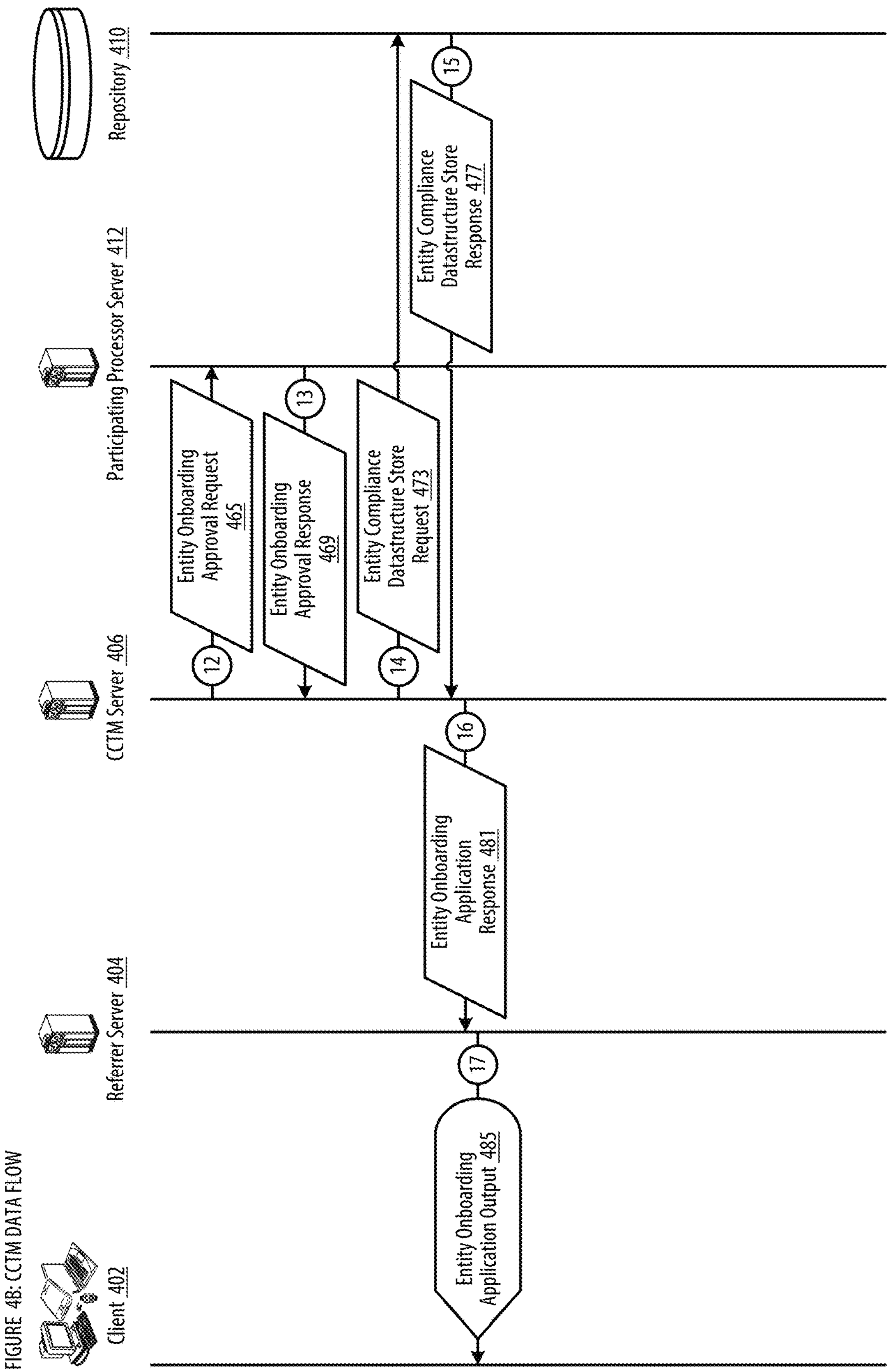
FIGURE 4B: CCTM DATA FLOW
Client 402
Referrer Server 404
CCTM Server 406
Participating Processor Server 412
Repository 410
12
Entity Onboarding Approval Request 465
13
Entity Onboarding Approval Response 469
14
Entity Compliance Datastructure Store Request 473
15
Entity Compliance Datastructure Store Response 477
16
Entity Onboarding Application Response 481
17
Entity Onboarding Application Output 485

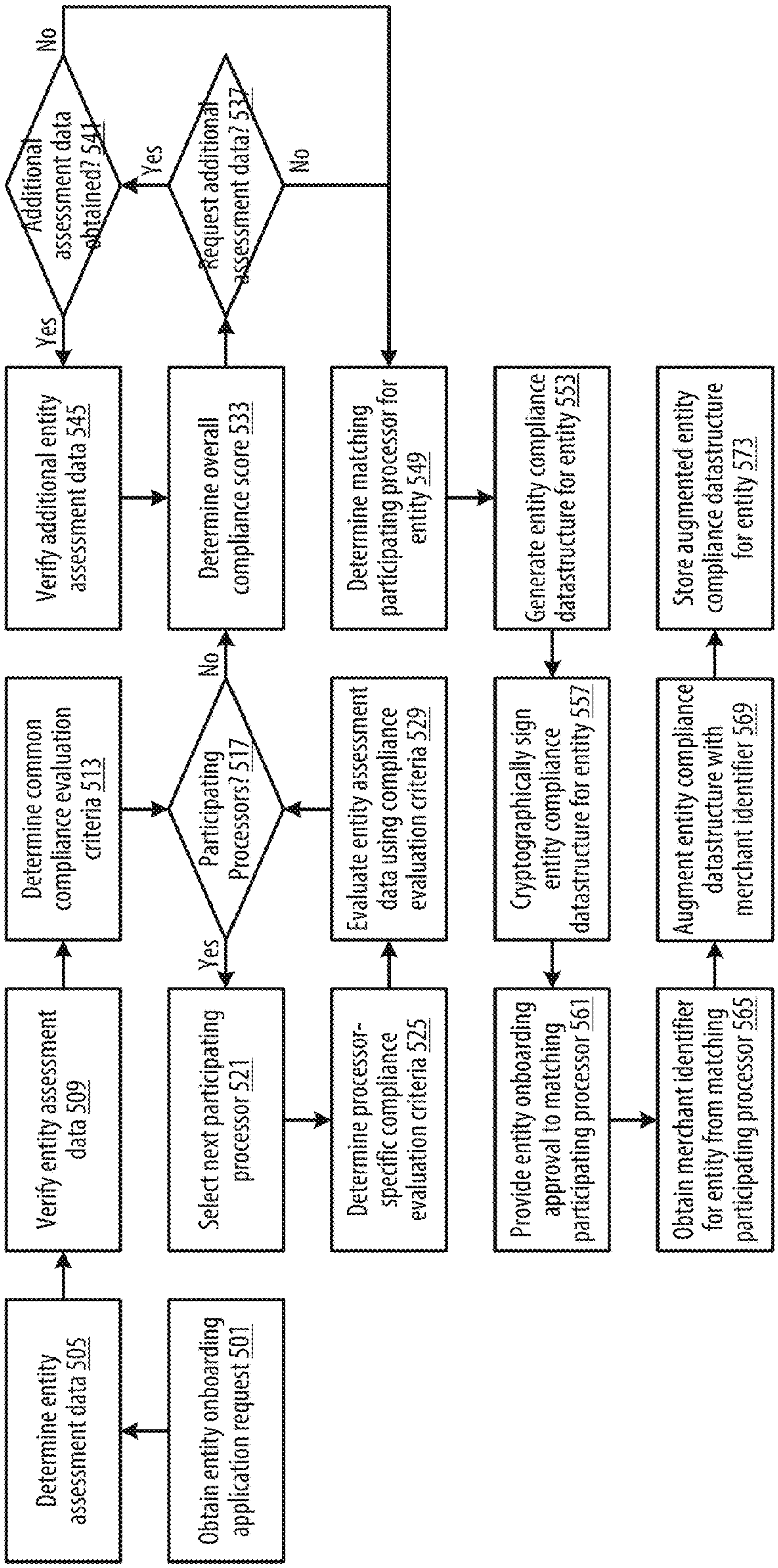
FIGURE 5: CCTM ECVO COMPONENT

FIGURE 6A: CCTM IMPLEMENTATION CASE
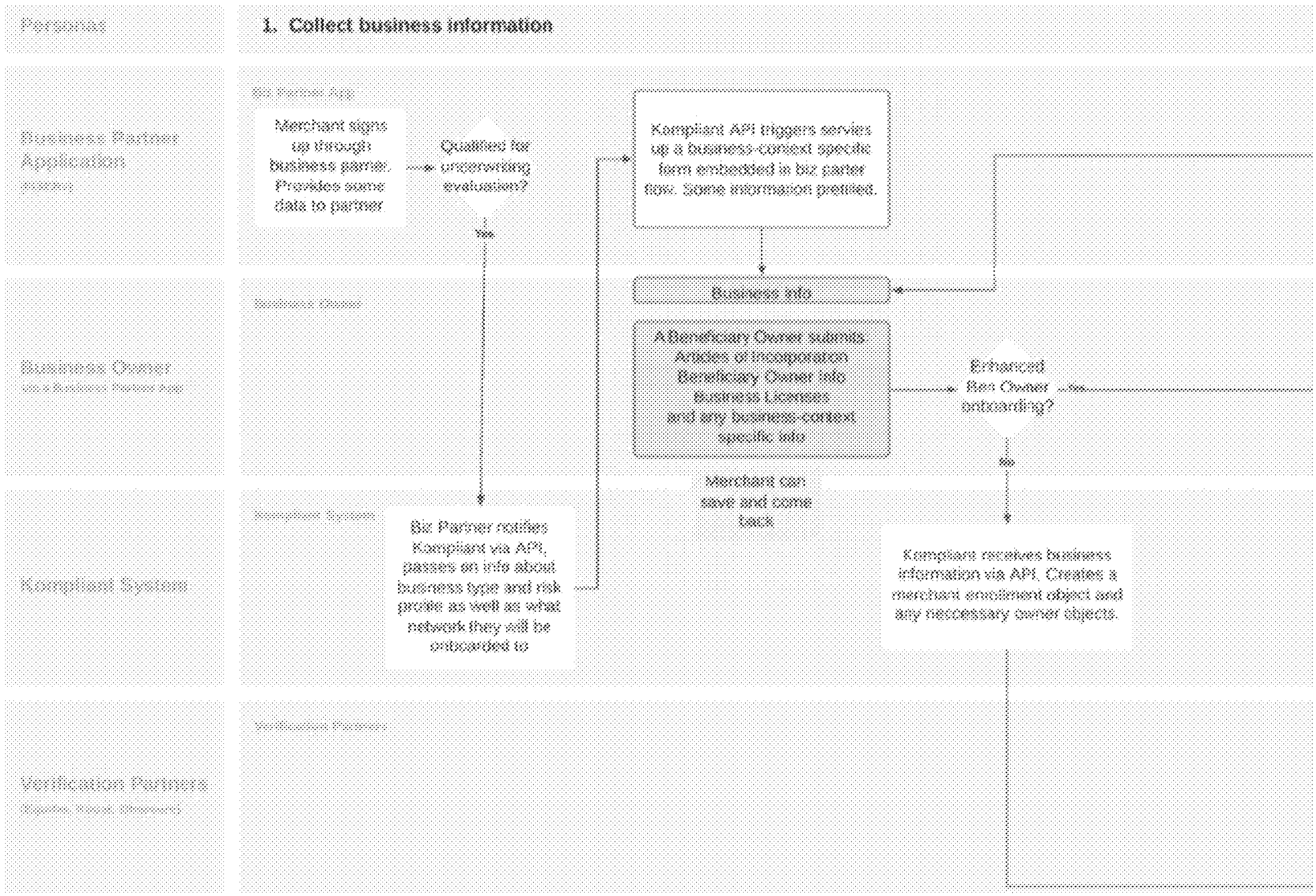

FIGURE 6B: CCTM IMPLEMENTATION CASE
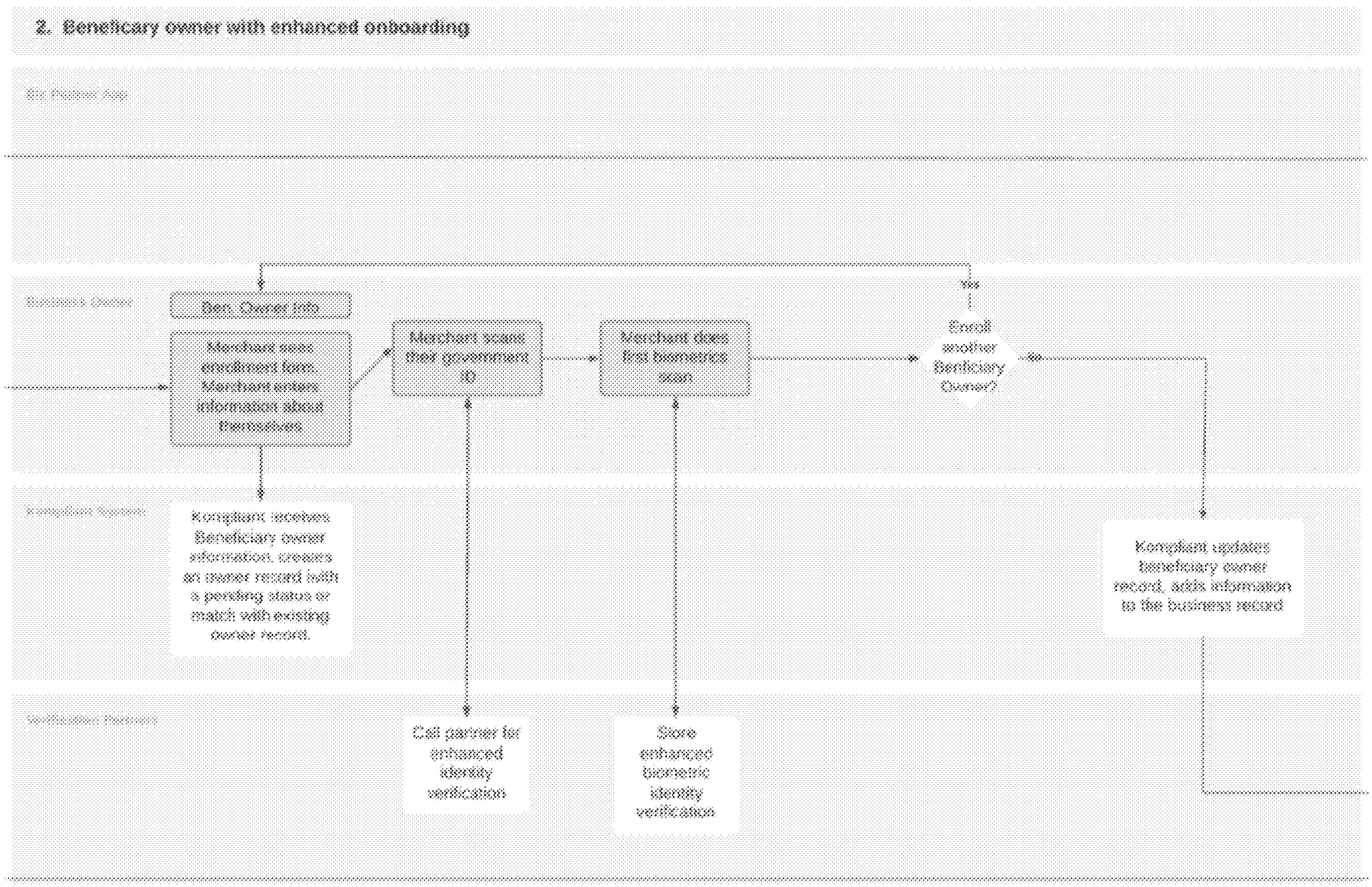

FIGURE 6 C: CCTM IMPLEMENTATION CASE
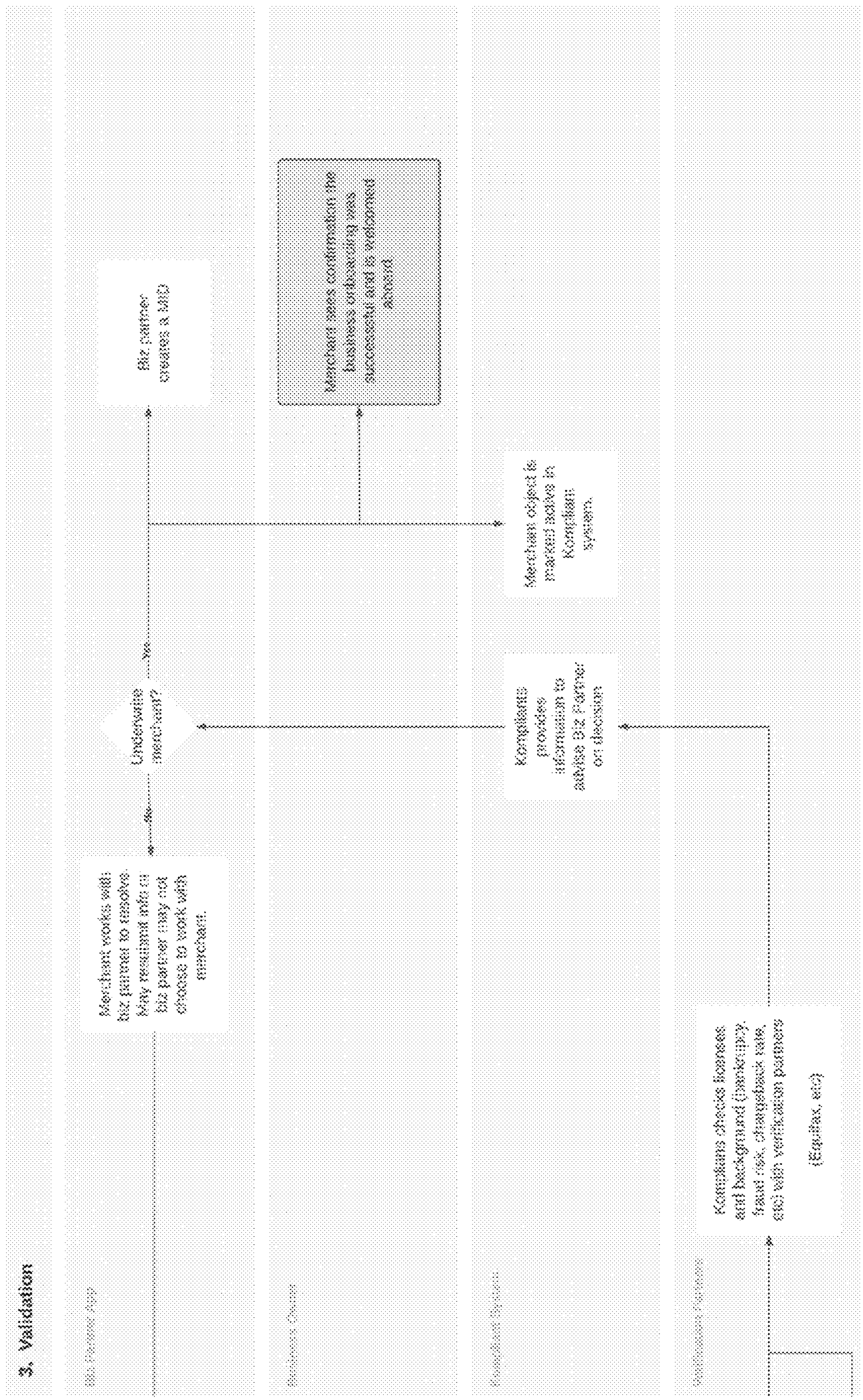

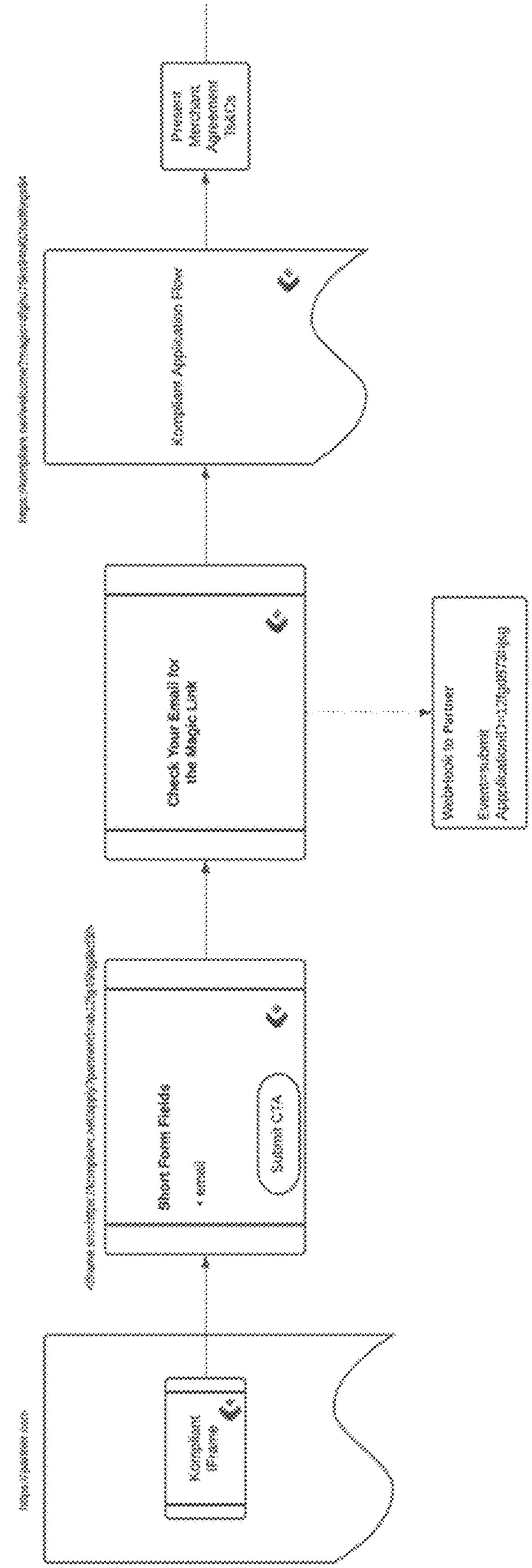
FIGURE 6 D: CCTM IMPLEMENTATION CASE

FIGURE 6E: CCTM IMPLEMENTATION CASE
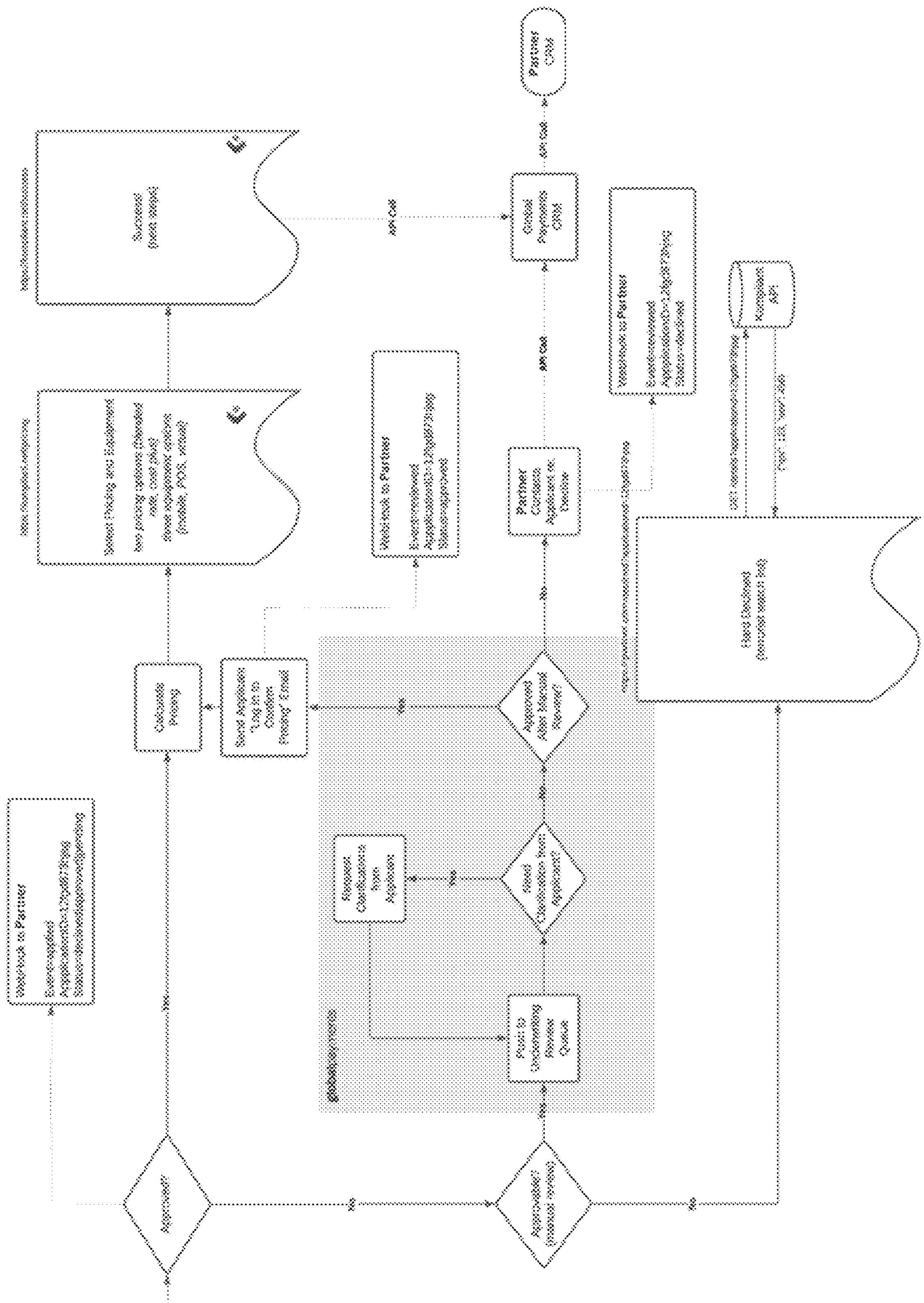

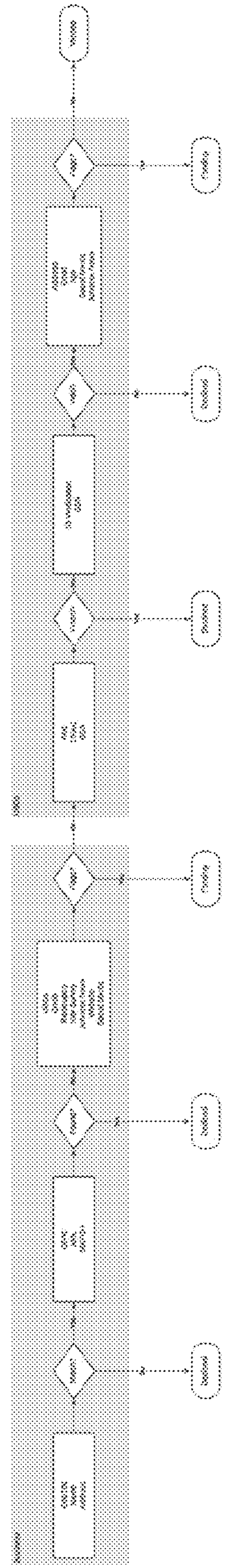
FIGURE 7A: CCTM IMPLEMENTATION CASE

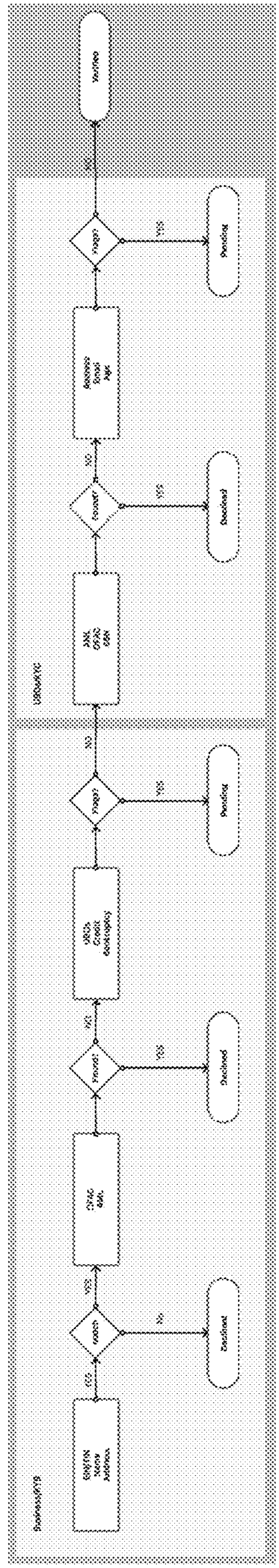
FIGURE 7B: CCTM IMPLEMENTATION CASE

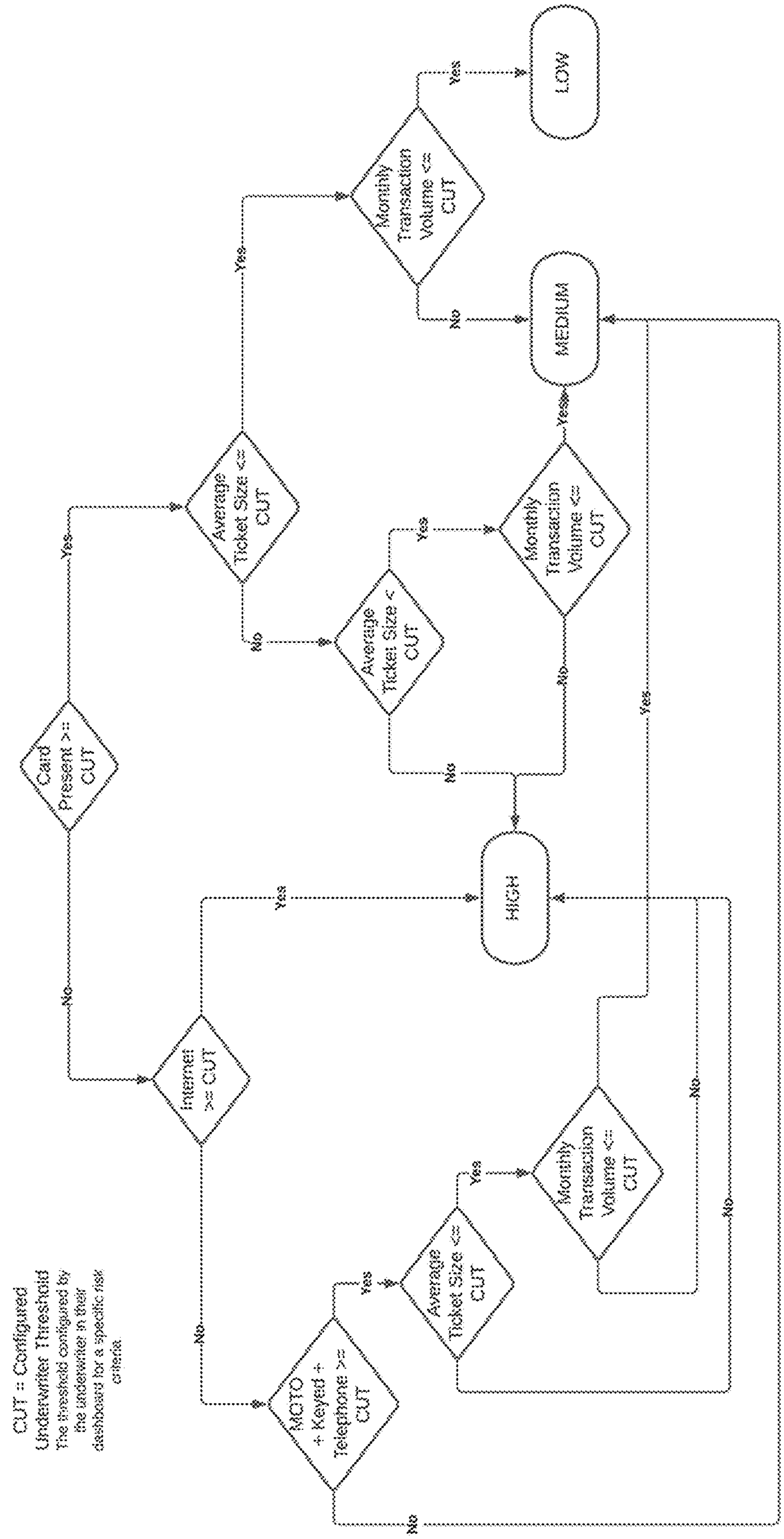
FIGURE 7 C: CCTM IMPLEMENTATION CASE

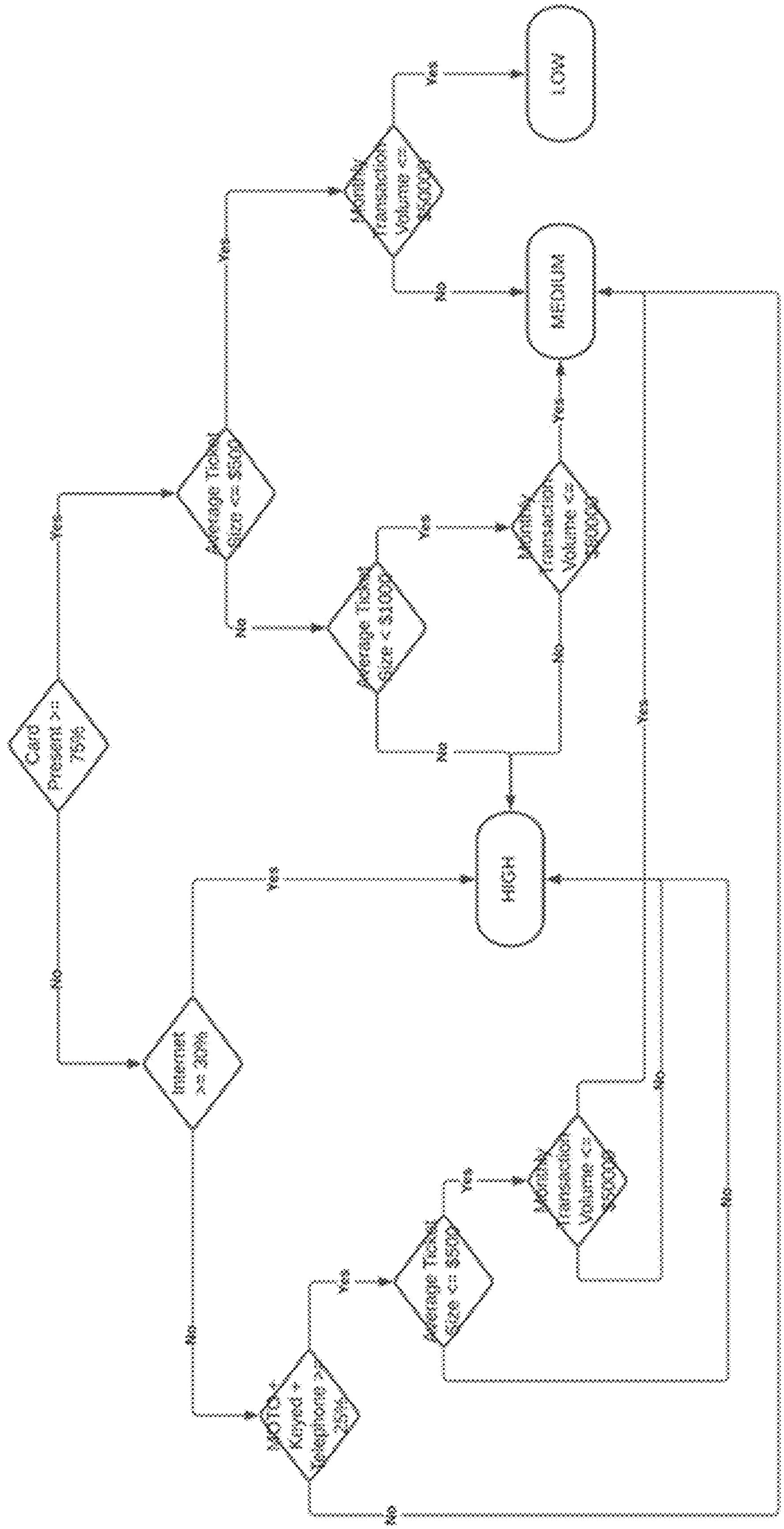
FIGURE 7 D: CCTM IMPLEMENTATION CASE

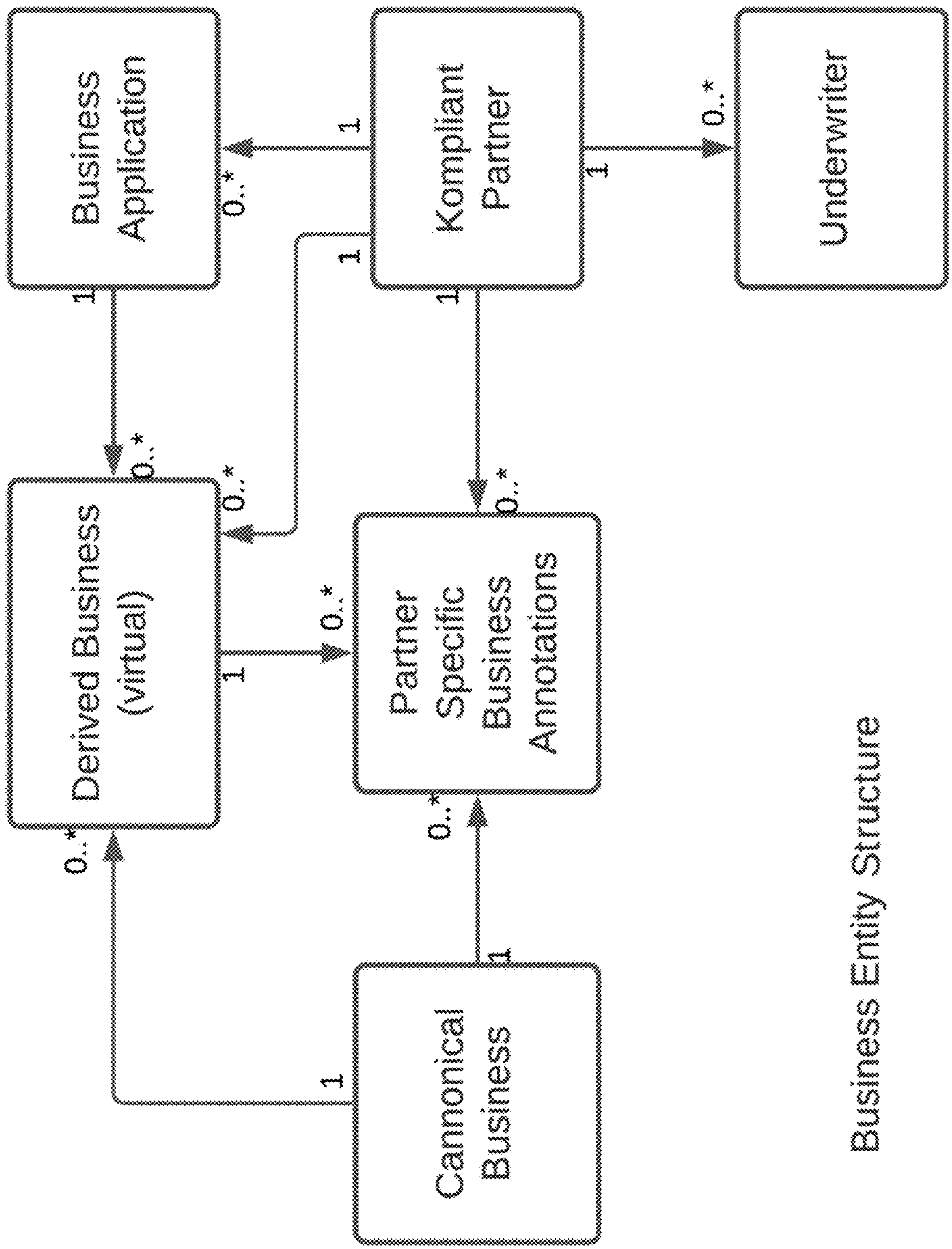
FIGURE 7E: CCTM IMPLEMENTATION CASE

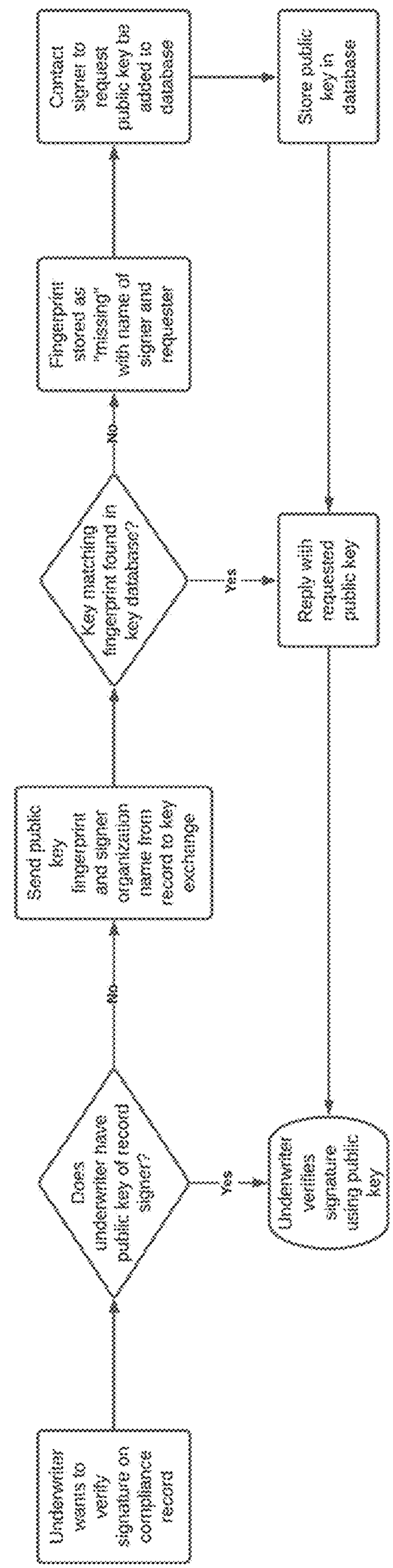
FIGURE 7F: CCTM IMPLEMENTATION CASE

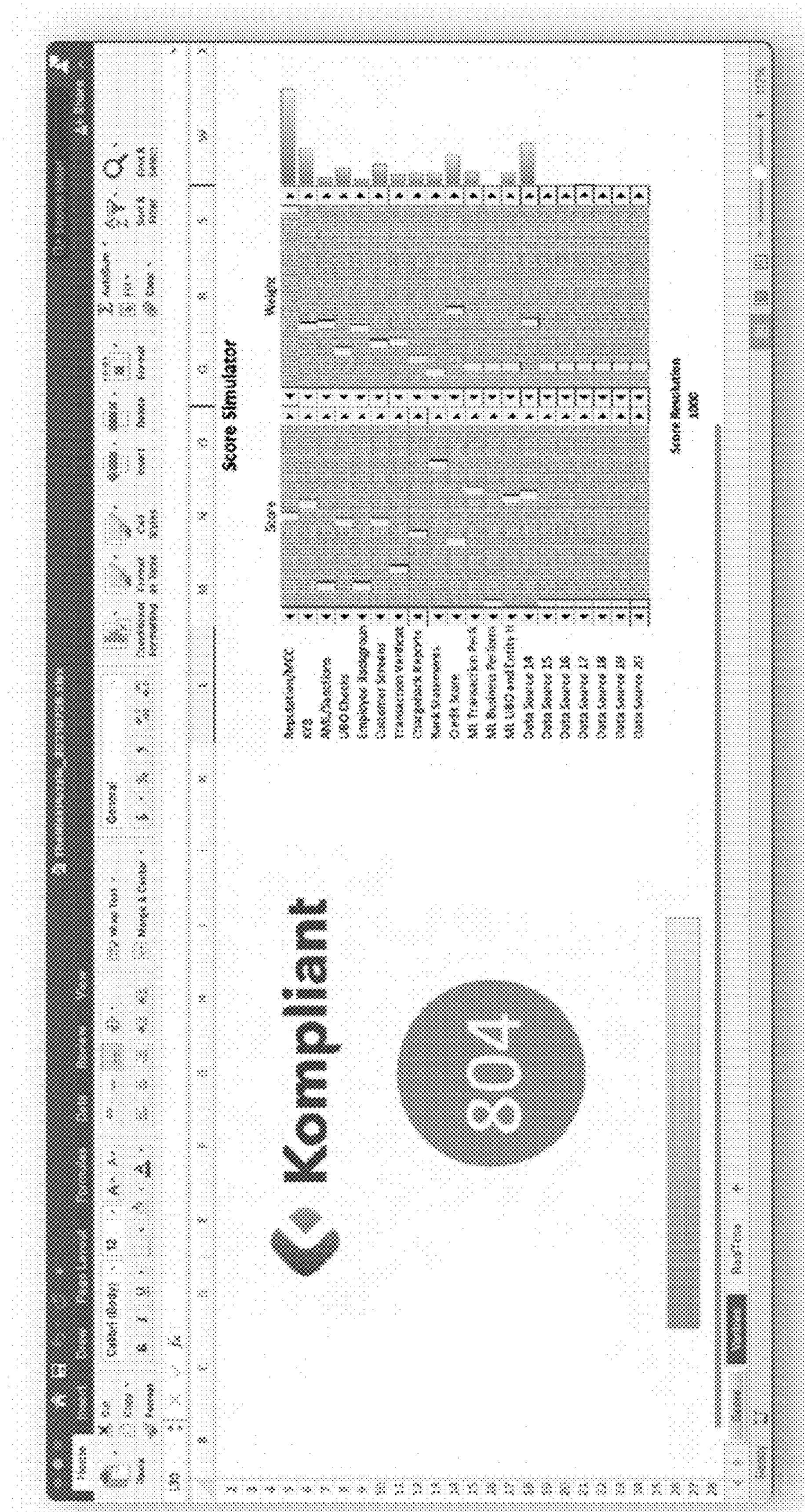
FIGURE 8A: CCTM IMPLEMENTATION CASE

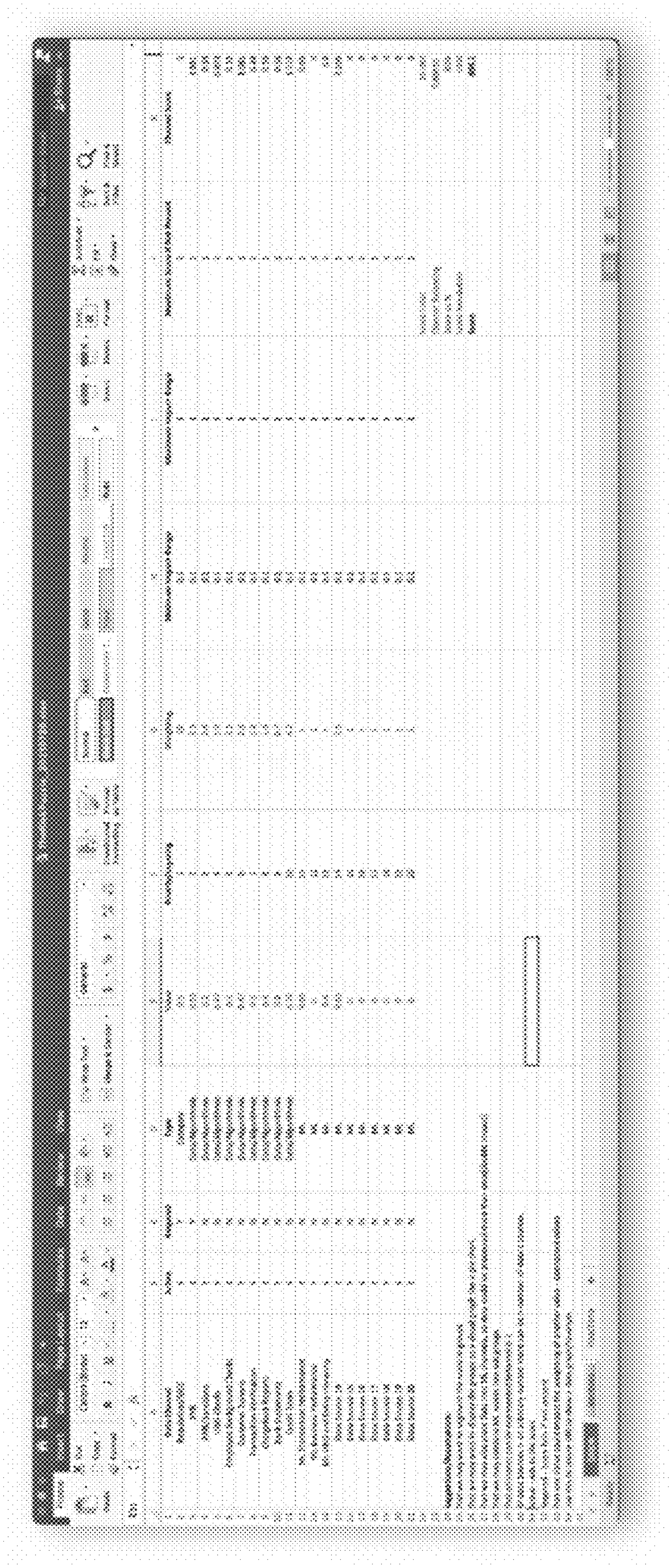
FIGURE 8B: CCTM IMPLEMENTATION CASE

Figure 8:
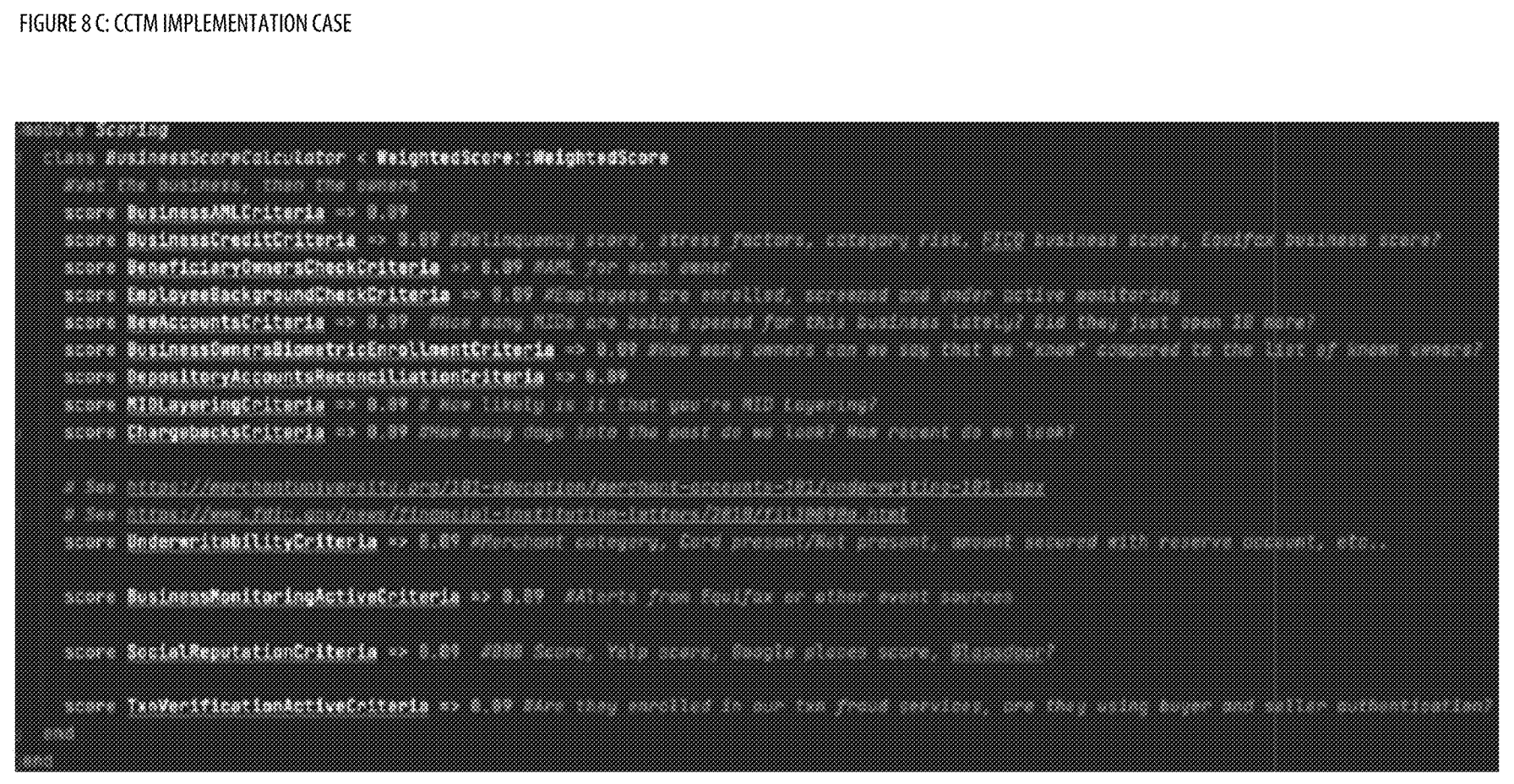

FIGURE 8 C: CCTM IMPLEMENTATION CASE

```
module Scoring
  class BusinessScoreCalculator < WeightedScore::WeightedScore
    #set the business, then the owners
    score BusinessAMLCriteria => 0.09
    score BusinessCreditCriteria => 0.09 #Delinquency score, stress factors, category risk, FICO business score, Equifax business score?
    score BeneficiaryOwnersCheckCriteria => 0.09 #KYC for each owner
    score EmployeeBackgroundCheckCriteria => 0.09 #Employees are enrolled, screened and under active monitoring
    score NewAccountsCriteria => 0.09  #How many MIDs are being opened for this business lately? Did they just open 10 more?
    score BusinessOwnersBiometricEnrollmentCriteria => 0.09 #How many owners can we say that we "know" compared to the list of known owners?
    score DepositoryAccountsReconciliationCriteria => 0.09
    score MIDLayeringCriteria => 0.09 # How likely is it that you're MID layering?
    score ChargebacksCriteria => 0.09 #How many days into the past do we look? How recent do we look?

    # See [illegible]
    # See [illegible]
    score UnderwritabilityCriteria => 0.09 #Merchant category, Card present/Not present, amount secured with reserve account, etc..

    score BusinessMonitoringActiveCriteria => 0.09  #Alerts from Equifax or other event sources

    score SocialReputationCriteria => 0.09  #BBB Score, Yelp score, Google places score, Glassdoor?

    score TxnVerificationActiveCriteria => 0.09 #Are they enrolled in our txn fraud services, are they using buyer and seller authentication?
  end
end
```

FIGURE 9: CCTM IMPLEMENTATION CASE

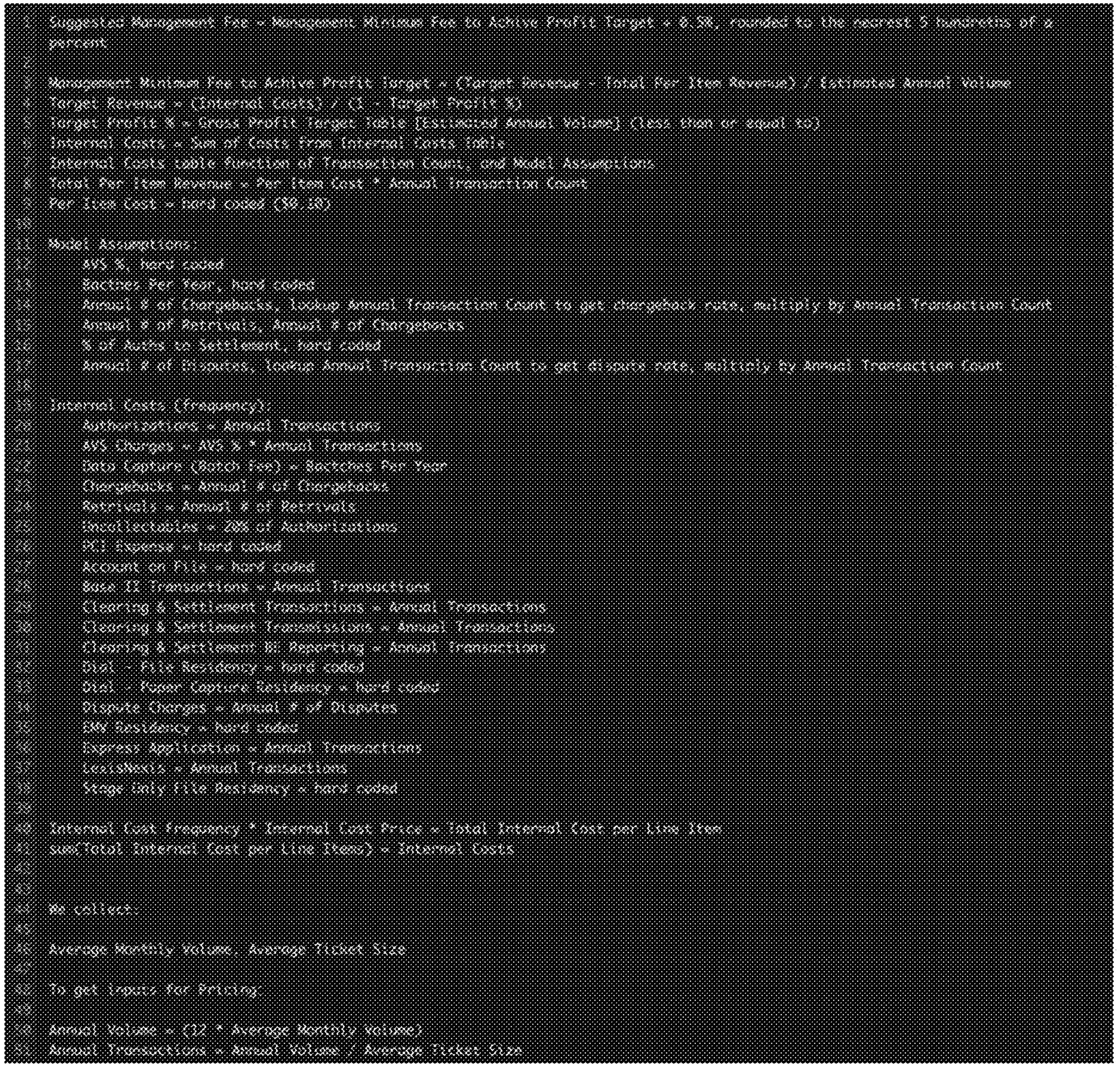

```
Suggested Management Fee = Management Minimum Fee to Achive Profit Target + 0.5%, rounded to the nearest 5 hundreths of a
percent

Management Minimum Fee to Achive Profit Target = (Target Revenue - Total Per Item Revenue) / Estimated Annual Volume
Target Revenue = (Internal Costs) / (1 - Target Profit %)
Target Profit % = Gross Profit Target Table [Estimated Annual Volume] (less than or equal to)
Internal Costs = Sum of Costs from Internal Costs Table
Internal Costs table function of Transaction Count, and Model Assumptions
Total Per Item Revenue = Per Item Cost * Annual Transaction Count
Per Item Cost = hard coded ($0.10)

Model Assumptions:
    AVS %, hard coded
    Bacthes Per Year, hard coded
    Annual # of Chargebacks, lookup Annual Transaction Count to get chargeback rate, multiply by Annual Transaction Count
    Annual # of Retrivals, Annual # of Chargebacks
    % of Auths to Settlement, hard coded
    Annual # of Disputes, lookup Annual Transaction Count to get dispute rate, multiply by Annual Transaction Count

Internal Costs (frequency):
    Authorizations = Annual Transactions
    AVS Charges = AVS % * Annual Transactions
    Data Capture (Batch Fee) = Batches Per Year
    Chargebacks = Annual # of Chargebacks
    Retrivals = Annual # of Retrivals
    Uncollectables = 20% of Authorizations
    PCI Expense = hard coded
    Account on File = hard coded
    Base II Transactions = Annual Transactions
    Clearing & Settlement Transactions = Annual Transactions
    Clearing & Settlement Transmissions = Annual Transactions
    Clearing & Settlement BE Reporting = Annual Transactions
    Dial - File Residency = hard coded
    Dial - Paper Capture Residency = hard coded
    Dispute Charges = Annual # of Disputes
    EMV Residency = hard coded
    Express Application = Annual Transactions
    LexisNexis = Annual Transactions
    Stage Only File Residency = hard coded

Internal Cost Frequency * Internal Cost Price = Total Internal Cost per Line Item
sum(Total Internal Cost per Line Items) = Internal Costs


We collect:

Average Monthly Volume, Average Ticket Size

To get inputs for Pricing:

Annual Volume = (12 * Average Monthly Volume)
Annual Transactions = Annual Volume / Average Ticket Size
```

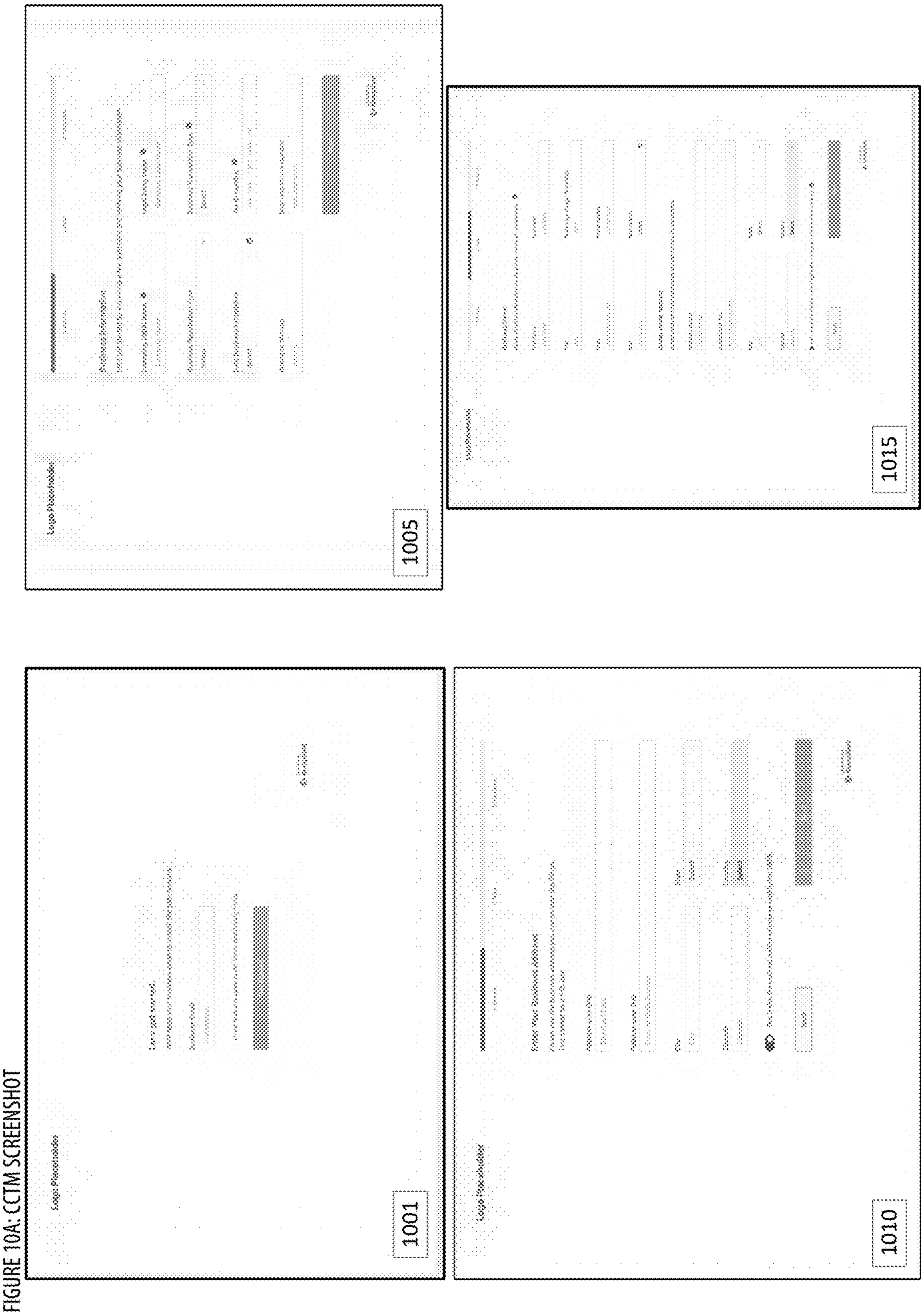
FIGURE 10A: CCTM SCREENSHOT

FIGURE 10B: CCTM SCREENSHOT
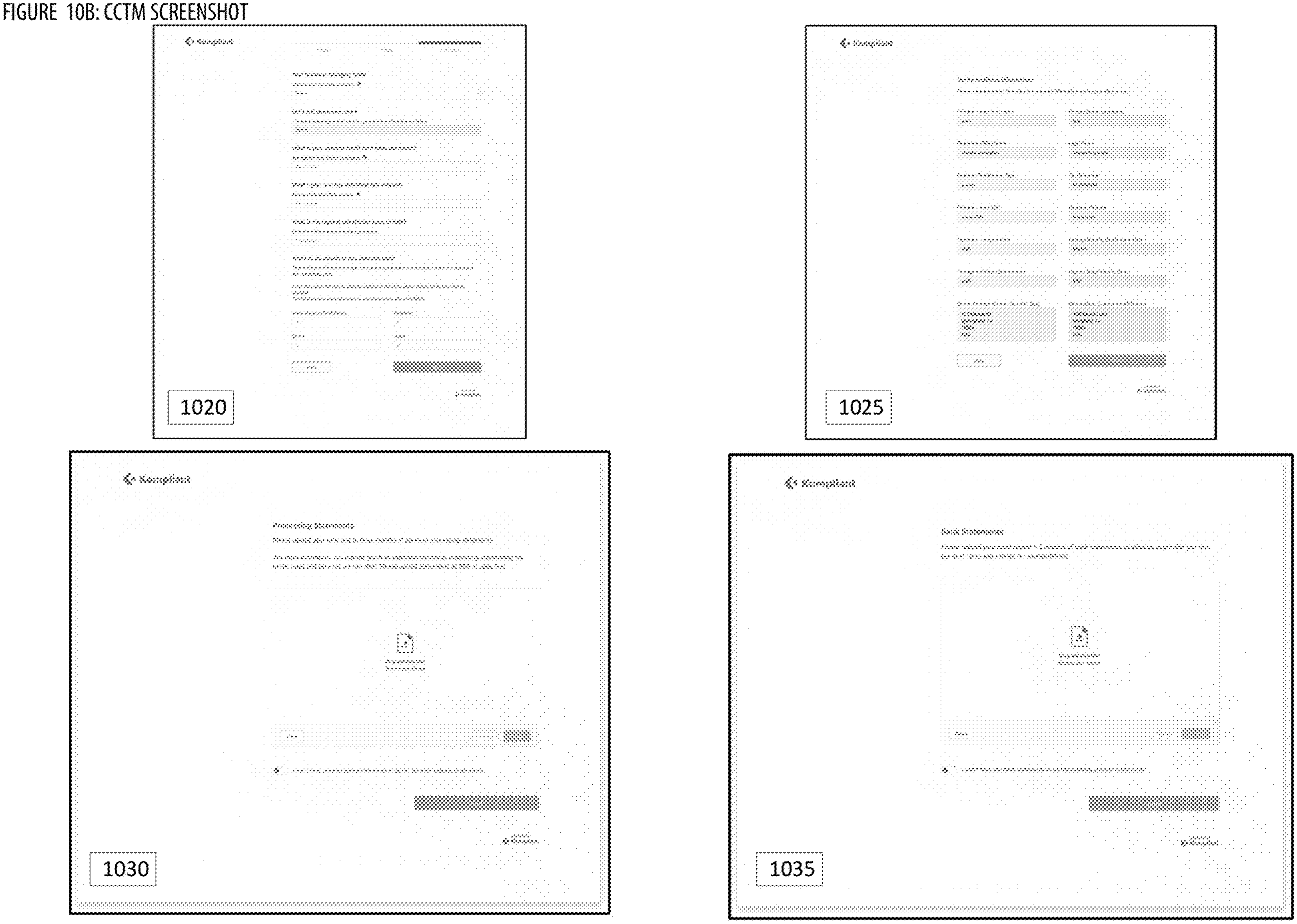

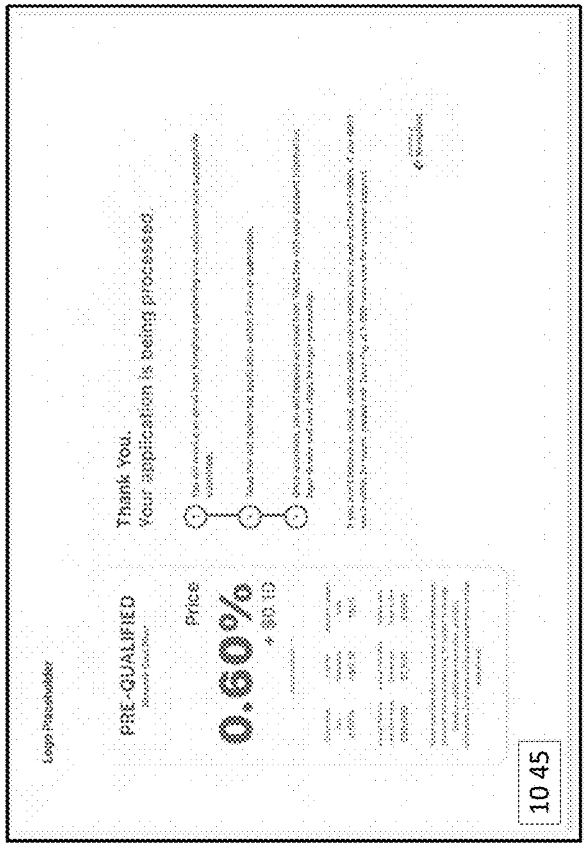
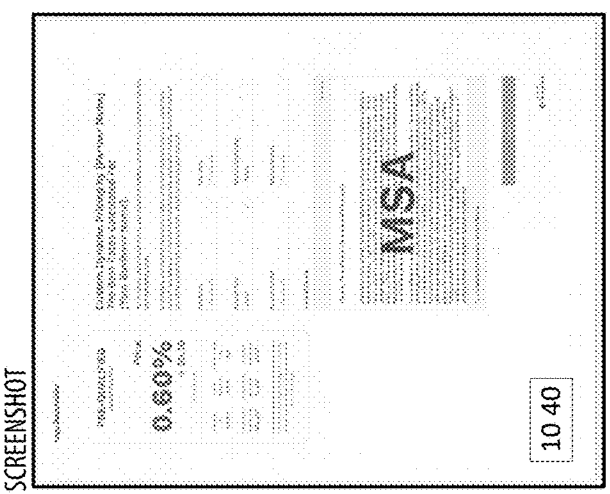
FIGURE 10 C: CCTM SCREENSHOT

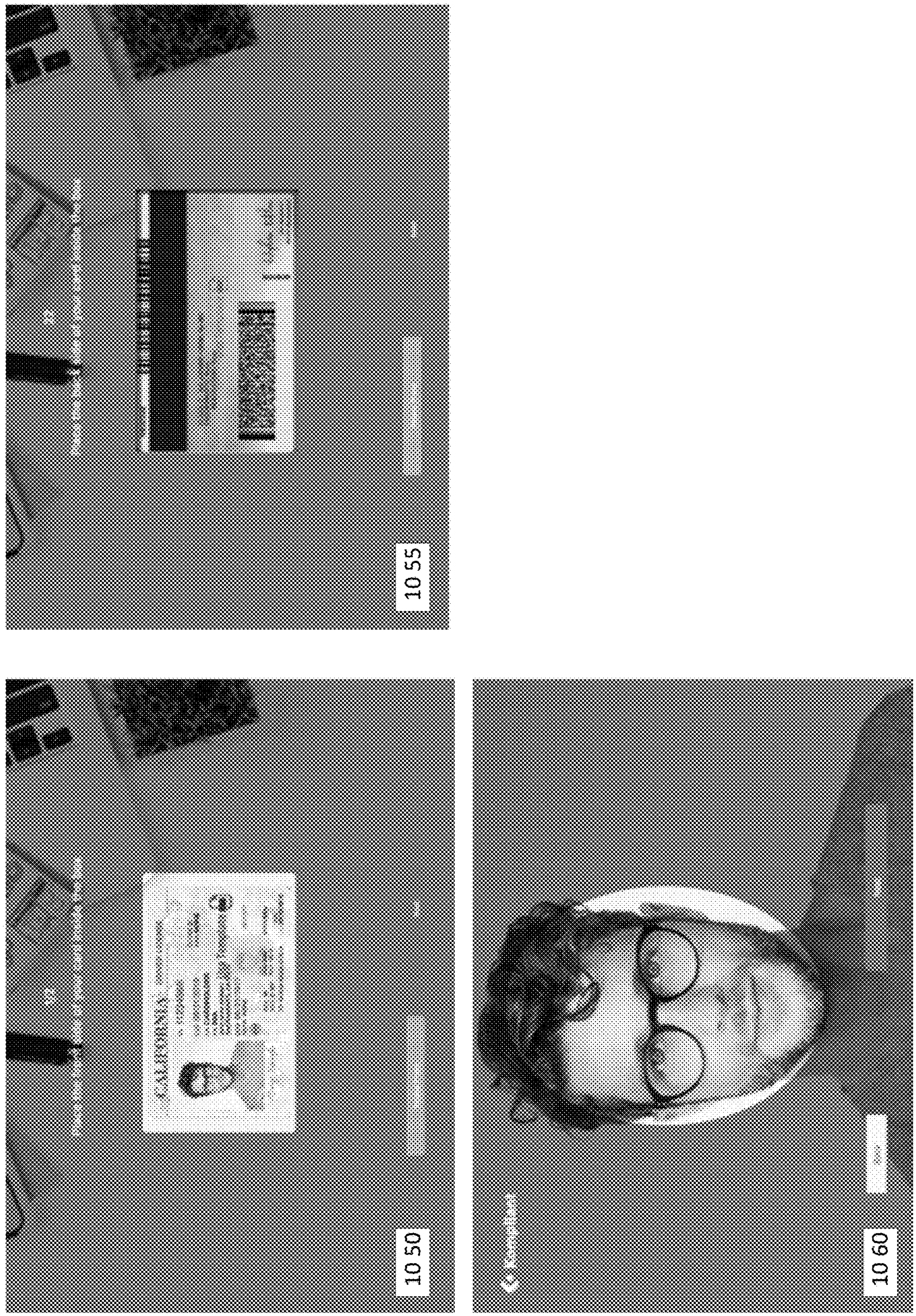
FIGURE 10 D: CCTM SCREENSHOT

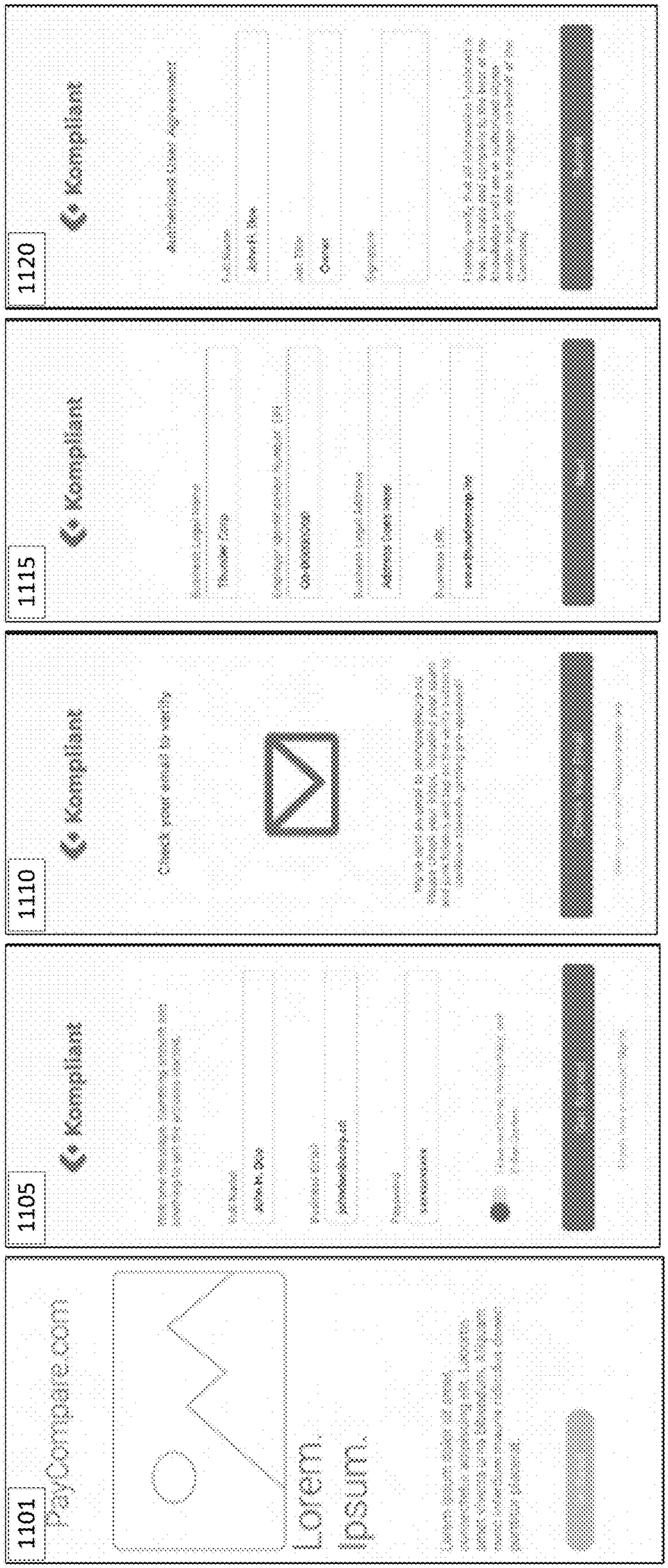
FIGURE 11A: CCTM SCREENSHOT

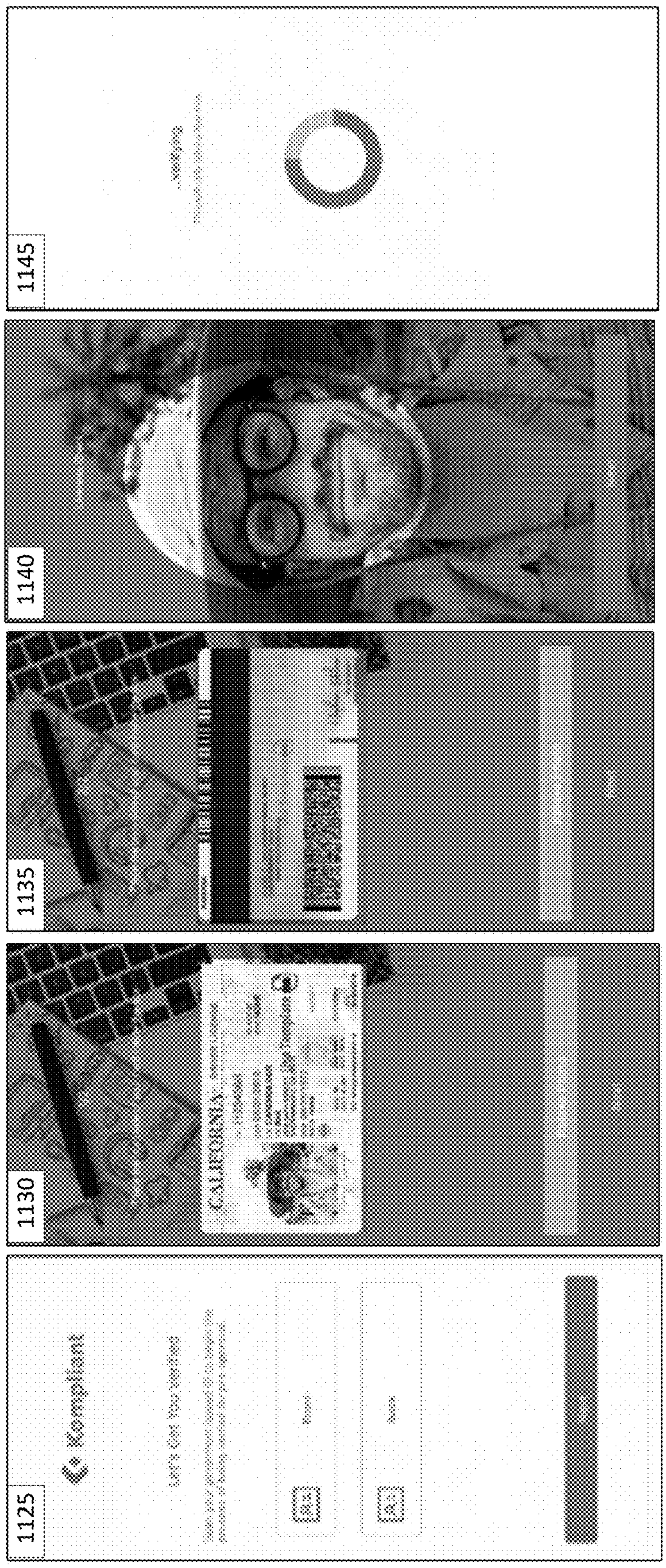
FIGURE 11B: CCTM SCREENSHOT

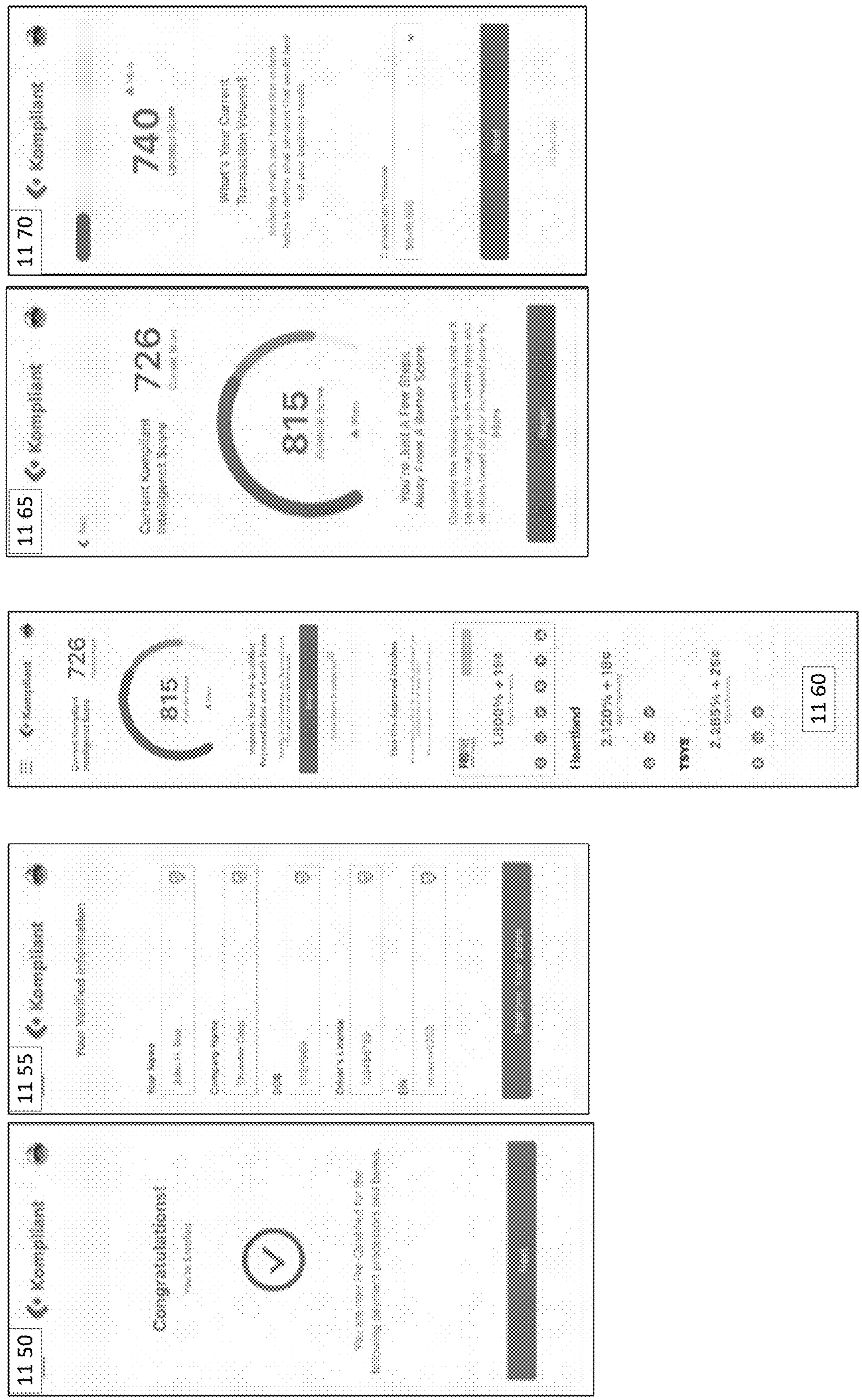
FIGURE 11 C: CCTM SCREENSHOT

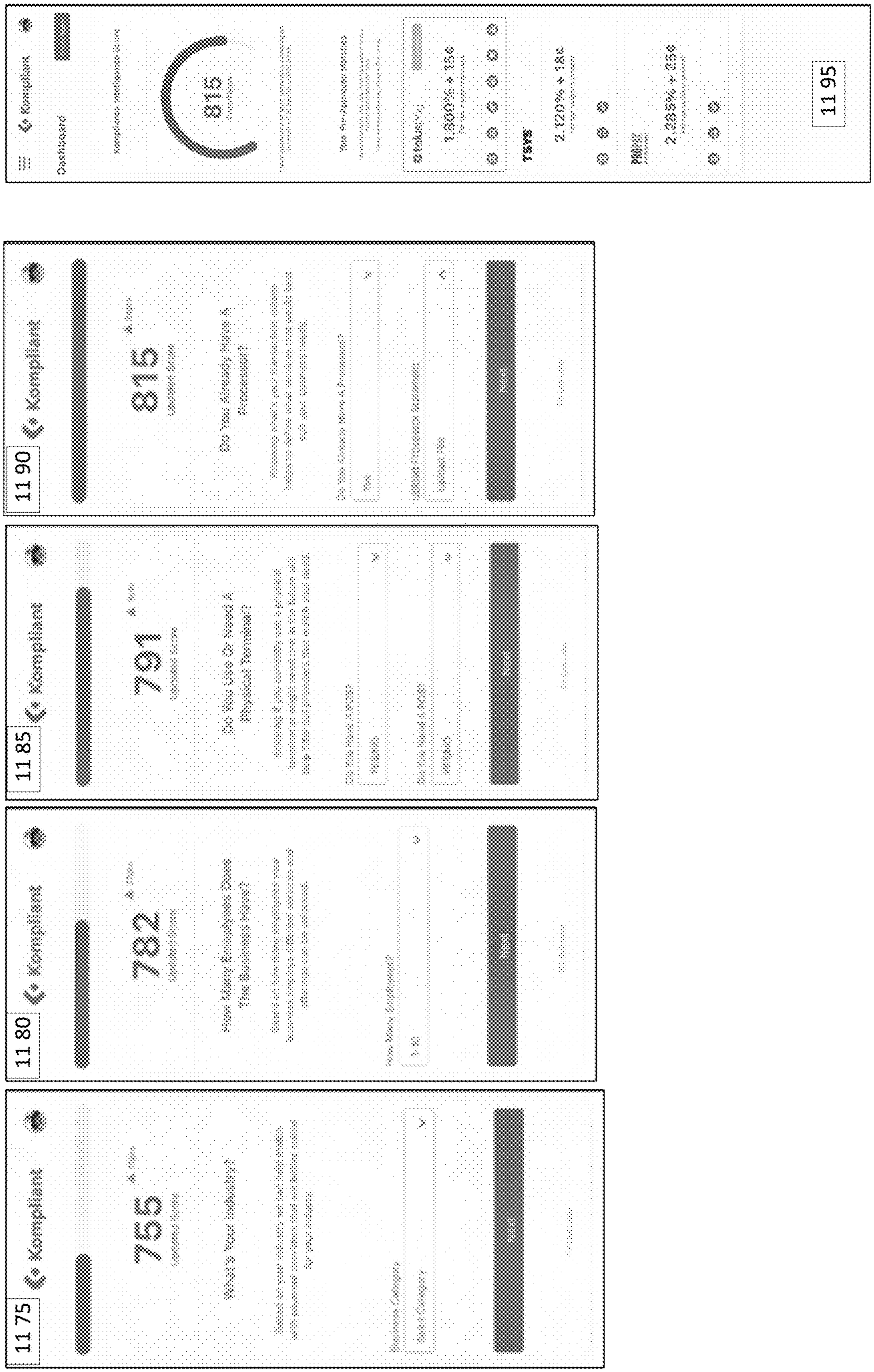
FIGURE 11 D: CCTM SCREENSHOT

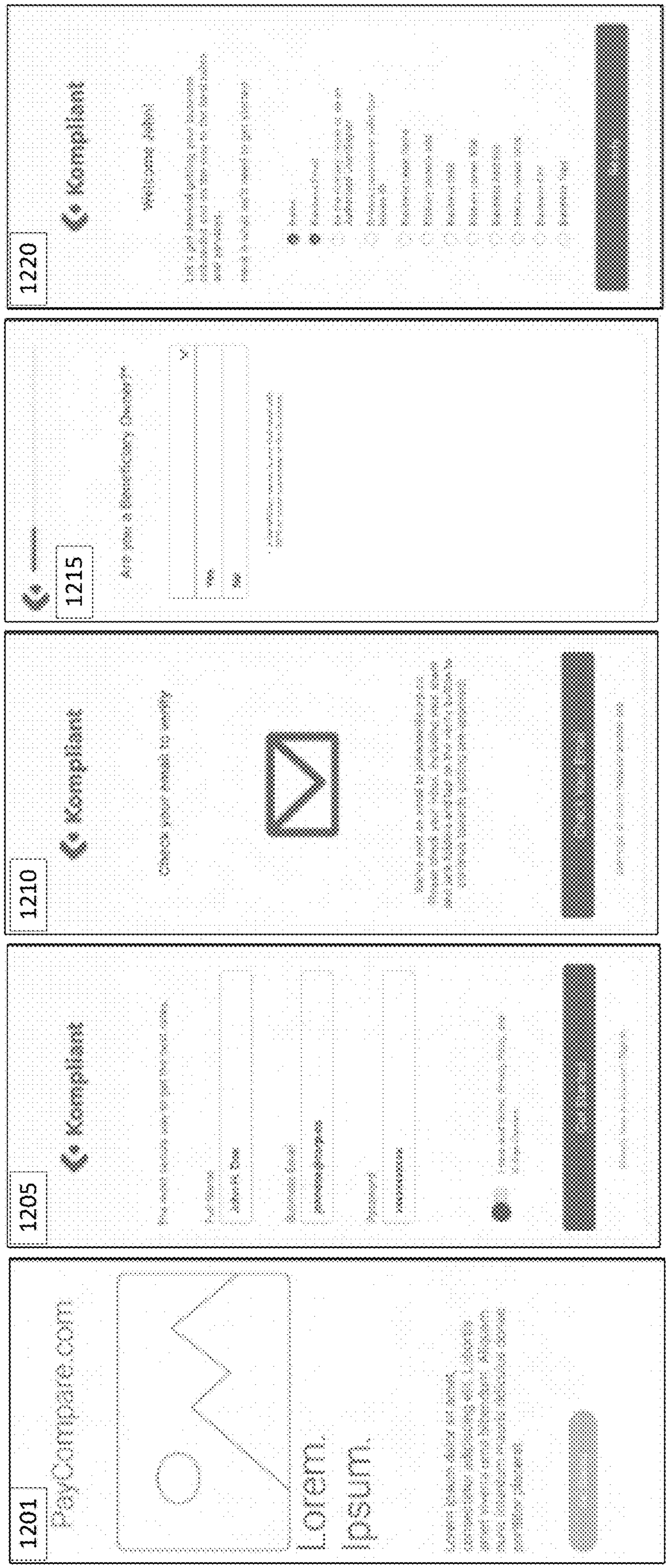
FIGURE 12A: CCTM SCREENSHOT

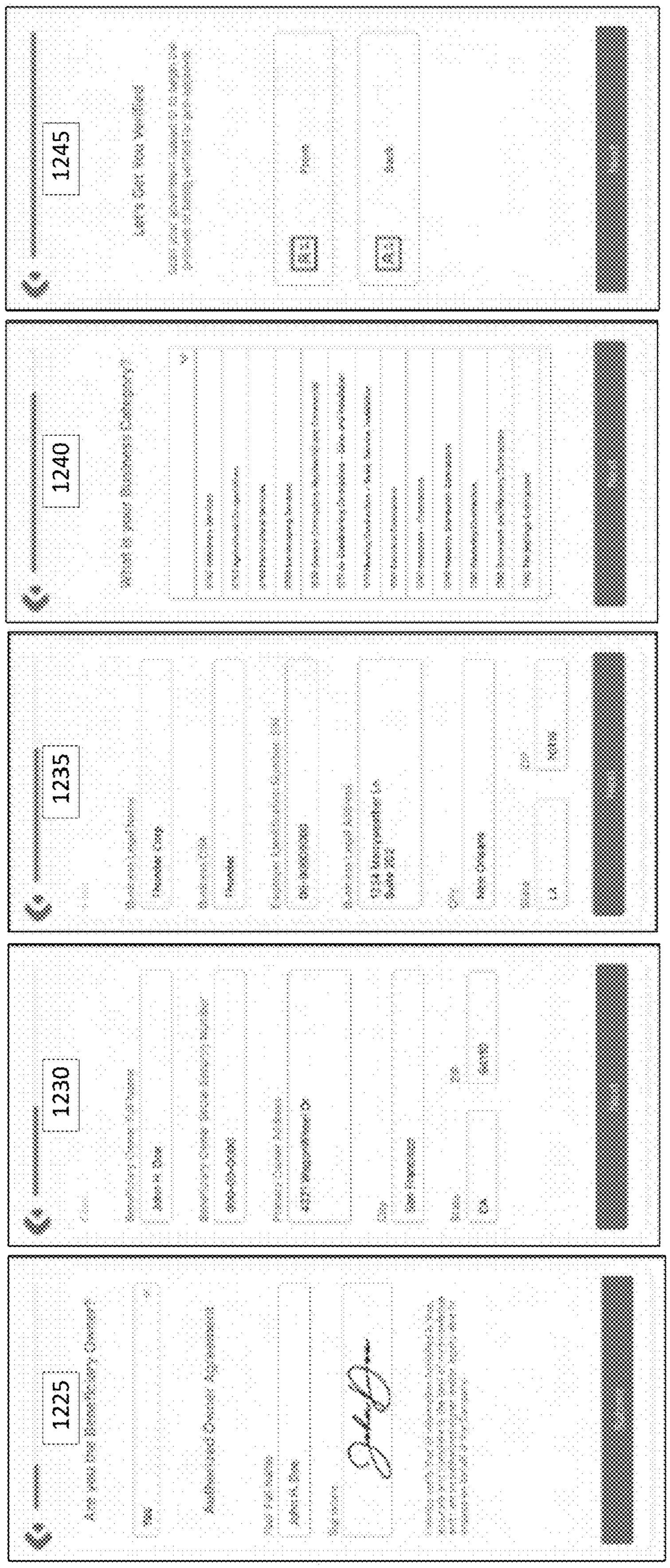
FIGURE 12B: CCTM SCREENSHOT

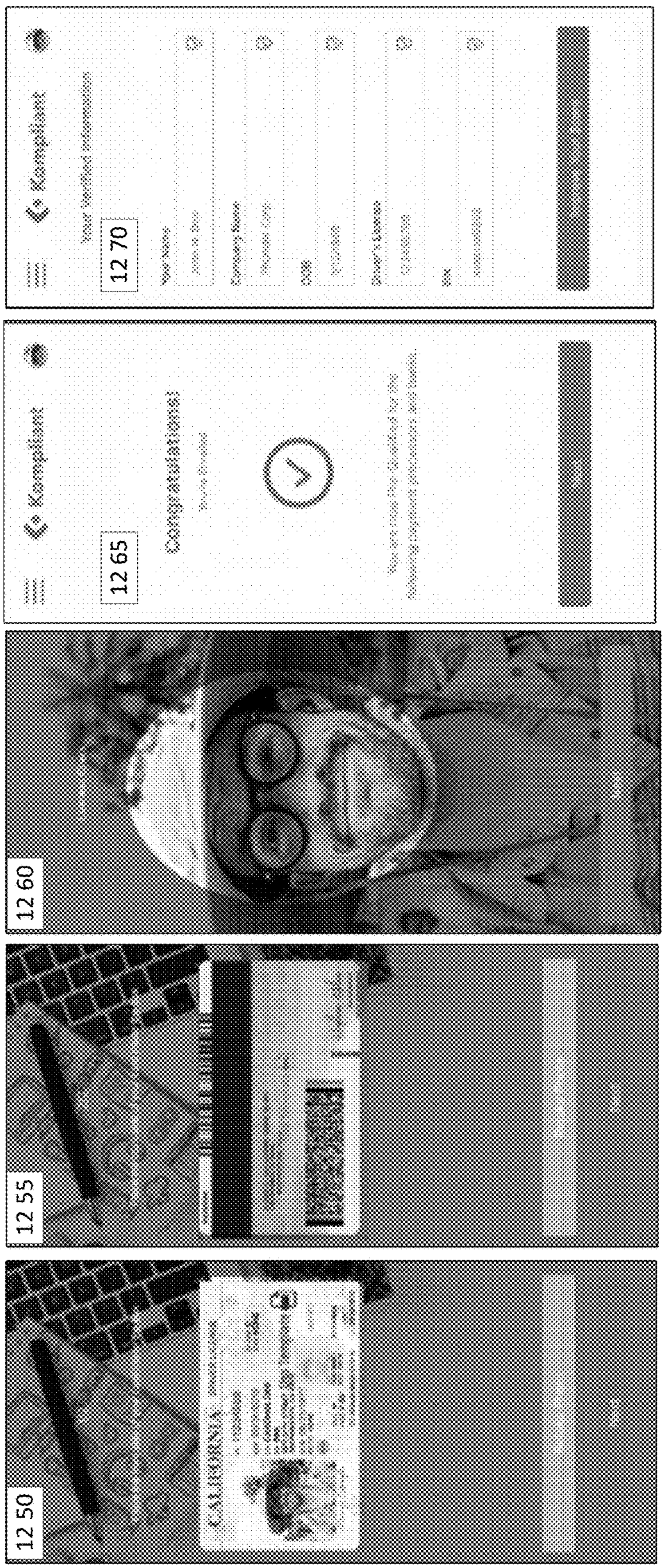
FIGURE 12 C: CCTM SCREENSHOT

FIGURE 12 D: CCTM SCREENSHOT
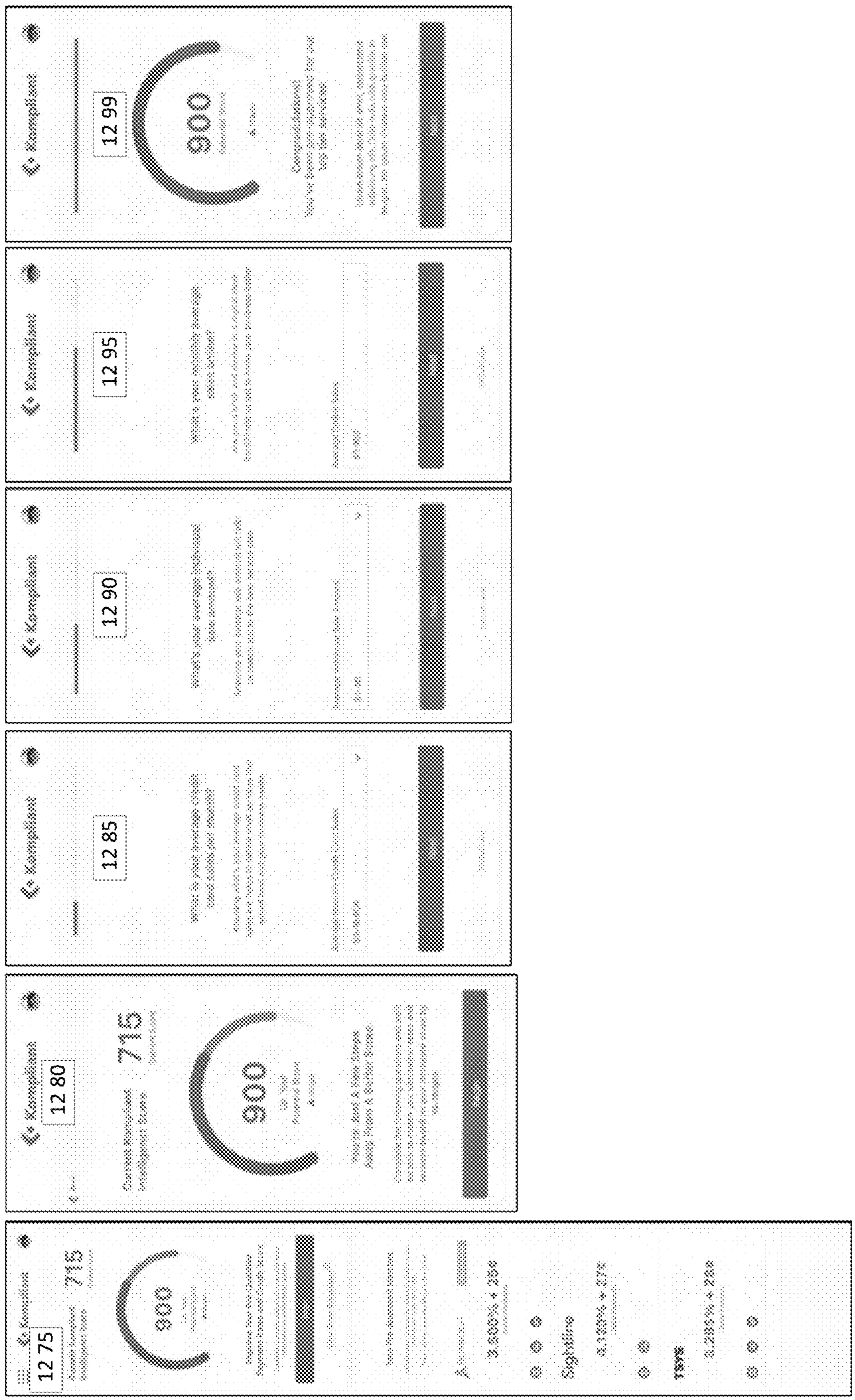

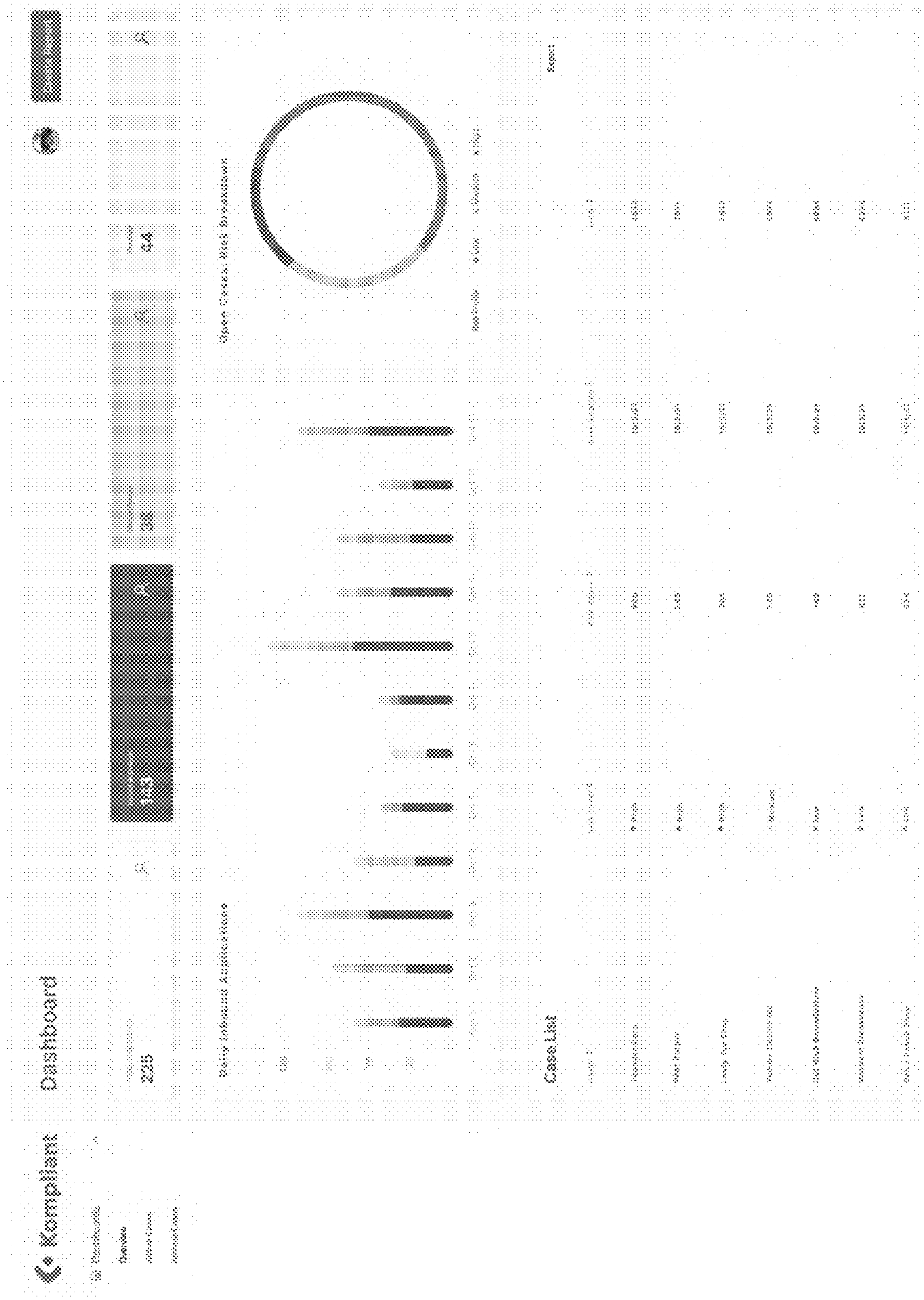
FIGURE 13A: CCTM SCREENSHOT

Kompliant
Dashboard
Welcome back, Steven
Applicants
All Risk
All Pending Cases
List View
My Watch List
Mary's Cupcakes
Uncle Joe's Liquor Cabinet
Brightime Candles
Cardigans and Skirts
Bob's Law
Packages and Things
Digital Sweater Shop
Multibrand Cereal Store
St. Charles Ave Pub
Gardens & Trees

FIGURE 13B: CCTM SCREENSHOT

Kompliant
Dashboard
Welcome back, Steven
255
Applicants
High Risk
143
36
44
All Pending Cases
Gallery View
List View
Maryd Cupcakes
Cardigans and Skirts
Digital Sweater Shop
Uncle Joe's Liquor Cabinet
Bob's Law
Multibrand Cereal Store
Packages and Things
St. Charles Ave Pub

FIGURE 13 C: CCTM SCREENSHOT

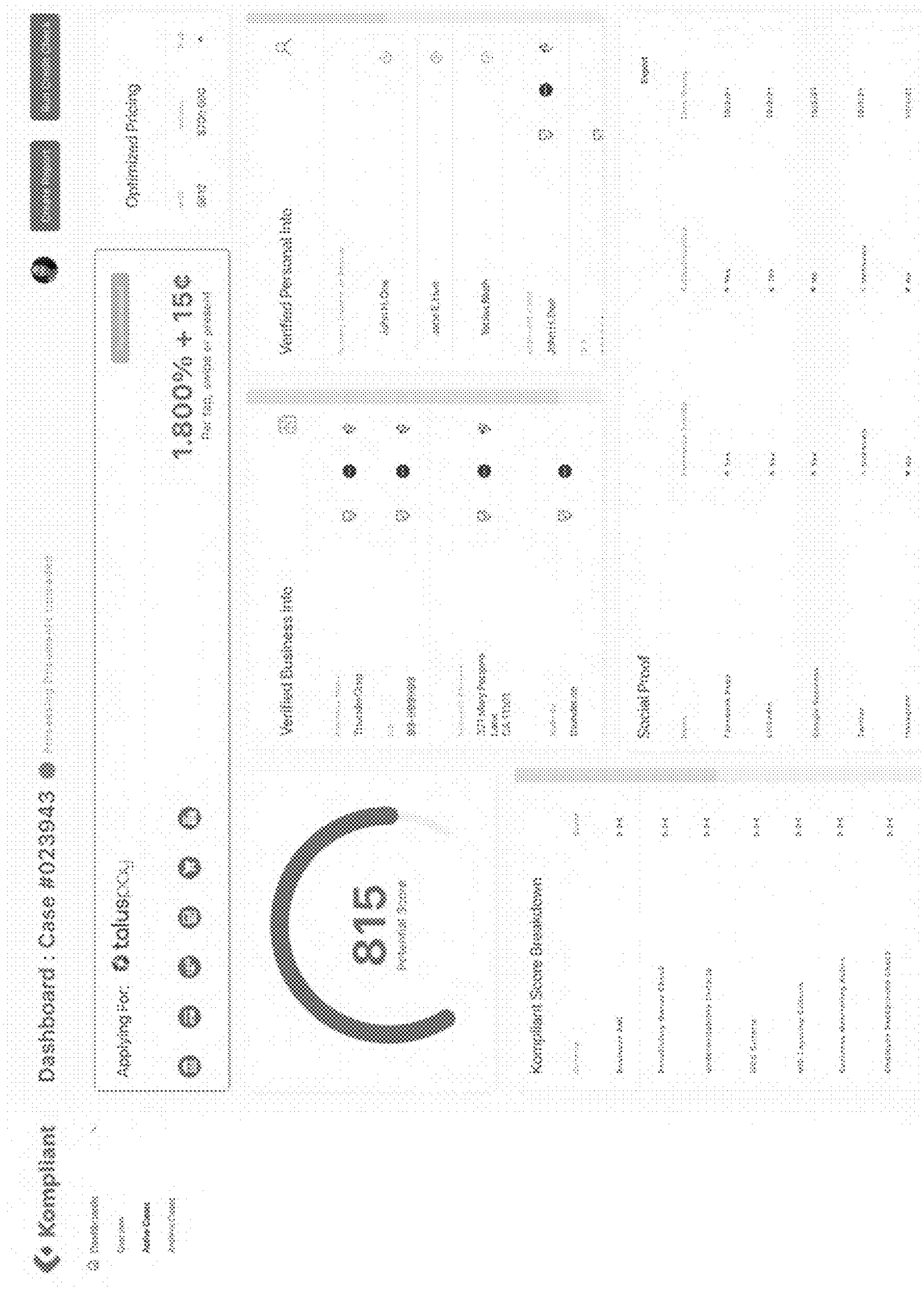
FIGURE 13 D: CCTM SCREENSHOT

Kompliant
Case #023943
Decline
Approve
PENDING APPROVAL
900

FIGURE 13E: CCTM SCREENSHOT

FIGURE 14: CCTM DATA FLOW
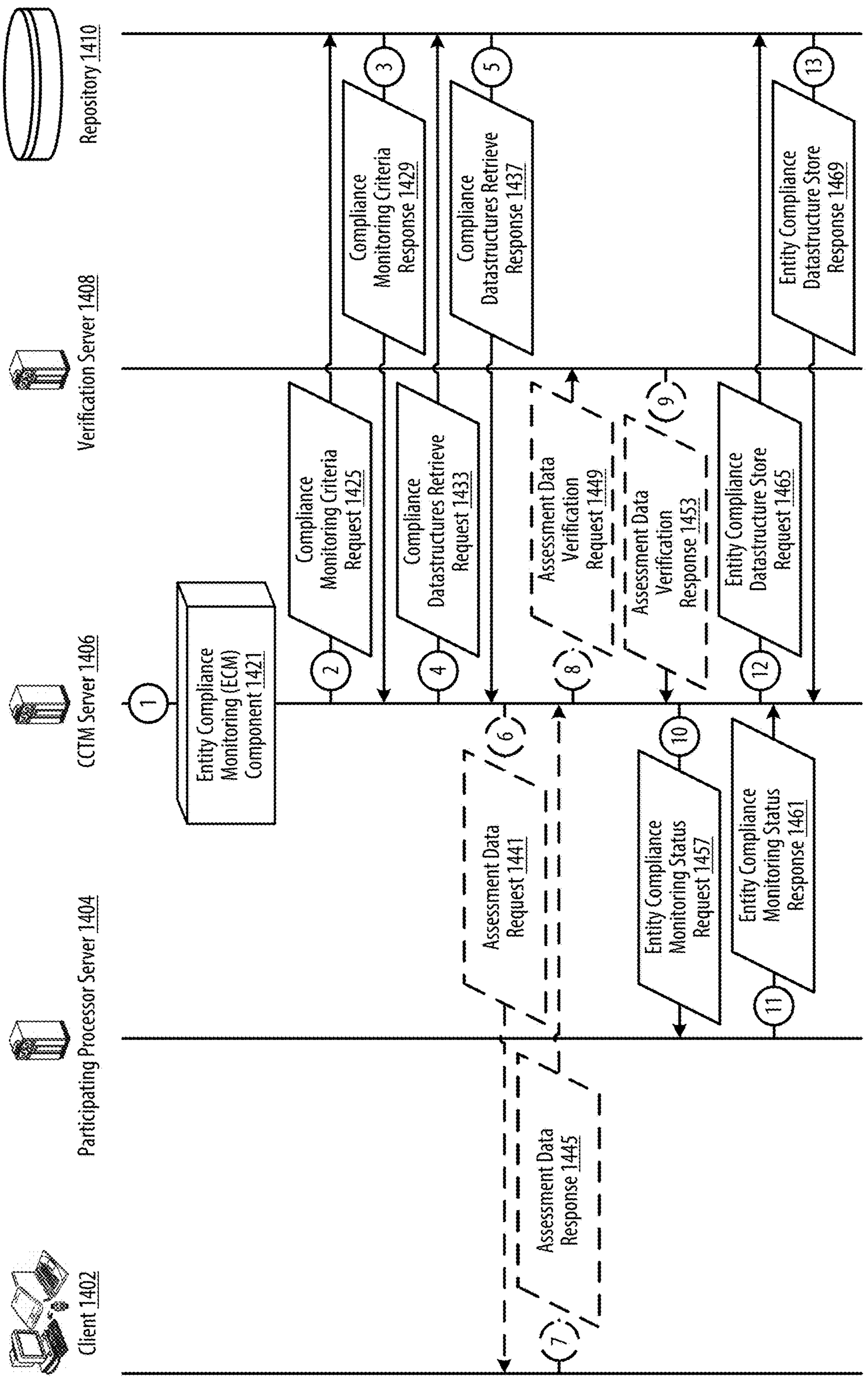

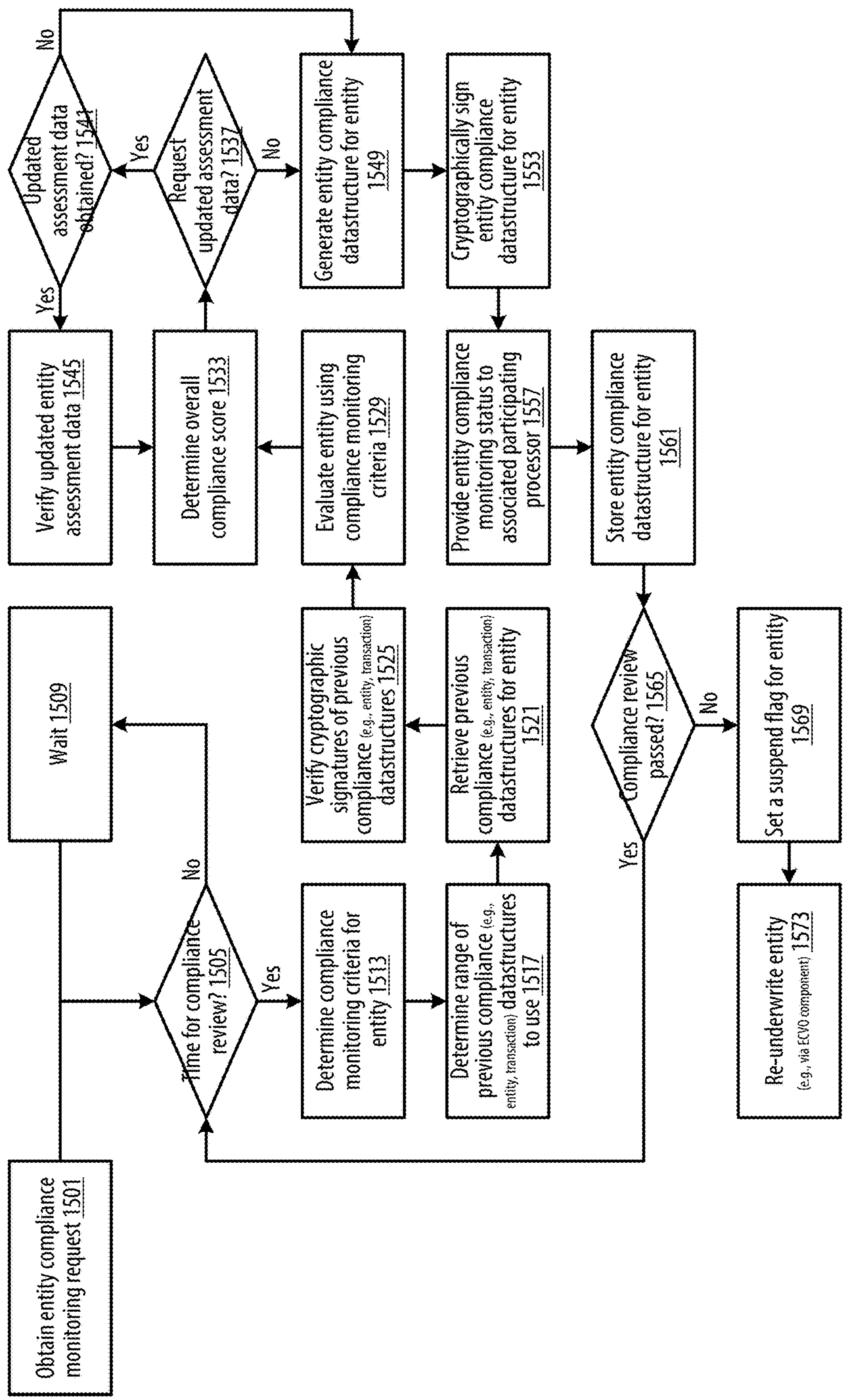
FIGURE 15: CCTM ECM COMPONENT

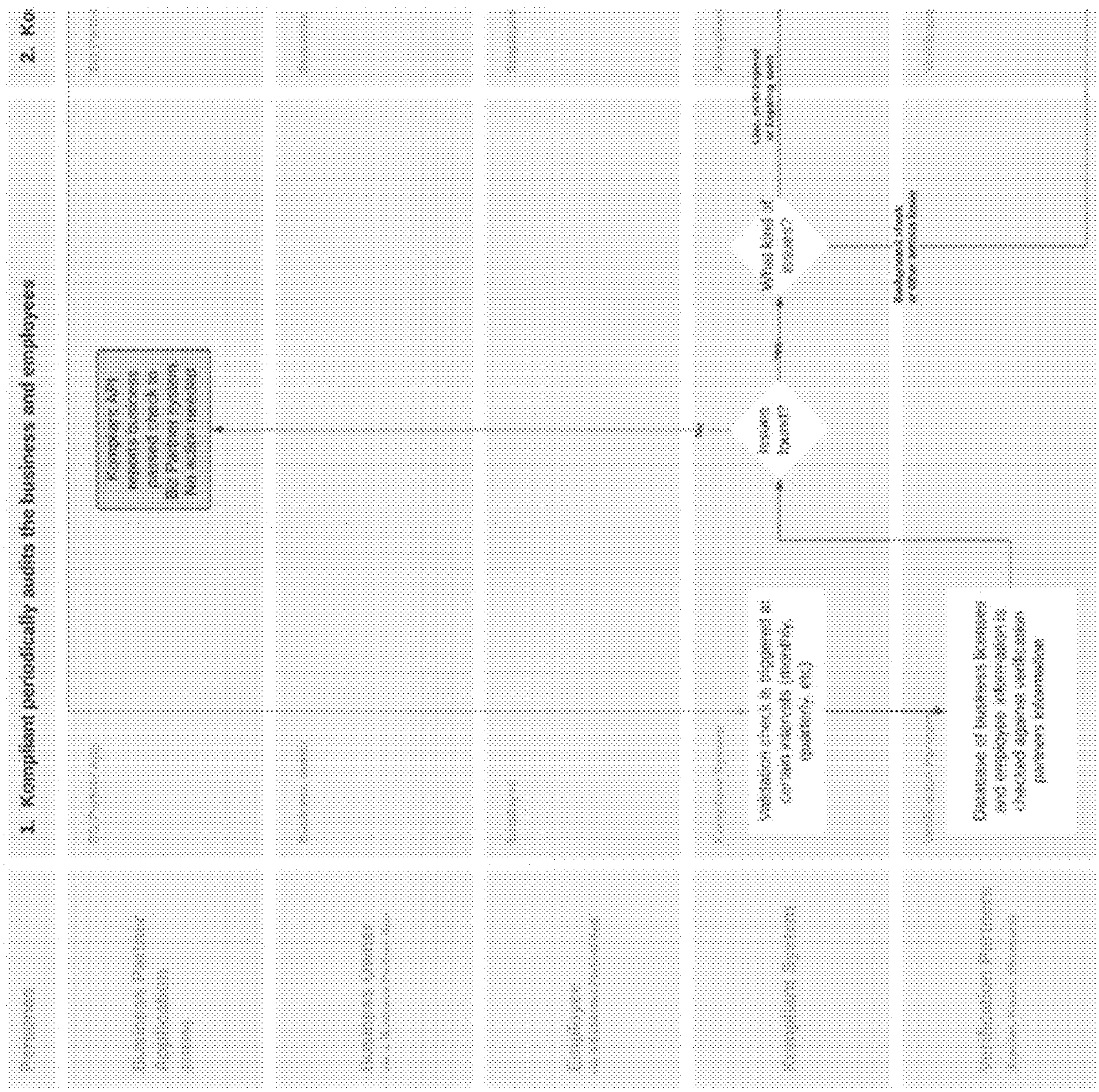
FIGURE 16A: CCTM IMPLEMENTATION CASE

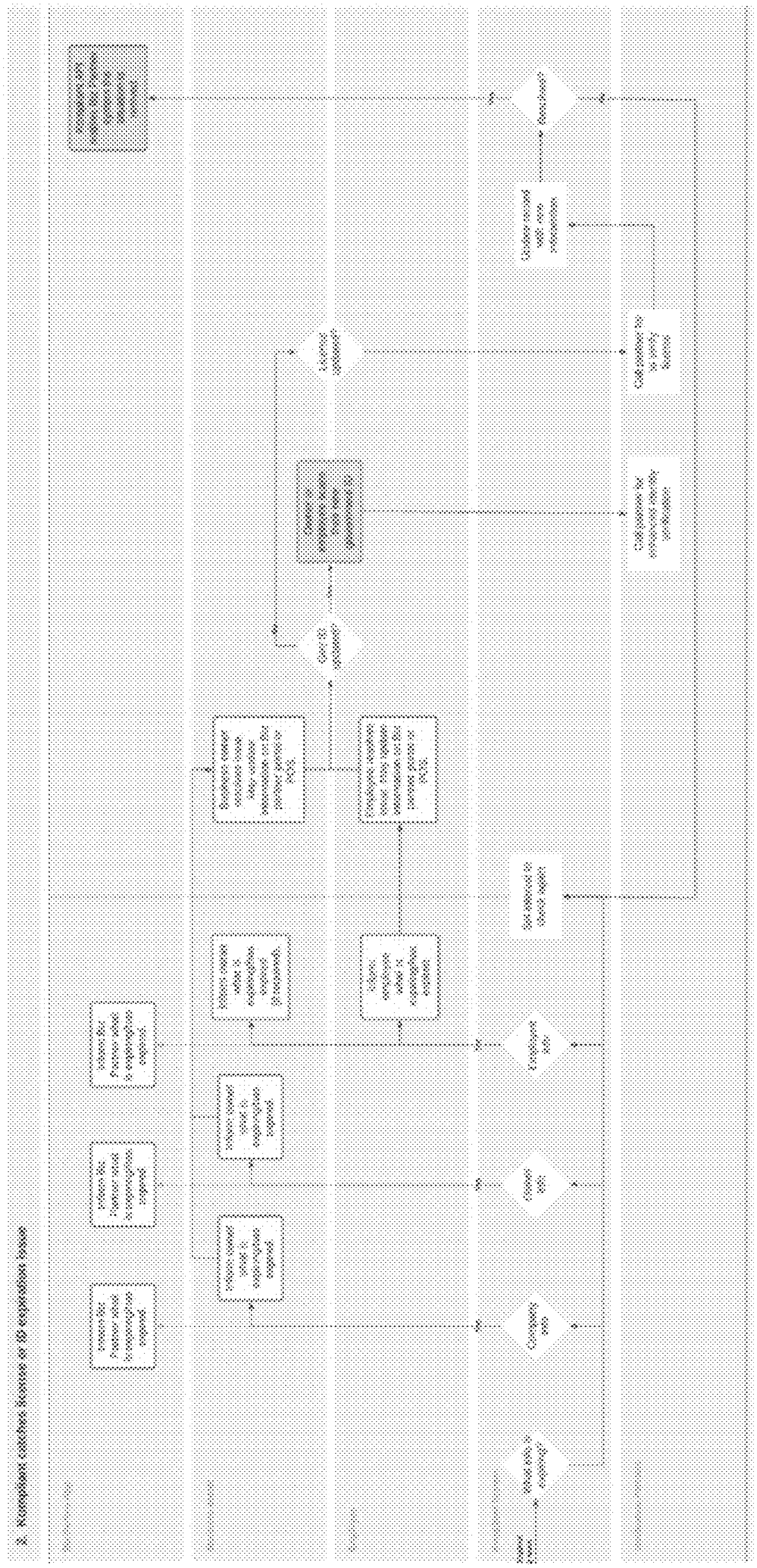
FIGURE 16B: CCTM IMPLEMENTATION CASE

FIGURE 16 C: CCTM IMPLEMENTATION CASE
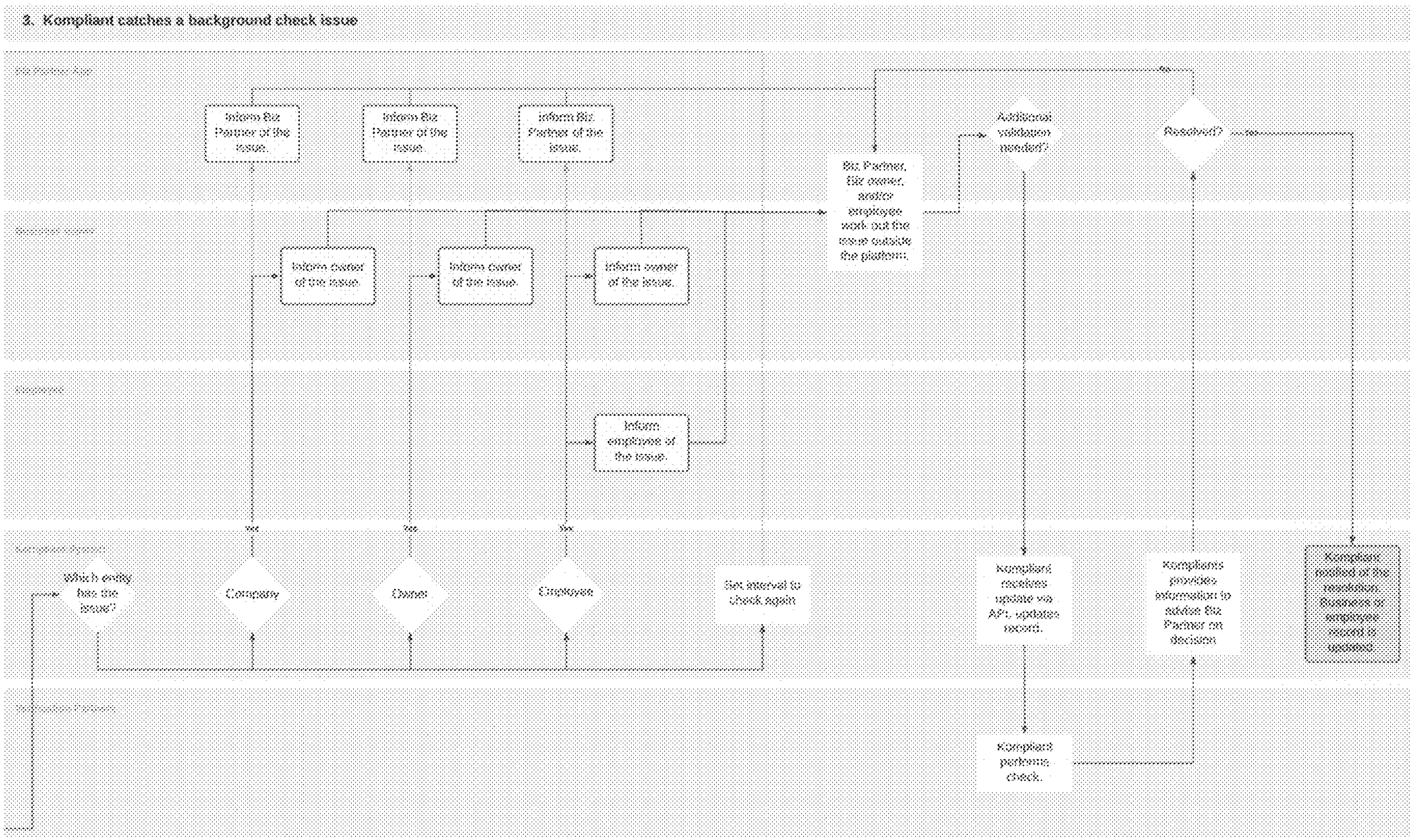

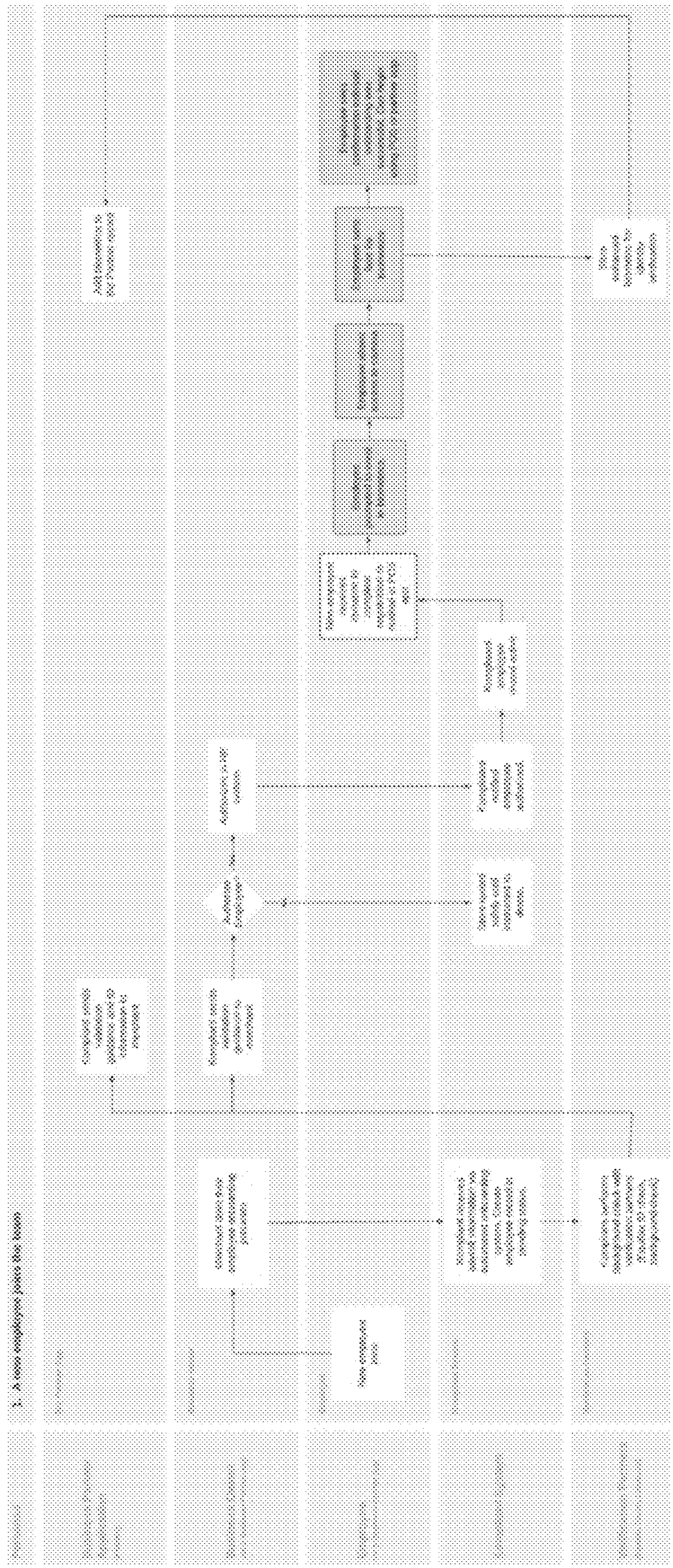
FIGURE 17A: CCTM IMPLEMENTATION CASE

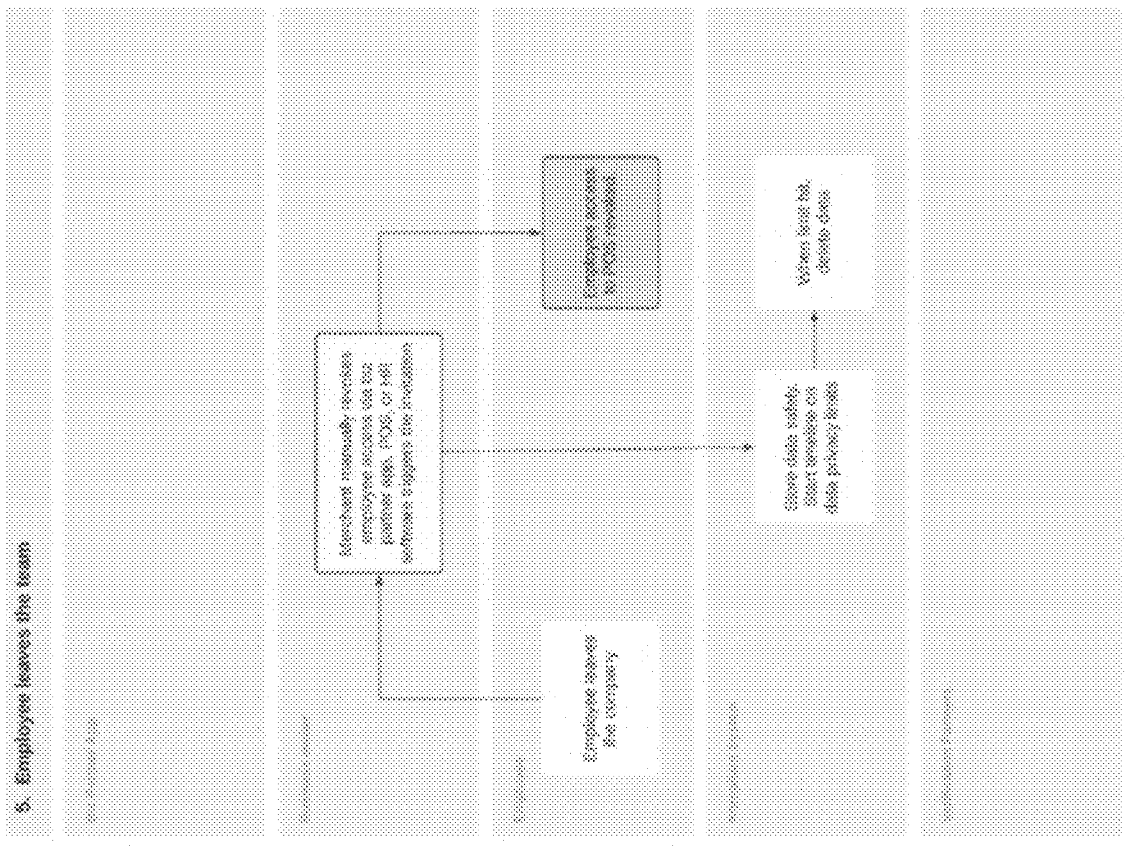
FIGURE 17B: CCTM IMPLEMENTATION CASE

FIGURE 18A: CCTM ARCHITECTURE
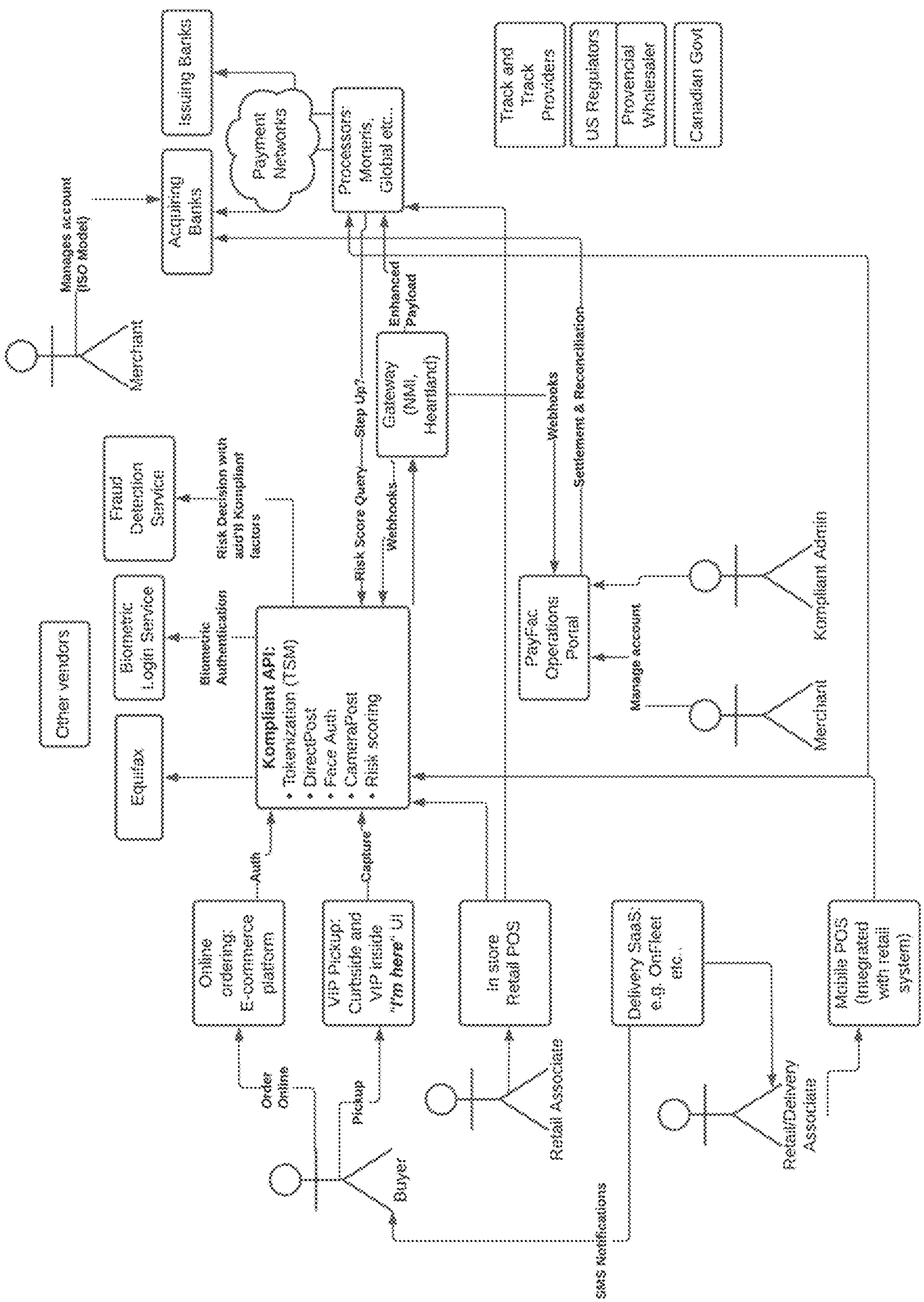

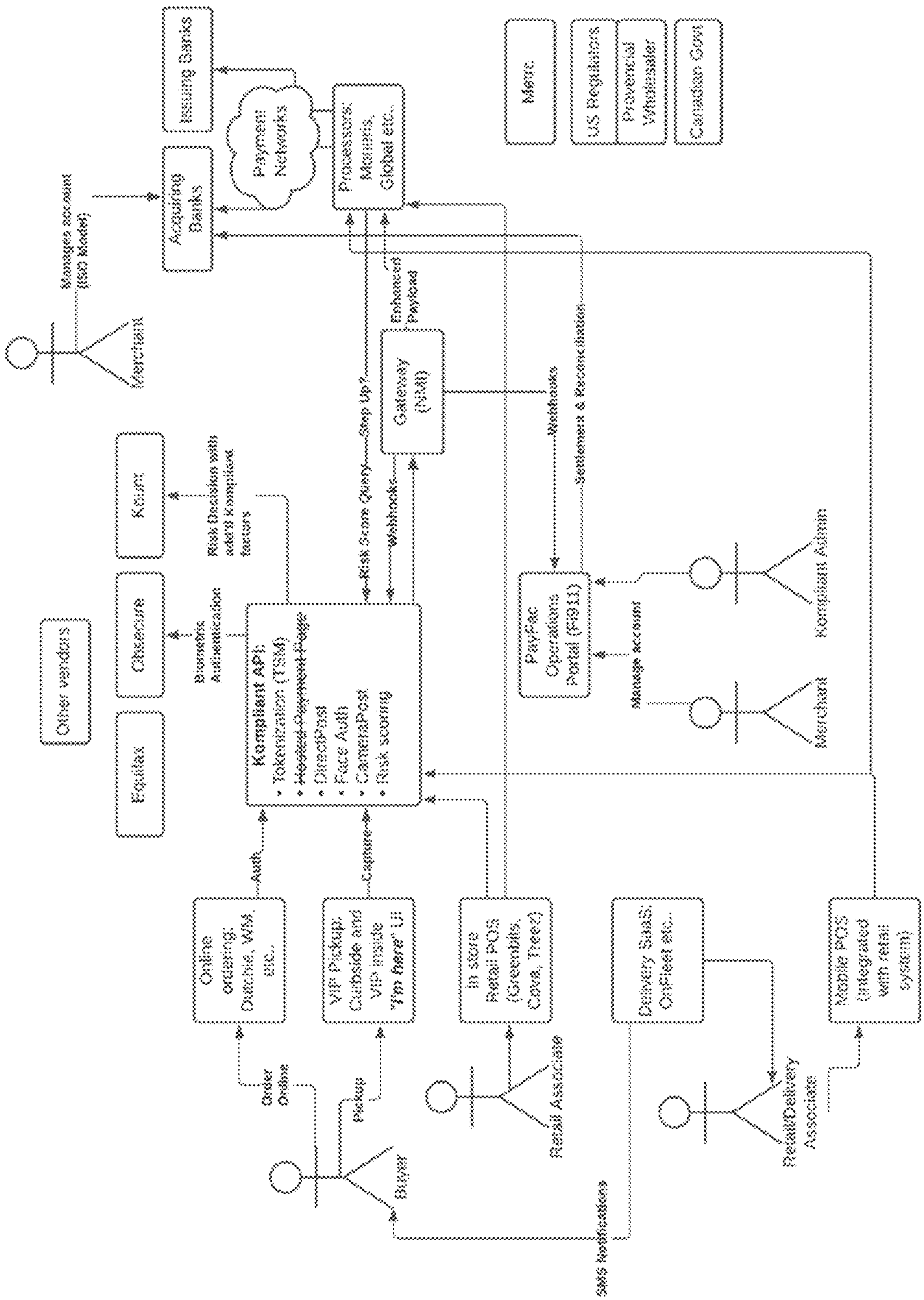
FIGURE 18B: CCTM ARCHITECTURE

FIGURE 19A: CCTM DATA FLOW
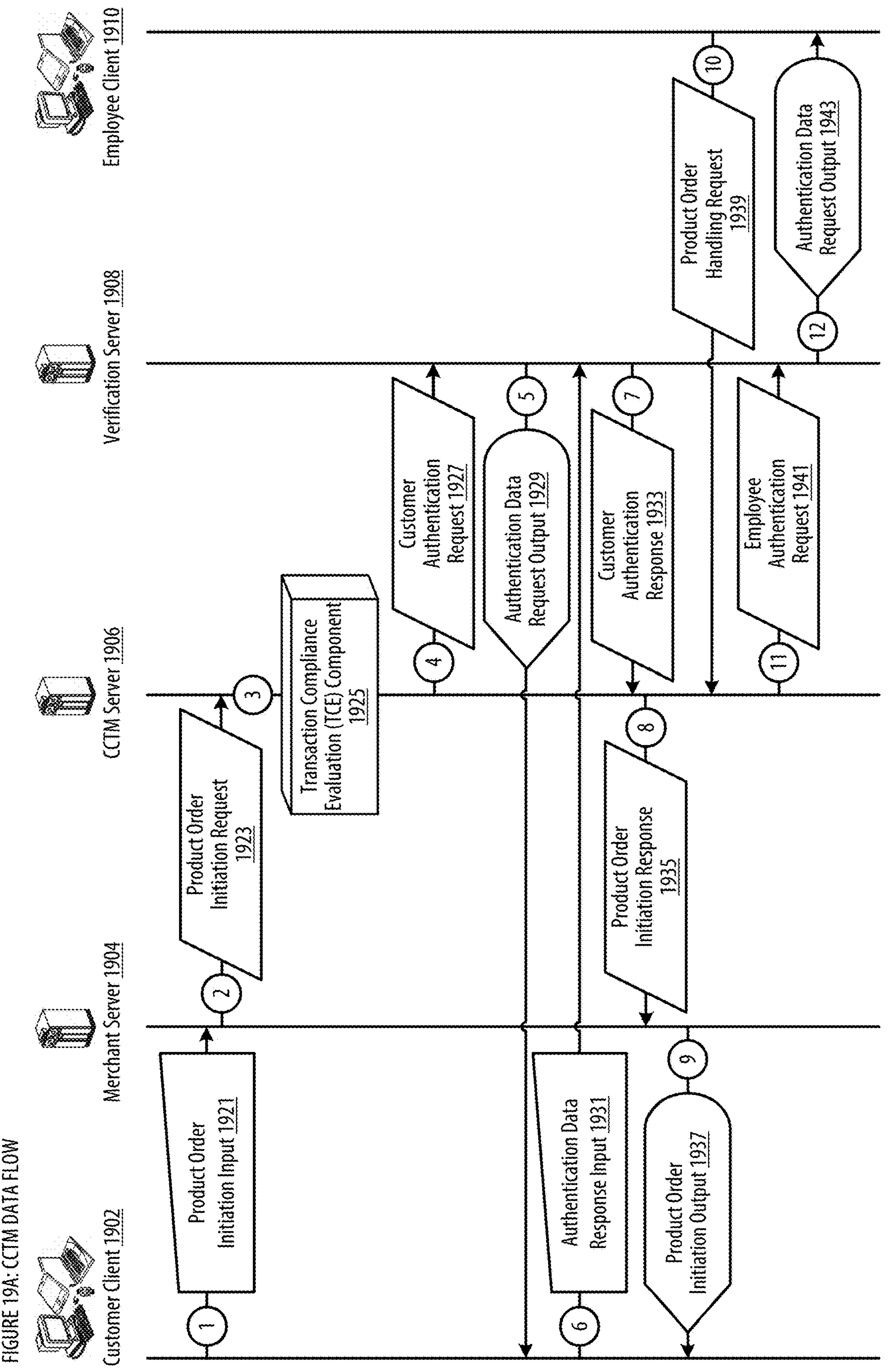

FIGURE 19B: CCTM DATA FLOW
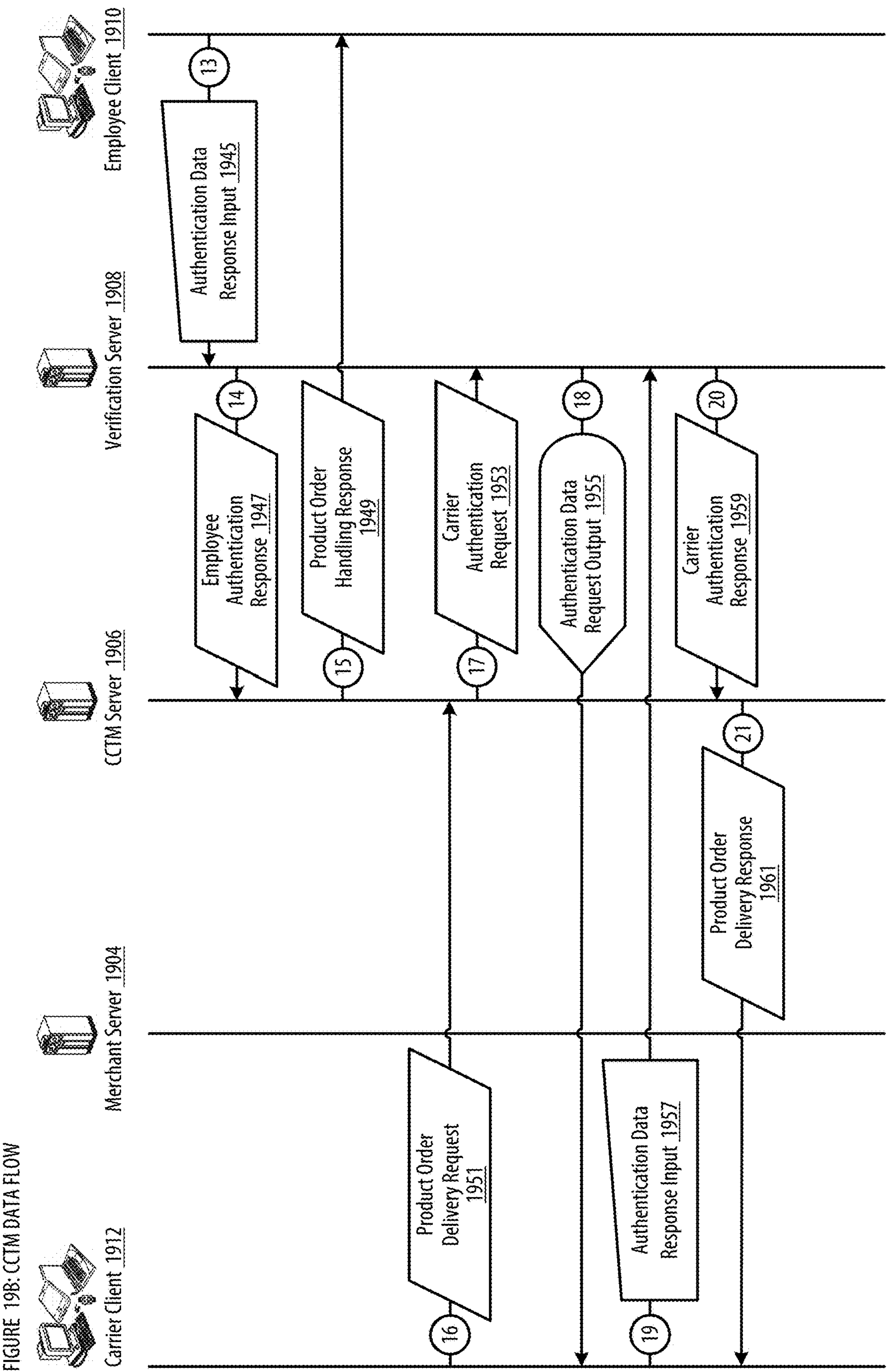

FIGURE 19 C: CCTM DATA FLOW
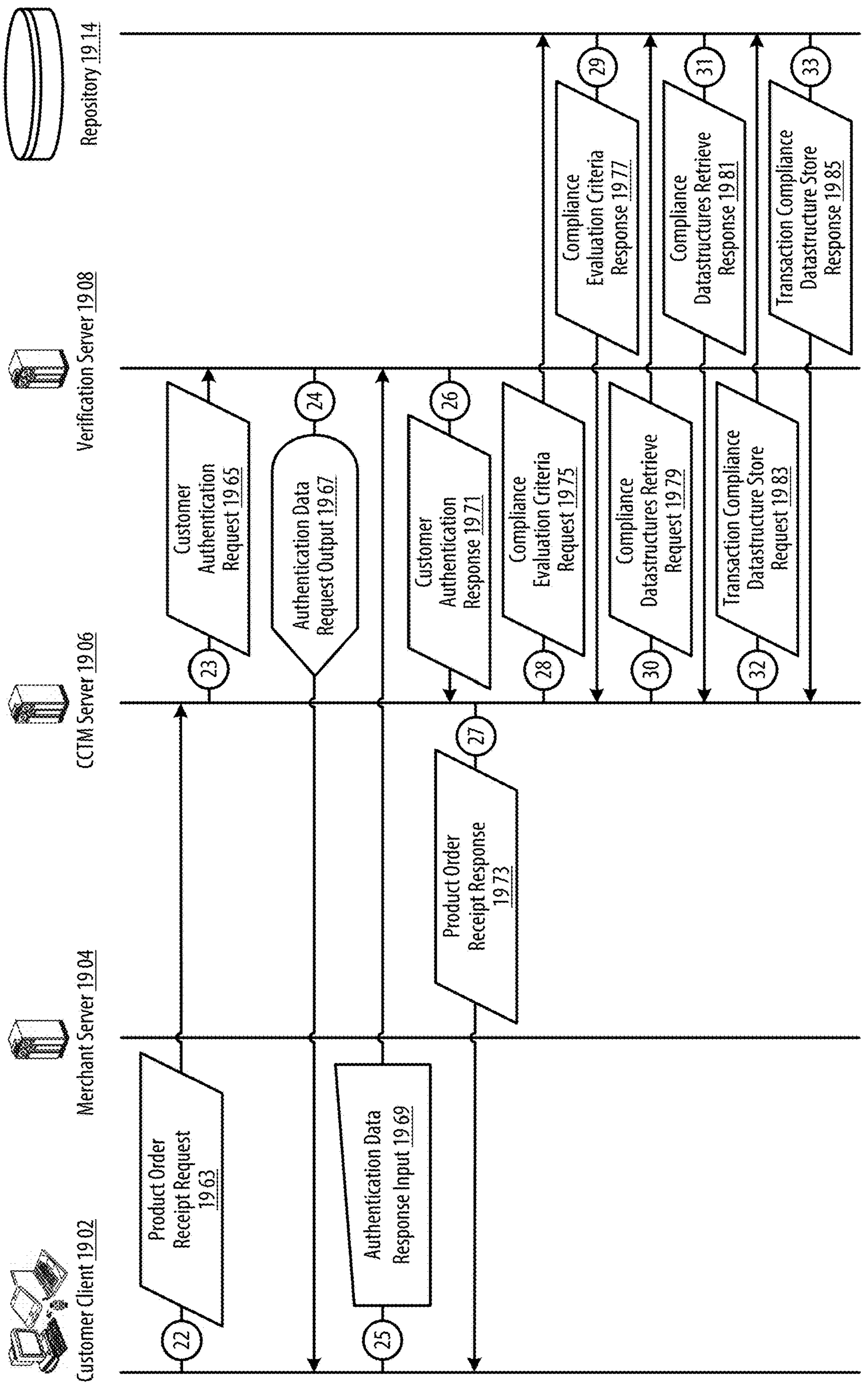

FIGURE 20: CCTM TCE COMPONENT
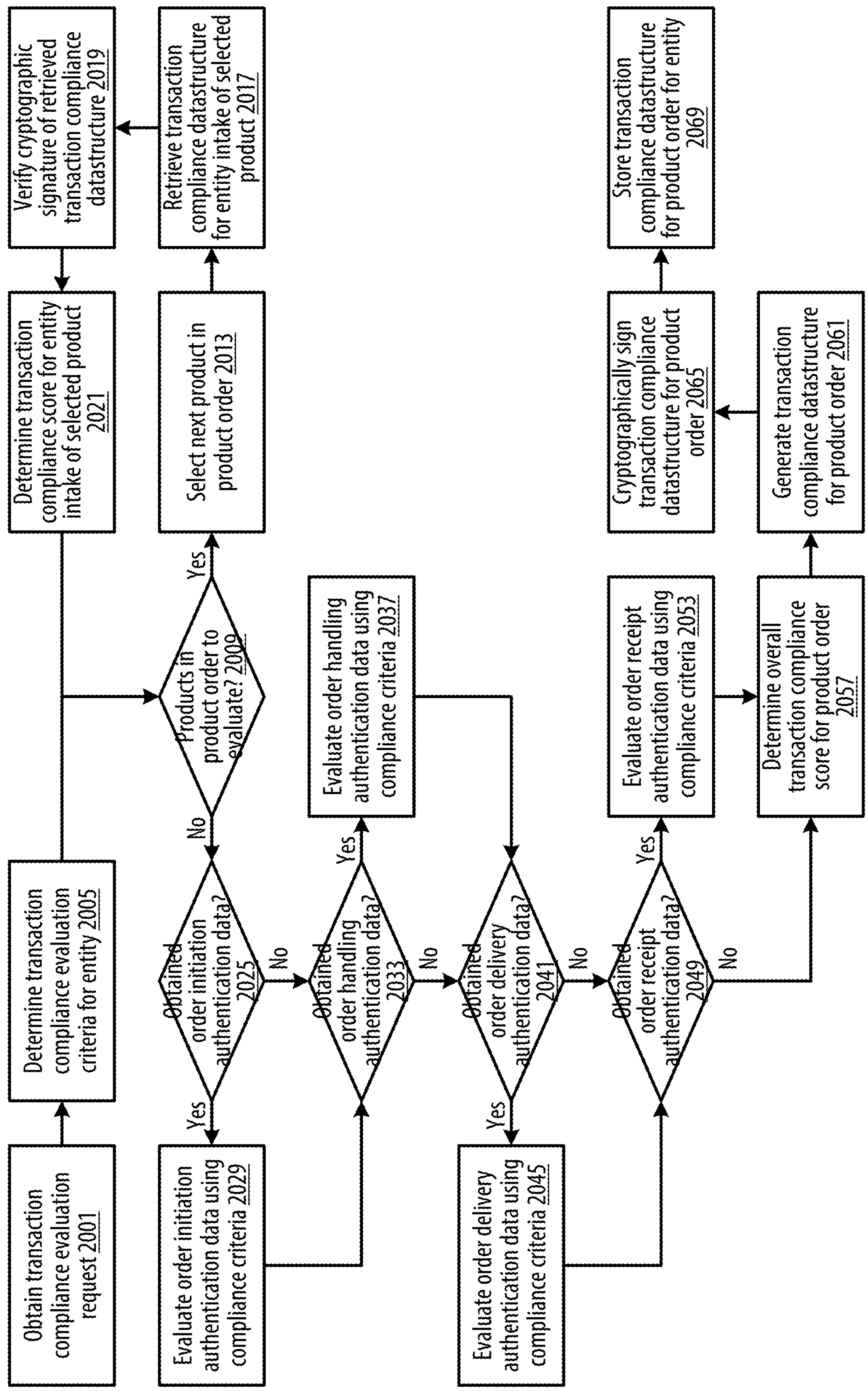

FIGURE 21A: CCTM IMPLEMENTATION CASE
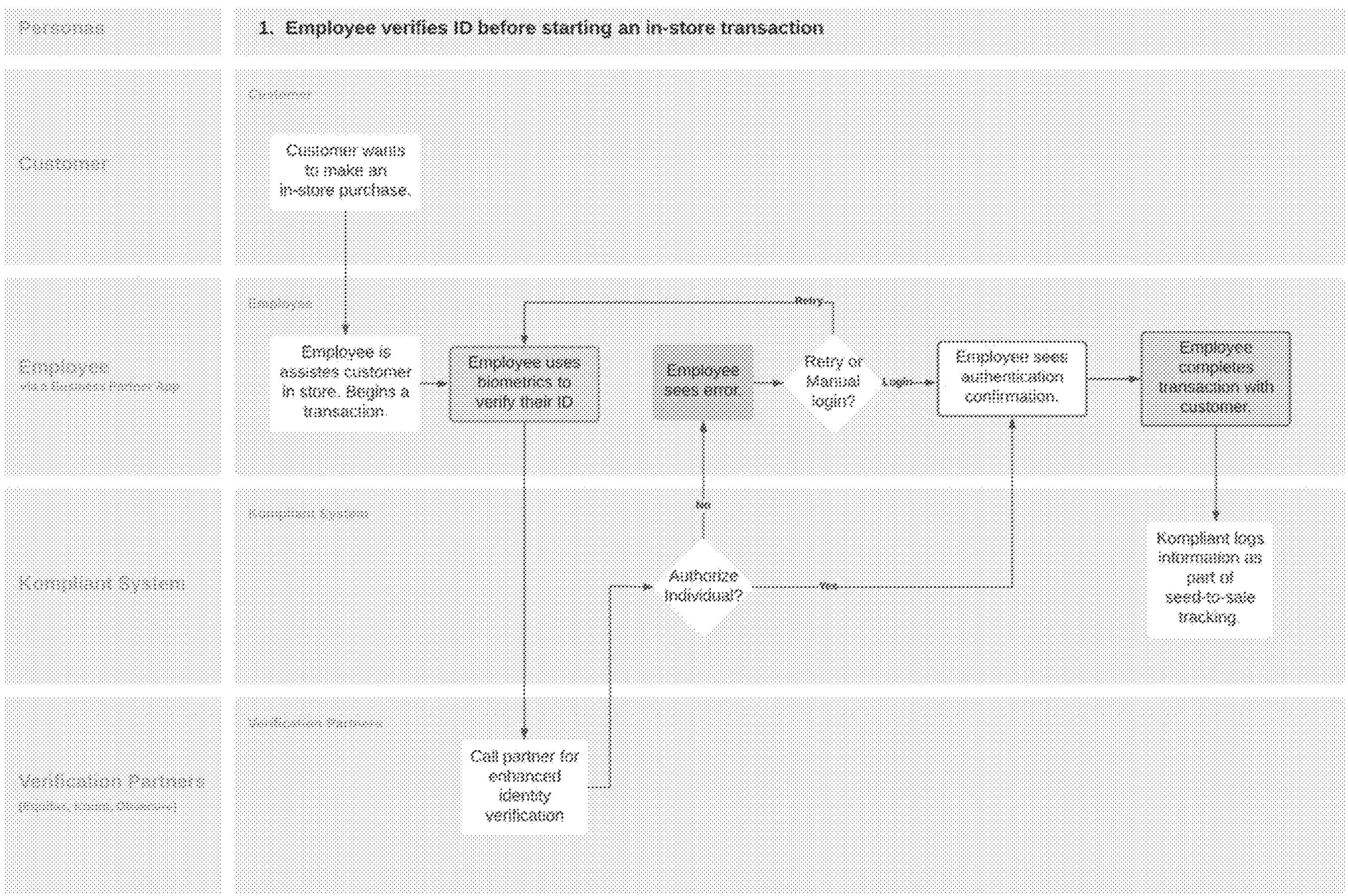

FIGURE 21B: CCTM IMPLEMENTATION CASE
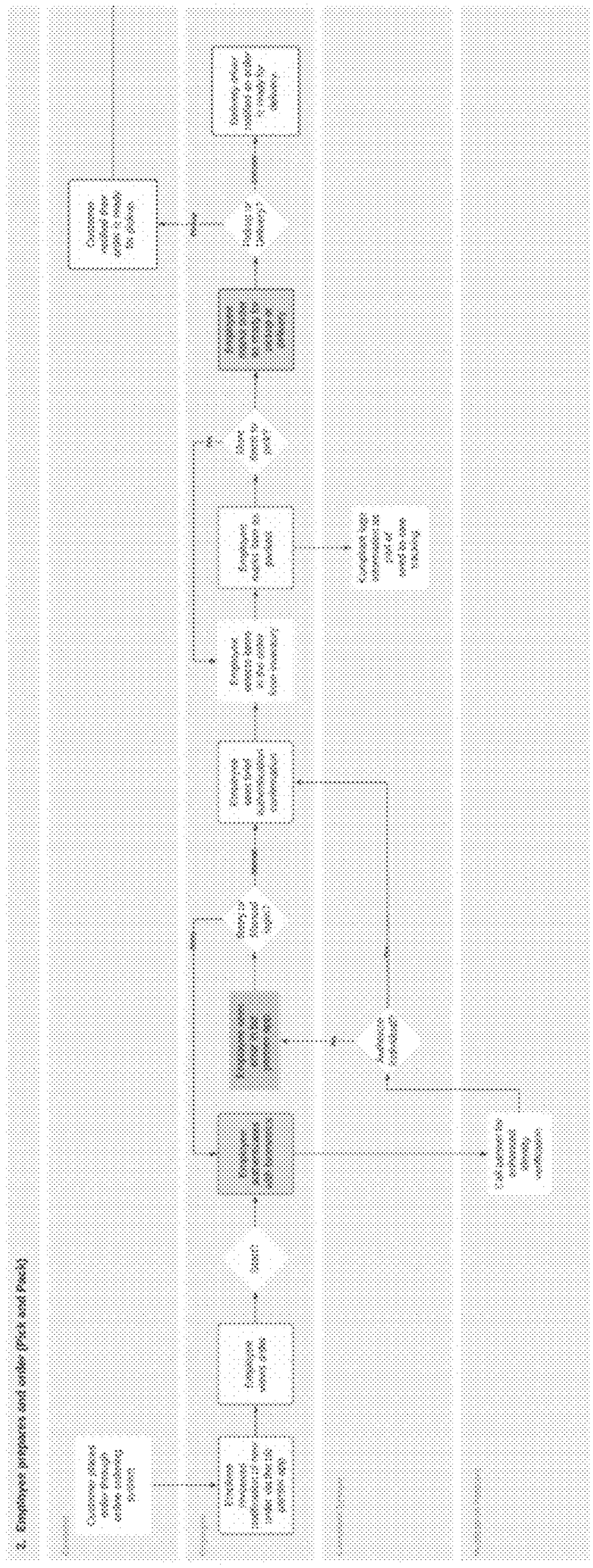

FIGURE 21 C: CCTM IMPLEMENTATION CASE
3. Employee hands off order to customer
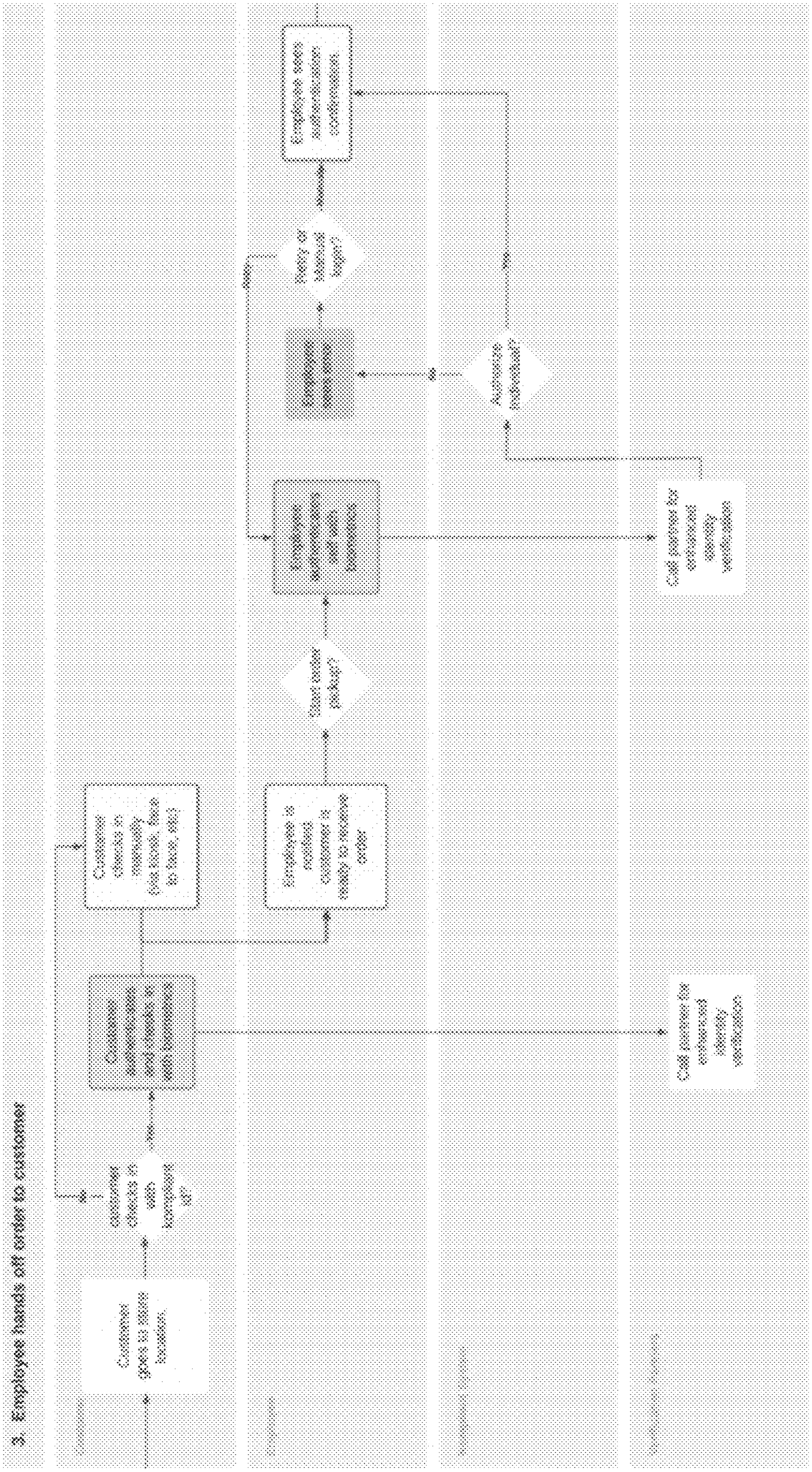

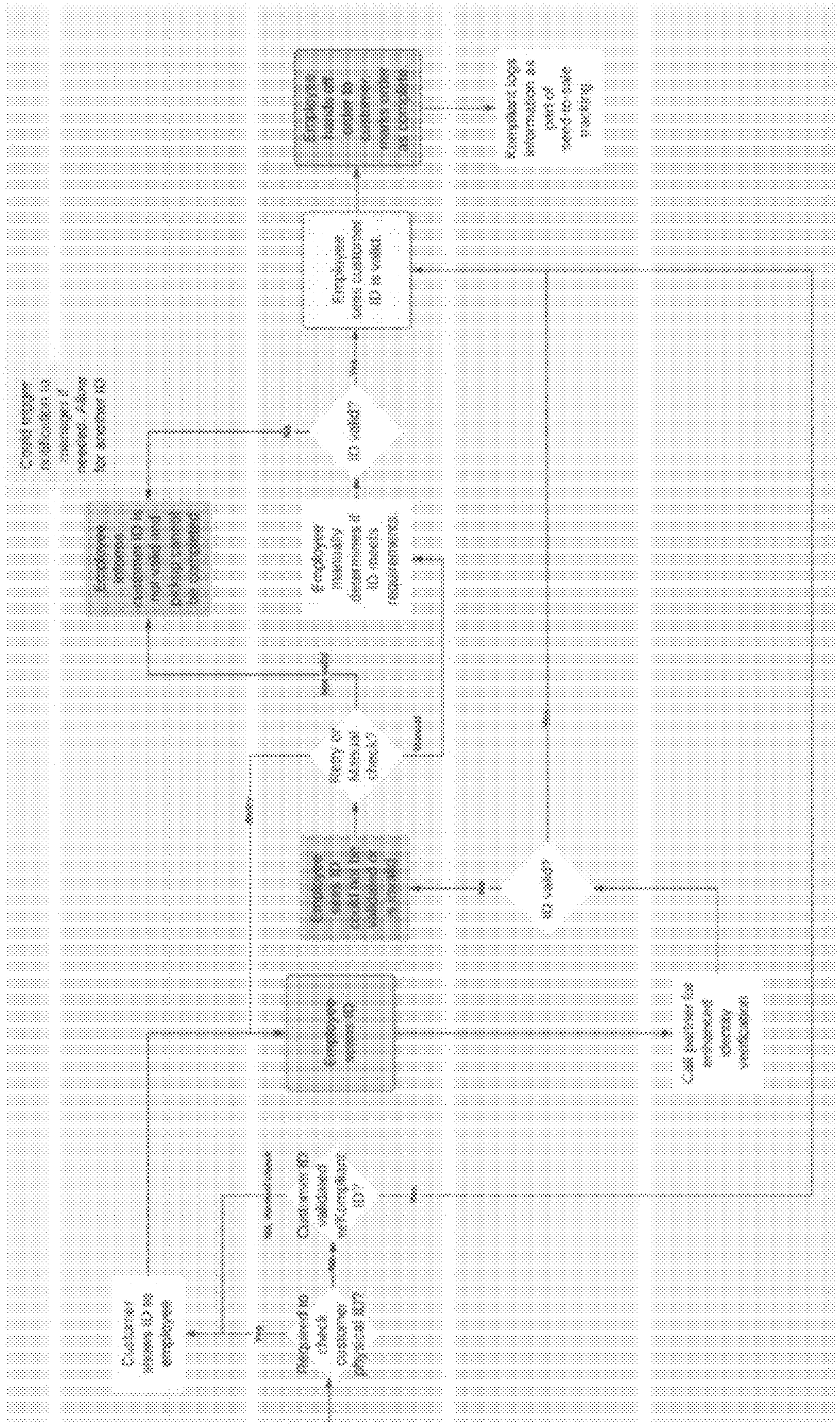
FIGURE 21 D: CCTM IMPLEMENTATION CASE

FIGURE 21E: CCTM IMPLEMENTATION CASE
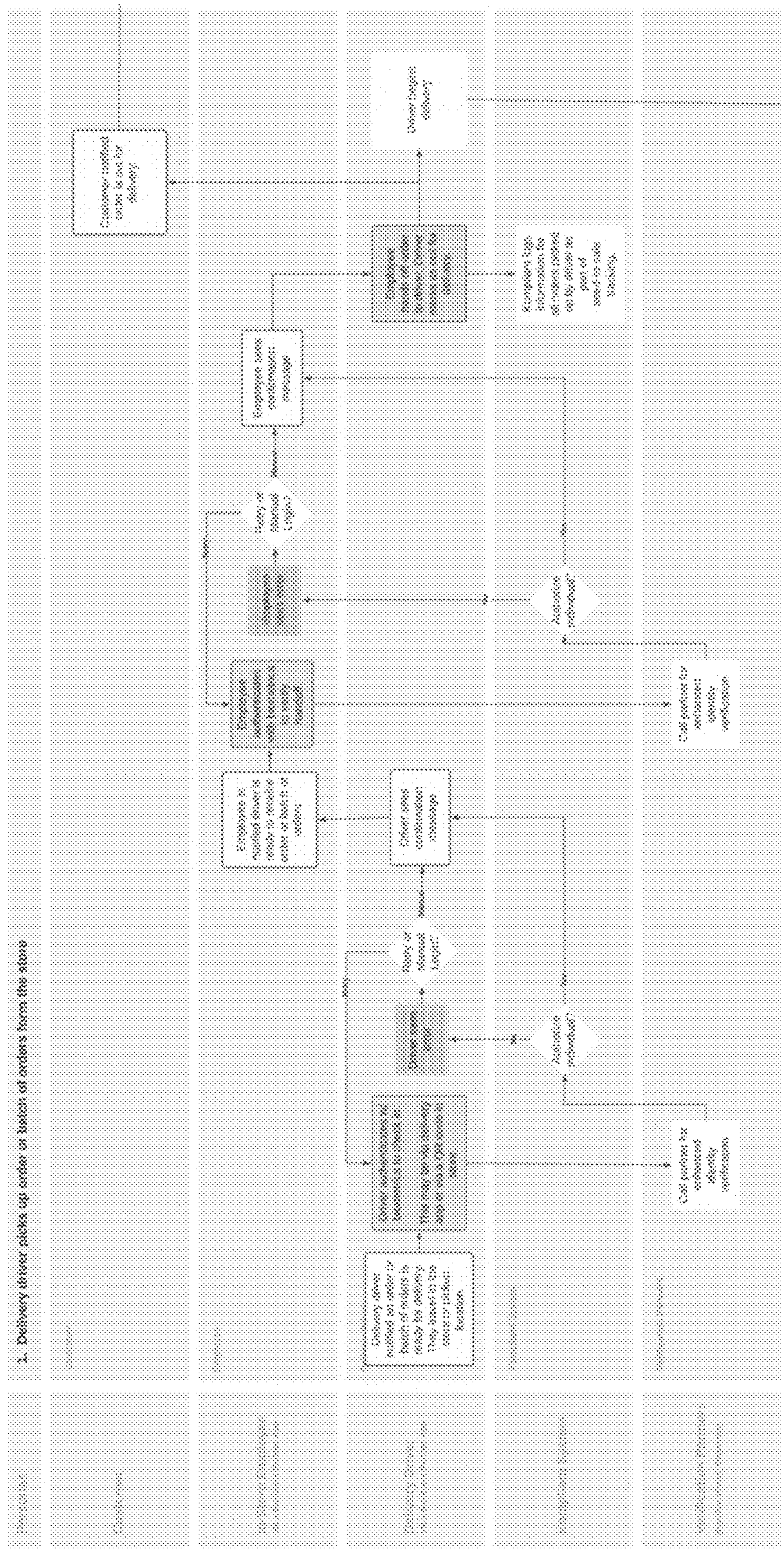

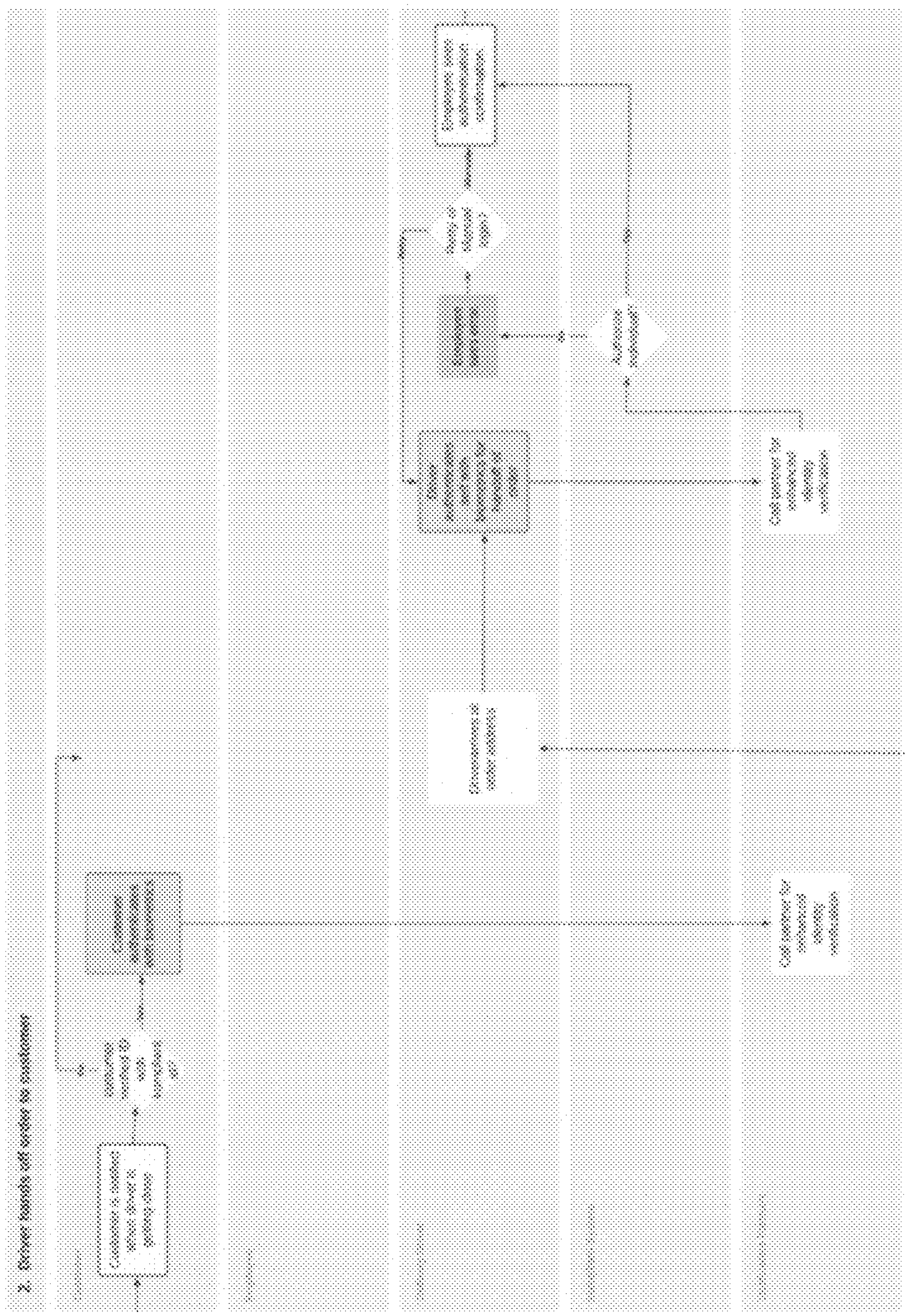
FIGURE 21 F: CCTM IMPLEMENTATION CASE

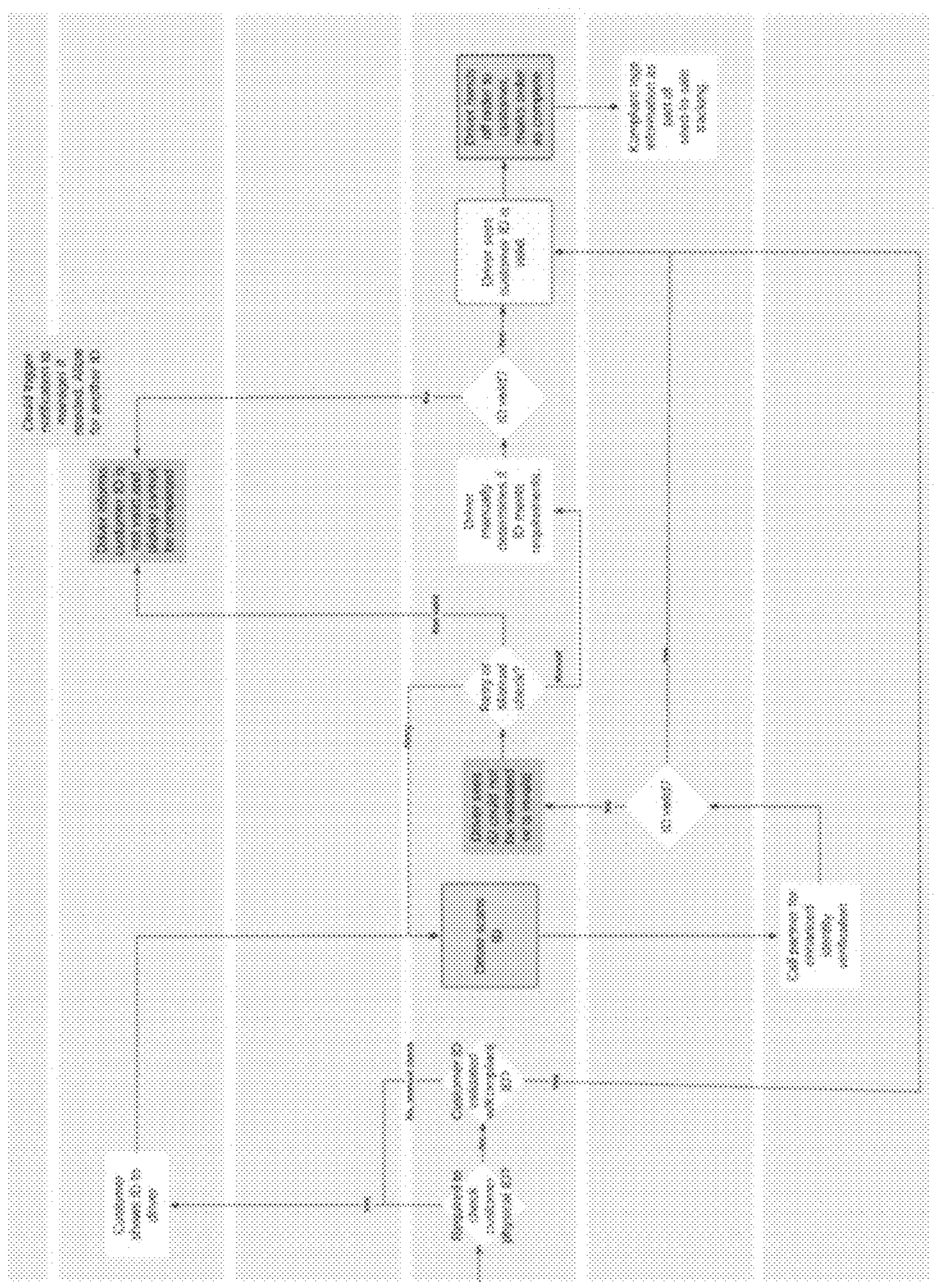
FIGURE 21 G: CCTM IMPLEMENTATION CASE

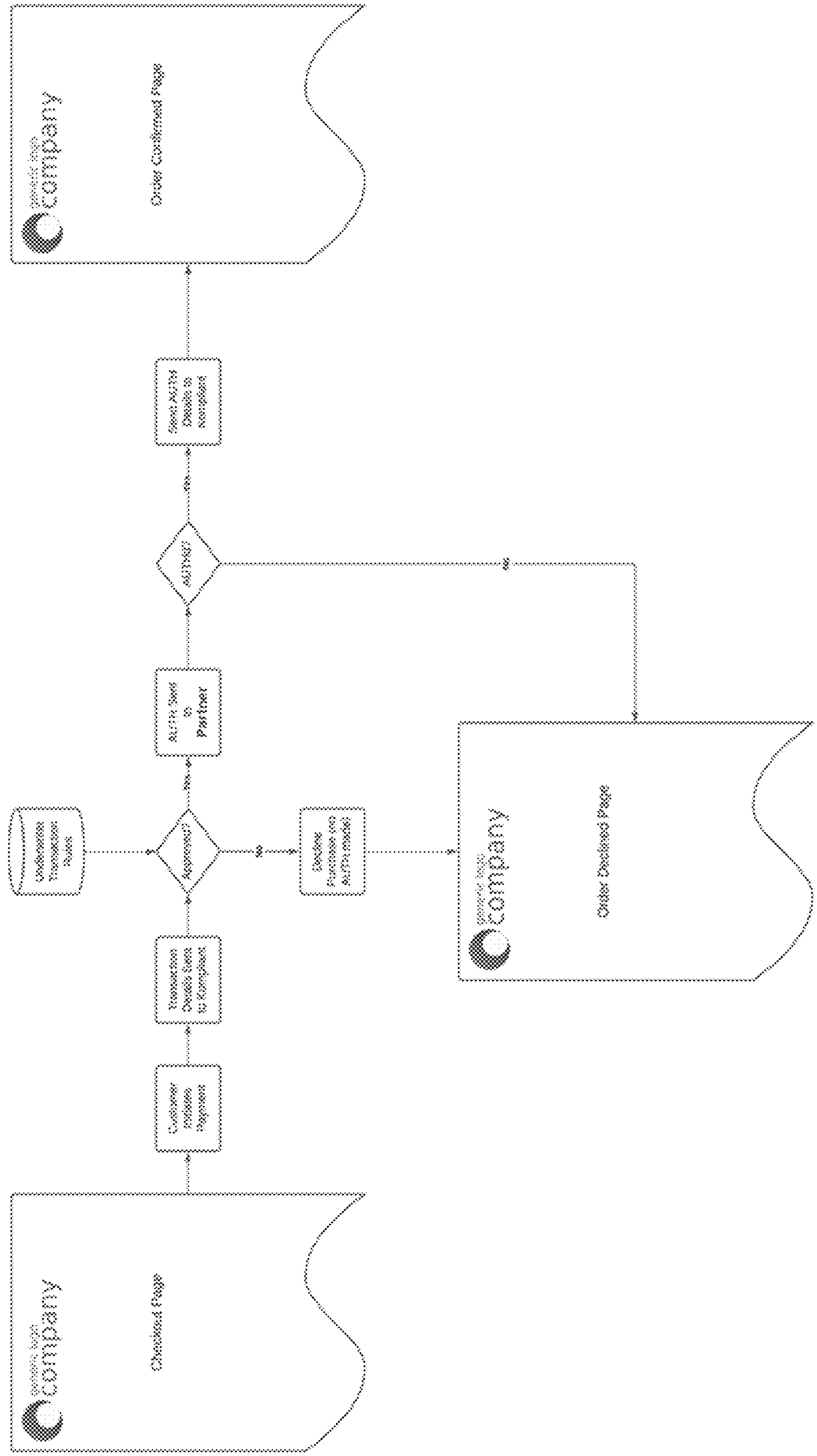
FIGURE 21H: CCTM IMPLEMENTATION CASE

FIGURE 22: CCTM IMPLEMENTATION CASE

Kompliant Score : 20.0

Kompliant Object

```
{
"buyer": {
  "age": 22,
  "email": "registered@example.org",
  "phone": "555-555-5555",
  "authentication": [
    {
      "type": "Kount",
      "score": "29",
      "response": {
        "paramlist": {
          "OS": null,
          "DSR": null,
          "UAS": null,
          "AUTO": "A",
          "BRND": "TOKEN",
          "DDFS": null,
          "GEOX": "US",
          "KAPT": "N",
          "MERC": "100096",
          "MODE": "O",
          "NETW": "N",
          "ORDR": "1179",
          "REGN": null,
          "SCOR": "29",

"version": "1",
"acquirer": {
},
"decision": {
  "result": "A",
  "kg_score": "20.0"
},
"merchant": {
  "mid": "FLOR",
  "descriptor": "Flor Variatals"
},
"terminal": {
},
"timestamp": "2023-04-29T22:34:56.722+02:00",
"compliance": {
  "key": "recorded_sale",
  "value": [
    {
      "Quantity": 3.5,
      "TotalAmount": 49.99,
      "PackageLabel": "ABCDEF0123456789000010331",
      "UnitOfMeasure": "Grams"
    },
    {
      "Quantity": 1.0,
      "TotalAmount": 59.99,
      "PackageLabel": "ABCDEF0123456789000010332",
      "UnitOfMeasure": "Ounces"
    }
  ],
  "vendor": "Metrc"
},
"gateway_response": {
  "type": "NMI",
  "score": "100",
  "response": {
    "type": "auth",
    "orderid": "",
    "authcode": "123456",
    "response": "1",
    "avsresponse": "",
    "cvvresponse": "N",
    "responsetext": "SUCCESS",
    "response_code": "100",

},
"order": {
  "txid": 86,
  "order_items": [
    {
      "name": "Asymmetrical",
      "type": "Fuel Cell",
      "price": 5747,
      "quantity": "1",
      "description": "New York Museum of Prehistoric History"
    }
  ]
},
"handoff": {
  "timestamp": "2021-04-29T20:34:56.782+00:00",
  "compliance": {
    "key": "completed_delivery",
    "value": {
      "Id": 6,
      "ConsumerId": null,
      "DriverName": "John Doe",
      "VehicleMake": "Car",
      "PlannedRoute": "Drive to destination.",
      "Transactions": [
        {
          "Quantity": 3.5,
          "TotalAmount": 49.99,
          "PackageLabel": "ABCDEF0123456789000000001",
          "UnitOfMeasure": "Grams"
        },
        {
          "Quantity": 1.0,
          "TotalAmount": 59.99,
          "PackageLabel": "ABCDEF0123456789000000002",
          "UnitOfMeasure": "Ounces"
```

FIGURE 23A: CCTM IMPLEMENTATION CASE
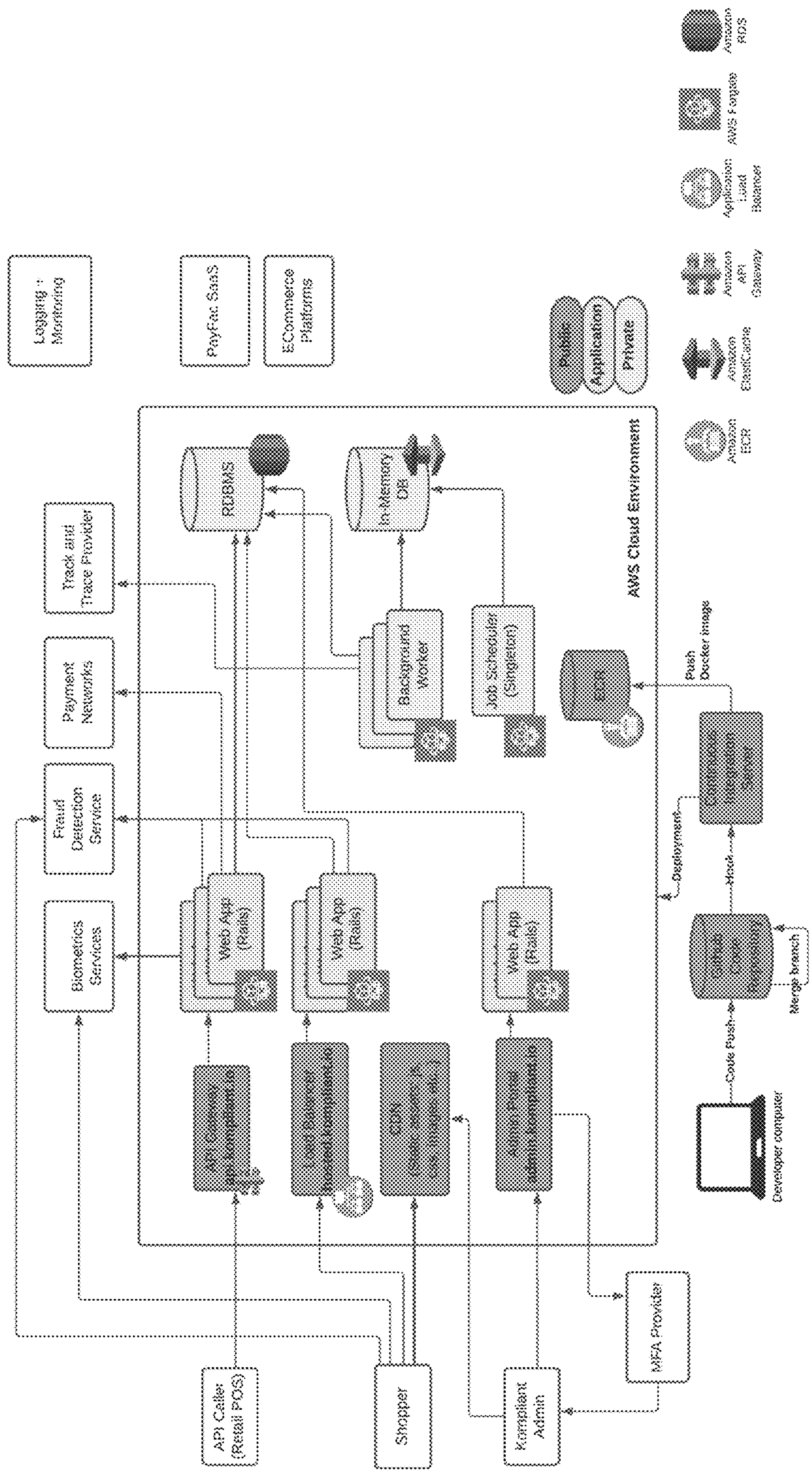

FIGURE 23B: CCTM IMPLEMENTATION CASE
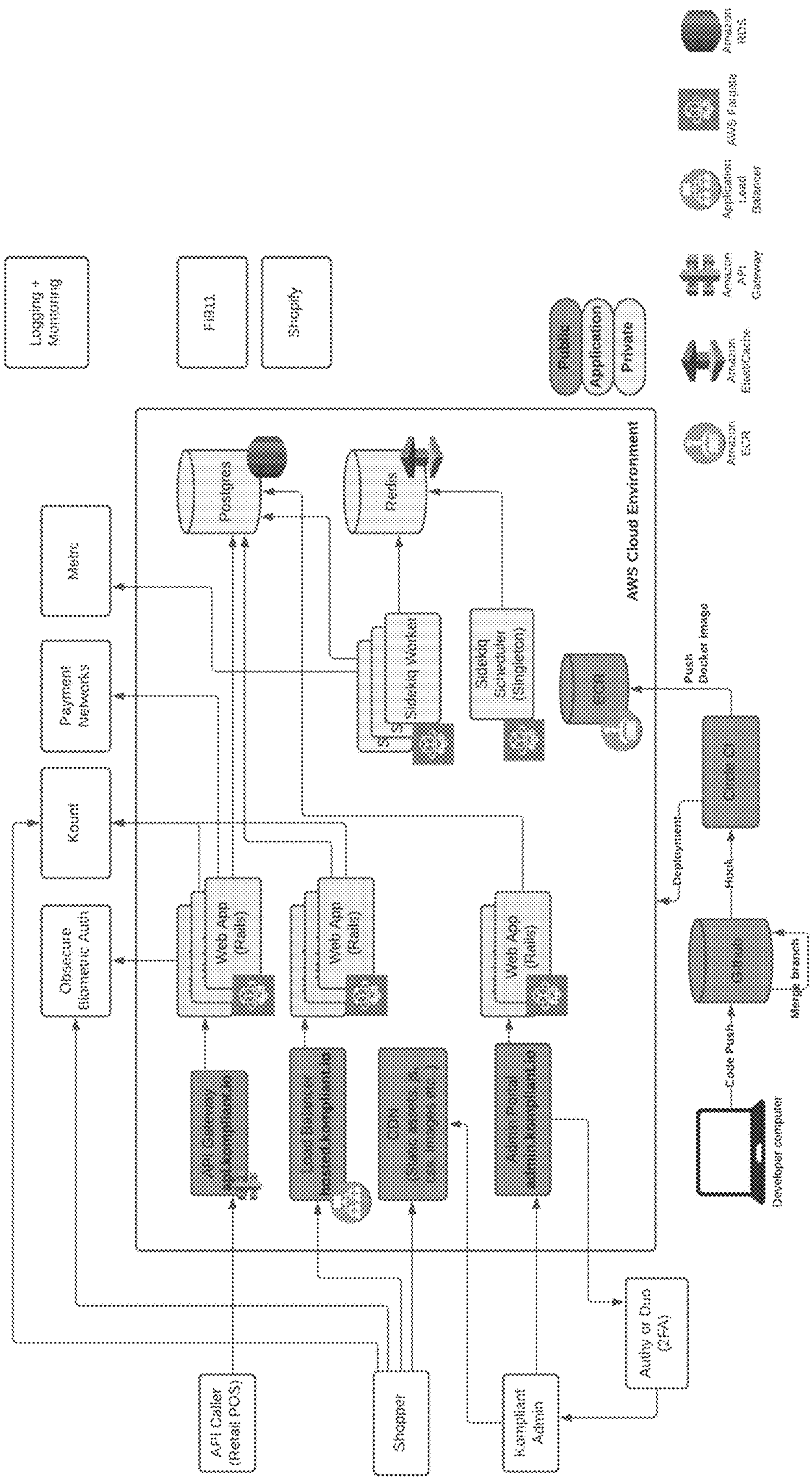

FIGURE 23 C: CCTM IMPLEMENTATION CASE
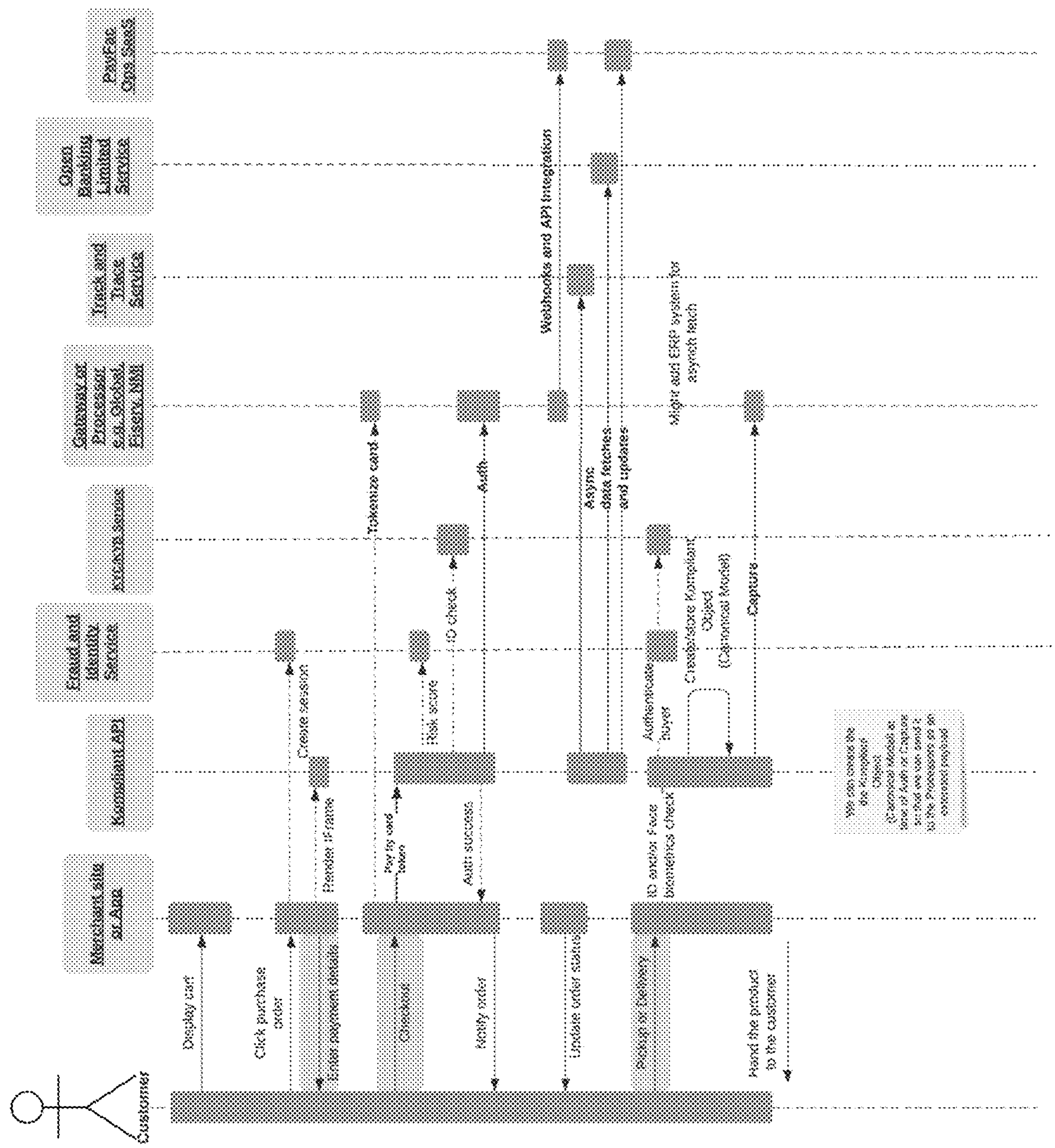

FIGURE 23 D: CCTM IMPLEMENTATION CASE
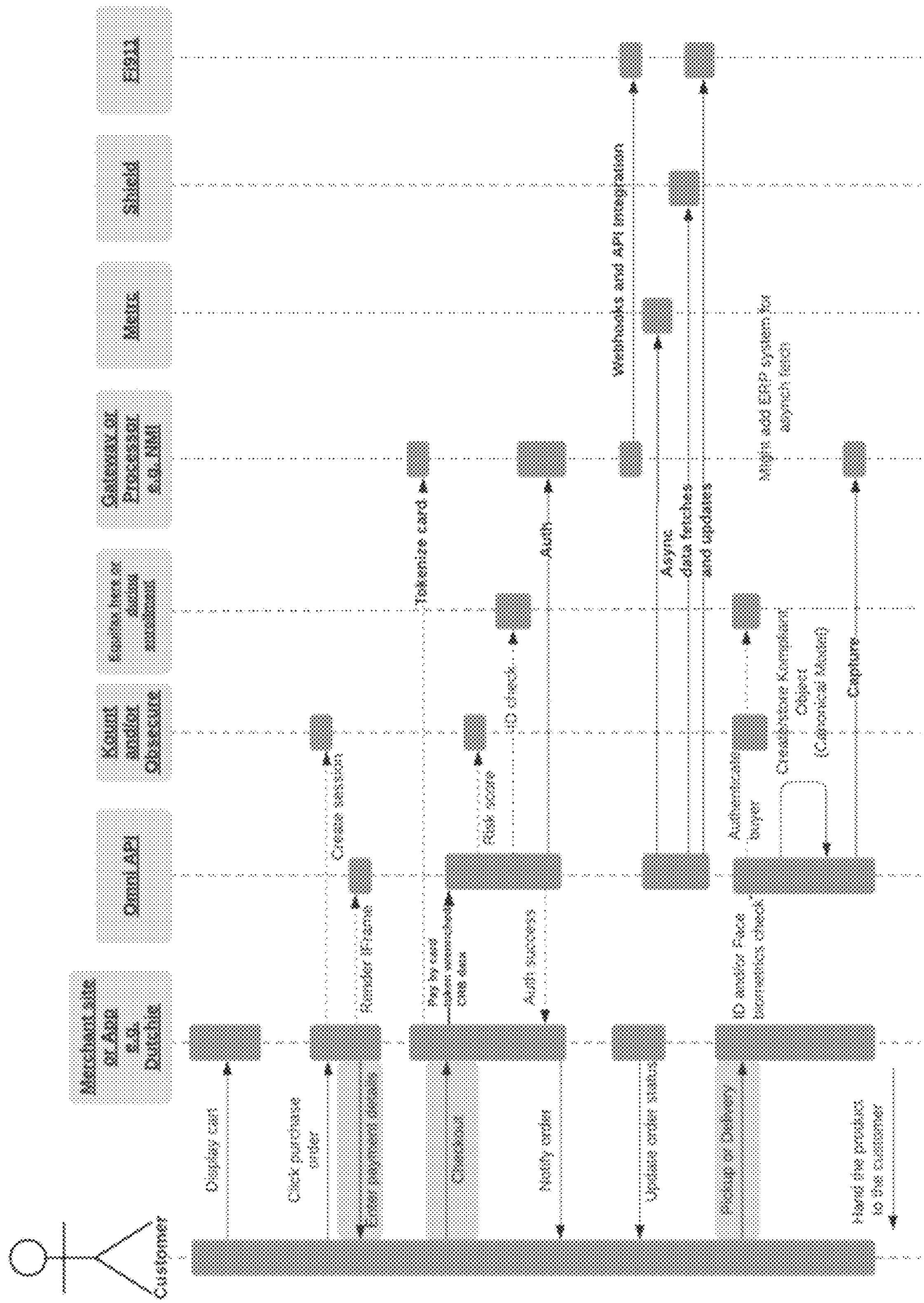

FIGURE 24A: CCTM SCREENSHOT
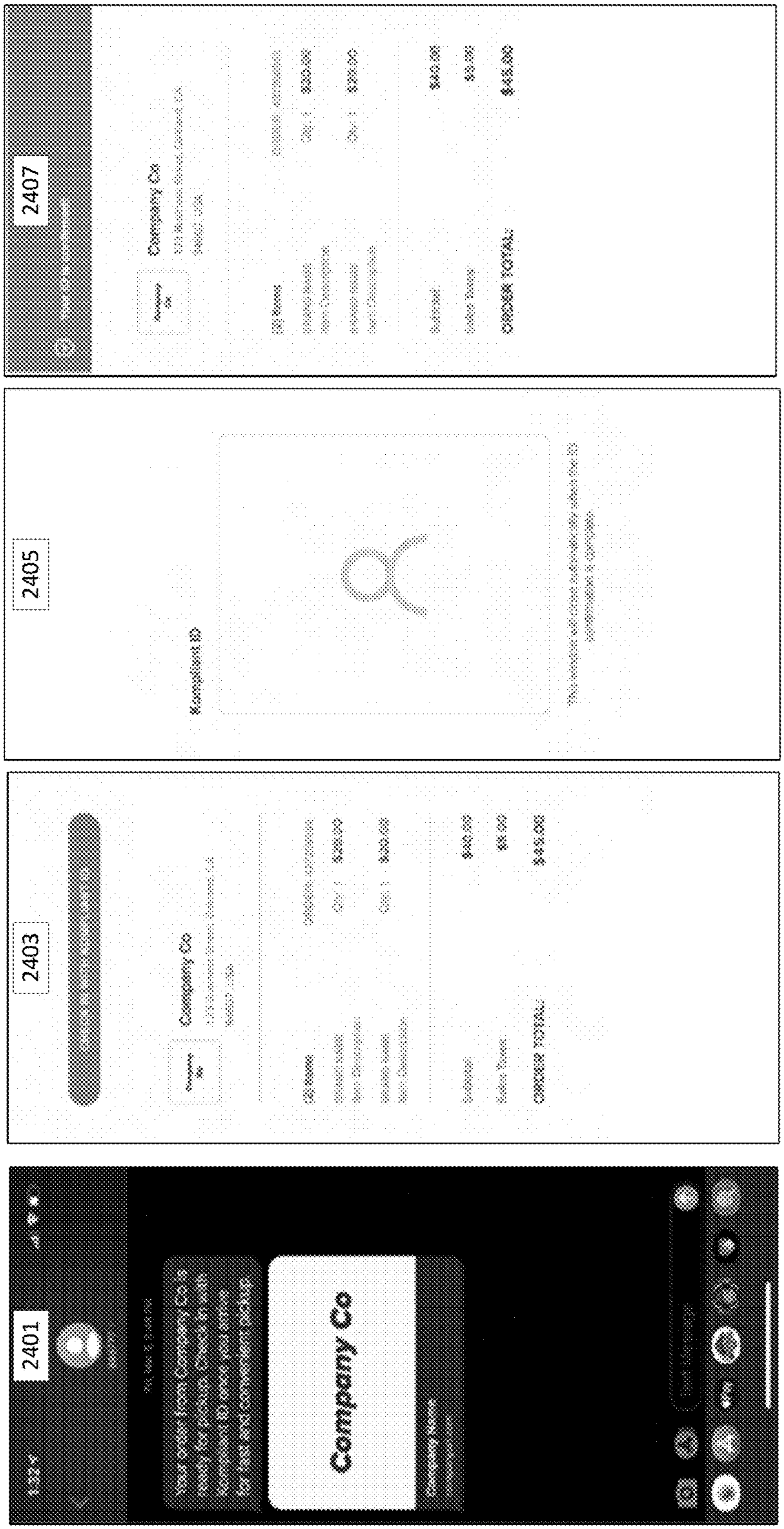

FIGURE 24B: CCTM SCREENSHOT
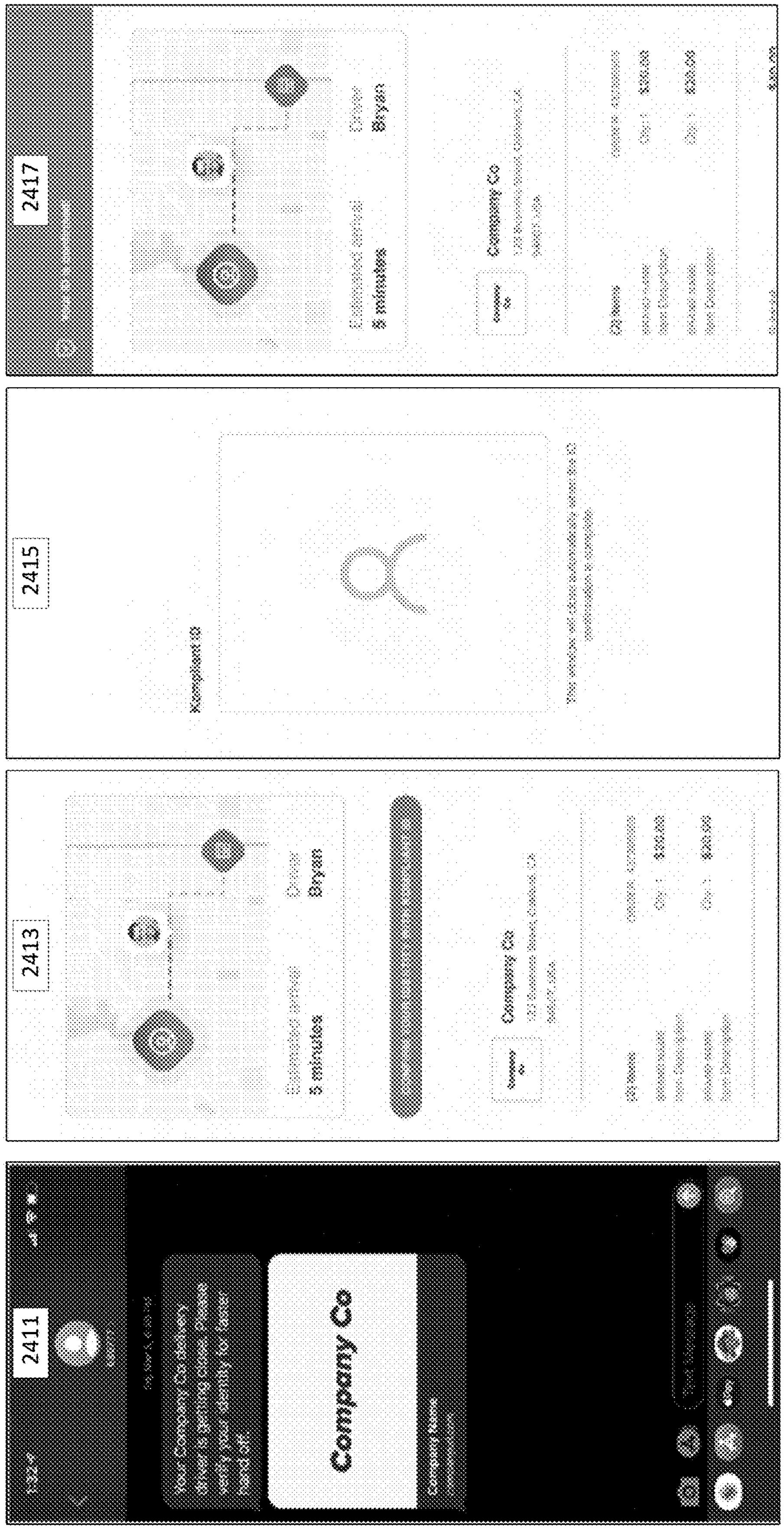

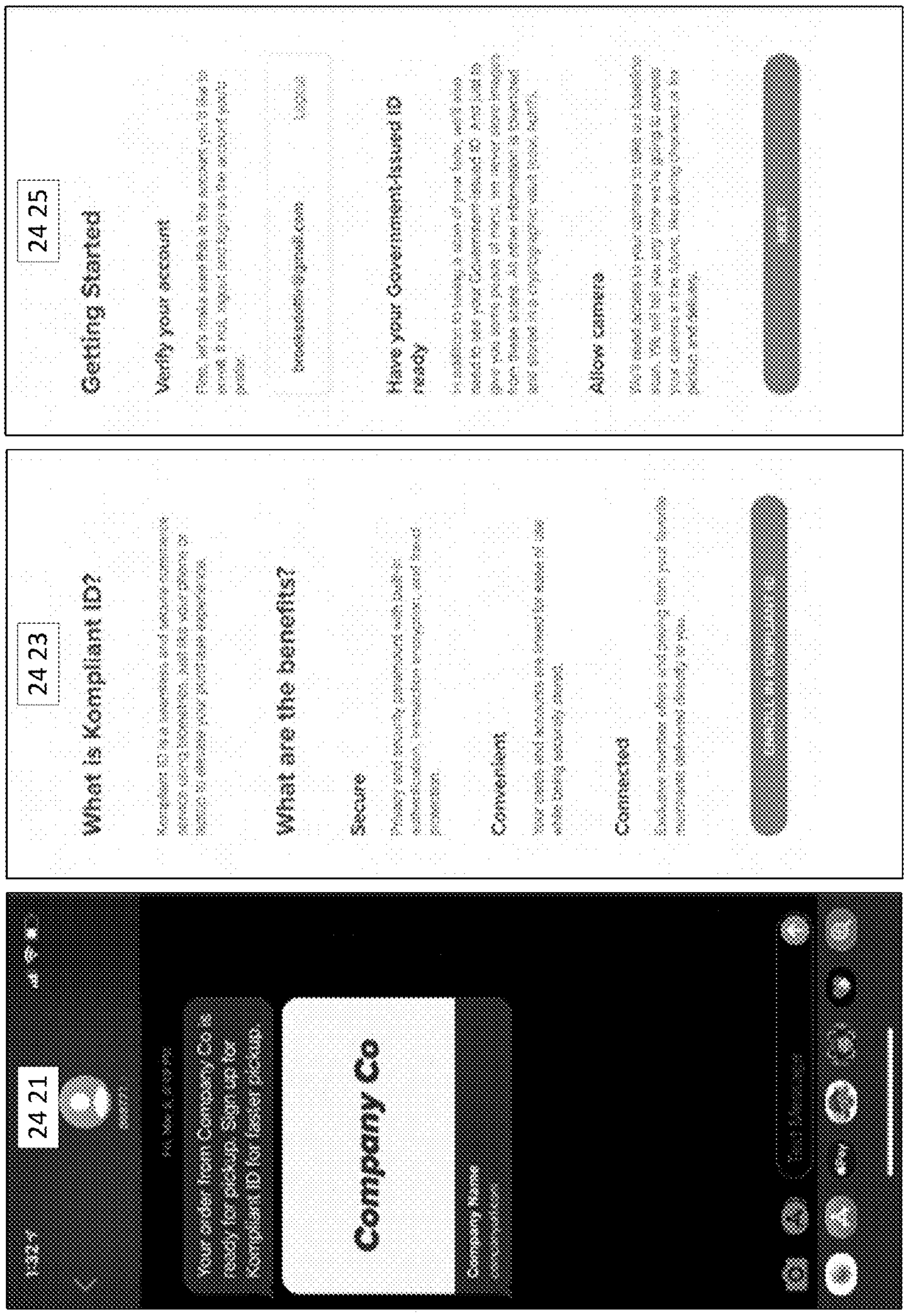
FIGURE 24 C: CCTM SCREENSHOT

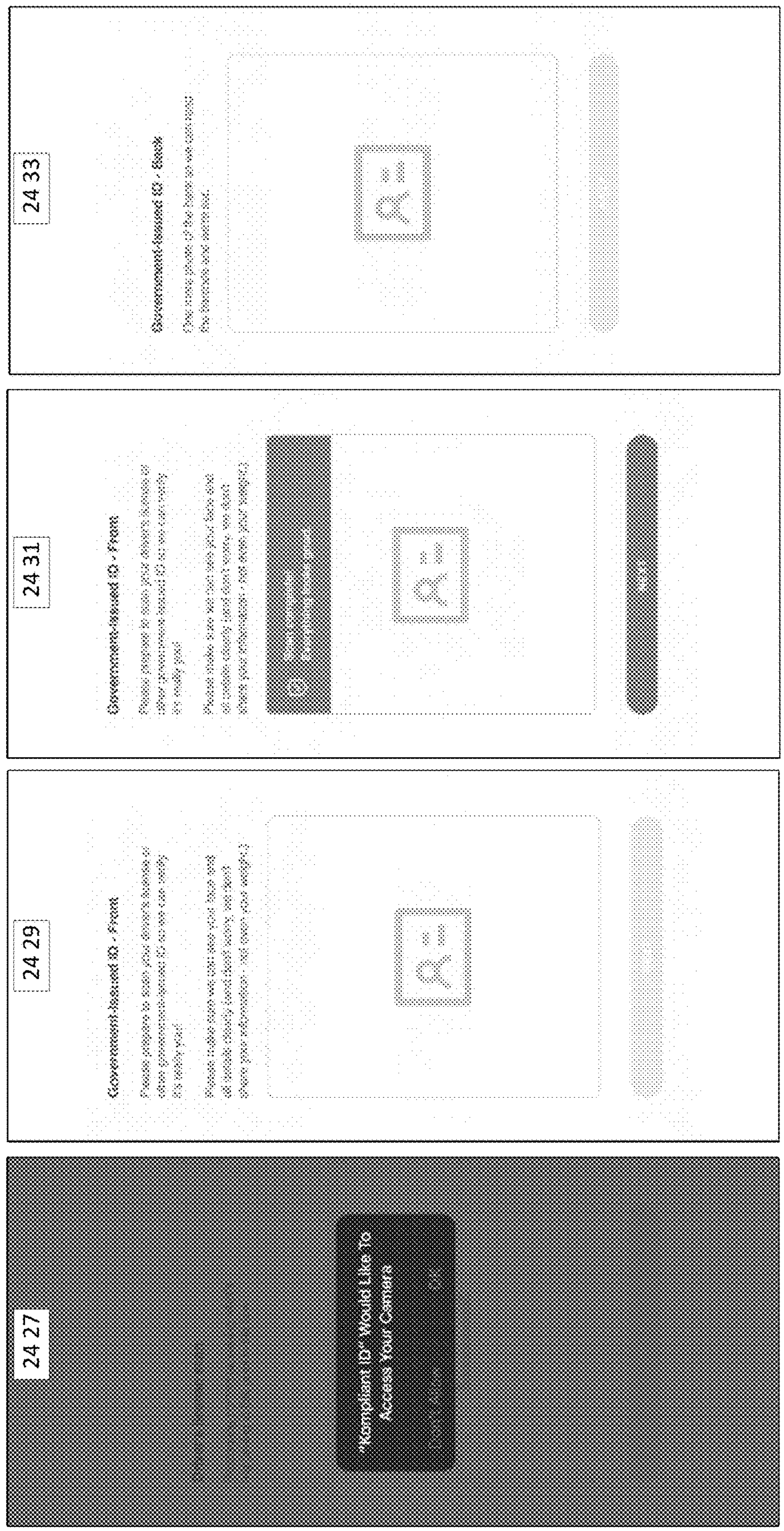
FIGURE 24 D: CCTM SCREENSHOT

FIGURE 24E: CCTM SCREENSHOT
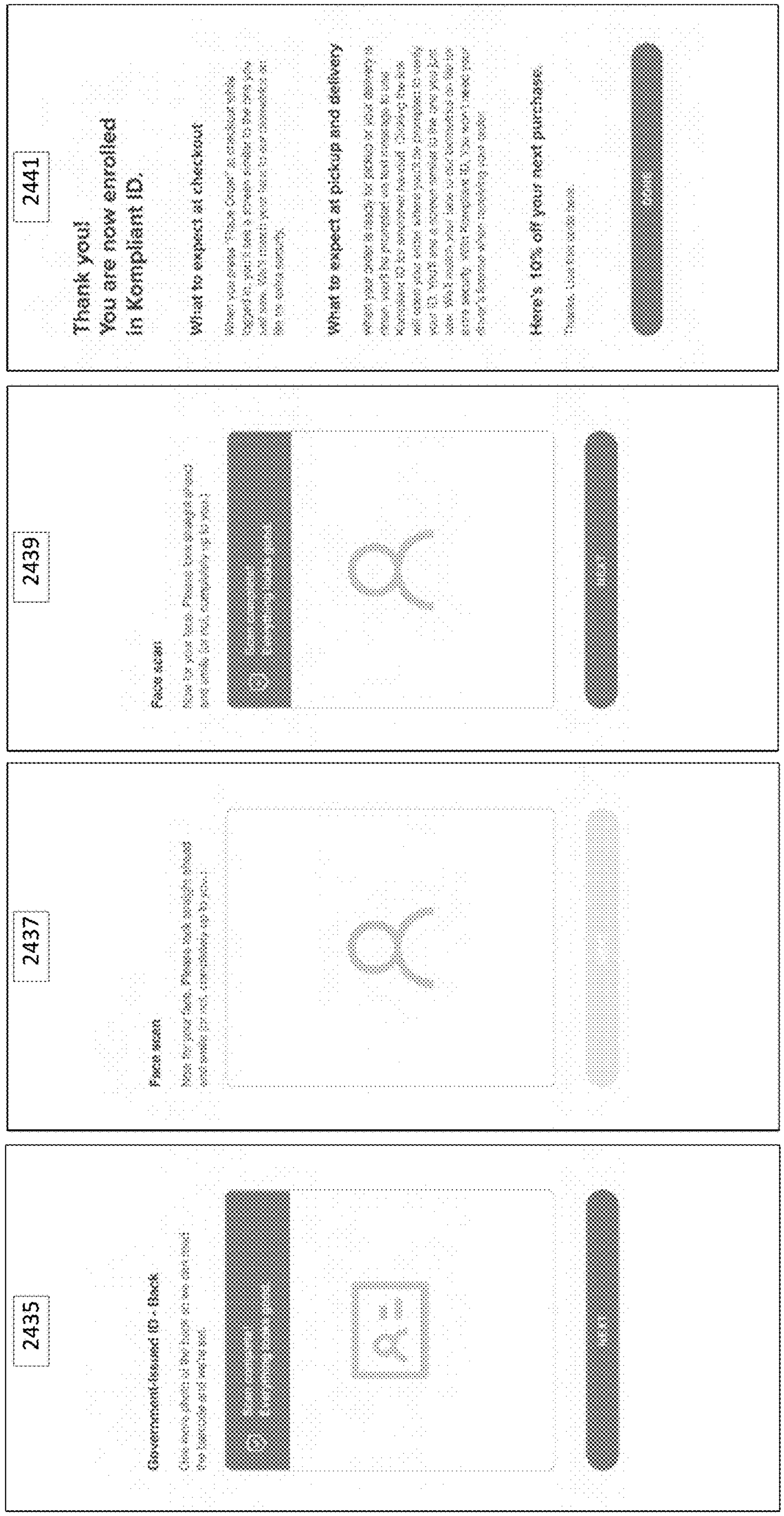

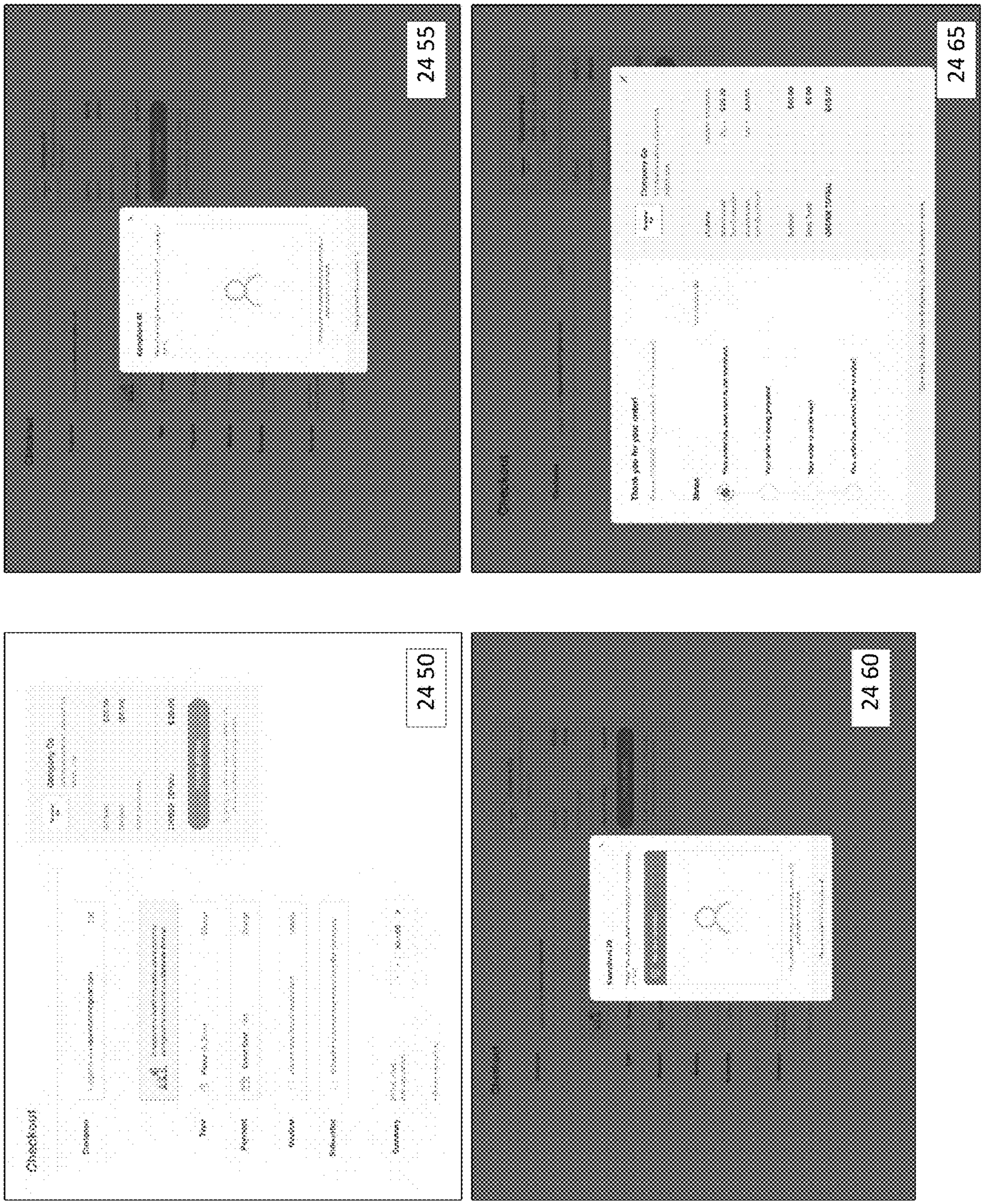
FIGURE 24 F: CCTM SCREENSHOT

COMPLIANCE COMMERCE TRANSACTION MANAGEMENT APPARATUSES, PROCESSES AND SYSTEMS

PRIORITY CLAIM

Applicant hereby claims benefit to priority under 35 USC § 119 as a non-provisional conversion of U'S provisional patent application Ser. No. 63/142,465, filed Jan. 27, 2021, entitled "Compliance Commerce Transaction Management Apparatuses, Processes and Systems".

Applicant hereby claims benefit to priority under 35 USC § 119 as a non-provisional conversion of U'S provisional patent application Ser. No. 63/238,771, filed Aug. 30, 2021, entitled "Compliance Commerce Transaction Management Apparatuses, Processes and Systems".

Applicant hereby claims benefit to priority under 35 USC § 119 as a non-provisional conversion of U.S. provisional patent application Ser. No. 63/300,046, filed Jan. 16, 2022, entitled "Compliance Commerce Transaction Management Apparatuses, Processes and Systems".

The entire contents of the aforementioned applications are herein expressly incorporated by reference.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations generally address inventory tracking, and more particularly, include Compliance Commerce Transaction Management Apparatuses, Processes and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Electronic Data Systems (EDS) provided electronic data processing payment systems. Further to payments, systems like System Software Associates' (SSA) Business Planning and Control System (BPCS) helped users manage inventory on hardware such as AS/400.

BRIEF DESCRIPTION OF THE DRAWINGS

Appendices and/or drawings illustrating various, non-limiting, example, innovative aspects of the Compliance Commerce Transaction Management Apparatuses, Processes and Systems (hereinafter "CCTM") disclosure, include:

FIGS. 1A-B show non-limiting, example embodiments of architecture(s) for the CCTM;

FIGS. 2A-B show non-limiting, example embodiments of architecture(s) for the CCTM;

FIGS. 3A-B show non-limiting, example embodiments of architectures for the CCTM;

FIGS. 4A-B show non-limiting, example embodiments of a datagraph illustrating data flow(s) for the CCTM;

FIG. 5 shows non-limiting, example embodiments of a logic flow illustrating an entity compliance verification and onboarding (ECVO) component for the CCTM;

FIGS. 6A-E show non-limiting, example embodiments of implementation case(s) for the CCTM;

FIGS. 7A-F show non-limiting, example embodiments of implementation case(s) for the CCTM;

FIGS. 8A-C show non-limiting, example embodiments of implementation case(s) for the CCTM;

FIG. 9 shows non-limiting, example embodiments of implementation case(s) for the CCTM;

FIGS. 10A-D show non-limiting, example embodiments of screenshots illustrating user interface(s) of the CCTM;

FIGS. 11A-D show non-limiting, example embodiments of screenshots illustrating user interface(s) of the CCTM;

FIGS. 12A-D show non-limiting, example embodiments of screenshots illustrating user interface(s) of the CCTM;

FIGS. 13A-E show non-limiting, example embodiments of screenshots illustrating user interface(s) of the CCTM;

FIG. 14 shows non-limiting, example embodiments of a datagraph illustrating data flow(s) for the CCTM;

FIG. 15 shows non-limiting, example embodiments of a logic flow illustrating an entity compliance monitoring (ECM) component for the CCTM;

FIGS. 16A-C show non-limiting, example embodiments of implementation case(s) for the CCTM;

FIGS. 17A-B show non-limiting, example embodiments of implementation case(s) for the CCTM;

FIGS. 18A-B show non-limiting, example embodiments of architectures for the CCTM;

FIGS. 19A-C show non-limiting, example embodiments of a datagraph illustrating data flow(s) for the CCTM;

FIG. 20 shows non-limiting, example embodiments of a logic flow illustrating a transaction compliance evaluation (TCE) component for the CCTM;

FIGS. 21A-H show non-limiting, example embodiments of implementation case(s) for the CCTM;

FIG. 22 shows non-limiting, example embodiments of implementation case(s) for the CCTM;

FIGS. 23A-D show non-limiting, example embodiments of implementation case(s) for the CCTM;

FIGS. 24A-F show non-limiting, example embodiments of screenshots illustrating user interface(s) of the CCTM;

Figure 25:
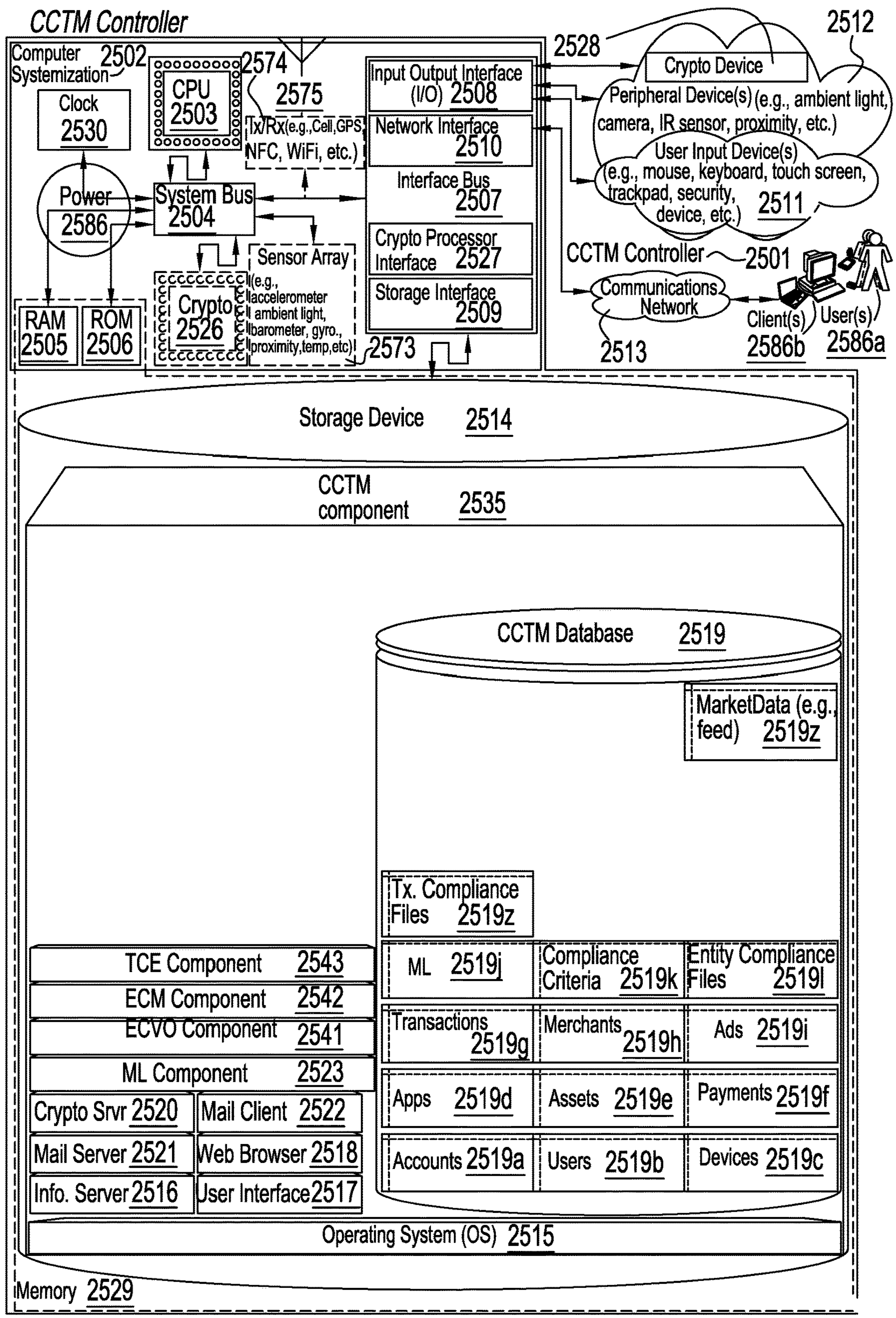
FIG. 25 shows a block diagram illustrating non-limiting, example embodiments of a CCTM controller.

APPENDICES 1-2 illustrate embodiments of the CCTM.

Generally, the leading number of each citation number within the drawings indicates the figure in which that citation number is introduced and/or detailed. As such, a detailed discussion of citation number 101 would be found and/or introduced in FIG. 1. Citation number 201 is introduced in FIG. 2, etc. Any citations and/or reference numbers are not necessarily sequences but rather just example orders that may be rearranged and other orders are contemplated. Citation number suffixes may indicate that an earlier introduced item has been re-referenced in the context of a later figure and may indicate the same item, evolved/modified version of the earlier introduced item, etc., e.g., server 199 of FIG. 1 may be a similar server 299 of FIG. 2 in the same and/or new context.

DETAILED DESCRIPTION

The Compliance Commerce Transaction Management Apparatuses, Processes and Systems (hereinafter "CCTM")

transforms entity onboarding application input, assessment data, authentication data inputs, via CCTM components (e.g., ECVO, ECM, TCE, etc. components), into entity onboarding application output, entity compliance datastructure, transaction compliance datastructure outputs. The CCTM components, in various embodiments, implement advantageous features as set forth below.

INTRODUCTION

The CCTM provides unconventional features (e.g., including verifying that the unique identifier of the source item is a valid transaction, where a valid transaction includes the unique identifier of the source item has not been transacted to another customer, the unique identifier of the source item has not been transacted at the source of origin and the intermediate origin that is incompatible with the customer transaction origin, and the time stamp of the source of origin and intermediate origin has not been transacted at the time stamp of the source of origin and the time stamp of the intermediate origin that is incompatible with the time stamp of the customer transaction origin, and the CCTM may then provide a verification status for a customer transaction identifier) that were never before available in inventory tracking.

Tracking links are used to match CCTM compliance data to purchase transaction identifier, merchant identifier, consumer identifier, acquirer processor identifier, payment network identifier, as well as additional identifiers for events including refunds and disputes. This allows for 'end-to-end' auditing of transactions. A tracking link is provided to authorized users to provide access to either an aggregate CCTM Compliance Score or to a data set providing a subset of the data the user is authorized to access for audit, compliance, or transaction handling purposes. Authorized users can access the CCTM data they are approved to use via API, UI, data stream or other data delivery mechanism through the CCTM interfaces.

CCTM

FIGS. 1A-B show non-limiting, example embodiments of architecture(s) for the CCTM. In FIGS. 1A-B, embodiments of how the CCTM may be utilized to facilitate lifecycle commerce compliance, compliance tokenization, and ongoing compliance monitoring are illustrated. In some implementations, the CCTM may include services such as: low/no code secure, streamlined and real-time onboarding service, giving the platform a customizable drop-in UI; enhanced data verification and seamless decisioning engine, ensuring applications don't get held up and the business application process is fully digitized; in-built process automation to expedite ability to get merchants/businesses live processing and reduce time-to-activation of services; underwriting workflow management; adjudication decision support; ongoing transaction verification service that can function as a safeguard against fraud along with enhanced business monitoring to remove friction of account issues or deposit holds during re-underwriting process; and/or the like.

In some implementations, the CCTM may provide a spectrum of platform services to address the compliance challenges faced by the entire payments ecosystem such as: real-time applicant verification using the leading 3rd party services to validate and augment self-reported data; a consumer-grade merchant onboarding portal facilitating industry leading service application and services activation experience; applicant tokenization with the secure encryption and cryptographic signing of data utilized to handle processing of an application for services including updated information, verified data, and results of business and owner monitoring; CCTM scoring intelligence with machine learning and embedded AI; underwriting dashboard to streamline adjudication workflow, improve decisioning, and minimize manual review; ongoing transaction verification and business monitoring for reunderwriting; and/or the like.

FIGS. 2A-B show non-limiting, example embodiments of architecture(s) for the CCTM. In FIG. 2A, an embodiment of how the CCTM may be utilized to facilitate evaluating, measuring, scoring, analyzing, and/or the like compliance compatibility is illustrated.

In FIG. 2B, an embodiment of how the CCTM may be utilized to facilitate ecosystem compliance services is illustrated. In various embodiments, the CCTM may provide the following compliance services to various parties in the ecosystem:

- Sponsor Bank: establishment and operation of payment programs ensuring adherence to applicable laws and regulations with ongoing monitoring and audit support
- Acquirer Processor: optimization of the rollout and operation of payment programs across channel partners
- Independent Sales Organization: improved application, decisioning, and activation experience
- VAR/ISV/Gateway: improved ability to market to applying business and provide a more efficient onboarding and activation experience
- Applying Business/Merchant of Record: seamless and streamlined service application and activation experience with ongoing proactive monitoring and optimization of services In various implementations, the CCTM may provide the following features:

- Protocol: common data, computational standards, and tokenization formats for ecosystem stakeholders using CCTM services
- Platform: 2-sided network with applying merchants as users and banks, processors, ISOs/VARS, PayFacs/PSPs, and Gateways as paying customers
- Decision Support: underwriting and compliance personnel have a more efficient workflow by using CCTM services; analytics and scoring informing initial decisioning and ongoing monitoring of merchants and portfolios
- Multi-Source Data Integrity: combination of data across 30+ bureaus and verification services as well as augmentation through usage by compliance teams enhanced with CCTM intelligent scoring; ongoing monitoring of the business, owners, and verification of transactions to ensure ongoing data integrity FIGS. 3A-B show non-limiting, example embodiments of architectures for the CCTM. In FIGS. 3A-B, embodiments of how a CCTM architecture may be implemented is illustrated. In various implementations, a CCTM architecture may provide the following features:

- Establishing the compliance implementation layer with well-formed interfaces
- Compliance canonical architecture facilitating combination, augmentation and use of data across multiple sources and CCTM analytics
- Multi-source data integrity with verification of data across multiple (e.g., three or more) trusted sources
- Data enhancement facilitating downstream analytics and machine learning
- Data feedback facilitating sharing of data with partners and machine learning algorithms FIGS. 4A-B show non-limiting, example embodiments of a datagraph illustrating data flow(s) for the CCTM. In FIGS. 4A-B, dashed lines indicate data flow elements that may be more likely to be optional. In FIGS. 4A-B, a client 402 (e.g., of an applicant associated with an entity such as a merchant) may send an entity onboarding application input 421 to a referrer (e.g., a marketing and or prequalification service such as PayCompare, a participating processor, referral partner, etc.) server 404 to request entity (e.g., merchant) onboarding with a participating processor (e.g., a payment processor such as Talus Payments®). For example, the client may be a desktop, a laptop, a tablet, a smartphone, a smartwatch, and/or the like that is executing a client application. In one implementation, the entity onboarding application input may include data such as a request identifier, business legal name, business description, business definition, business web domain, business employer identification number (EIN), business ultimate beneficial owner (UBO), business owner contact info, type of business/sector/merchant category code (MCC), equipment required (e.g., point of sale (POS) terminals), transaction and sales information, total payment volume (TPV), average order value (AOV), card-not-present (CNP) Volume, and/or the like. In one embodiment, the client may provide the following example entity onboarding application input, substantially in the form of a (Secure) Hypertext Transfer Protocol ("HTTP(S)") POST message including extensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
  <timestamp>2020-12-31 23:59:59</timestamp>
  <user_accounts_details>
      <user_account_credentials>
        <user_name>JohnDaDoeDoeDoooe@gmail.com</user_name>
        <password>abc123</password>
        //OPTIONAL <cookie>cookieID</cookie>
        //OPTIONAL <digital_cert_link>www.mydigitalcertificate.com/
JohnDoeDaDoeDoe@gmail.com/mycertifcate.dc</digital_cert_link>
        //OPTIONAL <digital_certificate>_DATA_</digital_certificate>
      </user_account_credentials>
  </user_accounts_details>
  <client_details> //iOS Client with App and Webkit
        //it should be noted that although several client details
        //sections are provided to show example variants of client
        //sources, further messages will include only on to save
        //space
      <client_IP>10.0.0.123</client_IP>
      <user_agent_string>Mozilla/5.0 (iPhone; CPU iphone OS 7_1_1 like Mac OS X)
AppleWebKit/537.51.2 (KHTML, like Gecko) Version/7.0 Mobile/11D201
Safari/9537.53</user_agent_string>
      <client_product_type>iPhone6, 1</client_product_type>
      <client_serial_number>DNXXX1X1XXXX</client_serial_number>
      <client_UDID>3XXXXXXXXXXXXXXXXXXXXXXXXD</client_UDID>
      <client_OS>iOS</client_OS>
      <client_OS_version>7.1.1</client_OS_version>
      <client_app_type>app with webkit</client_app_type>
      <app_installed_flag>true</app_installed_flag>
      <app_name>CCTM.app</app_name>
      <app_version>1.0 </app_version>
      <app_webkit_name>Mobile Safari</client_webkit_name>
      <client_version>537.51.2</client_version>
  </client_details>
  <client_details> //iOS Client with Webbrowser
      <client_IP>10.0.0.123</client_IP>
      <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
      <client_product_type>iPhone6, 1</client_product_type>
      <client_serial_number>DNXXX1X1XXXX</client_serial_number>
      <client_UDID>3XXXXXXXXXXXXXXXXXXXXXXXXD</client_UDID>
      <client_OS>10S</client_OS>
      <client_OS_version>7.1.1</client_OS_version>
      <client_app_type>web browser</client_app_type>
      <client_name>Mobile Safari</client_name>
      <client_version>9537.53</client_version>
  </client_details>
  <client_details> //Android Client with Webbrowser
      <client_IP>10.0.0.123</client_IP>
      <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
      <client_product_type>Nexus S</client_product_type>
      <client_serial_number>YXXXXXXXXZ</client_serial_number>
      <client_UDID>FXXXXXXXXX-XXXX-XXXX-XXXX-XXXXXXXXXXXX</client_UDID>
      <client_OS>Android</client_OS>
      <client_OS_version>4.0.4</client_OS_version>
      <client_app_type>web browser</client_app_type>
```

-continued

```
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
        AppleWebKit/537.75.14 (KHTML, like Gecko) Version/7.0.3
        Safari/537.75.14</user_agent_string>
        <client_product_type>MacPro5, 1</client_product_type>
        <client_serial_number>YXXXXXXXXZ</client_serial_number>
        <client_UDID>FXXXXXXXXX-XXXX-XXXX-XXXX-XXXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <entity_onboarding_application_input>
      <request_identifier>ID_request_1</request_identifier>
      <business_legal_name>Local Pharmacy Store 2022</business_legal_name>
      <business_description>pharmacy</business_description>
      <business_web_domain>www.LocalPharmacyStore2022.com</business_web_domain>
      <EIN>XX-XXXXXXX</EIN>
      <UBO_name>John Smith</UBO_name>
      <type_of_business>Drug Stores and Pharmacies</type_of_business>
      <MCC>5912</MCC>
      <equipment_required>2 POS terminals</equipment_required>
      <TPV>$50,000 per month</TPV>
      <AOV>$100</AOV>
      <CNP_Volume>30%</CNP_Volume>
      ...
    </entity_onboarding_application_input>
</auth_request>
```

The referrer server 404 may send an entity onboarding application request 425 to a CCTM server 406 to facilitate entity (e.g., merchant) onboarding with a participating processor. In one implementation, the entity onboarding application request may include data such as a request identifier, an account number, an application identifier, business legal name, business description, business definition, business web domain, business EIN, business UBO, business owner contact info, type of business/sector/Merchant Category Code (MCC), equipment required, transaction and sales information, TPV, AOV, CNP Volume, and/or the like. In one embodiment, the referrer server may provide the following example entity onboarding application request, substantially in the form of a HTTP(S) POST message including XML-formatted data, as provided below:

```
POST/entity_onboarding_application_request.php
  HTTP/1.1
Host: www.server.com
Content-Type: Application/XML
Content-Length: 667
<? XML version="1.0" encoding="UTF-8"?>
<entity_onboarding_application_request>
  <request_identifier>ID_request_2</request_identifier>
  <account_number>ID_account_1</account_number>
  <application_identifier>ID_application_1</application_identifier>
  <business_legal_name>Local Pharmacy Store 2022</business_legal_name>
  <business_description>pharmacy</business_description>
  <business_web_domain>www.LocalPharmacyStore2022.com</business_web_domain>
  <EIN>XX-XXXXXXX</EIN>
  <UBO_name>John Smith</UBO_name>
  <type_of_business>Drug Stores and Pharmacies</type_of_business>
  <MCC>5912</MCC>
  <equipment_required>2 POS terminals</equipment_required>
  <TPV>$50,000 per month</TPV>
  <AOV>$100</AOV>
  <CNP_Volume>30%</CNP_Volume>
  . . .
</entity_onboarding_application_request>
```

An entity compliance verification and onboarding (ECVO) component 429 may utilize data provided in the entity onboarding application request to generate an entity compliance data structure (e.g., that includes self-reported data provided by the applicant for the entity, verification data for the self-reported data, an overall compliance score, a merchant identifier, a cryptographic signature, etc.) for the entity, and/or to facilitate entity account activation with a participating processor. See FIG. 5 for additional details regarding the ECVO component.

The CCTM server 406 may send a compliance evaluation criteria request 433 to a repository 410 to determine compliance evaluation criteria to utilize for the entity (e.g., common criteria, processor-specific criteria). In one implementation, the compliance evaluation criteria request may include data such as a request identifier, a criteria type, type of business/sector/MCC, a processor identifier, and/or the like. In one embodiment, the CCTM server may provide the following example compliance evaluation criteria request, substantially in the form of a HTTP(S) POST message including XML-formatted data, as provided below:

```
POST/compliance_evaluation_criteria_request.php
  HTTP/1.1
Host: www.server.com
Content-Type: Application/XML
Content-Length: 667
<? XML version="1.0" encoding="UTF-8"?>
<compliance_evaluation_criteria_request>
```

```
  <request_identifier>ID_request_3</request_identifier>
  <criteria_type>ENTITY_EVALUATION</criteria_type>
  <type_of_business>Drug Stores and Pharmacies</type_of_business>
  <MCC>5912</MCC>
  <processor_identifier>ID_processor_TalusPay</processor_identifier>
</compliance_evaluation_criteria_request>
```

The repository 410 may send a compliance evaluation criteria response 437 to the CCTM server 406 with the requested compliance evaluation criteria to utilize for the entity. In one implementation, the compliance evaluation criteria response may include data such as a response identifier, the requested compliance evaluation criteria, and/or the like. In one embodiment, the repository may provide the following example compliance evaluation criteria response, substantially in the form of a HTTP(S) POST message including XML-formatted data, as provided below:

```
POST /compliance_evaluation_criteria_response.php HTTP/1.1
Host: www.server.com
Content-Type: Application/XML
Content-Length: 667
<?XML version = "1.0" encoding = "UTF-8"?>
<compliance_evaluation_criteria_response>
  <response_identifier>ID_response_3</response_identifier>
  <compliance_evaluation_criterion>
    <criterion_dimension>Entity Compliance</criterion_dimension>
    <criterion_factor>Entity name matches entity EIN?</criterion_factor>
    <criterion_type>COMMON</criterion_type>
  </compliance_evaluation_criterion>
  <compliance_evaluation_criterion>
    <criterion_dimension>Entity Compliance</criterion_dimension>
    <criterion_factor>Entity UBO matches business filings?</criterion_factor>
    <criterion_type>COMMON</criterion_type>
  </compliance_evaluation_criterion>
  ...
  <compliance_evaluation_criterion>
    <criterion_dimension>UBO Compliance</criterion_dimension>
    <criterion_factor>Owner name matches owner SSN?</criterion_factor>
    <criterion_type>COMMON</criterion_type>
  </compliance_evaluation_criterion>
  <compliance_evaluation_criterion>
    <criterion_dimension>UBO Compliance</criterion_dimension>
    <criterion_factor>Owner convicted of financial fraud?</criterion_factor>
    <criterion_type>PROCESSOR_SPECIFIC</criterion_type>
  </compliance_evaluation_criterion>
  ...
</compliance_evaluation_criteria_response>
```

The CCTM server 406 may send an additional assessment data request 441 to the referrer server 404 to request additional assessment data. In one implementation, the additional assessment data request may include data such as a request identifier, an account number, an application identifier, specification of additional assessment data requested, and/or the like. In one embodiment, the CCTM server may provide the following example additional assessment data request, substantially in the form of a HTTP(S) POST message including XML-formatted data, as provided below:

```
POST /additional_assessment_data_request.php HTTP/1.1
Host: www.server.com
Content-Type: Application/XML
Content-Length: 667
<?XML version = "1.0" encoding = "UTF-8"?>
<additional_assessment_data_request>
  <request_identifier>ID_request_4</request_identifier>
  <account_number>ID_account_1</account_number>
  <application_identifier>ID_application_1</application_identifier>
  <additional_assessment_data_requested>
    <data_requested>UBO social security number (SSN)</data_requested>
    <data_requested>UBO government ID card</data_requested>
  </additional_assessment_data_requested>
</additional_assessment_data_request>
```

The referrer server 404 may send an additional assessment data output 445 to the client 402 to request additional assessment data from the applicant. In one implementation, the additional assessment data output may include data such as a request identifier, specification of additional assessment data requested, and/or the like. In one embodiment, the referrer server may provide the following example additional assessment data output, substantially in the form of a HTTP(S) POST message including XML-formatted data, as provided below:

```
POST /additional_assessment_data_output.php HTTP/1.1
Host: www.server.com
Content-Type: Application/XML
Content-Length: 667
<?XML version = "1.0" encoding = "UTF-8"?>
<additional_assessment_data_output>
  <request_identifier>ID_request_5</request_identifier>
  <additional_assessment_data_requested>
    <data_requested>UBO social security number (SSN)</data_requested>
    <data_requested>UBO government ID card</data_requested>
  </additional_assessment_data_requested>
</additional_assessment_data_output>
```

The client 402 may send an additional assessment data input 449 to the referrer server 404 to provide the requested additional assessment data supplied by the applicant. In one implementation, the additional assessment data input may include data such as a response identifier, the provided additional assessment data, and/or the like. In one embodiment, the client may provide the following example additional assessment data input, substantially in the form of a HTTP(S) POST message including XML-formatted data, as provided below:

```
POST/additional_assessment_data_input.php HTTP/1.1
Host: www.server.com
Content-Type: Application/XML
Content-Length: 667
<? XML version="1.0" encoding="UTF-8"?>
<additional_assessment_data_input>
  <response_identifier>ID_response_5</response_identifier>
  <UBO_SSN>XXX-XX-XXXX</UBO_SSN>
  <driver_license_front>image_front.png</driver_license_front>
  <driver_license_back>image_back.png</driver_license_back>
</additional_assessment_data_input>
```

The referrer server 404 may send an additional assessment data response 453 to the CCTM server 406 with the requested additional assessment data. In one implementation, the additional assessment data response may include data such as a response identifier, the requested additional assessment data, and/or the like. In one embodiment, the referrer server may provide the following example additional assessment data response, substantially in the form of a HTTP(S) POST message including XML-formatted data, as provided below:

```
POST/additional_assessment_data_response.php HTTP/1.1
Host: www.server.com
Content-Type: Application/XML
Content-Length: 667
<? XML version="1.0" encoding="UTF-8"?>
<additional_assessment_data_response>
  <response_identifier>ID_response_4</response_identifier>
  <UBO_SSN>XXX-XX-XXXX</UBO_SSN>
  <driver_license_front>image_front.png</driver_license_front>
  <driver_license_back>image_back.png</driver_license_back>
</additional_assessment_data_response>
```

The CCTM server 406 may send an assessment data verification request 457 to a verification (e.g., Equifax) server 408 to verify assessment data (e.g., originally provided assessment data, additional assessment data) provided by the applicant. In one implementation, the assessment data verification request may include data such as a request identifier, specification of assessment data to verify, and/or the like. In one embodiment, the CCTM server may provide the following example assessment data verification request, substantially in the form of a HTTP(S) POST message including XML-formatted data, as provided below:

```
POST /assessment_data_verification_request.php HTTP/1.1
Host: www.server.com
Content-Type: Application/XML
Content-Length: 667
<?XML version = "1.0" encoding = "UTF-8"?>
<assessment_data_verification_request>
  <request_identifier>ID_request_6</request_identifier>
  <verification_section>
    <section_identifier>ID_section_1</section_identifier>
    <section_query>Entity name matches entity EIN?</section_query>
    <section_assessment_data>
      <business_legal_name>Local Pharmacy Store 2022</business_legal_name>
      <EIN>XX-XXXXXXX</EIN>
    </section_assessment_data>
```

-continued

```
  </verification_section>
  ...
  <verification_section>
    <section_identifier>ID_section_5</section_identifier>
    <section_query>Owner name matches owner SSN?</section_query>
    <section_assessment_data>
      <UBO_name>John Smith</UBO_name>
      <UBO_SSN>XXX-XX-XXXX</UBO_SSN>
    </section_assessment_data>
  </verification_section>
  ...
</assessment_data_verification_request>
```

The verification server 408 may send an assessment data verification response 461 to the CCTM server 406 with the requested assessment data verification. In one implementation, the assessment data verification response may include data such as a response identifier, the requested assessment data verification, and/or the like. In one embodiment, the verification server may provide the following example assessment data verification response, substantially in the form of a HTTP(S) POST message including XML-formatted data, as provided below:

```
POST /assessment_data_verification_response.php HTTP/1.1
Host: www.server.com
Content-Type: Application/XML
Content-Length: 667
<?XML version = "1.0" encoding = "UTF-8"?>
<assessment_data_verification_response>
  <response_identifier>ID_response_6</response_identifier>
  <verification_section>
    <section_identifier>ID_section_1</section_identifier>
    <status>VERIFIED</status>
```

-continued

```
  </verification_section>
  ...
  <verification_section>
    <section_identifier>ID_section_5</section_identifier>
    <status>NOT_VERIFIED</status>
  </verification_section>
  ...
</assessment_data_verification_response>
```

The CCTM server 406 may send an entity onboarding approval request 465 to a participating processor server 412 to provide the participating processor with the CCTM's evaluation of whether to approve the entity. In one implementation, the entity onboarding approval request may include data such as a request identifier, an entity compliance datastructure (ECD), and/or the like. In one embodiment, the CCTM server may provide the following example entity onboarding approval request, substantially in the form of a HTTP(S) POST message including XML-formatted data, as provided below:

```
POST /entity_onboarding_approval_request.php HTTP/1.1
Host: www.server.com
Content-Type: Application/XML
Content-Length: 667
<?XML version = "1.0" encoding = "UTF-8"?>
<entity_onboarding_approval_request>
  <request_identifier>ID_request_7</request_identifier>
  <entity_compliance_datastructure>
    <ECD_identifier>ID_entity_compliance_datastructure_1</ECD_identifier>
    <event_data>
      <account_number>ID_account_1</account_number>
      <event_type>ONBOARDING_APPLICATION</event_type>
      <event_date_time>1/1/2023</event_date_time>
      <application_identifier>ID_application_1</application_identifier>
      <approval_status>APPROVED</approval_status>
      <pricing_data>pricing details for entity</pricing_data>
      <overall_compliance_score>815</overall_compliance_score>
      <cryptographic_signature>Signature of the CCTM</cryptographic_signature>
    </event_data>
    <assessment_data>
      <business_legal_name>Local Pharmacy Store 2022</business_legal_name>
      <business_description>pharmacy</business_description>
      <business_web_domain>www.LocalPharmacyStore2022.com</business_web_domain>
      <EIN>XX-XXXXXXX</EIN>
      <UBO_name>John Smith</UBO_name>
      <UBO_SSN>XXX-XX-XXXX</UBO_SSN>
      <driver_license_front>image_front.png</driver_license_front>
      <driver_license_back>image_back.png</driver_license_back>
      <type_of_business>Drug Stores and Pharmacies</type_of_business>
      <MCC>5912</MCC>
      <equipment_required>2 POS terminals</equipment_required>
      <TPV>$50,000 per month</TPV>
      <AOV>$100</AOV>
      <CNP_Volume>30%</CNP_Volume>
      ...
    </assessment_data>
```

-continued

```
      <verification_data>
        <verification_section>
          <section_identifier>ID_section_1</section_identifier>
          <section_query>Entity name matches entity EIN?</section_query>
          <verification_status>PASS</verification_status>
        </verification_section>
        ...
        <verification_section>
          <section_identifier>ID_section_5</section_identifier>
          <section_query>Owner name matches owner SSN?</section_query>
          <verification_status>INVESTIGATION</verification_status>
        </verification_section>
        ...
      </verification_data>
    </entity_compliance_datastructure>
</entity_onboarding_approval_request>
```

The participating processor server 412 may send an entity onboarding approval response 469 to the CCTM server 406 with the participating processor's approval data (e.g., including a merchant identifier for the entity). In one implementation, the entity onboarding approval response may include data such as a response identifier, participating processor approval data, and/or the like. In one embodiment, the participating processor server may provide the following example entity onboarding approval response, substantially in the form of a HTTP(S) POST message including XML-formatted data, as provided below:

```
POST /entity_onboarding_approval_response.php HTTP/1.1
Host: www.server.com
Content-Type: Application/XML
Content-Length: 667
<?XML version = "1.0" encoding = "UTF-8"?>
<entity_onboarding_approval_response>
  <response_identifier>ID_response_7</response_identifier>
  <participating_processor_approval_data>
    <account_number>ID_account_1</account_number>
    <application_identifier>ID_application_1</application_identifier>
    <approval_confirmation_status>CONFIRMED</approval_confirmation_status>
    <merchant_identifier>ID_merchant_identifier_1</merchant_identifier>
    <approval_date_time>1/1/2023</approval_date_time>
    <cryptographic_signature>
      Signature of the participating processor
    </cryptographic_signature>
  </participating_processor_approval_data>
</entity_onboarding_approval_response>
```

The CCTM server 406 may send an entity compliance datastructure store request 473 to the repository 410 to store an entity compliance datastructure for the event (e.g., onboarding application) for the entity. In one implementation, the entity compliance datastructure store request may include data such as a request identifier, an entity compliance datastructure, and/or the like. In one embodiment, the CCTM server may provide the following example entity compliance datastructure store request, substantially in the form of a HTTP(S) POST message including XML-formatted data, as provided below:

```
POST /entity_compliance_datastructure_store_request.php HTTP/1.1
Host: www.server.com
Content-Type: Application/XML
Content-Length: 667
<?XML version = "1.0" encoding = "UTF-8"?>
<entity_compliance_datastructure_store_request>
  <request_identifier>ID_request_8</request_identifier>
  <entity_compliance_datastructure>
    <ECD_identifier>ID_entity_compliance_datastructure_1</ECD_identifier>
```

-continued

```
    <event_data>
      <account_number>ID_account_1</account_number>
      <event_type>ONBOARDING_APPLICATION</event_type>
      <event_date_time>1/1/2023</event_date_time>
      <application_identifier>ID_application_1</application_identifier>
      <approval_status>APPROVED</approval_status>
      <pricing_data>pricing details for entity</pricing_data>
      <overall_compliance_score>815</overall_compliance_score>
      <cryptographic_signature>Signature of the CCTM</cryptographic_signature>
    </event_data>
    <assessment_data>
      <business_legal_name>Local Pharmacy Store 2022</business_legal_name>
      <business_description>pharmacy</business_description>
      <business_web_domain>www.LocalPharmacyStore2022.com</business_web_domain>
      <EIN>XX-XXXXXXX</EIN>
      <UBO_name>John Smith</UBO_name>
      <UBO_SSN>XXX-XX-XXXX</UBO_SSN>
      <driver_license_front>image_front.png</driver_license_front>
      <driver_license_back>image_back.png</driver_license_back>
      <type_of_business>Drug Stores and Pharmacies</type_of_business>
      <MCC>5912</MCC>
      <equipment_required>2 POS terminals</equipment_required>
      <TPV>$50,000 per month</TPV>
      <AOV>$100</AOV>
      <CNP_Volume>30%</CNP_Volume>
      ...
    </assessment_data>
    <verification_data>
      <verification_section>
        <section_identifier>ID_section_1</section_identifier>
        <section_query>Entity name matches entity EIN?</section_query>
        <verification_status>PASS</verification_status>
      </verification_section>
      ...
      <verification_section>
        <section_identifier>ID_section_5</section_identifier>
        <section_query>Owner name matches owner SSN?</section_query>
        <verification_status>INVESTIGATION</verification_status>
      </verification_section>
      ...
    </verification_data>
    <participating_processor_approval_data>
      <account_number>ID_account_1</account_number>
      <application_identifier>ID_application_1</application_identifier>
      <approval_confirmation_status>CONFIRMED</approval_confirmation_status>
      <merchant_identifier>ID_merchant_identifier_1</merchant_identifier>
      <approval_date_time>1/1/2023</approval_date_time>
      <cryptographic_signature>
        Signature of the participating processor
      </cryptographic_signature>
    </participating_processor_approval_data>
  </entity_compliance_datastructure>
</entity_compliance_datastructure_store_request>
```

The repository 410 may send an entity compliance datastructure store response 477 to the CCTM server 406 to inform the CCTM server whether the entity compliance datastructure for the event (e.g., onboarding application) for the entity was stored successfully. In one implementation, the entity compliance datastructure store response may include data such as a response identifier, a status, and/or the like. In one embodiment, the repository may provide the following example entity compliance datastructure store response, substantially in the form of a HTTP(S) POST message including XML-formatted data, as provided below:

```
POST/entity_compliance_datastructure_store_response.php HTTP/1.1
Host: www.server.com
Content-Type: Application/XML
Content-Length: 667
<? XML version="1.0" encoding="UTF-8" ?>
<entity_compliance_datastructure_store_response>
  <response_identifier>ID_response_8</response_identifier>
  <status>OK</status>
</entity_compliance_datastructure_store_response>
```

The CCTM server 406 may send an entity onboarding application response 481 to the referrer server 404 to inform the referrer server whether the entity's onboarding application was approved. In one implementation, the entity onboarding application response may include data such as a response identifier, a status, and/or the like. In one embodiment, the CCTM server may provide the following example entity onboarding application response, substantially in the form of a HTTP(S) POST message including XML-formatted data, as provided below:

```
POST/entity_onboarding_application_response.php HTTP/1.1
Host: www.server.com
Content-Type: Application/XML
Content-Length: 667
<? XML version="1.0" encoding="UTF-8"?>
<entity_onboarding_application_response>
  <response_identifier>ID_response_2</response_identifier>
```

<status>APPROVED</status>
</entity_onboarding_application_response>

The referrer server 404 may send an entity onboarding application output 485 to the client 402 to inform the applicant whether the entity's onboarding application was approved. In one implementation, the entity onboarding application output may include data such as a response identifier, a status, and/or the like. In one embodiment, the referrer server may provide the following example entity onboarding application output, substantially in the form of a HTTP(S) POST message including XML-formatted data, as provided below:

POST/entity_onboarding_application_output.php HTTP/1.1
Host: www.server.com
Content-Type: Application/XML
Content-Length: 667
<? XML version="1.0" encoding="UTF-8"?>
<entity_onboarding_application_output>
<response_identifier>ID_response_1</response_identifier>
<status>APPROVED</status>
</entity_onboarding_application_output>

FIG. 5 shows non-limiting, example embodiments of a logic flow illustrating an entity compliance verification and onboarding (ECVO) component for the CCTM. In FIG. 5, an entity onboarding application request may be obtained at 501. For example, the entity onboarding application request may be obtained as a result of a request from an applicant associated with an entity (e.g., a merchant such as a pharmacy) to request entity onboarding with a participating processor (e.g., a payment processor such as Talus Pay). In various embodiments, the entity onboarding application request may be obtained directly from the applicant, via a prequalification service such as PayCompare, via a participating processor, and/or the like. See FIGS. 10A-D, 11A-D, 12A-D for exemplary user interface(s) that may be utilized by the applicant to request entity onboarding.

Entity assessment data associated with the entity onboarding application request may be determined at 505. For example, entity assessment data may include self-reported data provided by the applicant for the entity. In one embodiment, entity assessment data may be utilized to evaluate the entity's compliance (e.g., with federal and/or state government regulations, with industry standards, with payment processor rules). In one implementation, the entity onboarding application request may be parsed (e.g., using PHP commands) to determine the entity assessment data (e.g., based on the value of the entity_onboarding_application_request field). In some implementations, the entity assessment data may be provided via a datastructure similar to the following:

Entity Details:
t.datetime "created_at", precision: 6, null: false
t.datetime "updated_at", precision: 6, null: false
t.string "email", null: false
t.string "confirmation_token", limit: 128
t.string "operating_name"
t.string "legal_name"
t.string "registration_type"
t.string "tax_id_number"
t.string "website_url"
t.string "phone"
t.string "mailing_street"
t.string "mailing_street_secondary"
t.string "mailing_city"
t.string "mailing_state"
t.string "mailing_postal_code"
t.integer "mcc"
t.string "mailing_country"
t.string "auth_user_id"
t.integer "evaluation_score"
t.datetime "evaluation_date"
t.string "evaluation_reasons", default: [ ], array: true
t.integer "average_monthly_credit_sales"
t.integer "average_individual_sale"
t.integer "sales_swipe"
t.integer "sales_phone"
t.integer "sales_online"
t.integer "sales_keyed"
t.integer "highest_ticket_sales"
t.string "merchant_id"
t.string "business_type"
t.date "established_date"

Business Owner Details:
t.string "first_name"
t.string "last_name"
t.string "email"
t.string "mobile_phone"
t.date "dob"
t.string "ssn_redacted"
t.string "encrypted_ssn"
t.string "encrypted_ssn_iv"
t.bigint "business_application_id", null: false
t.datetime "created_at", precision: 6, null: false
t.datetime "updated_at", precision: 6, null: false
t.integer "ownership_percentage"
t.string "address_street"
t.string "address_city"
t.string "address_state"
t.string "address_postal_code"
t.string "address_street_secondary"
t.string "address_country"
t.string "encrypted_ssn_algo"
t.string "encrypted_ssn_key_path", default: [ ], array: true
t.string "business_title"
t.boolean "is_signer"

Account Information:
t.string "first_name"
t.string "last_name"
t.string "account_type"
t.string "account_ownership"
t.string "encrypted_routing_number"
t.string "encrypted_routing_number_iv"
t.string "encrypted_routing_number_algo"
t.string "encrypted_account_number"
t.string "encrypted_account_number_iv"
t.string "encrypted_account_number_algo"
t.string "encrypted_account_number_key_path", default: [ ], array: true
t.string "encrypted_routing_number_key_path", default: [ ], array: true
t.bigint "business_application_id", null: false The entity assessment data may be verified at 509. In one embodiment, the entity assessment data may be verified using attributes (e.g., business legal name, EIN) enumerated from the credit bureaus (e.g., Equifax, TransUnion, Experian) and/or other data sources (e.g., government agencies, data aggregators, Ethereum oracles via smart contracts, etc.). In one implementation, the entity assessment data may be verified via an assessment data verification request to a verification (e.g., Equifax) server. For example, the entity's business legal name and EIN may be verified. In some implementations, the entity assessment data may be verified via a variety of validation sources. For example, the following validation sources may be utilized:

| | Data Attribute | Data Type | Validation Source | Core Service | Risk Level |
|---|---|---|---|---|---|
| KYB | Corp Name | t.string | Clear | Application | Low |
| | DBA | t.string | Clear | Application | Low |
| | Status | t.enum | Clear | Application | Low |
| | SUB ISO (sales channel) | t.string | Clear | Application | Low |
| | Business Credit Reports | t.jsonb | Clear | Application | Medium |
| | Owner Credit Reports | t.jsonb | Clear | Application | High |
| | PCI Compliance | t.boolean | Payment Card Network | Verification | Low |
| | TIN Validation | t.boolean | Clear | Application | Low |
| | Business Description Type | t.string | Clear | Application | Low |
| | Site Survey | t.jsonb | Google Maps | Verification | Low |
| | Website | t.jsonb | G2 | Application | Low |
| | Phone Number | t.string | Clear | Application | Low |
| | Physical Business Address | t.jsonb | Clear | Application | Low |
| | Business Registration Type | t.string | Clear | Application | Low |
| | Date Established | t.date | Clear | Application | Low |
| KYC | Owner Location | t.jsonb | Clear | Application | Low |
| | Address Verification | t.jsonb | Clear | Verification | LOW |
| | Beneficial Ownership | t.jsonb | SoS DBs | Application | Low |
| | Gov Issued ID Verification | t.jsonb | ID.me | Application | Low |
| | MATCH check | t.jsonb | Mastercard | Verification | Low |
| | OFAC check | t.jsonb | Clear | Verification | LOW |
| | BSA/AML Check | t.jsonb | Clear | Verification | Low |
| | Owner Name | t.string | Clear | Application | Low |
| | Owner Title | t.string | Clear | Application | Low |
| | Ownership Percentage | t.integer | SoS and County DBs | Application | Low |
| | Owner Email | t.string | Clear | Application | Low |
| | Owner Phone Number | t.string | Clear | Application | Low |
| | SSN | t.jsonb | Clear | Application | LOW |
| | DOB | t.date | Clear | Application | Low |
| | Authorized Signer | t.jsonb | Bank, SoS, and County DBs | Application | Low |
| Transaction | MCC Match | t.integer | Clear | Verification | Low |
| | Type of Business | t.string | Enigma | Application | Low |
| | Sales Tactics | t.string | Processor Statements | Application | Low |
| | Average Monthly Credit Card Sales | t.integer | Enigma | Application | Low |
| | Average Ind Sales Amount | t.integer | Processor Statements | Application | Low |
| | Sales Method | t.integer | Processor Statements | Application | Low |
| Agreements & Docs | E Signature | t.jsonb | IronClad | Application | Low |
| | Business License | t.jsonb | SoS and County DBs | Application | Low |
| | Utility Bill | t.jsonb | https://authbridge.com/ | Application | Medium |
| | Sales Tax License | t.jsonb | IRS and SoS DBs | Application | Low |
| | Articles of Incorporation | t.jsonb | SoS and County DBS | Application | Low |
| | Other State Docs | t.jsonb | SoS DBS | Application | Medium |
| | Processing Statements | t.jsonb | Manual | Application | Medium |
| | Bank Statements | t.jsonb | Plaid | Application | High |
| Pricing | Google Earth/Maps | t.jsonb | Google Maps | Verification | Low |
| | Website Screenshot/Review | t.jsonb | G2 and Site Scraping | Verification | Low |
| | Negative News Search | t.jsonb | Clear (adverse media) | Verification | Low |

-continued

| Data Attribute | Data Type | Validation Source | Core Service | Risk Level |
|---|---|---|---|---|
| Bank Information | t.jsonb | Clear | Application | Low |
| Bank Letter/Voided Check | t.jsonb | GIACT | Application | Low |
| Processing Statements | t.jsonb | Manual | Application | Medium |
| Financial Projections | t.jsonb | Bank Statements | Application | Medium |
| Deposit Account | t.jsonb | Plaid | Application | Low |
| Dynamic Pricing | t.jsonb | Processor Statements | Application | Low |
| MSA (E Signature) | t.jsonb | IronClad or DocuSign | Application | Low |

In some implementations, each attribute may be scored with regard to the level of verification. For example, the following scores may be utilized:

- Pass—self reported data is verified from multiple sources
- Failed—self reported data cannot be verified
- Investigation—self reported data is verified from one source, but there are mis-matches that must be further investigated
- Missing—required data was not self-reported and verification is not possible; data required for verification could also be missing
- Strong Assurance—self reported data is verified across a threshold (e.g., 3+) number of sources (e.g., out of 31+ sources)

Common compliance evaluation criteria to use may be determined at 513. For example, a common compliance evaluation criterion may be whether the entity UBO matches business filings. In one embodiment, common compliance evaluation criteria may be used to evaluate any applying entity (e.g., using criteria applicable to entities of a certain type of business/sector/MCC). In one implementation, common compliance evaluation criteria may be dynamic rules that apply the dimensions and factors of compliance to facilitate a spot compliance assessment for a point in time and/or a trending or time-based assessment of compliance compatibility. For example, the common compliance evaluation criteria may be determined via a MySQL database command similar to the following:

```
SELECT complianceCriterionID, complianceCriterion-
    Dimension, complianceCriterionFactor
FROM ComplianceCriteria
WHERE isComplianceCriterionCommon IS TRUE AND
    isEntityComplianceEvaluationCriterion IS TRUE
    AND associatedMerchantBusinessType="Drug Stores
    and Pharmacies";
```

A determination may be made at 517 whether there remain participating processors to analyze. In one implementation, each of the participating processors that may be applicable for the entity may be analyzed. If there remain participating processors to analyze, the next participating processor may be selected for analysis at 521.

Processor-specific compliance evaluation criteria to use may be determined at 525. For example, a processor-specific compliance evaluation criterion may be whether the entity UBO was convicted of financial fraud. In one embodiment, processor-specific compliance evaluation criteria may be used to evaluate entities (e.g., using criteria applicable to entities of a certain type of business/sector/MCC) that may be applying for onboarding with the selected participating processor. In one implementation, processor-specific compliance evaluation criteria may be dynamic rules established by a payment processor/underwriter (e.g., the ISO/PayFAC/PSP/Sponsor Bank) that apply the dimensions and factors of compliance to facilitate a spot compliance assessment for a point in time and/or a trending or time-based assessment of compliance compatibility. For example, the processor-specific compliance evaluation criteria associated with the selected participating processor may be determined via a MySQL database command similar to the following:

```
SELECT complianceCriterionID, complianceCriterion-
    Dimension, complianceCriterionFactor
FROM ComplianceCriteria
WHERE isComplianceCriterionCommon IS FALSE
    AND
    associatedParticipatingProcessorID=ID_processor_
        TalusPay AND
    isEntityComplianceEvaluationCriterion IS TRUE
        AND
    associatedMerchantMCC=5912;
```

The entity assessment data may be evaluated using the determined compliance evaluation criteria (e.g., the common compliance evaluation criteria, the processor-specific compliance evaluation criteria) at 529. In one embodiment, each of the dimensions of compliance may be evaluated using the associated factors of compliance to generate a dimension compliance score for the respective dimension of compliance. For example, a dimension compliance score for a dimension of compliance may correspond to the percentage of factors of compliance associated with the dimension of compliance that pass verification checks. In another example, the dimension compliance score for the dimension of compliance may vary based on the level of compliance (e.g., pass vs. strong assurance, low/medium/high merchant risk level assessment calculation). In one implementation, factors of compliance may be evaluated using additional assessment data verification requests. In another implementation, factors of compliance may be evaluated using factor compliance calculators (e.g., merchant risk level assessment calculator). See FIGS. 7C-D for examples of merchant risk level assessment calculators. In some implementations, verification of attributes may be prioritized to optimize workflow and/or may be sequenced to optimize the checkers and/or to optimize for speed to decision. For example, Office of Foreign Assets Control (OFAC) checks may be performed first, as an entity that fails the OFAC checks is automatically denied onboarding and subsequent checks are unnecessary. See FIGS. 7A-B for additional examples of optimizations. In some implementations, the verification structures may be tailored to match the workflows using dynamic orders of operations.

An overall compliance score for the entity may be determined at 533. In one embodiment, the overall compliance score for the entity may be calculated as a weighted average of the individual dimension compliance scores for the entity. For example, dimension compliance scores may include entity score, owner(s) score, sector score (e.g., normalizing and comparing to other businesses in the same sector), transaction flows score, social media score (e.g., positive/adverse media), supply chain management track and trace score, financial score (e.g., augmentation and enhancement of the baseline credit score), forward delivery score, jurisdiction score, external data source scores, and/or the like. In one implementation, the overall compliance score may be determined for the entity. In another implementation, an overall compliance score for the entity may be determined for each of the analyzed participating processors. See FIGS. 8A-C for additional implementation details of a compliance score calculator.

A determination may be made at 537 whether to request additional entity assessment data. In one implementation, evaluation of the entity assessment data using the determined compliance evaluation criteria may identify issues or compliance concerns resulting in flagging of responses to invoke investigation and follow-on evaluation and/or triggering of intelligence to facilitate automated assessment of data and actions that are not within tolerances for compliance compatibility (e.g., the address provided is not a business but a government office, information provided is associated with a fraudulent or synthetic identity). As such, additional entity assessment data may be requested from the applicant.

If additional entity assessment data should be requested from the applicant, a determination may be made at 541 whether the additional entity assessment data was obtained. If the additional entity assessment data was obtained, the additional entity assessment data may be verified at 545. In one implementation, the additional entity assessment data may be verified as discussed with regard to 509. In another implementation, the additional entity assessment data may be evaluated using the determined compliance evaluation criteria as discussed with regard to 529. The overall compliance score for the entity may be recalculated based on the additional entity assessment data as discussed with regard to 533.

A matching participating processor for the entity may be determined at 549. In one embodiment, the matching participating processor for the entity may be determined as the participating processor best suited for the entity based on the entity's overall compliance score. In one implementation, a participating processor may be specified as the best suited participating processor for a range of overall compliance scores (e.g., participating processor 1 is best suited for entities with overall compliance score between 700 and 799, participating processor 2 is best suited for entities with overall compliance score between 800 and 899, etc.). As such, the matching participating processor for the entity may be determined as the best suited participating processor for the range corresponding to the entity's overall compliance score. In another implementation, pricing for the entity for each of the analyzed participating processors may be calculated based on the entity's overall compliance score (e.g., based on the overall compliance scores for the entity for each of the analyzed participating processors) and/or based on the evaluation of the entity assessment data. As such, the matching participating processor for the entity may be determined as the participating processor that provides the best pricing for the entity and/or the best referral fee for the CCTM. See FIG. 9 for additional implementation details of an entity pricing calculator.

An entity compliance datastructure for the entity may be generated at 553. For example, the entity compliance datastructure may include event data (e.g., information regarding the onboarding application), entity assessment data, verification and/or evaluation data, and/or the like. In one embodiment, the entity compliance datastructure may be utilized as a common data structure across payments and financial services ecosystem stakeholders (e.g., the ISO/PayFac/PSP/Acquirer Processor, the Sponsor Bank/Acquiring Bank, etc.) facilitating secure sharing of data while ensuring data integrity, completeness, and timeliness. In one implementation, the entity compliance datastructure as discussed with regard to the entity onboarding approval request 465 may be generated. See FIG. 7E for additional implementation details of secure sharing of data using compliance datastructures (e.g., entity compliance datastructures, transaction compliance datastructures).

The entity compliance datastructure for the entity may be cryptographically signed at 557. For example, the entity compliance datastructure for the entity may be cryptographically signed using a private key associated with the CCTM. In one embodiment, a scheme such as Public Key Cryptography Standards (PKCS) may be utilized to facilitate the use of cryptographic signatures. In one implementation, the entity compliance datastructure for the entity may be structured to provide proof of integrity and/or data origin at each step of the workflow by capturing data origins at the point of capture, signing the data package and then tracking providence and chain of custody for the use and modification of the data. In some implementations, the CCTV may be configured as a compliance certificate authority to facilitate verification of cryptographic signatures. See FIG. 7F for additional implementation details of verification of cryptographic signatures.

An entity onboarding approval may be provided to the matching participating processor at 561. In one embodiment, the entity onboarding approval may indicate that the CCTM recommends approval of the entity for onboarding with the matching participating processor and/or may include decision data (e.g., event data, entity assessment data, verification and/or evaluation data) utilized to reach the recommendation. In one implementation, the entity onboarding approval may be provided to the matching participating processor via an entity onboarding approval request and may include the entity compliance datastructure for the entity. See FIGS. 13A-E for exemplary user interface(s) that may be utilized (e.g., by a user associated with the CCTM, by a user associated with a participating processor) to facilitate entity approval (e.g., in cases where additional review is utilized).

A merchant identifier for the entity may be obtained from the matching participating processor at 565. For example, the merchant identifier may identify the entity in the system of the matching participating processor. In one implementation, an entity onboarding approval response (e.g., cryptographically signed by the matching participating processor) may be parsed (e.g., using PHP commands) to determine the merchant identifier for the entity (e.g., based on the value of the merchant_identifier field). In another implementation, the merchant identifier for the entity may be pre-generated by the CCTM (e.g., in accordance with the system of the matching participating processor, in accordance with rules of a merchant identifier generation protocol interoperable across payments and financial services ecosystem stakeholders) and an entity onboarding approval response (e.g., cryptographically signed by the matching participating processor) may be parsed (e.g., using PHP commands) to confirm that the entity was approved by the matching participating processor (e.g., based on the value of the approval_confirmation_status field), so that the merchant identifier for the entity may now be used.

The entity compliance datastructure for the entity may be augmented with the merchant identifier at 569. For example, the entity compliance datastructure for the entity may be augmented to include approval data from the matching participating processor. In one implementation, the entity compliance datastructure as discussed with regard to the entity compliance datastructure store request 473 may be generated.

The augmented entity compliance datastructure for the entity may be stored at 573. For example, the augmented entity compliance datastructure for the entity may be stored (e.g., via a MySQL database command) as an entity compliance file in the entity compliance files table 25191. In one implementation, the augmented entity compliance datastructure for the entity may be stored via an entity compliance datastructure store request. In some implementations, the augmented entity compliance datastructure for the entity may be cryptographically signed using a private key associated with the CCTM a second time to confirm that the augmentations have been approved by the CCTM.

FIGS. 6A-E show non-limiting, example embodiments of implementation case(s) for the CCTM. In FIGS. 6A-C, an exemplary implementation case of entity compliance verification and onboarding is illustrated. Business information regarding an applying entity is collected. Business UBO information is collected (e.g., including a government ID and/or a biometrics scan). Provided information is validated and the applying entity is onboarded.

In FIGS. 6D-E, an exemplary implementation case of entity compliance verification and onboarding is illustrated. Information regarding an applying entity is collected and evaluated. The applying entity may be approved, denied, or sent for additional review. An approved entity (e.g., automatically approved or approved after additional review) may select pricing and equipment and is onboarded.

FIGS. 7A-F show non-limiting, example embodiments of implementation case(s) for the CCTM. In FIGS. 7A-B, exemplary workflow sequences that optimize for speed to decision are illustrated. For example, EIN/TIN, business name, and business address checks may be performed first, as an entity that fails these checks is automatically denied onboarding and subsequent checks are unnecessary.

In FIGS. 7C-D, exemplary merchant risk level assessment calculators that facilitate low/medium/high merchant risk level assessment calculations are illustrated. These calculators evaluate a merchant's transactions (e.g., transaction volume, transaction size, transaction types) to calculate a merchant risk level assessment. In one implementation, decision thresholds may be set by the CCTM. In another implementation, decision thresholds may be set individually by each participating processor (e.g., underwriter). In some implementations, evaluation of entity assessment data may vary based on the determined merchant risk level assessment. For example, merchants may be classified as:

Qualified Low-Risk: businesses with sub-scale volume that do not introduce material risk into the payment system; the data and information can be verified and used for auto-approval Medium-Risk: businesses with material volume and potential risk which can be onboarded on a graduated basis using documentation, gamification of data collection, and automated matching and verification; if qualified as low risk will be auto decisioned; if not, the case is processed via additional review Inherently High-Risk: business is inherently risky given the jurisdiction, industry, transaction types or other risk factors; the information collected can be used to generate risk scorings to inform underwriting decisioning, but still utilizes additional review, approval, and/or ongoing monitoring In FIG. 7E, a diagram showing exemplary applicant tokenization is illustrated. In some implementations, the CCTM establishes a canonical architecture for the 'Applying Business' as well as the 'Merchant of Record'. This architecture enables the instantiation of a data store for the persistence of data provided by the applying business, data collected from verification of data provided by the business, augmented data used to inform decisioning and adjudication. A global unique ID is created for each applying business. This ID is used throughout the lifecycle of the business and can be used to identify the business regardless of the state of the decision processing from initial application, through decisioning, activation, ongoing monitoring, termination, and reactivation. The CCTM maintains the ID as a lifetime identifier for the business. Identifiers are also created for the business owners. Owners can be linked to any number of businesses. The mapping of the owners to the business can be updated given any changes in the ownership of the business structure. The data for the business and the business identifier are used to create point-in-time as well as trending views of the data the business will need to provide to apply for and onboard to any number of service providers. For example, the CCTM facilitates application and onboarding and activation processing for payment services, banking services, loan services, insurance services, health care services, transportation service as well as any other services the business would need to submit an application for.

In some implementations, the CCTM acts as a hub. The CCTM protocol facilitates the secure sharing of the data required for a business application across the parties involved in reviewing and approving the application. For example, a business applying for payment services will be reviewed and approved by many parties such as a Payment Services Provider, an Acquirer Processor, and a Sponsor Bank. A business applying for a loan will be reviewed by many parties such as a Sales Organization, Broker, and the Bank Loan Officer. The CCTM provides the common protocols and data structures enabling the secure sharing of the data required for the application, review, approval, and activation of services across the multiple parties involved in approving and provisioning the service for the business.

In some implementations, the CCTM is a hub that persists, maintains, updates, and/or monitors the standing of the business entity, the business owners, and/or their transactions. The data, records, profile, and score for the business are continuously updated. This is managed in the CCTM data structures and protocol. The data objects store the attributes and associated verified information for the Business and its associated owners and transactions. The protocol facilitates the sharing of that data. The business can then become a CCTM 'Verified Business'. This 'Verified Business' information and associated scores are then shared with any service provider that is registered to receive an application from the business or a service provider that already has that business as a customer and wants to monitor them. If a business that is applying to a service provider that is not registered, the business can send a request to the service provider to have them use the CCTM 'Verified Business' data and protocols to invoke and process the business' application for services.

In FIG. 7F, a diagram showing exemplary CCTM compliance cryptographic key exchange is illustrated. A compliance cryptographic key exchange may utilize a database of public keys of record signers to facilitate verification of cryptographic signatures on compliance records.

FIGS. 8A-C show non-limiting, example embodiments of implementation case(s) for the CCTM. In FIGS. 8A-C, exemplary implementation details of a compliance score calculator are illustrated. The compliance score calculator may be utilized to determine an overall compliance score for an entity. In one implementation, the compliance score calculator may have a maximum score (e.g., 1000) and individual dimension compliance scores for the entity may be calculated and weighted according to their weight to calculate the overall compliance score for the entity. For example, each individual dimension of compliance (e.g., data channel) may be active or passive, may be required or not required, may have a type (e.g., category, data/algorithmic, machine learning (ML), may have a value (e.g., from 0) to 1), may have a priority and/or layering, may have a weighting, may have a minimum and/or a maximum impact range, may have a minimum and/or a maximum score if not present (e.g., data is not available), and may have an overall data channel score (e.g., utilized during the calculation of the overall compliance score as the individual dimension compliance score).

FIG. 9 shows non-limiting, example embodiments of implementation case(s) for the CCTM. In FIG. 9, exemplary implementation details of an entity pricing calculator are illustrated. In one implementation, the entity pricing calculator may be utilized for (e.g., real-time) pricing calculation for an entity.

FIGS. 10A-D show non-limiting, example embodiments of screenshots illustrating user interface(s) of the CCTM. In FIGS. 10A-D, exemplary user interface(s) (e.g., for a website) that may be utilized by an applicant to request entity onboarding are illustrated. Screen 1001 shows a login screen. Auth0 email login may be triggered for opening and logging into the application when the applicant enters an email. Screen 1005 shows a know your business (KYB) screen section. Business information regarding an entity may be gathered. Screen 1010 shows another KYB screen section. Business physical and/or mailing addresses may be collected and verified via a USPS real-time address verification check. Screen 1015 shows a know your customer (KYC) screen. UBO information may be gathered and the application may verify that they have the authority to provide the information. Screen 1020 shows a transaction screen. Transaction information and/or additional information utilized for merchant risk level assessment and/or for pricing calculations may be gathered. Screen 1025 shows a verification screen. The applicant verifies that the information given is accurate and has a chance to review before moving forward. The CCTM analyzes the gathered information to assess merchant risk level. If the entity is classified as having a medium or high merchant risk level, processing statement may be gathered as shown in screen 1030 and/or bank statements may be gathered as shown in screen 1035. The CCTM calculates pricing dynamically using an entity pricing calculator. Dynamic pricing is displayed based on applicant input as shown in screen 1040. The applicant may be requested to enter banking information and to sign a master service agreement (MSA) to complete onboarding. Screen 1045 shows a completion screen. The applicant may be shown the completion screen upon completing the entity onboarding application.

The applicant's government ID and/or a biometrics scan data may be collected for enhanced verification of the applicant's identity. Screen 1050 shows collection of an image of the front of a government ID. Screen 1055 shows collection of an image of the back of a government ID. Screen 1060 shows collection of a face scan of the user's face. It is to be understood that such data may be similarly collected from other users such as employees, carriers, customers, and/or the like. This information may be utilized in subsequent interactions (e.g., purchase transactions) with a user for a faster, more efficient, and/or more secure verification of the user's identity.

FIGS. 11A-D show non-limiting, example embodiments of screenshots illustrating user interface(s) of the CCTM. In FIGS. 11A-D, exemplary user interface(s) (e.g., for a mobile device) that may be utilized by an applicant to request entity onboarding are illustrated. Screens 1101-1155 show completion of an entity onboarding application by an applicant. Screen 1160 shows that an entity was given an overall compliance score of 726 and shows matching participating processors for the entity and their pricing (e.g., for processing a purchase transaction). Screens 1165-1190 shown that the applicant may be prompted to provide additional entity assessment data to obtain a higher overall compliance score. Screen 1195 shows that the entity was given a recalculated overall compliance score of 815 based on the provided information (e.g., pricing may also be recalculated).

FIGS. 12A-D show non-limiting, example embodiments of screenshots illustrating user interface(s) of the CCTM. In FIGS. 12A-D, alternative exemplary user interface(s) (e.g., for a mobile device) that may be utilized by an applicant to request entity onboarding are illustrated.

FIGS. 13A-E show non-limiting, example embodiments of screenshots illustrating user interface(s) of the CCTM. In FIGS. 13A-E, exemplary user interface(s) (e.g., for a website) that may be utilized (e.g., by a user associated with the CCTM, by a user associated with a participating processor) to facilitate entity approval (e.g., in cases where additional review is utilized) are illustrated. FIG. 13A shows an underwriting manager view. The business onboarding dashboard provides an overview of cases and underwriting workflow. The summary overview organizes workflow data by approval state and risk levels. The case list provides a snapshot of pending cases. A manager can select specific cases to work on or investigate.

FIG. 13B shows an underwriting agent list view. Optimization of the underwriting agent's workflow enables them to focus on higher risk cases and exceptions. Agents can add accounts to their personal watch list to facilitate ongoing case management and monitoring. Custom alerts may be created facilitating ongoing and seamless oversight of selected accounts.

FIG. 13C shows an underwriting agent gallery view. Customization of the underwriting agent's workflow view facilitates viewing cases in list or gallery view. Case exceptions and missing requirements are summarized to facilitate efficient review.

FIG. 13D shows a case handling view. Business information is organized to facilitate rapid review and adjudication of cases flagged for additional review. Data used for screens and scoring can be accessed and is available for downstream audit review. Information provided by the business and bureaus is augmented with social media sentiment analysis and data mining. An overall compliance score provides AI-driven risk assessment and ongoing monitoring.

FIG. 13D shows a participating processor audit portal view. An auditor associated with the participating processor may review information regarding an entity provided by the CCTM (e.g., via an entity compliance datastructure), such as a merchant risk level assessment, an overall compliance score, decision data, and/or the like, and may decide whether to approve or to decline the entity's application.

FIG. 14 shows non-limiting, example embodiments of a datagraph illustrating data flow(s) for the CCTM. In FIG. 14, dashed lines indicate data flow elements that may be more likely to be optional. In FIG. 14, an entity compliance monitoring (ECM) component 1421 may monitor an entity (e.g., a merchant) and may periodically (e.g., daily, weekly, monthly, quarterly, annually) execute compliance reviews of the entity. See FIG. 15 for additional details regarding the ECM component.

A CCTM server 1406 (e.g., executing the ECM component) may send a compliance monitoring criteria request 1425 to a repository 1410 to determine compliance monitoring criteria to utilize for the entity (e.g., common criteria, processor-specific criteria). In one implementation, the compliance monitoring criteria request may include data such as a request identifier, a criteria type, an account number, an entity identifier, a compliance review periodicity, type of business/sector/MCC, a processor identifier, and/or the like. In one embodiment, the CCTM server may provide the following example compliance monitoring criteria request, substantially in the form of a HTTP(S) POST message including XML-formatted data, as provided below:

```
POST/compliance_monitoring_criteria_request.php
  HTTP/1.1
Host: www.server.com
Content-Type: Application/XML
Content-Length: 667
<? XML version="1.0" encoding="UTF-8"?>
<compliance_monitoring_criteria_request>
  <request_identifier>ID_request_11</request_identi-
    fier>
  <criteria_type>ENTITY_MONITORING</criteria_
    type>
  <account_number>ID_account_1</account_number>
  <merchant_identifier>ID_merchant_identifier_1</
    merchant_identifier>
  <compliance_review_periodicity>QUARTERLY</
    compliance_review_periodicity>
  <type_of_business>Drug Stores and Pharmacies</ty-
    pe_of_business>
  <MCC>5912</MCC>
  <processor_identifier>ID_processor_TalusPay</pro-
    cessor_identifier>
</compliance_monitoring_criteria_request>
```

The repository 1410 may send a compliance monitoring criteria response 1429 to the CCTM server 1406 with the requested compliance monitoring criteria to utilize for the entity. In one implementation, the compliance monitoring criteria response may include data such as a response identifier, the requested compliance monitoring criteria, and/or the like. In one embodiment, the repository may provide the following example compliance monitoring criteria response, substantially in the form of a HTTP(S) POST message including XML-formatted data, as provided below:

```
POST /compliance_monitoring_criteria_response.php HTTP/1.1
Host: www.server.com
Content-Type: Application/XML
Content-Length: 667
<?XML version = "1.0" encoding = "UTF-8"?>
<compliance_monitoring_criteria_response>
  <response_identifier>ID_response_11</response_identifier>
  <compliance_monitoring_criterion>
    <criterion_dimension>Entity Compliance</criterion_dimension>
    <criterion_factor>Entity license expired?</criterion_factor>
    <criterion_type>COMMON</criterion_type>
  </compliance_monitoring_criterion>
  ...
  <compliance_monitoring_criterion>
    <criterion_dimension>UBO Compliance</criterion_dimension>
    <criterion_factor>UBO changed?</criterion_factor>
    <criterion_type>COMMON</criterion_type>
  </compliance_monitoring_criterion>
  <compliance_monitoring_criterion>
    <criterion_dimension>UBO Compliance</criterion_dimension>
    <criterion_factor>Owner convicted of financial fraud?</criterion_factor>
    <criterion_type>PROCESSOR_SPECIFIC</criterion_type>
  </compliance_monitoring_criterion>
  ...
  <compliance_monitoring_criterion>
    <criterion_dimension>Transaction Flow Compliance</criterion_dimension>
    <criterion_factor>Transactions compliant?</criterion_factor>
    <criterion_type>COMMON</criterion_type>
  </compliance_monitoring_criterion>
  ...
</compliance_monitoring_criteria_response>
```

The CCTM server 1406 may send a compliance datastructures retrieve request 1433 to the repository 1410 to retrieve previously stored compliance datastructures (e.g., entity compliance datastructures, transaction compliance datastructures) associated with the entity. In one implementation, the compliance datastructures retrieve request may include data such as a request identifier, an account number, an entity identifier, a range, and/or the like. In one embodiment, the CCTM server may provide the following example compliance datastructures retrieve request, substantially in the form of a HTTP(S) POST message including XML-formatted data, as provided below:

```
POST/compliance_datastructures_retrieve_request.php
  HTTP/1.1
Host: www.server.com
Content-Type: Application/XML
Content-Length: 667
<? XML version="1.0" encoding="UTF-8"?>
<compliance_datastructures_retrieve_request>
  <request_identifier>ID_request_12</request_identi-
    fier>
  <account_number>ID_account_1</account_number>
  <merchant_identifier>ID_merchant_identifier_1</
    merchant_identifier>
  <entity_compliance_datastructures_range>
  entity compliance datastructures created during the last
    year
  </entity_compliance_datastructures_range>
  <transaction_compliance_datastructures_range>
  transaction compliance datastructures created during
    the last quarter
  </transaction_compliance_datastructures_range>
</compliance_datastructures_retrieve_request>
```

The repository 1410 may send a compliance datastructures retrieve response 1437 to the CCTM server 1406 with the requested compliance datastructures. In one implementation, the compliance datastructures retrieve response may include data such as a response identifier, the requested compliance datastructures, and/or the like. In one embodiment, the repository may provide the following example compliance datastructures retrieve response, substantially in the form of a HTTP(S) POST message including XML-formatted data, as provided below:

```
POST/compliance_datastructures_retrieve_response.php HTTP/1.1
Host: www.server.com
Content-Type: Application/XML
Content-Length: 667
<?XML version = "1.0" encoding = "UTF-8"?>
<compliance_datastructures_retrieve_response>
  <response_identifier>ID_response_12</response_identifier>
  <entity_compliance_datastructure>
    <ECD_identifier>ID_entity_compliance_datastructure_1</ECD_identifier>
    <event_data>
      <account_number>ID_account_1</account_number>
      <event_type>ONBOARDING_APPLICATION</event_type>
      <event_date_time>1/1/2023</event_date_time>
      ...
      <overall_compliance_score>815</overall_compliance_score>
      <cryptographic_signature>Signature of the CCTM</cryptographic_signature>
    </event_data>
    <assessment_data>
    ...
    </assessment_data>
    <verification_data>
    ...
    </verification_data>
    <participating_processor_approval_data>
    ...
    </participating_processor_approval_data>
  </entity_compliance_datastructure>
  <entity_compliance_datastructure>
    <ECD_identifier>ID_entity_compliance_datastructure_2</ECD_identifier>
    <event_data>
      <account_number>ID_account_1</account_number>
      <merchant_identifier>ID_merchant_identifier_1</merchant_identifier>
      <event_type>QUARTERLY_REVIEW</event_type>
      <event_date_time>4/1/2023</event_date_time>
      ...
      <overall_compliance_score>830</overall_compliance_score>
      <cryptographic_signature>Signature of the CCTM</cryptographic_signature>
    </event_data>
    <assessment_data>
    ...
    </assessment_data>
    <verification_data>
    ...
    </verification_data>
    <participating_processor_confirmation_data>
    ...
    </participating_processor_confirmation_data>
  </entity_compliance_datastructure>
  ...
  <transaction_compliance_datastructure>
    <TCD_identifier>ID_transaction_compliance_datastructure_1</TCD_identifier>
    <event_data>
      <account_number>ID_account_1</account_number>
```

-continued

```
        <merchant_identifier>ID_merchant_identifier_1</merchant_identifier>
        <event_type>PURCHASE_TRANSACTION</event_type>
        <event_date_time>4/15/2023</event_date_time>
        ...
        <overall_compliance_score>850</overall_compliance_score>
        <cryptographic_signature>Signature of the CCTM</cryptographic_signature>
      </event_data>
      <product_order_initiation_data>
      ...
      </product_order_initiation_data>
      <product_order_handling_data>
      ...
      </product_order_handling_data>
      <product_order_delivery_data>
      ...
      </product_order_delivery_data>
      <product_order_receipt_data>
      ...
      </product_order_receipt_data>
    </transaction_compliance_datastructure>
    ...
</compliance_datastructures_retrieve_response>
```

The CCTM server 1406 may send an assessment data request 1441 to a client 1402 (e.g., of a user associated with the entity) to request assessment data from the user. In one implementation, the assessment data request may include data such as a request identifier, specification of assessment data requested, and/or the like. In one embodiment, the CCTM server may provide the following example assessment data request, substantially in the form of a HTTP(S) POST message including XML-formatted data, as provided below:

```
POST /assessment_data_request.php HTTP/1.1
Host: www.server.com
Content-Type: Application/XML
Content-Length: 667
<?XML version = "1.0" encoding = "UTF-8"?>
<assessment_data_request>
  <request_identifier>ID_request_13</request_identifier>
  <assessment_data_requested>
    <data_requested>Updated entity license information</data_requested>
    <data_requested>Updated entity UBO information</data_requested>
  </assessment_data_requested>
</assessment_data_request>
```

The client 1402 may send an assessment data response 1445 to the CCTM server 1406 to provide the requested assessment data supplied by the user. For example, the client may be a desktop, a laptop, a tablet, a smartphone, a smartwatch, and/or the like that is executing a client application. In one implementation, the assessment data response may include data such as a response identifier, the provided assessment data, and/or the like. In one embodiment, the client may provide the following example assessment data response, substantially in the form of a HTTP(S) POST message including XML-formatted data, as provided below:

```
POST/assessment_data_response.php HTTP/1.1
Host: www.server.com
Content-Type: Application/XML
Content-Length: 667
<? XML version="1.0" encoding="UTF-8"?>
<assessment_data_response>
  <response_identifier>ID_response_13</response_
    identifier>
  <entity_license>updated_pharmacy_license.pdf</enti-
    ty_license>
  <UBO_name>John Smith</UBO_name>
  <UBO_SSN>XXX-XX-XXXX</UBO_SSN>
  <UBO_name>Jane Doe</UBO_name>
  <UBO_SSN>YYY-YY-YYYY</UBO_SSN>
  . . .
</assessment_data_response>
```

The CCTM server 1406 may send an assessment data verification request 1449 to a verification server 1408 to verify assessment data provided by the user. In one implementation, the assessment data verification request may include data such as a request identifier, specification of assessment data to verify, and/or the like. In one embodiment, the CCTM server may provide the following example assessment data verification request, substantially in the form of a HTTP(S) POST message including XML-formatted data, as provided below:

```
POST /assessment_data_verification_request.php HTTP/1.1
Host: www.server.com
Content-Type: Application/XML
Content-Length: 667
<?XML version = "1.0" encoding = "UTF-8"?>
<assessment_data_verification_request>
  <request_identifier>ID_request_14</request_identifier>
  <verification_section>
    <section_identifier>ID_section_1</section_identifier>
    <section_query>Entity license expired?</section_query>
    <section_assessment_data>
      <entity_license>updated_pharmacy_license.pdf</entity_license>
    </section_assessment_data>
  </verification_section>
  ...
  <verification_section>
    <section_identifier>ID_section_5</section_identifier>
    <section_query>Owner name matches owner SSN?</section_query>
    <section_assessment_data>
      <UBO_name>John Smith</UBO_name>
      <UBO_SSN>XXX-XX-XXXX</UBO_SSN>
      <UBO_name>Jane Doe</UBO_name>
      <UBO_SSN>YYY-YY-YYYY</UBO_SSN>
    </section_assessment_data>
  </verification_section>
  ...
</assessment_data_verification_request>
```

The verification server 1408 may send an assessment data verification response 1453 to the CCTM server 1406 with the requested assessment data verification. In one implementation, the assessment data verification response may include data such as a response identifier, the requested assessment data verification, and/or the like. In one embodiment, the verification server may provide the following example assessment data verification response, substantially in the form of a HTTP(S) POST message including XML-formatted data, as provided below:

```
POST /assessment_data_verification_response.php HTTP/1.1
Host: www.server.com
Content-Type: Application/XML
Content-Length: 667
<?XML version = "1.0" encoding = "UTF-8"?>
<assessment_data_verification_response>
  <response_identifier>ID_response_14</response_identifier>
  <verification_section>
    <section_identifier>ID_section_1</section_identifier>
    <status>VERIFIED</status>
  </verification_section>
  ...
  <verification_section>
    <section_identifier>ID_section_5</section_identifier>
```

-continued

```
    <status>VERIFIED</status>
  </verification_section>
  ...
</assessment_data_verification_response>
```

The CCTM server 1406 may send an entity compliance monitoring status request 1457 to a participating processor server 1404 to provide the participating processor associated with the entity with the CCTM's evaluation of whether the entity passed the compliance review. In one implementation, the entity compliance monitoring status request may include data such as a request identifier, an entity compliance datastructure, and/or the like. In one embodiment, the CCTM server may provide the following example entity compliance monitoring status request, substantially in the form of a HTTP(S) POST message including XML-formatted data, as provided below.

```
POST /entity_compliance_monitoring_status_request.php HTTP/1.1
Host: www.server.com
Content-Type: Application/XML
Content-Length: 667
<?XML version = "1.0" encoding = "UTF-8"?>
<entity_compliance_monitoring_status_request>
  <request_identifier>ID_request_15</request_identifier>
  <entity_compliance_datastructure>
    <ECD_identifier>ID_entity_compliance_datastructure_3</ECD_identifier>
    <event_data>
      <account_number>ID_account_1</account_number>
      <merchant_identifier>ID_merchant_identifier_1</merchant_identifier>
      <event_type>QUARTERLY_REVIEW</event_type>
      <event_date_time>7/1/2023</event_date_time>
      <review_status>PASSED</review_status>
      <overall_compliance_score>840</overall_compliance_score>
      <cryptographic_signature>Signature of the CCTM</cryptographic_signature>
    </event_data>
    <assessment_data>
      <entity_license>updated_pharmacy_license.pdf</entity_license>
      <UBO_name>John Smith</UBO_name>
      <UBO_SSN>XXX-XX-XXXX</UBO_SSN>
      <UBO_name>Jane Doe</UBO_name>
      <UBO_SSN>YYY-YY-YYYY</UBO_SSN>
      ...
    </assessment_data>
    <verification_data>
      <verification_section>
        <section_identifier>ID_section_1</section_identifier>
        <section_query>Entity license expired?</section_query>
        <verification_status>PASS</verification_status>
      </verification_section>
      ...
      <verification_section>
        <section_identifier>ID_section_5</section_identifier>
        <section_query>Owner name matches owner SSN?</section_query>
        <verification_status>PASS</verification_status>
      </verification_section>
      ...
    </verification_data>
  </entity_compliance_datastructure>
</entity_compliance_monitoring_status_request>
```

The participating processor server 1404 may send an entity compliance monitoring status response 1461 to the CCTM server 1406 with the participating processor's confirmation data. In one implementation, the entity compliance monitoring status response may include data such as a response identifier, participating processor confirmation data, and/or the like. In one embodiment, the participating processor server may provide the following example entity compliance monitoring status response, substantially in the form of a HTTP(S) POST message including XML-formatted data, as provided below:

```
POST /entity_compliance_monitoring_status_response.php HTTP/1.1
Host: www.server.com
Content-Type: Application/XML
Content-Length: 667
<?XML version = "1.0" encoding = "UTF-8"?>
<entity_compliance_monitoring_status_response>
  <response_identifier>ID_response_15</response_identifier>
  <participating_processor_confirmation_data>
    <account_number>ID_account_1</account_number>
    <merchant_identifier>ID_merchant_identifier_1</merchant_identifier>
    <review_confirmation_status>CONFIRMED</review_confirmation_status>
    <confirmation_date_time>7/1/2023</confirmation_date_time>
    <cryptographic_signature>
      Signature of the participating processor
    </cryptographic_signature>
  </participating_processor_confirmation_data>
</entity_compliance_monitoring_status_response>
```

The CCTM server 1406 may send an entity compliance datastructure store request 1465 to the repository 1410 to store an entity compliance datastructure for the event (e.g., periodic compliance review) for the entity. In one implementation, the entity compliance datastructure store request may include data such as a request identifier, an entity compliance datastructure, and/or the like. In one embodiment, the CCTM server may provide the following example entity compliance datastructure store request, substantially in the form of a HTTP(S) POST message including XML-formatted data, as provided below:

```
POST /entity_compliance_datastructure_store_request.php HTTP/1.1
Host: www.server.com
Content-Type: Application/XML
Content-Length: 667
<?XML version = "1.0" encoding = "UTF-8"?>
<entity_compliance_datastructure_store_request>
  <request_identifier>ID_request_16</request_identifier>
  <entity_compliance_datastructure>
    <ECD_identifier>ID_entity_compliance_datastructure_3</ECD_identifier>
    <event_data>
      <account_number>ID_account_1</account_number>
      <merchant_identifier>ID_merchant_identifier_1</merchant_identifier>
      <event_type>QUARTERLY_REVIEW</event_type>
      <event_date_time>7/1/2023</event_date_time>
      <review_status>PASSED</review_status>
      <overall_compliance_score>840</overall_compliance_score>
      <cryptographic_signature>Signature of the CCTM</cryptographic_signature>
    </event_data>
    <assessment_data>
      <entity_license>updated_pharmacy_license.pdf</entity_license>
      <UBO_name>John Smith</UBO_name>
      <UBO_SSN>XXX-XX-XXXX</UBO_SSN>
      <UBO_name>Jane Doe</UBO_name>
      <UBO_SSN>YYY-YY-YYYY</UBO_SSN>
      ...
    </assessment_data>
    <verification_data>
      <verification_section>
        <section_identifier>ID_section_1</section_identifier>
        <section_query>Entity license expired?</section_query>
        <verification_status>PASS</verification_status>
      </verification_section>
```

-continued

...
<verification_section>
<section_identifier>ID_section_5</section_identifier>
<section_query>Owner name matches owner SSN?</section_query>
<verification_status>PASS</verification_status>
</verification_section>
...
</verification_data>
<participating_processor_confirmation_data>
<account_number>ID_account_1</account_number>
<merchant_identifier>ID_merchant_identifier_1</merchant_identifier>
<review_confirmation_status>CONFIRMED</review_confirmation_status>
<confirmation_date_time>7/1/2023</confirmation_date_time>
<cryptographic_signature>
Signature of the participating processor
</cryptographic_signature>
</participating_processor_confirmation_data>
</entity_compliance_datastructure>
</entity_compliance_datastructure_store_request>

The repository 1410 may send an entity compliance datastructure store response 1469 to the CCTM server 1406 to inform the CCTM server whether the entity compliance datastructure for the event (e.g., periodic compliance review) for the entity was stored successfully. In one implementation, the entity compliance datastructure store response may include data such as a response identifier, a status, and/or the like. In one embodiment, the repository may provide the following example entity compliance datastructure store response, substantially in the form of a HTTP(S) POST message including XML-formatted data, as provided below:

POST/entity_compliance_datastructure_store_response.php HTTP/1.1
Host: www.server.com
Content-Type: Application/XML
Content-Length: 667
<? XML version="1.0" encoding="UTF-8"?>
<entity_compliance_datastructure_store_response>
<response_identifier>ID_response_16</response_identifier>
<status>OK</status>
</entity_compliance_datastructure_store_response>

FIG. 15 shows non-limiting, example embodiments of a logic flow illustrating an entity compliance monitoring (ECM) component for the CCTM. In FIG. 15, an entity compliance monitoring request may be obtained at 1501. For example, the entity compliance monitoring request may be obtained as a result of a CCTM configuration setting that flags an entity (e.g., based on the entity's type of business/sector/MCC) for periodic (e.g., daily, weekly, monthly, quarterly, annually) compliance review after the entity has been onboarded.

A determination may be made at 1505 whether it is time for a compliance review. In one implementation, the entity compliance monitoring request may specify a starting time and/or a periodicity of compliance reviews for the entity, which may be utilized to make this determination. If it is not yet time for a compliance review, the CCTM may wait at 1509.

If it is time for a compliance review, compliance monitoring criteria for the entity may be determined at 1513. For example, compliance monitoring criteria (e.g., applicable to entities of a certain type of business/sector/MCC) may include common compliance monitoring criteria and/or processor-specific compliance monitoring criteria. In one embodiment, common compliance monitoring criteria may be used to evaluate any entity, while processor-specific compliance monitoring criteria may be used to evaluate entities onboarded with a specific participating processor. In one implementation, compliance monitoring criteria may be dynamic rules that apply the dimensions and factors of compliance to facilitate a spot compliance assessment for a point in time and/or a trending or time-based assessment of compliance compatibility. For example, the common compliance monitoring criteria for the entity may be determined via a MySQL database command similar to the following:

```
SELECT complianceCriterionID, complianceCriterionDimension, complianceCriterionFactor
FROM ComplianceCriteria
WHERE isComplianceCriterionCommon IS TRUE AND
    isEntityComplianceMonitoringCriterion IS TRUE AND
    associatedMerchantBusinessType="Drug Stores and Pharmacies";
```

For example, the processor-specific compliance monitoring criteria for the entity associated with the participating processor of the entity may be determined via a MySQL database command similar to the following:

```
SELECT complianceCriterionID, complianceCriterionDimension, complianceCriterionFactor
FROM ComplianceCriteria
WHERE isComplianceCriterionCommon IS FALSE AND
    associatedParticipatingProcessorID=ID_processor_TalusPay AND
    isEntityComplianceMonitoringCriterion IS TRUE AND
    associatedMerchantMCC=5912;
```

A range of previous compliance datastructures to use may be determined at 1517. In one embodiment, previous compliance datastructures may include entity compliance datastructures, transaction compliance datastructures, and/or the like associated with the entity. In one implementation, a range (e.g., a date range, a quantity) associated with a set of previous compliance datastructures may be specified for the entity via a CCTM configuration setting (e.g., based on the entity's type of business/sector/MCC). For example, a range for entity compliance datastructures may specify that entity compliance datastructures created during the last year should be used. In another example, a range for transaction compliance datastructures may specify that transaction compliance datastructures created during the last quarter should be used. It is to be understood that different ranges may be specified for different sets of compliance datastructures.

Previous compliance datastructures for the entity matching the determined range(s) may be retrieved at 1521. In one embodiment, previous compliance datastructures may be used to facilitate calculation of a value of an overall compliance score for the entity and/or to facilitate calculation of a directionality (e.g., indicating increasing or decreasing compliance compatibility over a specific time period) of an overall compliance score for the entity. For example, the previous entity compliance datastructures for the entity may be retrieved via a MySQL database command similar to the following:

```
SELECT *
FROM EntityComplianceFiles
WHERE associatedEntityID=ID_account_1 AND
  associatedMerchantID=ID_merchant_identifier_1
    AND
  entityComplianceFileDateTime BETWEEN 'range
    start' AND 'range end'; a13395
```

For example, the previous transaction compliance datastructures for the entity may be retrieved via a MySQL database command similar to the following:

```
SELECT *
FROM TransactionComplianceFiles
WHERE associatedEntityID=ID_account_1 AND
  associatedMerchantID=ID_merchant_identifier_1
    AND
  transactionComplianceFileDateTime BETWEEN
    'range start' AND 'range end';
```

Cryptographic signatures of the previous compliance datastructures for the entity may be verified at 1525. In one embodiment, verifying the cryptographic signatures of the previous compliance datastructures may prevent data tampering by ensuring data integrity, and/or may facilitate data auditing by verifying data providence. In one implementation, a public key of each signer (e.g., a public key associated with the CCTM, a public key associated with the participating processor of the entity) associated with a compliance datastructure may be used to verify the respective signer's cryptographic signature. See FIG. 7F for additional implementation details of verification of cryptographic signatures.

The entity may be evaluated using the determined compliance monitoring criteria at 1529. In one embodiment, each of the dimensions of compliance may be evaluated using the associated factors of compliance to generate a dimension compliance score for the respective dimension of compliance. For example, a dimension compliance score for a dimension of compliance may correspond to the percentage of factors of compliance associated with the dimension of compliance that pass verification checks. In another example, the dimension compliance score for the dimension of compliance may vary based on the level of compliance (e.g., pass vs. strong assurance, low/medium/high merchant risk level assessment calculation, overall compliance scores associated with the previous entity compliance datastructures for the entity). In another example, the dimension compliance score for the dimension of compliance may vary based on the directionality of compliance compatibility (e.g., whether the compliance compatibility is increasing or diminishing over time based on the data from the previous compliance datastructures for the entity). In one implementation, factors of compliance may be evaluated using assessment data verification requests. In another implementation, factors of compliance may be evaluated using factor compliance calculators (e.g., merchant risk level assessment calculator). See FIGS. 7C-D) for examples of merchant risk level assessment calculators. In another implementation, factors of compliance may be evaluated using directionality of compliance compatibility calculators (e.g., evaluation of a multidimensional vector of facets (e.g., compliance scores over time, time since entity creation, entity funding, entity industry, entity category, entity size, entity type, whether the entity has a compliance officer, etc.) to determine the probability that the entity will stay in compliance compatibility during a specified time period (e.g., the next quarter, the duration of the services agreement or contract with the entity)). In some implementations, verification of attributes may be prioritized to optimize workflow and/or may be sequenced to optimize the checkers and/or to optimize for review speed. See FIGS. 7A-B for additional examples of optimizations. In some implementations, the verification structures may be tailored to match the workflows using dynamic orders of operations.

An overall compliance score for the entity may be determined at 1533. In one embodiment, the overall compliance score for the entity may be calculated as a weighted average of the individual dimension compliance scores for the entity. For example, dimension compliance scores may include entity score, owner(s) score, sector score (e.g., normalizing and comparing to other businesses in the same sector), transaction flows score, social media score (e.g., positive/adverse media), supply chain management track and trace score, financial score (e.g., augmentation and enhancement of the baseline credit score), forward delivery score, jurisdiction score, external data source scores, and/or the like. In one implementation, the overall compliance score may be a spot score (e.g., that includes a value of the overall compliance score). In another implementation, the overall compliance score for the entity may be a trending score (e.g., that includes a value and/or a directionality of the overall compliance score). For example, the directionality may be implemented as a spectrograph with the dimensions and/or factors of compliance plotted on the spectrum with an arrow indicating direction (e.g., increasing or decreasing compliance compatibility over a specified time period). See FIGS. 8A-C for additional implementation details of a compliance score calculator.

A determination may be made at 1537 whether to request updated entity assessment data. In one implementation, evaluation of the entity assessment data using the determined compliance monitoring criteria may identify issues or compliance concerns resulting in flagging of responses to invoke investigation and follow-on evaluation and/or triggering of intelligence to facilitate automated assessment of data and actions that are not within tolerances for compliance compatibility (e.g., a license expiration date is approaching necessitating acquisition of an updated license by the entity). As such, updated entity assessment data may be requested (e.g., a copy of the updated pharmaceutical license). In another implementation, periodic updates of specific assessment data may be requested (e.g., annual updates of entity UBO information).

If updated entity assessment data should be requested from the entity, a determination may be made at 1541 whether the updated assessment data was obtained. If the updated entity assessment data was obtained, the updated entity assessment data may be verified at 1545. In one implementation, the updated entity assessment data may be verified (e.g., using attributes and/or other data sources) via an assessment data verification request to a verification (e.g., Equifax) server. For example, the entity's updated UBO information may be verified (e.g., to ensure that UBO name and UBO SSN match). In some implementations, each attribute may be scored with regard to the level of verification. For example, the following scores may be utilized:

- Pass—self reported data is verified from multiple sources
- Failed—self reported data cannot be verified
- Investigation—self reported data is verified from one source, but there are mis-matches that must be further investigated
- Missing—required data was not self-reported and verification is not possible; data required for verification could also be missing
- Strong Assurance—self reported data is verified across a threshold (e.g., 3+) number of sources (e.g., out of 31+ sources)

In another implementation, the updated entity assessment data may be evaluated using the determined compliance monitoring criteria as discussed with regard to 1529. The overall compliance score for the entity may be recalculated based on the updated entity assessment data as discussed with regard to 1533.

An entity compliance datastructure for the entity may be generated at 1549. For example, the entity compliance datastructure may include event data (e.g., information regarding the periodic review), entity assessment data, verification and/or evaluation data, and/or the like. In one embodiment, the entity compliance datastructure may be utilized as a common data structure across payments and financial services ecosystem stakeholders (e.g., the ISO/PayFac/PSP/Acquirer Processor, the Sponsor Bank/Acquiring Bank, etc.) facilitating secure sharing of data while ensuring data integrity, completeness, and timeliness. In one implementation, the entity compliance datastructure as discussed with regard to the entity compliance monitoring status request 1457 may be generated. See FIG. 7E for additional implementation details of secure sharing of data using compliance datastructures (e.g., entity compliance datastructures, transaction compliance datastructures).

The entity compliance datastructure for the entity may be cryptographically signed at 1553. For example, the entity compliance datastructure for the entity may be cryptographically signed using a private key associated with the CCTM. In one embodiment, a scheme such as Public Key Cryptography Standards (PKCS) may be utilized to facilitate the use of cryptographic signatures. In one implementation, the entity compliance datastructure for the entity may be structured to provide proof of integrity and/or data origin at each step of the workflow by capturing data origins at the point of capture, signing the data package and then tracking providence and chain of custody for the use and modification of the data. In some implementations, the CCTM may be configured as a compliance certificate authority to facilitate verification of cryptographic signatures.

An entity compliance monitoring status may be provided to the participating processor associated with the entity at 1557. In one embodiment, the entity compliance monitoring status may indicate whether the entity passed the CCTM's periodic review and/or may include decision data (e.g., event data, entity assessment data, verification and/or evaluation data) utilized to reach the decision. In one implementation, the entity compliance monitoring status may be provided to the participating processor via an entity compliance monitoring status request and may include the entity compliance datastructure for the entity.

The entity compliance datastructure for the entity may be stored at 1561. For example, the (e.g., augmented) entity compliance datastructure for the entity may be stored (e.g., via a MySQL database command) as an entity compliance file in the entity compliance files table 25191. In one implementation, the entity compliance datastructure for the entity may be stored via an entity compliance datastructure store request. In some implementations, the entity compliance datastructure for the entity may be augmented and/or may be cryptographically signed using a private key associated with the CCTM a second time to confirm that the augmentations (e.g., confirmation that the participating processor approved results of the periodic review) have been approved by the CCTM.

A determination may be made at 1565 whether the entity passed the compliance review. If the entity failed the compliance review, a suspend flag for the entity may be set at 1569. In one embodiment, a set suspend flag may indicate that the entity's association with the participating processor should be reevaluated due to an unsatisfactory assessment of compliance compatibility. In one implementation, once the suspend flag for the entity is set (e.g., due to an overall compliance score below a specified threshold (e.g., value and/or directionality), due to a dimension compliance score below a specified threshold (e.g., value and/or directionality), due to a failed verification check (e.g., OFAC check)), the entity has a specified period of time (e.g., 30 days) to undergo reevaluation before the entity's association with the participating processor is terminated. The CCTM may facilitate reevaluating the entity by re-underwriting the entity at 1573. In one implementation, the entity may be re-underwritten via the ECVO component. For example, the entity may continue to be associated with the participating processor but with updated pricing (e.g., higher pricing due to lower compliance compatibility).

FIGS. 16A-C show non-limiting, example embodiments of implementation case(s) for the CCTM. In FIGS. 16A-C, an exemplary implementation case of entity compliance monitoring is illustrated. The CCTM may periodically audit an entity and/or the entity's employees for compliance compatibility. The CCTM may check for issues such as outdated business information, expirations of licenses for the entity or for the entity's employees/UBO, expirations of IDs for the entity's employees/UBO, background check issues for the entity's employees/UBO, and/or the like. If additional verification should be performed, the CCTM may obtain updated assessment data via an API and may verify that any issues are resolved.

FIGS. 17A-B show non-limiting, example embodiments of implementation case(s) for the CCTM. In FIGS. 17A-B, an exemplary implementation case of employee onboarding and offboarding is illustrated. When an employee is onboarded with an entity, the employee's government ID and/or a biometrics scan data may be collected for enhanced verification of the employee's identity, and the employee may be granted access to the entity's systems (e.g., POS terminals and/or apps). This information may be utilized in subsequent interactions (e.g., purchase transactions) to identify the employee (e.g., handling a purchase transaction). When the employee is offboarded, the employee's access to the entity's systems (e.g., POS terminals and/or apps) is revoked.

FIGS. 18A-B show non-limiting, example embodiments of architectures for the CCTM. In FIGS. 18A-B, embodiments of how the CCTM may be utilized to facilitate transaction compliance evaluation during online ordering are illustrated. In various implementations, the CCTM may provide enhanced buyer, seller (e.g., employee), carrier (e.g., delivery driver), and/or the like authentication at time of purchase, handoff (e.g., for delivery), settlement (e.g., at pickup/delivery), and/or the like facilitating end-to-end matching of buyer, seller, carrier, and transaction data from purchase to handoff.

FIGS. 19A-C show non-limiting, example embodiments of a datagraph illustrating data flow(s) for the CCTM. In FIGS. 19A-C, a customer client 1902 (e.g., of a customer) may send a product order initiation input 1921 to a merchant server 1904 (e.g., of an entity such as a merchant, a producer, a distributor, etc.) to submit a product order (e.g., an online order) for one or more products. For example, the customer client may be a desktop, a laptop, a tablet, a smartphone, a smartwatch, and/or the like that is executing a client application. In one implementation, the product order initiation input may include data such as a request identifier, product order data, and/or the like. In one embodiment, the customer client may provide the following example product order initiation input, substantially in the form of a HTTP(S) POST message including XML-formatted data, as provided below:

```
POST /product_order_initiation_input.php HTTP/1.1
Host: www.server.com
Content-Type: Application/XML
Content-Length: 667
<?XML version = "1.0" encoding = "UTF-8"?>
<product_order_initiation_input>
  <request_identifier>ID_request_21</request_identifier>
  <product_order_data>
    <order_identifier>ID_order_1</order_identifier>
    <order_date_time>7/15/2023</order_date_time>
    <customer_identifier>ID_customer_1</customer_identifier>
    <customer_location>GPS coordinates of customer's location</customer_location>
    <order_type>DELIVERY</order_type>
    <order_payment>
      <payment_method>Credit Card</payment_method>
      <payment_type>Visa</payment_type>
      <card_number>xxxx-xxxx-xxxx-XXXX</card_number>
      <expiration_date>01/2025</expiration_date>
      <CVV_code>YYY</CVV_code>
      ...
    </order_payment>
    <product>
      <product_identifier>ID_medicine_1</product_identifier>
      <product_quantity>1</product_quantity>
      <product_price>$20.00</product_price>
    </product>
    <product>
      <product_identifier>ID_medicine_2</product_identifier>
      <product_quantity>2</product_quantity>
      <product_price>$2.50</product_price>
    </product>
    <order_subtotal>$25.00</order_subtotal>
    <order_discount>$5.00</order_discount>
    <order_total>$20.00</order_total>
  </product_order_data>
</product_order_initiation_input>
```

The merchant server 1904 may send a product order initiation request 1923 to a CCTM server 1906 to facilitate transaction compliance evaluation of the product order initiation. In one implementation, the product order initiation request may include data such as a request identifier, an account number, an entity identifier, product order data, and/or the like. In one embodiment, the merchant server may provide the following example product order initiation request, substantially in the form of a HTTP(S) POST message including XML-formatted data, as provided below:

```
POST /product_order_initiation_request.php HTTP/1.1
Host: www.server.com
Content-Type: Application/XML
Content-Length: 667
<?XML version = "1.0" encoding = "UTF-8"?>
<product_order_initiation_request>
  <request_identifier>ID_request_22</request_identifier>
  <account_number>ID_account_1</account_number>
  <merchant_identifier>ID_merchant_identifier_1</merchant_identifier>
  <product_order_data>
    <order_identifier>ID_order_1</order_identifier>
    <order_date_time>7/15/2023</order_date_time>
    <customer_identifier>ID_customer_1</customer_identifier>
    <customer_location>GPS coordinates of customer's location</customer_location>
    <order_type>DELIVERY</order_type>
    <order_payment>
      <payment_method>Credit Card</payment_method>
```

-continued

```
      <payment_type>Visa</payment_type>
      <card_number>xxxx-xxxx-XXXX-XXXX</card_number>
      <expiration_date>01/2025</expiration_date>
      <CVV_code>YYY</CVV_code>
      ...
    </order_payment>
    <product>
      <product_identifier>ID_medicine_1</product_identifier>
      <product_quantity>1</product_quantity>
      <product_price>$20.00</product_price>
      <product_item_details>
        <item_UUID>ID_UUID_111</item_UUID>
        <item_RFID_tag>ID_RFID_tag_1</item_RFID_tag>
        <item_production_date_time>5/1/2023</item_production_date_time>
        <item_production_location>ID_location_1</item_production_location>
        <cryptographic_signature>Signature of producer</cryptographic_signature>
      </product_item_details>
    </product>
    <product>
      <product_identifier>ID_medicine_2</product_identifier>
      <product_quantity>2</product_quantity>
      <product_price>$2.50</product_price>
      <product_item_details>
        <item_UUID>ID_UUID_222</item_UUID>
        <item_RFID_tag>ID_RFID_tag_2</item_RFID_tag>
        <item_production_date_time>6/1/2023</item_production_date_time>
        <item_production_location>ID_location_2</item_production_location>
        <cryptographic_signature>Signature of producer</cryptographic_signature>
      </product_item_details>
      <product_item_details>
        <item_UUID>ID_UUID_223</item_UUID>
        <item_RFID_tag>ID_RFID_tag_3</item_RFID_tag>
        <item_production_date_time>6/2/2023</item_production_date_time>
        <item_production_location>ID_location_2</item_production_location>
        <cryptographic_signature>Signature of producer</cryptographic_signature>
      </product_item_details>
    </product>
    <order_subtotal>$25.00</order_subtotal>
    <order_discount>$5.00</order_discount>
    <order_total>$20.00</order_total>
  </product_order_data>
</product_order_initiation_request>
```

A transaction compliance evaluation (TCE) component 1925 may evaluate the product order (e.g., including product items data and/or various authentication data) to generate a transaction compliance datastructure for the product order for the entity. See FIG. 20 for additional details regarding the TCE component.

The CCTM server 1906 may send a customer authentication request 1927 to a verification server 1908 to facilitate authentication of the person who initiated the product order. In one implementation, the customer authentication request may include data such as a request identifier, a customer identifier, customer ID card data (e.g., obtained when the customer registered with the CCTM), an authentication type, and/or the like. In one embodiment, the CCTM server may provide the following example customer authentication request, substantially in the form of a HTTP(S) POST message including XML-formatted data, as provided below:

```
POST/customer_authentication_request.php HTTP/1.1
Host: www.server.com
Content-Type: Application/XML
Content-Length: 667
<? XML version="1.0" encoding="UTF-8"?>
<customer_authentication_request>
  <request_identifier>ID_request_23</request_identifier>
  <customer_identifier>ID_customer_1</customer_identifier>
  <driver_license_front>image_front.png</driver_license_front>
  <driver_license_back>image_back.png</driver_license_back>
  <authentication_type>BIOMETRICS</authentication_ type>
</customer_authentication_request>
```

The verification server 1908 may send an authentication data request output 1929 to the customer client 1902 to request authentication data from the person who initiated the product order (e.g., one or more of a face scan, a fingerprint scan, a password, a security token, etc.). In one implementation, the authentication data request output may include data such as a request identifier, an authentication type, and/or the like. In one embodiment, the verification server may provide the following example authentication data request output, substantially in the form of a HTTP(S) POST message including XML-formatted data, as provided below:

```
POST/authentication_data_request_output.php HTTP/1.1
Host: www.server.com
Content-Type: Application/XML
Content-Length: 667
<? XML version="1.0" encoding="UTF-8" ?>
<authentication_data_request_output>
  <request_identifier>ID_request_24</request_identifier>
  <authentication_type>BIOMETRICS</authentication_ type>
</authentication_data_request_output>
```

The customer client 1902 may send an authentication data response input 1931 to the verification server 1908 with the requested customer authentication data. In one implementation, the authentication data response input may include data such as a response identifier, customer authentication data, and/or the like. In one embodiment, the customer client may provide the following example authentication data response input, substantially in the form of a HTTP(S) POST message including XML-formatted data, as provided below:

```
POST/authentication_data_response_input.php HTTP/1.1
Host: www.server.com
Content-Type: Application/XML
Content-Length: 667
<? XML version="1.0" encoding="UTF-8"?>
<authentication_data_response_input>
  <response_identifier>ID_response_24</response_identifier>
  <customer_authentication_data>face scan data</customer_authentication_data>
</authentication_data_response_input>
```

The verification server 1908 may send a customer authentication response 1933 to the CCTM server 1906 to inform the CCTM server whether the person who initiated the product order was authenticated successfully. In one implementation, the customer authentication response may include data such as a response identifier, an authentication status, and/or the like. In one embodiment, the verification server may provide the following example customer authentication response, substantially in the form of a HTTP(S) POST message including NAIL-formatted data, as provided below:

```
POST/customer_authentication_response.php HTTP/1.1
Host: www.server.com
Content-Type: Application/XML
Content-Length: 667
<? XML version="1.0" encoding="UTF-8"?>
<customer_authentication_response>
  <response_identifier>ID_response_23</response_identifier>
  <status>VERIFIED</status>
</customer_authentication_response>
```

The CCTM server 1906 may send a product order initiation response 1935 to the merchant server 1904 to inform the merchant server whether the person who initiated the product order was authenticated successfully. In one implementation, the product order initiation response may include data such as a response identifier, an authentication status, and/or the like. In one embodiment, the CCTM server may provide the following example product order initiation response, substantially in the form of a HTTP(S) POST message including XML-formatted data, as provided below:

```
POST/product_order_initiation_response.php HTTP/1.1
Host: www.server.com
Content-Type: Application/XML
Content-Length: 667
<? XML version="1.0" encoding="UTF-8"?>
<product_order_initiation_response>
  <response_identifier>ID_response_22</response_identifier>
  <status>VERIFIED</status>
</product_order_initiation_response>
```

The merchant server 1904 may send a product order initiation output 1937 to the customer client 1902 to inform the customer whether the product order was processed successfully. In one implementation, the product order initiation output may include data such as a response identifier, a status, and/or the like. In one embodiment, the merchant server may provide the following example product order initiation output, substantially in the form of a HTTP(S) POST message including XML-formatted data, as provided below:

```
POST/product_order_initiation_output.php HTTP/1.1
Host: www.server.com
Content-Type: Application/XML
Content-Length: 667
<? XML version="1.0" encoding="UTF-8"?>
<product_order_initiation_output>
  <response_identifier>ID_response_21</response_identifier>
  <status>OK</status>
</product_order_initiation_output>
```

An employee client 1910 (e.g., of an employee of the entity) may send a product order handling request 1939 to the CCTM server 1906 to facilitate transaction compliance evaluation of the product order handling. In one implementation, the product order handling request may include data such as a request identifier, an account number, an entity identifier, an employee identifier, an employee location, an order identifier, an order handling date and/or time, product items to handle, and/or the like. In one embodiment, the employee client may provide the following example product order handling request, substantially in the form of a HTTP(S) POST message including XML-formatted data, as provided below:

```
POST /product_order_handling_request.php HTTP/1.1
Host: www.server.com
Content-Type: Application/XML
Content-Length: 667
<?XML version = "1.0" encoding = "UTF-8"?>
<product_order_handling_request>
  <request_identifier>ID_request_25</request_identifier>
  <account_number>ID_account_1</account_number>
  <merchant_identifier>ID_merchant_identifier_1</merchant_identifier>
  <employee_identifier>ID_employee_1</employee_identifier>
  <employee_location>GPS coordinates of employee's location</employee_location>
  <order_identifier>ID_order_1</order_identifier>
  <order_handling_date_time>7/16/2023</order_handling_date_time>
  <product_items_to_handle>
    <item_UUID>ID_UUID_111</item_UUID>
    <item_UUID>ID_UUID_222</item_UUID>
    <item_UUID>ID_UUID_223</item_UUID>
  </product_items_to_handle>
</product_order_handling_request>
```

The CCTM server 1906 may send an employee authentication request 1941 to the verification server 1908 to facilitate authentication of the employee. In one implementation, the employee authentication request may include data such as a request identifier, an employee identifier, employee ID card data (e.g., obtained when the employee registered with the CCTM), an authentication type, and/or the like. In one embodiment, the CCTM server may provide the following example employee authentication request, substantially in the form of a HTTP(S) POST message including XML-formatted data, as provided below:

```
POST/employee_authentication_request.php HTTP/1.1
Host: www.server.com
Content-Type: Application/XML
Content-Length: 667
<? XML version="1.0" encoding="UTF-8"?>
<employee_authentication_request>
  <request_identifier>ID_request_26</request_identifier>
  <employee_identifier>ID_employee_1</employee_identifier>
  <driver_license_front>image_front.png</driver_license_front>
  <driver_license_back>image_back.png</driver_license_back>
  <authentication_type>BIOMETRICS</authentication_ type>
</employee_authentication_request>
```

The verification server 1908 may send an authentication data request output 1943 to the employee client 1910 to request authentication data from the employee (e.g., one or more of a face scan, a fingerprint scan, a password, a security token, etc.). In one implementation, the authentication data request output may include data such as a request identifier, an authentication type, and/or the like. In one embodiment, the verification server may provide the following example authentication data request output, substantially in the form of a HTTP(S) POST message including XML-formatted data, as provided below:

```
POST/authentication_data_request_output.php HTTP/1.1
Host: www.server.com
Content-Type: Application/XML
Content-Length: 667
<? XML version="1.0" encoding="UTF-8"?>
<authentication_data_request_output>
  <request_identifier>ID_request_27</request_identifier>
  <authentication_type>BIOMETRICS</authentication_ type>
</authentication_data_request_output>
```

The employee client 1910 may send an authentication data response input 1945 to the verification server 1908 with the requested employee authentication data. For example, the employee client may be a desktop, a laptop, a tablet, a smartphone, a smartwatch, and/or the like that is executing a client application. In one implementation, the authentication data response input may include data such as a response identifier, employee authentication data, and/or the like. In one embodiment, the employee client may provide the following example authentication data response input, substantially in the form of a HTTP(S) POST message including XML-formatted data, as provided below:

```
POST/authentication_data_response_input.php HTTP/1.1
Host: www.server.com
Content-Type: Application/XML
Content-Length: 667
<? XML version="1.0" encoding="UTF-8"?>
<authentication_data_response_input>
  <response_identifier>ID_response_27</response_identifier>
  <employee_authentication_data>face scan data</employee_authentication_data>
</authentication_data_response_input>
```

The verification server 1908 may send an employee authentication response 1947 to the CCTM server 1906 to inform the CCTM server whether the employee was authenticated successfully. In one implementation, the employee authentication response may include data such as a response identifier, an authentication status, and/or the like. In one embodiment, the verification server may provide the following example employee authentication response, substantially in the form of a HTTP(S) POST message including XML-formatted data, as provided below:

```
POST/employee_authentication_response.php HTTP/1.1
Host: www.server.com
Content-Type: Application/XML
Content-Length: 667
<? XML version="1.0" encoding="UTF-8"?>
<employee_authentication_response>
  <response_identifier>ID_response_26</response_identifier>
  <status>VERIFIED</status>
</employee_authentication_response>
```

The CCTM server 1906 may send a product order handling response 1949 to the employee client 1910 to inform the employee whether the employee is authorized to handle the product order. In one implementation, the product order handling response may include data such as a response identifier, a status, and/or the like. In one embodiment, the CCTM server may provide the following example product order handling response, substantially in the form of a HTTP(S) POST message including XML-formatted data, as provided below:

```
POST/product_order_handling_response.php HTTP/1.1
Host: www.server.com
Content-Type: Application/XML
Content-Length: 667
<? XML version="1.0" encoding="UTF-8"?>
<product_order_handling_response>
  <response_identifier>ID_response_25</response_identifier>
  <status>OK</status>
</product_order_handling_response>
```

A carrier client 1912 (e.g., of a carrier delivering the product order) may send a product order delivery request 1951 to the CCTM server 1906 to facilitate transaction compliance evaluation of the product order delivery. In one implementation, the product order delivery request may include data such as a request identifier, an account number, an entity identifier, a carrier identifier, a carrier location, an order identifier, an order delivery date and/or time (e.g., when product items are picked up by the carrier and order delivery is started), product items to deliver, and/or the like. In one embodiment, the carrier client may provide the following example product order delivery request, substantially in the form of a HTTP(S) POST message including XML-formatted data, as provided below:

```
POST /product_order_delivery_request.php HTTP/1.1
Host: www.server.com
Content-Type: Application/XML
Content-Length: 667
<?XML version = "1.0" encoding = "UTF-8"?>
<product_order_delivery_request>
  <request_identifier>ID_request_28</request_identifier>
  <account_number>ID_account_1</account_number>
  <merchant_identifier>ID_merchant_identifier_1</merchant_identifier>
  <carrier_identifier>ID_carrier_1</carrier_identifier>
  <carrier_location>GPS coordinates of carrier's location</carrier_location>
  <order_identifier>ID_order_1</order_identifier>
  <order_delivery_date_time>7/17/2023</order_delivery_date_time>
  <product_items_to_deliver>
    <item_UUID>ID_UUID_111</item_UUID>
    <item_UUID>ID_UUID_222</item_UUID>
    <item_UUID>ID_UUID_223</item_UUID>
  </product_items_to_deliver>
</product_order_delivery_request>
```

The CCTM server 1906 may send a carrier authentication request 1953 to the verification server 1908 to facilitate authentication of the carrier. In one implementation, the carrier authentication request may include data such as a request identifier, a carrier identifier, carrier ID card data (e.g., obtained when the carrier registered with the CCTM), an authentication type, and/or the like. In one embodiment, the CCTM server may provide the following example carrier authentication request, substantially in the form of a HTTP (S) POST message including XML-formatted data, as provided below:

```
POST/carrier_authentication_request.php HTTP/1.1
Host: www.server.com
Content-Type: Application/XML
Content-Length: 667
<? XML version="1.0" encoding="UTF-8"?>
<carrier_authentication_request>
  <request_identifier>ID_request_29</request_identifier>
  <carrier_identifier>ID_carrier_1</carrier_identifier>
  <driver_license_front>image_front.png</driver_license_front>
  <driver_license_back>image_back.png</driver_license_back>
  <authentication_type>BIOMETRICS</authentication_ type>
</carrier_authentication_request>
```

The verification server 1908 may send an authentication data request output 1955 to the carrier client 1912 to request authentication data from the carrier (e.g., one or more of a face scan, a fingerprint scan, a password, a security token, etc.). In one implementation, the authentication data request output may include data such as a request identifier, an authentication type, and/or the like. In one embodiment, the verification server may provide the following example authentication data request output, substantially in the form of a HTTP(S) POST message including XML-formatted data, as provided below:

```
POST/authentication_data_request_output.php HTTP/1.1
Host: www.server.com
Content-Type: Application/XML
Content-Length: 667
<? XML version="1.0" encoding="UTF-8" ?>
<authentication_data_request_output>
  <request_identifier>ID_request_30</request_identifier>
  <authentication_type>BIOMETRICS</authentication_ type>
</authentication_data_request_output>
```

The carrier client 1912 may send an authentication data response input 1957 to the verification server 1908 with the requested carrier authentication data. For example, the carrier client may be a desktop, a laptop, a tablet, a smartphone, a smartwatch, and/or the like that is executing a client application. In one implementation, the authentication data response input may include data such as a response identifier, carrier authentication data, and/or the like. In one embodiment, the carrier client may provide the following example authentication data response input, substantially in the form of a HTTP(S) POST message including XML-formatted data, as provided below:

```
POST/authentication_data_response_input.php HTTP/1.1
Host: www.server.com
Content-Type: Application/XML
Content-Length: 667
<? XML version="1.0" encoding="UTF-8"?>
<authentication_data_response_input>
  <response_identifier>ID_response_30</response_identifier>
  <carrier_authentication_data>face scan data</carrier_authentication_data>
</authentication_data_response_input>
```

The verification server 1908 may send a carrier authentication response 1959 to the CCTM server 1906 to inform the CCTM server whether the carrier was authenticated successfully. In one implementation, the carrier authentication response may include data such as a response identifier, an authentication status, and/or the like. In one embodiment, the verification server may provide the following example carrier authentication response, substantially in the form of a HTTP(S) POST message including XML-formatted data, as provided below:

```
POST/carrier_authentication_response.php HTTP/1.1
Host: www.server.com
Content-Type: Application/XML
Content-Length: 667
<? XML version="1.0" encoding="UTF-8"?>
<carrier_authentication_response>
  <response_identifier>ID_response_29</response_identifier>
  <status>VERIFIED</status>
</carrier_authentication_response>
```

The CCTM server 1906 may send a product order delivery response 1961 to the carrier client 1912 to inform the carrier whether the carrier is authorized to deliver the product order. In one implementation, the product order delivery response may include data such as a response identifier, a status, and/or the like. In one embodiment, the CCTM server may provide the following example product order delivery response, substantially in the form of a HTTP(S) POST message including XML-formatted data, as provided below:

```
POST/product_order_delivery_response.php HTTP/1.1
Host: www.server.com
Content-Type: Application/XML
Content-Length: 667
<? XML version="1.0" encoding="UTF-8"?>
<product_order_delivery_response>
  <response_identifier>ID_response_28</response_
    identifier>
  <status>OK</status>
</product_order_delivery_response>
```

The customer client 1902 may send a product order receipt request 1963 to the CCTM server 1906 to receive the product order from the carrier. In one implementation, the product order receipt request may include data such as a request identifier, an account number, an entity identifier, a customer identifier, a customer location, an order identifier, an order receipt date and/or time, product items received, and/or the like. In one embodiment, the customer client may provide the following example product order receipt request, substantially in the form of a HTTP(S) POST message including XML-formatted data, as provided below:

```
POST /product_order_receipt_request.php HTTP/1.1
Host: www.server.com
Content-Type: Application/XML
Content-Length: 667
<?XML version = "1.0" encoding = "UTF-8"?>
<product_order_receipt_request>
  <request_identifier>ID_request_31</request_identifier>
  <account_number>ID_account_1</account_number>
  <merchant_identifier>ID_merchant_identifier_1</merchant_identifier>
  <customer_identifier>ID_customer_1</customer_identifier>
  <customer_location>GPS coordinates of customer's location</customer_location:
  <order_identifier>ID_order_1</order_identifier>
  <order_receipt_date_time>7/18/2023</order_receipt_date_time>
  <product_items_received>
    <item_UUID>ID_UUID_111</item_UUID>
    <item_UUID>ID_UUID_222</item_UUID>
    <item_UUID>ID_UUID_223</item_UUID>
  </product_items_received>
</product_order_receipt_request>
```

The CCTM server 1906 may send a customer authentication request 1965 to the verification server 1908 to facilitate authentication of the person who is receiving the product order. In one implementation, the customer authentication request may include data such as a request identifier, a customer identifier, customer ID card data (e.g., obtained when the customer registered with the CCTM), an authentication type, and/or the like. In one embodiment, the CCTM server may provide the following example customer authentication request, substantially in the form of a HTTP (S) POST message including XML-formatted data, as provided below:

```
POST/customer_authentication_request.php HTTP/1.1
Host: www.server.com
Content-Type: Application/XML
Content-Length: 667
<? XML version="1.0" encoding="UTF-8"?>
<customer_authentication_request>
  <request_identifier>ID_request_32</request_identi-
    fier>
  <customer_identifier>ID_customer_1</customer_i-
    dentifier>
  <driver_license_front>image_front.png</driver_li-
    cense_front>
  <driver_license_back>image_back.png</driver_li-
    cense_back>
  <authentication_type>BIOMETRICS</authentica-
    tion_ type>
</customer_authentication_request>
```

The verification server 1908 may send an authentication data request output 1967 to the customer client 1902 to request authentication data from the person who is receiving the product order (e.g., one or more of a face scan, a fingerprint scan, a password, a security token, etc.). In one implementation, the authentication data request output may include data such as a request identifier, an authentication type, and/or the like. In one embodiment, the verification server may provide the following example authentication data request output, substantially in the form of a HTTP(S) POST message including XML-formatted data, as provided below:

```
POST/authentication_data_request_output.php HTTP/1.1
Host: www.server.com
Content-Type: Application/XML
Content-Length: 667
<? XML version="1.0" encoding="UTF-8"?>
<authentication_data_request_output>
  <request_identifier>ID_request_33</request_identifier>
  <authentication_type>BIOMETRICS</authentication_ type>
</authentication_data_request_output>
```

The customer client 1902 may send an authentication data response input 1969 to the verification server 1908 with the requested customer authentication data. In one implementation, the authentication data response input may include data such as a response identifier, customer authentication data, and/or the like. In one embodiment, the customer client may provide the following example authentication data response input, substantially in the form of a HTTP(S) POST message including XML-formatted data, as provided below:

```
POST/authentication_data_response_input.php HTTP/1.1
Host: www.server.com
Content-Type: Application/XML
Content-Length: 667
<? XML version="1.0" encoding="UTF-8"?>
<authentication_data_response_input>
  <response_identifier>ID_response_33</response_identifier>
  <customer_authentication_data>face scan data</customer_authentication_data>
</authentication_data_response_input>
```

The verification server 1908 may send a customer authentication response 1971 to the CCTM server 1906 to inform the CCTM server whether the person who is receiving the product order was authenticated successfully. In one implementation, the customer authentication response may include data such as a response identifier, an authentication status, and/or the like. In one embodiment, the verification server may provide the following example customer authentication response, substantially in the form of a HTTP(S) POST message including XML-formatted data, as provided below:

```
POST/customer_authentication_response.php HTTP/1.1
Host: www.server.com
Content-Type: Application/XML
Content-Length: 667
<? XML version="1.0" encoding="UTF-8"?>
<customer_authentication_response>
  <response_identifier>ID_response_32</response_identifier>
  <status>VERIFIED</status>
</customer_authentication_response>
```

The CCTM server 1906 may send a product order receipt response 1973 to the customer client 1902 to inform the customer whether the customer is authorized to receive the product order. In one implementation, the product order receipt response may include data such as a response identifier, a status, and/or the like. In one embodiment, the CCTM server may provide the following example product order receipt response, substantially in the form of a HTTP(S) POST message including XML-formatted data, as provided below:

```
POST/product_order_receipt_response.php HTTP/1.1
Host: www.server.com
Content-Type: Application/XML
Content-Length: 667
<? XML version="1.0" encoding="UTF-8"?>
<product_order_receipt_response>
  <response_identifier>ID_response_31</response_identifier>
  <status>OK</status>
</product_order_receipt_response>
```

The CCTM server 1906 may send a compliance evaluation criteria request 1975 to a repository 1914 to determine transaction compliance evaluation criteria to utilize for the entity (e.g., common criteria, processor-specific criteria). In one implementation, the compliance evaluation criteria request may include data such as a request identifier, a criteria type, an account number, an entity identifier, type of business/sector/MCC, a processor identifier, and/or the like. In one embodiment, the CCTM server may provide the following example compliance evaluation criteria request, substantially in the form of a HTTP(S) POST message including XML-formatted data, as provided below:

```
POST/compliance_evaluation_criteria_request.php HTTP/1.1
Host: www.server.com
Content-Type: Application/XML
Content-Length: 667
<? XML version="1.0" encoding="UTF-8"?>
<compliance_evaluation_criteria_request>
  <request_identifier>ID_request_34</request_identifier>
  <criteria_type>TRANSACTION_EVALUATION</criteria_type>
  <account_number>ID_account_1</account_number>
  <merchant_identifier>ID_merchant_identifier_1</merchant_identifier>
  <type_of_business>Drug Stores and Pharmacies</type_of_business>
  <MCC>5912</MCC>
  <processor_identifier>ID_processor_TalusPay</processor_identifier>
</compliance_evaluation_criteria_request>
```

The repository 1914 may send a compliance evaluation criteria response 1977 to the CCTM server 1906 with the requested transaction compliance evaluation criteria to utilize for the entity. In one implementation, the compliance evaluation criteria response may include data such as a response identifier, the requested transaction compliance evaluation criteria, and/or the like. In one embodiment, the repository may provide the following example compliance evaluation criteria response, substantially in the form of a HTTP(S) POST message including XML-formatted data, as provided below:

```
POST /compliance_evaluation_criteria_response.php HTTP/1.1
Host: www.server.com
Content-Type: Application/XML
Content-Length: 667
<?XML version = "1.0" encoding = "UTF-8"?>
<compliance_evaluation_criteria_response>
  <response_identifier>ID_response_34</response_identifier>
```

-continued

```
  <compliance_evaluation_criterion>
    <criterion_dimension>Product Compliance</criterion_dimension>
    <criterion_factor>Chain of custody maintained through intake?</criterion_factor>
    <criterion_type>COMMON</criterion_type>
  </compliance_evaluation_criterion>
  ...
  <compliance_evaluation_criterion>
    <criterion_dimension>Order Initiation Compliance</criterion_dimension>
    <criterion_factor>Customer authenticated at order initiation?</criterion_factor>
    <criterion_type>COMMON</criterion_type>
  </compliance_evaluation_criterion>
  <compliance_evaluation_criterion>
    <criterion_dimension>Order Initiation Compliance</criterion_dimension>
    <criterion_factor>Customer authenticated with biometrics?</criterion_factor>
    <criterion_type>PROCESSOR_SPECIFIC</criterion_type>
  </compliance_evaluation_criterion>
  ...
</compliance_evaluation_criteria_response>
```

The CCTM server 1906 may send a compliance datastructures retrieve request 1979 to the repository 1914 to retrieve previously stored transaction compliance datastructures associated with the entity's intake (e.g., purchase) of the product items associated with the product order. In one implementation, the compliance datastructures retrieve request may include data such as a request identifier, an account number, an entity identifier, product items data, and/or the like. In one embodiment, the CCTM server may provide the following example compliance datastructures retrieve request, substantially in the form of a HTTP(S) POST message including XML-formatted data, as provided below:

```
POST /compliance_datastructures_retrieve_request.php HTTP/1.1
Host: www.server.com
Content-Type: Application/XML
Content-Length: 667
<?XML version = "1.0" encoding = "UTF-8"?>
<compliance_datastructures_retrieve_request>
```

-continued

```
  <request_identifier>ID_request_35</request_identifier>
  <account_number>ID_account_1</account_number>
  <merchant_identifier>ID_merchant_identifier_1</merchant_identifier>
  <product_items_data>
    <item_UUID>ID_UUID_111</item_UUID>
    <item_UUID>ID_UUID_222</item_UUID>
    <item_UUID>ID_UUID_223</item_UUID>
  </product_items_data>
</compliance_datastructures_retrieve_request>
```

The repository 1914 may send a compliance datastructures retrieve response 1981 to the CCTM server 1906 with the requested transaction compliance datastructures. In one implementation, the compliance datastructures retrieve response may include data such as a response identifier, the requested transaction compliance datastructures, and/or the like. In one embodiment, the repository may provide the following example compliance datastructures retrieve response, substantially in the form of a HTTP(S) POST message including XML-formatted data, as provided below:

```
POST /compliance_datastructures_retrieve_response.php HTTP/1.1
Host: www.server.com
Content-Type: Application/XML
Content-Length: 667
<?XML version = "1.0" encoding = "UTF-8"?>
<compliance_datastructures_retrieve_response>
  <response_identifier>ID_response_35</response_identifier>
  <transaction_compliance_datastructure>
    <TCD_identifier>ID_transaction_compliance_datastructure_111</TCD_identifier>
    <event_data>
      <account_number>ID_account_1</account_number>
      <merchant_identifier>ID_merchant_identifier_1</merchant_identifier>
      <producer_identifier>ID_producer_1</producer_identifier>
      <event_type>INTAKE_PURCHASE_TRANSACTION</event_type>
      <event_date_time>5/15/2023</event_date_time>
      <product_items_data>
        <item_UUID>ID_UUID_111</item_UUID>
      </product_items_data>
      ...
      <overall_compliance_score>860</overall_compliance_score>
      <cryptographic_signature>Signature of the CCTM</cryptographic_signature>
    </event_data>
    <product_order_initiation_data>
    ...
    </product_order_initiation_data>
    <product_order_handling_data>
    ...
    </product_order_handling_data>
    <product_order_delivery_data>
    ...
    </product_order_delivery_data>
```

-continued

```
    <product_order_receipt_data>
    ...
    </product_order_receipt_data>
  </transaction_compliance_datastructure>
  <transaction_compliance_datastructure>
    <TCD_identifier>ID_transaction_compliance_datastructure_222</TCD_identifier>
    <event_data>
      <account_number>ID_account_1</account_number>
      <merchant_identifier>ID_merchant_identifier_1</merchant_identifier>
      <producer_identifier>ID_producer_2</producer_identifier>
      <event_type>INTAKE_PURCHASE_TRANSACTION</event_type>
      <event_date_time>5/16/2023</event_date_time>
      <product_items_data>
        <item_UUID>ID_UUID_222</item_UUID>
        <item_UUID>ID_UUID_223</item_UUID>
      </product_items_data>
      ...
      <overall_compliance_score>870</overall_compliance_score>
      <cryptographic_signature>Signature of the CCTM</cryptographic_signature>
    </event_data>
    <product_order_initiation_data>
    ...
    </product_order_initiation_data>
    <product_order_handling_data>
    ...
    </product_order_handling_data>
    <product_order_delivery_data>
    ...
    </product_order_delivery_data>
    <product_order_receipt_data>
    ...
    </product_order_receipt_data>
  </transaction_compliance_datastructure>
</compliance_datastructures_retrieve_response>
```

The CCTM server 1906 may send a transaction compliance datastructure store request 1983 to the repository 1914 to store a transaction compliance datastructure for the event (e.g., product order) for the entity. In one implementation, the transaction compliance datastructure store request may include data such as a request identifier, a transaction compliance datastructure, and/or the like. In one embodiment, the CCTM server may provide the following example transaction compliance datastructure store request, substantially in the form of a HTTP(S) POST message including XML-formatted data, as provided below:

```
POST /transaction_compliance_datastructure_store_request.php HTTP/1.1
Host: www.server.com
Content-Type: Application/XML
Content-Length: 667
<?XML version = "1.0" encoding = "UTF-8"?>
<transaction_compliance_datastructure_store_request>
  <request_identifier>ID_request_36</request_identifier>
  <transaction_compliance_datastructure>
    <TCD_identifier>ID_transaction_compliance_datastructure_333</TCD_identifier>
    <event_data>
      <account_number>ID_account_1</account_number>
      <merchant_identifier>ID_merchant_identifier_1</merchant_identifier>
      <event_type>PURCHASE_TRANSACTION</event_type>
      <order_identifier>ID_order_1</order_identifier>
      <event_date_time>7/15/2023</event_date_time>
      <customer_identifier>ID_customer_1</customer_identifier>
      <order_type>DELIVERY</order_type>
      <order_payment>
        <payment_method>Credit Card</payment_method>
        <payment_type>Visa</payment_type>
        <card_number>xxxx-xxxx-xxxx-xxxx</card_number>
        <expiration_date>01/2025</expiration_date>
        <CVV_code>YYY</CVV_code>
        ...
      </order_payment>
      <product_items_data>
        <item_UUID>ID_UUID_111</item_UUID>
```

-continued

```
            <item_UUID>ID_UUID_222</item_UUID>
            <item_UUID>ID_UUID_223</item_UUID>
        </product_items_data>
        <products_intake_compliance_score>850</products_intake_compliance_score>
        ...
        <overall_compliance_score>860</overall_compliance_score>
        <cryptographic_signature>Signature of the CCTM</cryptographic_signature>
    </event_data>
    <product_order_initiation_data>
        <order_date_time>7/15/2023</order_date_time>
        <customer_identifier>ID_customer_1</customer_identifier>
        <customer location>
            GPS coordinates of customer's location
        </customer_location>
        <authentication_type>BIOMETRICS</authentication_type>
        <status>VERIFIED</status>
        <product_order_initiation_score>880</product_order_initiation_score>
        ...
    </product_order_initiation_data>
    <product_order_handling_data>
        <order_handling_date_time>7/16/2023</order_handling_date_time>
        <employee_identifier>ID_employee_1</employee_identifier>
        <employee_location>
            GPS coordinates of employee's location
        </employee_location>
        <authentication_type>BIOMETRICS</authentication_type>
        <status>VERIFIED</status>
        <product_items_handled>
            <item_UUID>ID_UUID_111</item_UUID>
            <item_UUID>ID_UUID_222</item_UUID>
            <item_UUID>ID_UUID_223</item_UUID>
        </product_items_handled>
        <product_order_handling_score>870</product_order_handling_score>
        ...
    </product_order_handling_data>
    <product_order_delivery_data>
        <order_delivery_date_time>7/17/2023</order_delivery_date_time>
        <carrier_identifier>ID_carrier_1</carrier_identifier>
        <carrier_location>GPS coordinates of carrier's location</carrier_location>
        <authentication_type>BIOMETRICS</authentication_type>
        <status>VERIFIED</status>
        <product_items_delivered>
            <item_UUID>ID_UUID_111</item_UUID>
            <item_UUID>ID_UUID_222</item_UUID>
            <item_UUID>ID_UUID_223</item_UUID>
        </product_items_delivered>
        <product_order_delivery_score>860</product_order_delivery_score>
        ...
    </product_order_delivery_data>
    <product_order_receipt_data>
        <order_receipt_date_time>7/18/2023</order_receipt_date_time>
        <customer_identifier>ID_customer_1</customer_identifier>
        <customer_location>
            GPS coordinates of customer's location
        </customer_location>
        <authentication_type>BIOMETRICS</authentication_type>
        <status>VERIFIED</status>
        <product_items_received>
            <item_UUID>ID_UUID_111</item_UUID>
            <item_UUID>ID_UUID_222</item_UUID>
            <item_UUID>ID_UUID_223</item_UUID>
        </product_items_received>
        <product_order_receipt_score>860</product_order_receipt_score>
        ...
    </product_order_receipt_data>
  </transaction_compliance_datastructure>
</transaction_compliance_datastructure_store_request>
```

The repository 1914 may send a transaction compliance datastructure store response 1985 to the CCTM server 1906 to inform the CCTM server whether the transaction compliance datastructure for the event (e.g., product order) for the entity was stored successfully. In one implementation, the transaction compliance datastructure store response may include data such as a response identifier, a status, and/or the like. In one embodiment, the repository may provide the following example transaction compliance datastructure store response, substantially in the form of a HTTP(S) POST message including XML-formatted data, as provided below:

```
POST/transaction_compliance_datastructure_store_re-
    sponse.php HTTP/1.1
Host: www.server.com
Content-Type: Application/XML
Content-Length: 667
<? XML version="1.0" encoding="UTF-8"?>
<transaction_compliance_datastructure_store_response>
```

response_identifier>ID_response_36</response_identifier>
<status>OK</status>
</transaction_compliance_datastructure_store_response>

FIG. 20 shows non-limiting, example embodiments of a logic flow illustrating a transaction compliance evaluation (TCE) component for the CCTM. In FIG. 20, a transaction compliance evaluation request may be obtained at 2001. For example, the transaction compliance evaluation request may be obtained as a result of a request from an entity (e.g., a merchant such as a pharmacy) to evaluate transaction compliance of a product order (e.g., a purchase transaction).

Transaction compliance evaluation criteria for the entity may be determined at 2005. For example, transaction compliance evaluation criteria (e.g., applicable to entities of a certain type of business/sector/NCC) may include common transaction compliance evaluation criteria and/or processor-specific transaction compliance evaluation criteria. In one implementation, a product order initiation request may be parsed (e.g., using PHP commands) to determine an entity identifier of the entity (e.g., based on the value of the merchant_identifier field), and information regarding the entity (e.g., type of business/sector/MCC) may be determined based on the entity identifier. In one embodiment, common transaction compliance evaluation criteria may be used to evaluate transactions of any entity, while processor-specific transaction compliance evaluation criteria may be used to evaluate transactions of entities onboarded with a specific participating processor. In one implementation, transaction compliance evaluation criteria may be dynamic rules that apply the dimensions and factors of compliance to facilitate a spot compliance assessment for a point in time and/or a trending or time-based assessment of compliance compatibility. For example, the common transaction compliance evaluation criteria for the entity may be determined via a MySQL database command similar to the following:

```
SELECT complianceCriterionID, complianceCriterionDimension, complianceCriterionFactor
FROM ComplianceCriteria
WHERE isComplianceCriterionCommon IS TRUE AND
  isTransactionComplianceEvaluationCriterion IS TRUE AND
  associatedMerchantBusinessType="Drug Stores and Pharmacies";
```

For example, the processor-specific transaction compliance evaluation criteria for the entity associated with the participating processor of the entity may be determined via a MySQL database command similar to the following:

```
SELECT complianceCriterionID, complianceCriterionDimension, complianceCriterionFactor
FROM ComplianceCriteria
WHERE isComplianceCriterionCommon IS FALSE AND
  associatedParticipatingProcessorID=ID_processor_TalusPay AND
  isTransactionComplianceEvaluationCriterion IS TRUE AND
  associatedMerchantMCC=5912;
```

A determination may be made at 2009 whether there remain product items in the product order to evaluate. In one implementation, each of the product items in the product order may be evaluated. If there remain product items in the product order to evaluate, the next product item in the product order may be selected for evaluation at 2013.

A transaction compliance datastructure for entity intake of the selected product item by the entity may be retrieved at 2017. In one embodiment, the CCTM may facilitate maintaining chain of custody of product items sold by the entity to assess compliance compatibility of the entity. In one implementation, the CCTM may track a product item from production by a producer (e.g., when the producer attaches an RFID tag, item production date, item location, and/or the like to the product item), through order initiation by a merchant (e.g., the producer's customer), through handling of the product by the producer (e.g., additional processing, packaging), though delivery (e.g, by a carrier), to receipt by the merchant, and/or the like to facilitate calculation of a product intake compliance score of the product item for the merchant. In another implementation, the CCTM may track a product item from order initiation by a merchant (e.g., a distributor's customer), through handling of the product by the distributor (e.g., packaging), though delivery (e.g, by a carrier), to receipt by the merchant, and/or the like to facilitate calculation of a product intake compliance score of the product item for the merchant. As such, the transaction compliance datastructure for entity intake of the selected product item by the entity may be used to facilitate calculation of an overall compliance score for the purchase transaction for the entity. For example, the transaction compliance datastructure for entity intake of the selected product item by the entity may be retrieved via a MySQL database command similar to the following:

```
SELECT *
FROM TransactionComplianceFiles
WHERE associatedEntityID=ID_account_1 AND
  associatedMerchantID=ID_merchant_identifier_1
    AND
  transactionProductItemUUIDs=ID_UUID_111;
```

Cryptographic signature(s) of the retrieved transaction compliance datastructure may be verified at 2019. In one embodiment, verifying the cryptographic signatures of the retrieved transaction compliance datastructure may prevent data tampering by ensuring data integrity, and/or may facilitate data auditing by verifying data providence. In one implementation, a public key of each signer (e.g., a public key associated with the CCTM, a public key associated with a producer, a public key associated with the carrier, a public key associated with a merchant) associated with the retrieved transaction compliance datastructure may be used to verify the respective signer's cryptographic signature. See FIG. 7F for additional implementation details of verification of cryptographic signatures.

A transaction compliance score for entity intake of the selected product item may be determined at 2021. In one implementation, the transaction compliance score for entity intake of the selected product item may be determined as the overall compliance score associated with the retrieved transaction compliance datastructure. In another implementation, the transaction compliance score for entity intake of the selected product item may be adjusted based on overall compliance scores (e.g., based on the most recent compliance review) of intake transaction participants (e.g., producer, distributor, carrier, merchant) and/or based on other factors (e.g., the recency of the intake transaction).

A determination may be made at 2025 whether order initiation authentication data for the product order was obtained. If so, the order initiation authentication data may be evaluated using the determined transaction compliance evaluation criteria at 2029. For example, factors such as whether the person who initiated the product order was authenticated, the type of authentication performed (e.g., biometrics, password, face to face using an ID card), the authentication status (e.g., verified, not verified), the confidence level associated with the authentication status, and/or the like may be evaluated. In one implementation, each of the dimensions of compliance associated with the order initiation authentication data may be evaluated using the associated factors of compliance to generate a dimension compliance score for the respective dimension of compliance. For example, a dimension compliance score for a dimension of compliance may correspond to the percentage of factors of compliance associated with the dimension of compliance that pass verification checks. In another example, the dimension compliance score for the dimension of compliance may vary based on the level of compliance (e.g., pass vs. strong assurance).

A determination may be made at 2033 whether order handling authentication data for the product order was obtained. If so, the order handling authentication data may be evaluated using the determined transaction compliance evaluation criteria at 2037. For example, factors such as whether the employee associated with the product order was authenticated, the type of authentication performed (e.g., biometrics, password, face to face using an ID card), the authentication status (e.g., verified, not verified), the confidence level associated with the authentication status, and/or the like may be evaluated. In one implementation, each of the dimensions of compliance associated with the order handling authentication data may be evaluated using the associated factors of compliance to generate a dimension compliance score for the respective dimension of compliance. For example, a dimension compliance score for a dimension of compliance may correspond to the percentage of factors of compliance associated with the dimension of compliance that pass verification checks. In another example, the dimension compliance score for the dimension of compliance may vary based on the level of compliance (e.g., pass vs. strong assurance).

A determination may be made at 2041 whether order delivery authentication data for the product order was obtained. If so, the order delivery authentication data may be evaluated using the determined transaction compliance evaluation criteria at 2045. For example, factors such as whether the carrier associated with the product order was authenticated, the type of authentication performed (e.g., biometrics, password, face to face using an ID card), the authentication status (e.g., verified, not verified), the confidence level associated with the authentication status, and/or the like may be evaluated. In one implementation, each of the dimensions of compliance associated with the order delivery authentication data may be evaluated using the associated factors of compliance to generate a dimension compliance score for the respective dimension of compliance. For example, a dimension compliance score for a dimension of compliance may correspond to the percentage of factors of compliance associated with the dimension of compliance that pass verification checks. In another example, the dimension compliance score for the dimension of compliance may vary based on the level of compliance (e.g., pass vs. strong assurance).

A determination may be made at 2049 whether order receipt authentication data for the product order was obtained. If so, the order receipt authentication data may be evaluated using the determined transaction compliance evaluation criteria at 2053. For example, factors such as whether the person who received the product order was authenticated, the type of authentication performed (e.g., biometrics, password, face to face using an ID card), the authentication status (e.g., verified, not verified), the confidence level associated with the authentication status, and/or the like may be evaluated. In one implementation, each of the dimensions of compliance associated with the order receipt authentication data may be evaluated using the associated factors of compliance to generate a dimension compliance score for the respective dimension of compliance. For example, a dimension compliance score for a dimension of compliance may correspond to the percentage of factors of compliance associated with the dimension of compliance that pass verification checks. In another example, the dimension compliance score for the dimension of compliance may vary based on the level of compliance (e.g., pass vs. strong assurance).

An overall transaction compliance score for the product order may be determined at 2057. In one embodiment, the overall transaction compliance score for the product order may be calculated as a weighted average of the individual dimension compliance scores for the product order. For example, dimension compliance scores may include product compliance scores (e.g., for entity intake of the product items in the product order), order initiation compliance score, order handling compliance score, order delivery compliance score, order receipt compliance score, and/or the like. See FIGS. 8A-C for additional implementation details of a compliance score calculator.

A transaction compliance datastructure for the product order may be generated at 2061. For example, the transaction compliance datastructure may include event data (e.g., information regarding the product order), product order initiation data, product order handling data, product order delivery data, product order receipt data, verification and/or evaluation data, and/or the like. In one embodiment, the transaction compliance datastructure may be utilized as a common data structure across payments and financial services ecosystem stakeholders (e.g., the ISO/PayFac/PSP/Acquirer Processor, the Sponsor Bank/Acquiring Bank, etc.) facilitating secure sharing of data while ensuring data integrity, completeness, and timeliness. In one implementation, the transaction compliance datastructure as discussed with regard to the transaction compliance datastructure store request 1983 may be generated. See FIG. 7E for additional implementation details of secure sharing of data using compliance datastructures (e.g., entity compliance datastructures, transaction compliance datastructures).

The transaction compliance datastructure for the product order may be cryptographically signed at 2065. For example, the transaction compliance datastructure for the product order may be cryptographically signed using a private key associated with the CCTM. In one embodiment, a scheme such as Public Key Cryptography Standards (PKCS) may be utilized to facilitate the use of cryptographic signatures. In one implementation, the transaction compliance datastructure for the product order may be structured to provide proof of integrity and/or data origin at each step of the product order fulfillment by capturing data origins at the point of capture, signing the data package and then tracking providence and chain of custody for the use and modification of the data. In some implementations, the CCTV may be configured as a compliance certificate authority to facilitate verification of cryptographic signatures.

The transaction compliance datastructure for the product order for the entity may be stored at 2069. For example, the transaction compliance datastructure for the product order for the entity may be stored (e.g., via a MySQL database command) as a transaction compliance file in the transaction compliance files table 2519*m*. In one implementation, the transaction compliance datastructure for the product order for the entity may be stored via a transaction compliance datastructure store request.

FIGS. 21A-H show non-limiting, example embodiments of implementation case(s) for the CCTM. In FIG. 21A, an exemplary implementation case of an in-store purchase transaction is illustrated. An employee assisting a customer is authenticated using biometrics. The employee completes the transaction with the customer (e.g., who may also be authenticated) and the authentication data is logged as part of the end-to-end transaction tracking and/or auditing.

In FIGS. 21B-D, an exemplary implementation case of a (e.g., curbside) pickup purchase transaction is illustrated. When an employee packing an order receives an order notification, the employee packing the order is authenticated using biometrics. When a customer arrives at the store, the customer is authenticated using biometrics. An employee handing off the order is authenticated using biometrics, and hands off the order to the authenticated customer. The authentication data is logged as part of the end-to-end transaction tracking and/or auditing.

In FIGS. 21E-G, an exemplary implementation case of a delivery purchase transaction is illustrated. A carrier (e.g., a driver) delivering an order may be notified that the order is ready for delivery, and the driver is authenticated using biometrics when the driver arrives at the store or another pickup location. When an employee handing off the order is notified that the driver is ready to receive the order, the employee handing off the order is authenticated using biometrics, and hands off the order to the authenticated driver. When the driver arrives at a customer's location, the customer is authenticated using biometrics and the driver is authenticated using biometrics, and the authenticated driver hands off the order to the authenticated customer. The authentication data is logged as part of the end-to-end transaction tracking and/or auditing.

In FIG. 21H, an exemplary implementation case of transaction compliance monitoring is illustrated. When a customer places an online order using a checkout page of a merchant, the customer is authenticated using biometrics. The authentication data is logged as part of the end-to-end transaction tracking and/or auditing.

FIG. 22 shows non-limiting, example embodiments of implementation case(s) for the CCTM. In FIG. 22, an exemplary JSON object facilitating persistence and/or delivery of compliance score and/or enhanced authentication data is illustrated. The use of such a JSON object (e.g., for transactions) may facilitate the following features:

- Continuous buyer authentication (e.g., age, government ID, biometrics)
- Continuous seller authentication (e.g., age, government ID, biometrics)
- Continuous carrier authentication (e.g., age, government ID, biometrics)
- Full traceability of goods from purchase to handoff (e.g., geolocation, end-to-end supply chain data)
- Merchant onboarding validation and monitoring (e.g., background checks, biometrics)
- CCTM intelligence for enhanced risk scoring advice and fraud detection
- Track and trace compliance traceability
- Secure cryptographic data handling See Appendix 1 for another example of a JSON object for a transaction and Appendix 2 for an example of JSON object schema.

FIGS. 23A-D show non-limiting, example embodiments of implementation case(s) for the CCTM. In FIGS. 23A-B, embodiments of CCTM architectures that may be utilized to facilitate transaction compliance monitoring (e.g., for an online order) are illustrated. In FIGS. 23C-D, embodiments of how the CCTM may be utilized to facilitate transaction compliance monitoring (e.g., for an online order) are illustrated.

FIGS. 24A-F show non-limiting, example embodiments of screenshots illustrating user interface(s) of the CCTM. In FIGS. 24A-F, exemplary user interface(s) (e.g., for a mobile device) that may be utilized by a customer to place an online order are illustrated. In FIG. 24A, exemplary user interface(s) for a (e.g., curbside) pickup purchase transaction are illustrated. Screen 2401 shows that a customer is notified of the pickup order and is provided a link to check in. Screen 2403 shows that the customer is prompted to check in with a CCTM ID (e.g., via biometrics). Screen 2405 shows that a camera (e.g., of the customer's mobile device) captures a live photo of the customer's face. Screen 2407 shows that the customer's identity was successfully verified.

In FIG. 24B, exemplary user interface(s) for a delivery purchase transaction are illustrated. Screen 2411 shows that a customer is notified when a driver delivering the delivery order is nearby. Screen 2413 shows that the customer is prompted to verify the customer's identity (e.g., via biometrics). Screen 2415 shows that a camera (e.g., of the customer's mobile device) captures a live photo of the customer's face. Screen 2417 shows that the customer's identity was successfully verified.

In FIGS. 24C-E, exemplary user interface(s) for biometrics enrollment of a customer are illustrated. It is to be understood that such user interface(s) may be similarly used for biometrics enrollment of other users such as applicants, employees, carriers, and/or the like. Screen 2421 shows that the customer is prompted to enroll for a CCTM ID) after placing their pickup order. Screen 2423 shows the customer the benefits associated with the CCTM ID. Screen 2425 shows the customer prerequisites for proceeding with the enrollment. Screen 2427 shows that the enrollment app is requesting camera access (e.g., to the customer's mobile device). Screen 2429 shows that a photo of the customer's driver license (front) is captured. Screen 2431 shows a confirmation that the photo of the customer's driver license (front) was captured successfully. Screen 2433 shows that a photo of the customer's driver license (back) is captured. Screen 2435 shows a confirmation that the photo of the customer's driver license (back) was captured successfully. Screen 2437 shows that a photo of the customer's face is captured. Screen 2439 shows a confirmation that the photo of the customer's face was captured successfully. Screen 2441 shows a confirmation that the customer successfully enrolled for a CCTM ID.

In FIG. 24F, exemplary user interface(s) for a checkout for a customer enrolled for a CCTV ID) are illustrated. Screen 2450 shows that card (e.g., credit card, debit card) details may be pre-filled for logged in CCTM ID) members. Screen 2455 shows that the customer may be prompted to verify identity using facial biometrics. Screen 2460 shows a confirmation that the customer's identity was successfully verified at the point of purchase. Screen 2465 shows an order confirmation with prompt to use the CCTM ID to check in during order pickup.

Additional Alternative Embodiment Examples

The following alternative example embodiments provide a number of variations of some of the already discussed principles for expanded color on the abilities of the CCTM.

Additional embodiments may include:

1. An entity compliance datastructure generator apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, an entity assessment data datastructure associated with an entity object for an event type, in which the entity assessment data datastructure is structured to specify an entity category identifier;

determine, via the at least one processor, a set of compliance evaluation criterion objects to utilize for the entity object based on the entity category identifier, in which each compliance evaluation criterion object is structured to specify a factor of compliance rule that is associated with a dimension of compliance data channel;

determine, via the at least one processor, an evaluation order for the set of compliance evaluation criterion objects;

evaluate, via the at least one processor, each factor of compliance rule specified in the set of compliance evaluation criterion objects in accordance with the determined evaluation order using an applicable subset of entity assessment data specified in the entity assessment data datastructure to determine a compliance verification status associated with the respective factor of compliance rule;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object for the event type, in which the entity compliance datastructure is structured to specify the overall compliance score;

cryptographically sign, via the at least one processor, the entity compliance datastructure using a private key; and store, via the at least one processor, the cryptographically signed entity compliance datastructure.

2. The apparatus of embodiment 1, in which the entity assessment data datastructure is structured to include entity details data, business owner details data, and account information data.

3. The apparatus of embodiment 1, in which the entity assessment data datastructure is structured to include self-reported data provided by an applicant associated with the entity object.

4. The apparatus of embodiment 1, in which the event type is one of: an onboarding application, a periodic compliance review.

5. The apparatus of embodiment 1, in which the entity category identifier is one of: a business type identifier, a sector identifier, a merchant category code.

6. The apparatus of embodiment 1, in which the set of compliance evaluation criterion objects includes a set of common compliance evaluation criterion objects and a set of processor-specific compliance evaluation criterion objects.

7. The apparatus of embodiment 1, in which the evaluation order is optimized for speed to decision.

8. The apparatus of embodiment 1, in which the instructions to evaluate a factor of compliance rule are structured as instructions to verify the respective applicable subset of entity assessment data using a verification server.

9. The apparatus of embodiment 8, in which the verification server is one of: a credit bureau server, a government agency server, a data aggregator server, an Ethereum oracle.

10. The apparatus of embodiment 1, in which the instructions to evaluate a factor of compliance rule are structured as instructions to evaluate the respective factor of compliance rule using a factor compliance calculator.

11. The apparatus of embodiment 1, in which the compliance verification status associated with a factor of compliance rule includes a level of verification score, and in which the dimension compliance score of the dimension of compliance data channel associated with the respective factor of compliance rule is calculated based on the level of verification score.

12. The apparatus of embodiment 1, in which a dimension compliance score is one of: an entity score, an owner(s) score, a sector score, a transaction flows score, a social media score, a supply chain management track and trace score, a financial score, a forward delivery score, a jurisdiction score, an external data source score.

13. The apparatus of embodiment 1, in which the component collection storage is further structured with processor-executable instructions, comprising:

determine, via the at least one processor, a matching participating processor object for the entity object; and provide, via the at least one processor, the cryptographically signed entity compliance datastructure to a participating processor server associated with the matching participating processor object.

14. The apparatus of embodiment 13, in which the component collection storage is further structured with processor-executable instructions, comprising:

obtain, via the at least one processor, a participating processor approval data datastructure associated with the entity object, in which the participating processor approval data datastructure is structured to specify a merchant identifier for the entity object and a participating processor cryptographic signature; and augment, via the at least one processor, the stored cryptographically signed entity compliance datastructure to include the merchant identifier and the participating processor cryptographic signature.

15. The apparatus of embodiment 1, in which the entity compliance datastructure is structured in a common data format that facilitates secure sharing of compliance data.

16. An entity compliance datastructure generator processor-readable, non-transient medium, the medium storing a component collection, the component collection storage structured with processor-executable instructions comprising:

obtain, via the at least one processor, an entity assessment data datastructure associated with an entity object for an event type, in which the entity assessment data datastructure is structured to specify an entity category identifier;

determine, via the at least one processor, a set of compliance evaluation criterion objects to utilize for the entity object based on the entity category identifier, in which each compliance evaluation criterion object is structured to specify a factor of compliance rule that is associated with a dimension of compliance data channel;

determine, via the at least one processor, an evaluation order for the set of compliance evaluation criterion objects;

evaluate, via the at least one processor, each factor of compliance rule specified in the set of compliance evaluation criterion objects in accordance with the determined evaluation order using an applicable subset of entity assessment data specified in the entity assessment data datastructure to determine a compliance verification status associated with the respective factor of compliance rule;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object for the event type, in which the entity compliance datastructure is structured to specify the overall compliance score;

cryptographically sign, via the at least one processor, the entity compliance datastructure using a private key; and store, via the at least one processor, the cryptographically signed entity compliance datastructure.

17. The medium of embodiment 16, in which the entity assessment data datastructure is structured to include entity details data, business owner details data, and account information data.

18. The medium of embodiment 16, in which the entity assessment data datastructure is structured to include self-reported data provided by an applicant associated with the entity object.

19. The medium of embodiment 16, in which the event type is one of: an onboarding application, a periodic compliance review.

20. The medium of embodiment 16, in which the entity category identifier is one of: a business type identifier, a sector identifier, a merchant category code.

21. The medium of embodiment 16, in which the set of compliance evaluation criterion objects includes a set of common compliance evaluation criterion objects and a set of processor-specific compliance evaluation criterion objects.

22. The medium of embodiment 16, in which the evaluation order is optimized for speed to decision.

23. The medium of embodiment 16, in which the instructions to evaluate a factor of compliance rule are structured as instructions to verify the respective applicable subset of entity assessment data using a verification server.

24. The medium of embodiment 23, in which the verification server is one of: a credit bureau server, a government agency server, a data aggregator server, an Ethereum oracle.

25. The medium of embodiment 16, in which the instructions to evaluate a factor of compliance rule are structured as instructions to evaluate the respective factor of compliance rule using a factor compliance calculator.

26. The medium of embodiment 16, in which the compliance verification status associated with a factor of compliance rule includes a level of verification score, and in which the dimension compliance score of the dimension of compliance data channel associated with the respective factor of compliance rule is calculated based on the level of verification score.

27. The medium of embodiment 16, in which a dimension compliance score is one of: an entity score, an owner(s) score, a sector score, a transaction flows score, a social media score, a supply chain management track and trace score, a financial score, a forward delivery score, a jurisdiction score, an external data source score.

28. The medium of embodiment 16, in which the component collection storage is further structured with processor-executable instructions, comprising:

determine, via the at least one processor, a matching participating processor object for the entity object; and provide, via the at least one processor, the cryptographically signed entity compliance datastructure to a participating processor server associated with the matching participating processor object.

29. The medium of embodiment 28, in which the component collection storage is further structured with processor-executable instructions, comprising:

obtain, via the at least one processor, a participating processor approval data datastructure associated with the entity object, in which the participating processor approval data datastructure is structured to specify a merchant identifier for the entity object and a participating processor cryptographic signature; and augment, via the at least one processor, the stored cryptographically signed entity compliance datastructure to include the merchant identifier and the participating processor cryptographic signature.

30. The medium of embodiment 16, in which the entity compliance datastructure is structured in a common data format that facilitates secure sharing of compliance data.

31. An entity compliance datastructure generator processor-implemented system, comprising: means to store a component collection;

means to process processor-executable instructions from the component collection, the component collection storage structured with processor-executable instructions including:

obtain, via the at least one processor, an entity assessment data datastructure associated with an entity object for an event type, in which the entity assessment data datastructure is structured to specify an entity category identifier;

determine, via the at least one processor, a set of compliance evaluation criterion objects to utilize for the entity object based on the entity category identifier, in which each compliance evaluation criterion object is structured to specify a factor of compliance rule that is associated with a dimension of compliance data channel;

determine, via the at least one processor, an evaluation order for the set of compliance evaluation criterion objects;

evaluate, via the at least one processor, each factor of compliance rule specified in the set of compliance evaluation criterion objects in accordance with the determined evaluation order using an applicable subset of entity assessment data specified in the entity assessment data datastructure to determine a compliance verification status associated with the respective factor of compliance rule;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object for the event type, in which the entity compliance datastructure is structured to specify the overall compliance score;

cryptographically sign, via the at least one processor, the entity compliance datastructure using a private key; and store, via the at least one processor, the cryptographically signed entity compliance datastructure.

32. The system of embodiment 31, in which the entity assessment data datastructure is structured to include entity details data, business owner details data, and account information data.

33. The system of embodiment 31, in which the entity assessment data datastructure is structured to include self-reported data provided by an applicant associated with the entity object.

34. The system of embodiment 31, in which the event type is one of: an onboarding application, a periodic compliance review.

35. The system of embodiment 31, in which the entity category identifier is one of: a business type identifier, a sector identifier, a merchant category code.

36. The system of embodiment 31, in which the set of compliance evaluation criterion objects includes a set of common compliance evaluation criterion objects and a set of processor-specific compliance evaluation criterion objects.

37. The system of embodiment 31, in which the evaluation order is optimized for speed to decision.

38. The system of embodiment 31, in which the instructions to evaluate a factor of compliance rule are structured as instructions to verify the respective applicable subset of entity assessment data using a verification server.

39. The system of embodiment 38, in which the verification server is one of: a credit bureau server, a government agency server, a data aggregator server, an Ethereum oracle.

40. The system of embodiment 31, in which the instructions to evaluate a factor of compliance rule are structured as instructions to evaluate the respective factor of compliance rule using a factor compliance calculator.

41. The system of embodiment 31, in which the compliance verification status associated with a factor of compliance rule includes a level of verification score, and in which the dimension compliance score of the dimension of compliance data channel associated with the respective factor of compliance rule is calculated based on the level of verification score.

42. The system of embodiment 31, in which a dimension compliance score is one of: an entity score, an owner(s) score, a sector score, a transaction flows score, a social media score, a supply chain management track and trace score, a financial score, a forward delivery score, a jurisdiction score, an external data source score.

43. The system of embodiment 31, in which the component collection storage is further structured with processor-executable instructions, comprising:

determine, via the at least one processor, a matching participating processor object for the entity object; and provide, via the at least one processor, the cryptographically signed entity compliance datastructure to a participating processor server associated with the matching participating processor object.

44. The system of embodiment 43, in which the component collection storage is further structured with processor-executable instructions, comprising:

obtain, via the at least one processor, a participating processor approval data datastructure associated with the entity object, in which the participating processor approval data datastructure is structured to specify a merchant identifier for the entity object and a participating processor cryptographic signature; and augment, via the at least one processor, the stored cryptographically signed entity compliance datastructure to include the merchant identifier and the participating processor cryptographic signature.

45. The system of embodiment 31, in which the entity compliance datastructure is structured in a common data format that facilitates secure sharing of compliance data.

46. An entity compliance datastructure generator processor-implemented process, including processing processor-executable instructions via at least one processor from a component collection stored in at least one memory, the component collection storage structured with processor-executable instructions comprising:

obtain, via the at least one processor, an entity assessment data datastructure associated with an entity object for an event type, in which the entity assessment data datastructure is structured to specify an entity category identifier;

determine, via the at least one processor, a set of compliance evaluation criterion objects to utilize for the entity object based on the entity category identifier, in which each compliance evaluation criterion object is structured to specify a factor of compliance rule that is associated with a dimension of compliance data channel;

determine, via the at least one processor, an evaluation order for the set of compliance evaluation criterion objects;

evaluate, via the at least one processor, each factor of compliance rule specified in the set of compliance evaluation criterion objects in accordance with the determined evaluation order using an applicable subset of entity assessment data specified in the entity assessment data datastructure to determine a compliance verification status associated with the respective factor of compliance rule;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object for the event type, in which the entity compliance datastructure is structured to specify the overall compliance score;

cryptographically sign, via the at least one processor, the entity compliance datastructure using a private key; and store, via the at least one processor, the cryptographically signed entity compliance datastructure.

47. The process of embodiment 46, in which the entity assessment data datastructure is structured to include entity details data, business owner details data, and account information data.

48. The process of embodiment 46, in which the entity assessment data datastructure is structured to include self-reported data provided by an applicant associated with the entity object.

49. The process of embodiment 46, in which the event type is one of: an onboarding application, a periodic compliance review.

50. The process of embodiment 46, in which the entity category identifier is one of: a business type identifier, a sector identifier, a merchant category code.

51. The process of embodiment 46, in which the set of compliance evaluation criterion objects includes a set of common compliance evaluation criterion objects and a set of processor-specific compliance evaluation criterion objects.

52. The process of embodiment 46, in which the evaluation order is optimized for speed to decision.

53. The process of embodiment 46, in which the instructions to evaluate a factor of compliance rule are structured as instructions to verify the respective applicable subset of entity assessment data using a verification server.

54. The process of embodiment 53, in which the verification server is one of: a credit bureau server, a government agency server, a data aggregator server, an Ethereum oracle.

55. The process of embodiment 46, in which the instructions to evaluate a factor of compliance rule are structured as instructions to evaluate the respective factor of compliance rule using a factor compliance calculator.

56. The process of embodiment 46, in which the compliance verification status associated with a factor of compliance rule includes a level of verification score, and in which the dimension compliance score of the dimension of compliance data channel associated with the respective factor of compliance rule is calculated based on the level of verification score.

57. The process of embodiment 46, in which a dimension compliance score is one of: an entity score, an owner(s) score, a sector score, a transaction flows score, a social media score, a supply chain management track and trace score, a financial score, a forward delivery score, a jurisdiction score, an external data source score.

58. The process of embodiment 46, in which the component collection storage is further structured with processor-executable instructions, comprising:

determine, via the at least one processor, a matching participating processor object for the entity object; and provide, via the at least one processor, the cryptographically signed entity compliance datastructure to a participating processor server associated with the matching participating processor object.

59. The process of embodiment 58, in which the component collection storage is further structured with processor-executable instructions, comprising:

obtain, via the at least one processor, a participating processor approval data datastructure associated with the entity object, in which the participating processor approval data datastructure is structured to specify a merchant identifier for the entity object and a participating processor cryptographic signature; and augment, via the at least one processor, the stored cryptographically signed entity compliance datastructure to include the merchant identifier and the participating processor cryptographic signature.

60. The process of embodiment 46, in which the entity compliance datastructure is structured in a common data format that facilitates secure sharing of compliance data.

101. An entity compliance datastructure generator apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance datastructures to utilize for the entity object;

retrieve, via the at least one processor, a set of previously stored compliance datastructures associated with the entity object and matching the determined range;

verify, via the at least one processor, cryptographic signatures associated with each previously stored compliance datastructure in the retrieved set of previously stored compliance datastructures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance datastructures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object, in which the entity compliance datastructure is structured to specify the calculated overall compliance score;

cryptographically sign, via the at least one processor, the entity compliance datastructure using a private key; and store, via the at least one processor, the cryptographically signed entity compliance datastructure.

102. The apparatus of embodiment 101, in which the set of compliance monitoring criterion objects is determined based on an entity category identifier associated with the entity object.

103. The apparatus of embodiment 102, in which the entity category identifier is one of: a business type identifier, a sector identifier, a merchant category code.

104. The apparatus of embodiment 101, in which the set of compliance monitoring criterion objects includes a set of common compliance monitoring criterion objects, and a set of processor-specific compliance monitoring criterion objects associated with a participating processor object associated with the entity object.

105. The apparatus of embodiment 101, in which the range of previous compliance datastructures is structured as one of: a date range, a quantity.

106. The apparatus of embodiment 101, in which the range of previous compliance datastructures is determined based on a compliance review periodicity associated with the entity object.

107. The apparatus of embodiment 101, in which the range of previous compliance datastructures comprises a range for entity compliance datastructures and a range for transaction compliance datastructures, and in which the retrieved set of previously stored compliance datastructures comprises a set of entity compliance datastructures and a set of transaction compliance datastructures.

108. The apparatus of embodiment 101, in which the instructions to evaluate a factor of compliance rule are structured as instructions to verify the respective applicable subset of entity assessment data using a verification server.

109. The apparatus of embodiment 108, in which the verification server is one of: a credit bureau server, a government agency server, a data aggregator server, an Ethereum oracle.

110. The apparatus of embodiment 101, in which the instructions to evaluate a factor of compliance rule are structured as instructions to evaluate the respective factor of compliance rule using a directionality of compliance compatibility calculator.

111. The apparatus of embodiment 101, in which the compliance verification status associated with a factor of compliance rule includes a level of verification score, and in which the dimension compliance score of the dimension of compliance data channel associated with the respective factor of compliance rule is calculated based on the level of verification score.

112. The apparatus of embodiment 101, in which the calculated overall compliance score associated with the entity object is a trending score that includes a value component and a directionality component.

113. The apparatus of embodiment 101, in which the component collection storage is further structured with processor-executable instructions, comprising:

determine, via the at least one processor, that the calculated overall compliance score associated with the entity object is below a specified threshold; and set, via the at least one processor, a suspend flag for the entity object.

114. The apparatus of embodiment 113, in which the calculated overall compliance score associated with the entity object is below the specified threshold due to an individual dimension compliance score below a specified threshold.

115. The apparatus of embodiment 113, in which the setting of the suspend flag initiates a countdown timer, and in which the entity object is disassociated from a participating processor object associated with the entity object upon expiration of the countdown timer.

116. An entity compliance datastructure generator processor-readable, non-transient medium, the medium storing a component collection, the component collection storage structured with processor-executable instructions comprising:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance datastructures to utilize for the entity object;

retrieve, via the at least one processor, a set of previously stored compliance datastructures associated with the entity object and matching the determined range;

verify, via the at least one processor, cryptographic signatures associated with each previously stored compliance datastructure in the retrieved set of previously stored compliance datastructures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance datastructures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object, in which the entity compliance datastructure is structured to specify the calculated overall compliance score;

cryptographically sign, via the at least one processor, the entity compliance datastructure using a private key; and store, via the at least one processor, the cryptographically signed entity compliance datastructure.

117. The medium of embodiment 116, in which the set of compliance monitoring criterion objects is determined based on an entity category identifier associated with the entity object.

118. The medium of embodiment 117, in which the entity category identifier is one of: a business type identifier, a sector identifier, a merchant category code.

119. The medium of embodiment 116, in which the set of compliance monitoring criterion objects includes a set of common compliance monitoring criterion objects, and a set of processor-specific compliance monitoring criterion objects associated with a participating processor object associated with the entity object.

120. The medium of embodiment 116, in which the range of previous compliance datastructures is structured as one of: a date range, a quantity.

121. The medium of embodiment 116, in which the range of previous compliance datastructures is determined based on a compliance review periodicity associated with the entity object.

122. The medium of embodiment 116, in which the range of previous compliance datastructures comprises a range for entity compliance datastructures and a range for transaction compliance datastructures, and in which the retrieved set of previously stored compliance datastructures comprises a set of entity compliance datastructures and a set of transaction compliance datastructures.

123. The medium of embodiment 116, in which the instructions to evaluate a factor of compliance rule are structured as instructions to verify the respective applicable subset of entity assessment data using a verification server.

124. The medium of embodiment 123, in which the verification server is one of: a credit bureau server, a government agency server, a data aggregator server, an Ethereum oracle.

125. The medium of embodiment 116, in which the instructions to evaluate a factor of compliance rule are structured as instructions to evaluate the respective factor of compliance rule using a directionality of compliance compatibility calculator.

126. The medium of embodiment 116, in which the compliance verification status associated with a factor of compliance rule includes a level of verification score, and in which the dimension compliance score of the dimension of compliance data channel associated with the respective factor of compliance rule is calculated based on the level of verification score.

127. The medium of embodiment 116, in which the calculated overall compliance score associated with the entity object is a trending score that includes a value component and a directionality component.

128. The medium of embodiment 116, in which the component collection storage is further structured with processor-executable instructions, comprising:

determine, via the at least one processor, that the calculated overall compliance score associated with the entity object is below a specified threshold; and set, via the at least one processor, a suspend flag for the entity object.

129. The medium of embodiment 128, in which the calculated overall compliance score associated with the entity object is below the specified threshold due to an individual dimension compliance score below a specified threshold.

130. The medium of embodiment 128, in which the setting of the suspend flag initiates a countdown timer, and in which the entity object is disassociated from a participating processor object associated with the entity object upon expiration of the countdown timer.

131. An entity compliance datastructure generator processor-implemented system, comprising:

means to store a component collection;

means to process processor-executable instructions from the component collection, the component collection storage structured with processor-executable instructions including:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance datastructures to utilize for the entity object;

retrieve, via the at least one processor, a set of previously stored compliance datastructures associated with the entity object and matching the determined range;

verify, via the at least one processor, cryptographic signatures associated with each previously stored compliance datastructure in the retrieved set of previously stored compliance datastructures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance datastructures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object, in which the entity compliance datastructure is structured to specify the calculated overall compliance score;

cryptographically sign, via the at least one processor, the entity compliance datastructure using a private key; and store, via the at least one processor, the cryptographically signed entity compliance datastructure.

132. The system of embodiment 131, in which the set of compliance monitoring criterion objects is determined based on an entity category identifier associated with the entity object.

133. The system of embodiment 132, in which the entity category identifier is one of: a business type identifier, a sector identifier, a merchant category code.

134. The system of embodiment 131, in which the set of compliance monitoring criterion objects includes a set of common compliance monitoring criterion objects, and a set of processor-specific compliance monitoring criterion objects associated with a participating processor object associated with the entity object.

135. The system of embodiment 131, in which the range of previous compliance datastructures is structured as one of: a date range, a quantity.

136. The system of embodiment 131, in which the range of previous compliance datastructures is determined based on a compliance review periodicity associated with the entity object.

137. The system of embodiment 131, in which the range of previous compliance datastructures comprises a range for entity compliance datastructures and a range for transaction compliance datastructures, and in which the retrieved set of previously stored compliance datastructures comprises a set of entity compliance datastructures and a set of transaction compliance datastructures.

138. The system of embodiment 131, in which the instructions to evaluate a factor of compliance rule are structured as instructions to verify the respective applicable subset of entity assessment data using a verification server.

139. The system of embodiment 138, in which the verification server is one of: a credit bureau server, a government agency server, a data aggregator server, an Ethereum oracle.

140. The system of embodiment 131, in which the instructions to evaluate a factor of compliance rule are structured as instructions to evaluate the respective factor of compliance rule using a directionality of compliance compatibility calculator.

141. The system of embodiment 131, in which the compliance verification status associated with a factor of compliance rule includes a level of verification score, and in which the dimension compliance score of the dimension of compliance data channel associated with the respective factor of compliance rule is calculated based on the level of verification score.

142. The system of embodiment 131, in which the calculated overall compliance score associated with the entity object is a trending score that includes a value component and a directionality component.

143. The system of embodiment 131, in which the component collection storage is further structured with processor-executable instructions, comprising:

determine, via the at least one processor, that the calculated overall compliance score associated with the entity object is below a specified threshold; and set, via the at least one processor, a suspend flag for the entity object.

144. The system of embodiment 143, in which the calculated overall compliance score associated with the entity object is below the specified threshold due to an individual dimension compliance score below a specified threshold.

145. The system of embodiment 143, in which the setting of the suspend flag initiates a countdown timer, and in which the entity object is disassociated from a participating processor object associated with the entity object upon expiration of the countdown timer.

146. An entity compliance datastructure generator processor-implemented process, including processing processor-executable instructions via at least one processor from a component collection stored in at least one memory, the component collection storage structured with processor-executable instructions comprising:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance datastructures to utilize for the entity object;

retrieve, via the at least one processor, a set of previously stored compliance datastructures associated with the entity object and matching the determined range;

verify, via the at least one processor, cryptographic signatures associated with each previously stored compliance datastructure in the retrieved set of previously stored compliance datastructures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance datastructures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance datastructure for the entity object, in which the entity compliance datastructure is structured to specify the calculated overall compliance score;

cryptographically sign, via the at least one processor, the entity compliance datastructure using a private key; and store, via the at least one processor, the cryptographically signed entity compliance datastructure.

147. The process of embodiment 146, in which the set of compliance monitoring criterion objects is determined based on an entity category identifier associated with the entity object.

148. The process of embodiment 147, in which the entity category identifier is one of: a business type identifier, a sector identifier, a merchant category code.

149. The process of embodiment 146, in which the set of compliance monitoring criterion objects includes a set of common compliance monitoring criterion objects, and a set of processor-specific compliance monitoring criterion objects associated with a participating processor object associated with the entity object.

150. The process of embodiment 146, in which the range of previous compliance datastructures is structured as one of: a date range, a quantity.

151. The process of embodiment 146, in which the range of previous compliance datastructures is determined based on a compliance review periodicity associated with the entity object.

152. The process of embodiment 146, in which the range of previous compliance datastructures comprises a range for entity compliance datastructures and a range for transaction compliance datastructures, and in which the retrieved set of previously stored compliance datastructures comprises a set of entity compliance datastructures and a set of transaction compliance datastructures.

153. The process of embodiment 146, in which the instructions to evaluate a factor of compliance rule are structured as instructions to verify the respective applicable subset of entity assessment data using a verification server.

154. The process of embodiment 153, in which the verification server is one of: a credit bureau server, a government agency server, a data aggregator server, an Ethereum oracle.

155. The process of embodiment 146, in which the instructions to evaluate a factor of compliance rule are structured as instructions to evaluate the respective factor of compliance rule using a directionality of compliance compatibility calculator.

156. The process of embodiment 146, in which the compliance verification status associated with a factor of compliance rule includes a level of verification score, and in which the dimension compliance score of the dimension of compliance data channel associated with the respective factor of compliance rule is calculated based on the level of verification score.

157. The process of embodiment 146, in which the calculated overall compliance score associated with the entity object is a trending score that includes a value component and a directionality component.

158. The process of embodiment 146, in which the component collection storage is further structured with processor-executable instructions, comprising:

determine, via the at least one processor, that the calculated overall compliance score associated with the entity object is below a specified threshold; and set, via the at least one processor, a suspend flag for the entity object.

159. The process of embodiment 158, in which the calculated overall compliance score associated with the entity object is below the specified threshold due to an individual dimension compliance score below a specified threshold.

160. The process of embodiment 158, in which the setting of the suspend flag initiates a countdown timer, and in which the entity object is disassociated from a participating processor object associated with the entity object upon expiration of the countdown timer.

201. A transaction compliance datastructure generator apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, a product order data datastructure corresponding to a transaction associated with an entity object, in which the product order data datastructure is structured to specify a set of product item objects;

determine, via the at least one processor, a set of transaction compliance evaluation criterion objects to utilize for the transaction based on an entity category identifier associated with the entity object, in which each transaction compliance evaluation criterion object is structured to specify a factor of compliance rule that is associated with a dimension of compliance data channel;

retrieve, via the at least one processor, a set of entity intake transaction compliance datastructures associated with the entity object, in which each entity intake transaction compliance datastructure corresponds to a product item object in the set of product item objects;

verify, via the at least one processor, cryptographic signatures associated with each entity intake transaction compliance datastructure in the retrieved set of entity intake transaction compliance datastructures using a public key of each signer;

determine, via the at least one processor, an entity intake transaction compliance score associated with each product item object in the set of product item objects using a corresponding entity intake transaction compliance datastructure for the respective product item object;

obtain, via the at least one processor, a set of authentication data datastructures associated with the transaction, in which the set of authentication data datastructures includes at least one of: a product order initiation authentication data datastructure, a product order handling authentication data datastructure, a product order delivery authentication data datastructure, a product order receipt authentication data datastructure;

evaluate, via the at least one processor, each authentication data datastructure in the set of authentication data datastructures associated with the transaction, using each factor of compliance rule specified in the set of transaction compliance evaluation criterion objects that is applicable to the respective authentication data datastructure, to calculate a dimension compliance score for each dimension of compliance data channel;

calculate, via the at least one processor, an overall transaction compliance score associated with the transaction using the determined entity intake transaction compliance scores and the calculated dimension compliance scores;

generate, via the at least one processor, a transaction compliance datastructure for the entity object for the transaction, in which the transaction compliance datastructure is structured to specify the overall transaction compliance score;

cryptographically sign, via the at least one processor, the transaction compliance datastructure using a private key; and store, via the at least one processor, the cryptographically signed transaction compliance datastructure.

202. The apparatus of embodiment 201, in which a product item object in the set of product item objects is structured to specify a unique identifier of a product item, in which the product item is labeled with the unique identifier.

203. The apparatus of embodiment 202, in which the product item is labeled with the unique identifier using one of: a serial number, a linear barcode, a matrix barcode, an RFID tag, an NFC tag, a Bluetooth tracker.

204. The apparatus of embodiment 202, in which the product item object is structured to specify at least one of: a production timestamp associated with the product item, a production location associated with the product item, a cryptographic signature of the product item's producer.

205. The apparatus of embodiment 201, in which the set of transaction compliance evaluation criterion objects includes a set of common transaction compliance evaluation criterion objects, and a set of processor-specific transaction compliance evaluation criterion objects associated with a participating processor object associated with the entity object.

206. The apparatus of embodiment 201, in which the entity category identifier is one of: a business type identifier, a sector identifier, a merchant category code.

207. The apparatus of embodiment 201, in which the set of transaction compliance evaluation criterion objects to utilize for the transaction is determined also based on a transaction type associated with the transaction.

208. The apparatus of embodiment 207, in which a transaction type is one of: a product purchase transaction, a product lease transaction, a product return transaction, a product exchange transaction.

209. The apparatus of embodiment 201, in which an entity intake transaction compliance score associated with a product item object is determined as an overall compliance score associated with a retrieved entity intake transaction compliance datastructure corresponding to the product item object.

210. The apparatus of embodiment 209, in which the entity intake transaction compliance score associated with the product item object is adjusted based on overall compliance scores of intake transaction participants.

211. The apparatus of embodiment 201, in which the product order initiation authentication data datastructure is structured to include authentication data associated with a customer object at the time the transaction was initiated.

212. The apparatus of embodiment 201, in which the product order handling authentication data datastructure is structured to include authentication data associated with an employee object, associated with the entity object, at the time a product item corresponding to a product item object in the set of product item objects was handled.

213. The apparatus of embodiment 201, in which the product order delivery authentication data datastructure is structured to include authentication data associated with a carrier object at the time a product item corresponding to a product item object in the set of product item objects was picked up.

214. The apparatus of embodiment 201, in which the product order receipt authentication data datastructure is structured to include authentication data associated with a customer object at the time a product item corresponding to a product item object in the set of product item objects was received.

215. The apparatus of embodiment 201, in which the transaction compliance datastructure is structured in a common data format that facilitates secure sharing of compliance data.

216. A transaction compliance datastructure generator processor-readable, non-transient medium, the medium storing a component collection, the component collection storage structured with processor-executable instructions comprising:

obtain, via the at least one processor, a product order data datastructure corresponding to a transaction associated with an entity object, in which the product order data datastructure is structured to specify a set of product item objects;

determine, via the at least one processor, a set of transaction compliance evaluation criterion objects to utilize for the transaction based on an entity category identifier associated with the entity object, in which each transaction compliance evaluation criterion object is structured to specify a factor of compliance rule that is associated with a dimension of compliance data channel;

retrieve, via the at least one processor, a set of entity intake transaction compliance datastructures associated with the entity object, in which each entity intake transaction compliance datastructure corresponds to a product item object in the set of product item objects;

verify, via the at least one processor, cryptographic signatures associated with each entity intake transaction compliance datastructure in the retrieved set of entity intake transaction compliance datastructures using a public key of each signer;

determine, via the at least one processor, an entity intake transaction compliance score associated with each product item object in the set of product item objects using a corresponding entity intake transaction compliance datastructure for the respective product item object;

obtain, via the at least one processor, a set of authentication data datastructures associated with the transaction, in which the set of authentication data datastructures includes at least one of: a product order initiation authentication data datastructure, a product order handling authentication data datastructure, a product order delivery authentication data datastructure, a product order receipt authentication data datastructure;

evaluate, via the at least one processor, each authentication data datastructure in the set of authentication data datastructures associated with the transaction, using each factor of compliance rule specified in the set of transaction compliance evaluation criterion objects that is applicable to the respective authentication data datastructure, to calculate a dimension compliance score for each dimension of compliance data channel;

calculate, via the at least one processor, an overall transaction compliance score associated with the transaction using the determined entity intake transaction compliance scores and the calculated dimension compliance scores;

generate, via the at least one processor, a transaction compliance datastructure for the entity object for the transaction, in which the transaction compliance datastructure is structured to specify the overall transaction compliance score;

cryptographically sign, via the at least one processor, the transaction compliance datastructure using a private key; and store, via the at least one processor, the cryptographically signed transaction compliance datastructure.

217. The medium of embodiment 216, in which a product item object in the set of product item objects is structured to specify a unique identifier of a product item, in which the product item is labeled with the unique identifier.

218. The medium of embodiment 217, in which the product item is labeled with the unique identifier using one of: a serial number, a linear barcode, a matrix barcode, an RFID tag, an NFC tag, a Bluetooth tracker.

219. The medium of embodiment 217, in which the product item object is structured to specify at least one of: a production timestamp associated with the product item, a production location associated with the product item, a cryptographic signature of the product item's producer.

220. The medium of embodiment 216, in which the set of transaction compliance evaluation criterion objects includes a set of common transaction compliance evaluation criterion objects, and a set of processor-specific transaction compliance evaluation criterion objects associated with a participating processor object associated with the entity object.

221. The medium of embodiment 216, in which the entity category identifier is one of: a business type identifier, a sector identifier, a merchant category code.

222. The medium of embodiment 216, in which the set of transaction compliance evaluation criterion objects to utilize for the transaction is determined also based on a transaction type associated with the transaction.

223. The medium of embodiment 222, in which a transaction type is one of: a product purchase transaction, a product lease transaction, a product return transaction, a product exchange transaction.

224. The medium of embodiment 216, in which an entity intake transaction compliance score associated with a product item object is determined as an overall compliance score associated with a retrieved entity intake transaction compliance datastructure corresponding to the product item object.

225. The medium of embodiment 224, in which the entity intake transaction compliance score associated with the product item object is adjusted based on overall compliance scores of intake transaction participants.

226. The medium of embodiment 216, in which the product order initiation authentication data datastructure is structured to include authentication data associated with a customer object at the time the transaction was initiated.

227. The medium of embodiment 216, in which the product order handling authentication data datastructure is structured to include authentication data associated with an employee object, associated with the entity object, at the time a product item corresponding to a product item object in the set of product item objects was handled.

228. The medium of embodiment 216, in which the product order delivery authentication data datastructure is structured to include authentication data associated with a carrier object at the time a product item corresponding to a product item object in the set of product item objects was picked up.

229. The medium of embodiment 216, in which the product order receipt authentication data datastructure is structured to include authentication data associated with a customer object at the time a product item corresponding to a product item object in the set of product item objects was received.

230. The medium of embodiment 216, in which the transaction compliance datastructure is structured in a common data format that facilitates secure sharing of compliance data.

231. A transaction compliance datastructure generator processor-implemented system, comprising: means to store a component collection;

means to process processor-executable instructions from the component collection, the component collection storage structured with processor-executable instructions including:

obtain, via the at least one processor, a product order data datastructure corresponding to a transaction associated with an entity object, in which the product order data datastructure is structured to specify a set of product item objects;

determine, via the at least one processor, a set of transaction compliance evaluation criterion objects to utilize for the transaction based on an entity category identifier associated with the entity object, in which each transaction compliance evaluation criterion object is structured to specify a factor of compliance rule that is associated with a dimension of compliance data channel;

retrieve, via the at least one processor, a set of entity intake transaction compliance datastructures associated with the entity object, in which each entity intake transaction compliance datastructure corresponds to a product item object in the set of product item objects;

verify, via the at least one processor, cryptographic signatures associated with each entity intake transaction compliance datastructure in the retrieved set of entity intake transaction compliance datastructures using a public key of each signer;

determine, via the at least one processor, an entity intake transaction compliance score associated with each product item object in the set of product item objects using a corresponding entity intake transaction compliance datastructure for the respective product item object;

obtain, via the at least one processor, a set of authentication data datastructures associated with the transaction, in which the set of authentication data datastructures includes at least one of: a product order initiation authentication data datastructure, a product order handling authentication data datastructure, a product order delivery authentication data datastructure, a product order receipt authentication data datastructure;

evaluate, via the at least one processor, each authentication data datastructure in the set of authentication data datastructures associated with the transaction, using each factor of compliance rule specified in the set of transaction compliance evaluation criterion objects that is applicable to the respective authentication data datastructure, to calculate a dimension compliance score for each dimension of compliance data channel;

calculate, via the at least one processor, an overall transaction compliance score associated with the transaction using the determined entity intake transaction compliance scores and the calculated dimension compliance scores;

generate, via the at least one processor, a transaction compliance datastructure for the entity object for the transaction, in which the transaction compliance datastructure is structured to specify the overall transaction compliance score;

cryptographically sign, via the at least one processor, the transaction compliance datastructure using a private key; and store, via the at least one processor, the cryptographically signed transaction compliance datastructure.

232. The system of embodiment 231, in which a product item object in the set of product item objects is structured to specify a unique identifier of a product item, in which the product item is labeled with the unique identifier.

233. The system of embodiment 232, in which the product item is labeled with the unique identifier using one of: a serial number, a linear barcode, a matrix barcode, an RFID tag, an NFC tag, a Bluetooth tracker.

234. The system of embodiment 232, in which the product item object is structured to specify at least one of: a production timestamp associated with the product item, a production location associated with the product item, a cryptographic signature of the product item's producer.

235. The system of embodiment 231, in which the set of transaction compliance evaluation criterion objects includes a set of common transaction compliance evaluation criterion objects, and a set of processor-specific transaction compliance evaluation criterion objects associated with a participating processor object associated with the entity object.

236. The system of embodiment 231, in which the entity category identifier is one of: a business type identifier, a sector identifier, a merchant category code.

237. The system of embodiment 231, in which the set of transaction compliance evaluation criterion objects to utilize for the transaction is determined also based on a transaction type associated with the transaction.

238. The system of embodiment 237, in which a transaction type is one of: a product purchase transaction, a product lease transaction, a product return transaction, a product exchange transaction.

239. The system of embodiment 231, in which an entity intake transaction compliance score associated with a product item object is determined as an overall compliance score associated with a retrieved entity intake transaction compliance datastructure corresponding to the product item object.

240. The system of embodiment 239, in which the entity intake transaction compliance score associated with the product item object is adjusted based on overall compliance scores of intake transaction participants.

241. The system of embodiment 231, in which the product order initiation authentication data datastructure is structured to include authentication data associated with a customer object at the time the transaction was initiated.

242. The system of embodiment 231, in which the product order handling authentication data datastructure is structured to include authentication data associated with an employee object, associated with the entity object, at the time a product item corresponding to a product item object in the set of product item objects was handled.

243. The system of embodiment 231, in which the product order delivery authentication data datastructure is structured to include authentication data associated with a carrier object at the time a product item corresponding to a product item object in the set of product item objects was picked up.

244. The system of embodiment 231, in which the product order receipt authentication data datastructure is structured to include authentication data associated with a customer object at the time a product item corresponding to a product item object in the set of product item objects was received.

245. The system of embodiment 231, in which the transaction compliance datastructure is structured in a common data format that facilitates secure sharing of compliance data.

246. A transaction compliance datastructure generator processor-implemented process, including processing processor-executable instructions via at least one processor from a component collection stored in at least one memory, the component collection storage structured with processor-executable instructions comprising:

obtain, via the at least one processor, a product order data datastructure corresponding to a transaction associated with an entity object, in which the product order data datastructure is structured to specify a set of product item objects;

determine, via the at least one processor, a set of transaction compliance evaluation criterion objects to utilize for the transaction based on an entity category identifier associated with the entity object, in which each transaction compliance evaluation criterion object is structured to specify a factor of compliance rule that is associated with a dimension of compliance data channel;

retrieve, via the at least one processor, a set of entity intake transaction compliance datastructures associated with the entity object, in which each entity intake transaction compliance datastructure corresponds to a product item object in the set of product item objects;

verify, via the at least one processor, cryptographic signatures associated with each entity intake transaction compliance datastructure in the retrieved set of entity intake transaction compliance datastructures using a public key of each signer;

determine, via the at least one processor, an entity intake transaction compliance score associated with each product item object in the set of product item objects using a corresponding entity intake transaction compliance datastructure for the respective product item object;

obtain, via the at least one processor, a set of authentication data datastructures associated with the transaction, in which the set of authentication data datastructures includes at least one of: a product order initiation authentication data datastructure, a product order handling authentication data datastructure, a product order delivery authentication data datastructure, a product order receipt authentication data datastructure;

evaluate, via the at least one processor, each authentication data datastructure in the set of authentication data datastructures associated with the transaction, using each factor of compliance rule specified in the set of transaction compliance evaluation criterion objects that is applicable to the respective authentication data datastructure, to calculate a dimension compliance score for each dimension of compliance data channel;

calculate, via the at least one processor, an overall transaction compliance score associated with the transaction using the determined entity intake transaction compliance scores and the calculated dimension compliance scores;

generate, via the at least one processor, a transaction compliance datastructure for the entity object for the transaction, in which the transaction compliance datastructure is structured to specify the overall transaction compliance score;

cryptographically sign, via the at least one processor, the transaction compliance datastructure using a private key; and store, via the at least one processor, the cryptographically signed transaction compliance datastructure.

247. The process of embodiment 246, in which a product item object in the set of product item objects is structured to specify a unique identifier of a product item, in which the product item is labeled with the unique identifier.

248. The process of embodiment 247, in which the product item is labeled with the unique identifier using one of: a serial number, a linear barcode, a matrix barcode, an RFID tag, an NFC tag, a Bluetooth tracker.

249. The process of embodiment 247, in which the product item object is structured to specify at least one of: a production timestamp associated with the product item, a production location associated with the product item, a cryptographic signature of the product item's producer.

250. The process of embodiment 246, in which the set of transaction compliance evaluation criterion objects includes a set of common transaction compliance evaluation criterion objects, and a set of processor-specific transaction compliance evaluation criterion objects associated with a participating processor object associated with the entity object.

251. The process of embodiment 246, in which the entity category identifier is one of: a business type identifier, a sector identifier, a merchant category code.

252. The process of embodiment 246, in which the set of transaction compliance evaluation criterion objects to utilize for the transaction is determined also based on a transaction type associated with the transaction.

253. The process of embodiment 252, in which a transaction type is one of: a product purchase transaction, a product lease transaction, a product return transaction, a product exchange transaction.

254. The process of embodiment 246, in which an entity intake transaction compliance score associated with a product item object is determined as an overall compliance score associated with a retrieved entity intake transaction compliance datastructure corresponding to the product item object.

255. The process of embodiment 254, in which the entity intake transaction compliance score associated with the product item object is adjusted based on overall compliance scores of intake transaction participants.

256. The process of embodiment 246, in which the product order initiation authentication data datastructure is structured to include authentication data associated with a customer object at the time the transaction was initiated.

257. The process of embodiment 246, in which the product order handling authentication data datastructure is structured to include authentication data associated with an employee object, associated with the entity object, at the time a product item corresponding to a product item object in the set of product item objects was handled.

258. The process of embodiment 246, in which the product order delivery authentication data datastructure is structured to include authentication data associated with a carrier object at the time a product item corresponding to a product item object in the set of product item objects was picked up.

259. The process of embodiment 246, in which the product order receipt authentication data datastructure is structured to include authentication data associated with a customer object at the time a product item corresponding to a product item object in the set of product item objects was received.

260. The process of embodiment 246, in which the transaction compliance datastructure is structured in a common data format that facilitates secure sharing of compliance data.

CCTM Controller

FIG. 25 shows a block diagram illustrating non-limiting, example embodiments of a CCTM controller. In this embodiment, the CCTM controller 2501 may serve to aggregate, process, store, search, serve, identify, instruct, generate, match, and/or facilitate interactions with a computer through inventory tracking technologies, and/or other related data.

Users, which may be people and/or other systems, may engage information technology systems (e.g., computers) to facilitate information processing. In turn, computers employ processors to process information; such processors 2503 may be referred to as central processing units (CPU). One form of processor is referred to as a microprocessor. CPUs use communicative circuits to pass binary encoded signals acting as instructions to allow various operations. These instructions may be operational and/or data instructions containing and/or referencing other instructions and data in various processor accessible and operable areas of memory 2529 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the CCTM controller 2501 may be connected to and/or communicate with entities such as, but not limited to: one or more users from peripheral devices 2512 (e.g., user input devices 2511); an optional cryptographic processor device 2528; and/or a communications network 2513.

Networks comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is referred to as a "node." Networks are generally thought to facilitate the transfer of information from source points to destinations. A node specifically tasked with furthering the passage of information from a source to a destination is called a "router." There are many forms of networks such as Local Area Networks (LANs), Pico networks, Wide Area Networks (WANs), Wireless Networks (WLANs), etc. For example, the Internet is, generally, an interconnection of a multitude of networks whereby remote clients and servers may access and interoperate with one another.

The CCTM controller 2501 may be based on computer systems that may comprise, but are not limited to, components such as: a computer systemization 2502 connected to memory 2529.

Computer Systemization

A computer systemization 2502 may comprise a clock 2530, central processing unit ("CPU(s)" and/or "processor(s)" (these terms are used interchangeably throughout the disclosure unless noted to the contrary)) 2503, a memory 2529 (e.g., a read only memory (ROM) 2506, a random access memory (RAM) 2505, etc.), and/or an interface bus 2507, and most frequently, although not necessarily, are all interconnected and/or communicating through a system bus 2504 on one or more (mother)board(s) 2502 having conductive and/or otherwise transportive circuit pathways through which instructions (e.g., binary encoded signals) may travel to effectuate communications, operations, storage, etc. The computer systemization may be connected to a power source 2586; e.g., optionally the power source may be internal. Optionally, a cryptographic processor 2526 may be connected to the system bus. In another embodiment, the cryptographic processor, transceivers (e.g., ICs) 2574, and/or sensor array (e.g., accelerometer, altimeter, ambient light, barometer, global positioning system (GPS) (thereby allowing CCTM controller to determine its location), gyroscope, magnetometer, pedometer, proximity, ultra-violet sensor, etc.) 2573 may be connected as either internal and/or external peripheral devices 2512 via the interface bus I/O 2508 (not pictured) and/or directly via the interface bus 2507. In turn, the transceivers may be connected to antenna(s) 2575, thereby effectuating wireless transmission and reception of various communication and/or sensor protocols; for example the antenna(s) may connect to various transceiver chipsets (depending on deployment needs), including: Broadcom® BCM4329FKUBG transceiver chip (e.g., providing 802.11n, Bluetooth 2.1+EDR, FM, etc.); a Broadcom® BCM4752 GPS receiver with accelerometer, altimeter, GPS, gyroscope, magnetometer; a Broadcom® BCM4335 transceiver chip (e.g., providing 2G, 3G, and 4G long-term evolution (LTE) cellular communications; 802.11ac, Bluetooth 4.0 low energy (LE) (e.g., beacon features)); a Broadcom® BCM43341 transceiver chip (e.g., providing 2G, 3G and 4G LTE cellular communications; 802.11g/, Bluetooth 4.0, near field communication (NFC), FM radio); an Infineon Technologies® X-Gold 618-PMB9800 transceiver chip (e.g., providing 2G/3G HSDPA/HSUPA communications); a MediaTek® MT6620 transceiver chip (e.g., providing 802.11a/ac/b/g/n (also known as WiFi in numerous iterations), Bluetooth 4.0 LE, FM, GPS; a Lapis Semiconductor® ML.8511 UV sensor; a maxim integrated MAX44000 ambient light and infrared proximity sensor; a Texas Instruments® WiLink WL1283 transceiver chip (e.g., providing 802.11n, Bluetooth 3.0, FM, GPS); and/or the like. The system clock may have a crystal oscillator and generates a base signal through the computer systemization's circuit pathways. The clock may be coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large supercomputer(s) and mainframe(s) computers, down to mini computers, servers, desktop computers, laptops, thin clients (e.g., Chromebooks®), netbooks, tablets (e.g., Android®, iPads®, and Windows® tablets, etc.), mobile smartphones (e.g., Android®, iPhones®, Nokia®, Palm® and Windows® phones, etc.), wearable device(s) (e.g., headsets (e.g., Apple AirPods (Pro)®, glasses, goggles (e.g., Google Glass®), watches, etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2529 beyond the processor itself; internal memory may include, but is not limited to: fast registers, various levels of cache memory (e.g., level 1, 2, 3, etc.), (dynamic/static) RAM, solid state memory, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon®, Duron® and/or Opteron®; Apple's® A series of processors (e.g., A5, A6, A7, A8, etc.); ARM's® application, embedded and secure processors; IBM® and/or Motorola's DragonBall® and PowerPCR; IBM's® and Sony's® Cell processor; Intel's® 80X86 series (e.g., 80386, 80486), Pentium®, Celeron®, Core (2) Duo®, i series (e.g., i3, i5, 17, 19, etc.), Itanium®, Xeon®, and/or XScale®; Motorola's® 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code), e.g., via load/read address commands; e.g., the CPU may read processor issuable instructions from memory (e.g., reading it from a component collection (e.g., an interpreted and/or compiled program application/library including allowing the processor to execute instructions from the application/library) stored in the memory). Such instruction passing facilitates communication within the CCTM controller and beyond through various interfaces. Should processing requirements dictate a greater amount speed and/or capacity, distributed processors (e.g., see Distributed CCTM below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the CCTM may be achieved by implementing a microcontroller such as CAST's® R8051XC2 microcontroller; Intel's® MCS 51 (i.e., 8051 microcontroller); and/or the like. Also, to implement certain features of the CCTM, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the CCTM component collection (distributed or otherwise) and/or features may be implemented via the microprocessor and/or via embedded components; e.g., via ASIC, coprocessor, DSP, FPGA, and/or the like. Alternately, some implementations of the CCTM may be implemented with embedded components that are configured and used to achieve a variety of features or signal processing.

Depending on the particular implementation, the embedded components may include software solutions, hardware solutions, and/or some combination of both hardware/software solutions. For example, CCTM features discussed herein may be achieved through implementing FPGAs, which are a semiconductor devices containing programmable logic components called "logic blocks", and programmable interconnects, such as the high performance FPGA Virtex® series and/or the low cost Spartan® series manufactured by Xilinx®. Logic blocks and interconnects can be programmed by the customer or designer, after the FPGA is manufactured, to implement any of the CCTM features. A hierarchy of programmable interconnects allow logic blocks to be interconnected as needed by the CCTM system designer/administrator, somewhat like a one-chip programmable breadboard. An FPGA's logic blocks can be programmed to perform the operation of basic logic gates such as AND, and NOR, or more complex combinational operators such as decoders or mathematical operations. In most FPGAs, the logic blocks also include memory elements, which may be circuit flip-flops or more complete blocks of memory. In some circumstances, the CCTM may be developed on FPGAs and then migrated into a fixed version that more resembles ASIC implementations. Alternate or coordinating implementations may migrate CCTM controller features to a final ASIC instead of or in addition to FPGAs. Depending on the implementation all of the aforementioned embedded components and microprocessors may be considered the "CPU" and/or "processor" for the CCTM.

Power Source

The power source 2586 may be of any various form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2586 is connected to at least one of the interconnected subsequent components of the CCTM thereby providing an electric current to all subsequent components. In one example, the power source 2586 is connected to the system bus component 2504. In an alternative embodiment, an outside power source 2586 is provided through a connection across the I/O) 2508 interface. For example, Ethernet (with power on Ethernet), IEEE 1394, USB and/or the like connections carry both data and power across the connection and is therefore a suitable source of power.

Interface Adapters

Interface bus(ses) 2507 may accept, connect, and/or communicate to a number of interface adapters, variously although not necessarily in the form of adapter cards, such as but not limited to: input output interfaces (I/O)) 2508, storage interfaces 2509, network interfaces 2510, and/or the like. Optionally, cryptographic processor interfaces 2527 similarly may be connected to the interface bus. The interface bus provides for the communications of interface adapters with one another as well as with other components of the computer systemization. Interface adapters are adapted for a compatible interface bus. Interface adapters variously connect to the interface bus via a slot architecture. Various slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2509 may accept, communicate, and/or connect to a number of storage devices such as, but not limited to: (removable) storage devices 2514, removable disc devices, and/or the like. Storage interfaces may employ connection protocols such as, but not limited to: (Ultra) (Serial) Advanced Technology Attachment (Packet Interface) ((Ultra) (Serial) ATA(PI), (Enhanced) Integrated Drive Electronics ((E)IDE), Institute of Electrical and Electronics Engineers (IEEE) 1394, fiber channel, Non-Volatile Memory (NVM) Express (NVMe), Small Computer Systems Interface (SCSI), Thunderbolt, Universal Serial Bus (USB), and/or the like.

Network interfaces 2510 may accept, communicate, and/or connect to a communications network 2513. Through a communications network 2513, the CCTM controller is accessible through remote clients **2533*b* (e.g., computers with web browsers) by users 2533*a*. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed CCTM below), architectures may similarly be employed to pool, load balance, and/or otherwise decrease/increase the communicative bandwidth required by the CCTM controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2510 may be used to engage with various communications network types 2513**. For example, multiple network interfaces may be employed to allow for the communication over broadcast, multicast, and/or unicast networks.

Input Output interfaces (I/O)) 2508 may accept, communicate, and/or connect to user, peripheral devices 2512 (e.g., input devices 2511), cryptographic processor devices 2528, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, Thunderbolt/USB-C, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One output device may include a video display, which may comprise a Cathode Ray Tube (CRT), Liquid Crystal Display (LCD), Light-Emitting Diode (LED), Organic Light-Emitting Diode (OLED), and/or the like based monitor with an interface (e.g., HDMI circuitry and cable) that accepts signals from a video interface, may be used. The video interface composites information generated by a computer systemization and generates video signals based on the composited information in a video memory frame. Another output device is a television set, which accepts signals from a video interface. The video interface provides the composited video information through a video connection interface that accepts a video display interface (e.g., an RCA composite video connector accepting an RCA composite video cable; a DVI connector accepting a DVI display cable, etc.).

Peripheral devices 2512 may be connected and/or communicate to I/O) and/or other facilities of the like such as network interfaces, storage interfaces, directly to the interface bus, system bus, the CPU, and/or the like. Peripheral devices may be external, internal and/or part of the CCTM controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection ensuring secure transactions with a digital signature, as connection/format adaptors, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2511 often are a type of peripheral device 512 (see above) and may include: accelerometers, cameras, card readers, dongles, finger print readers, gloves, graphics tablets, joysticks, keyboards, microphones, mouse (mice), remote controls, security/biometric devices (e.g., facial identifiers, fingerprint reader, iris reader, retina reader, etc.), styluses, touch screens (e.g., capacitive, resistive, etc.), trackballs, trackpads, watches, and/or the like.

It should be noted that although user input devices and peripheral devices may be employed, the CCTM controller may be embodied as an embedded, dedicated, and/or monitor-less (i.e., headless) device, and access may be provided over a network interface connection.

Cryptographic units such as, but not limited to, microcontrollers, processors 2526, interfaces 2527, and/or devices 2528 may be attached, and/or communicate with the CCTM controller. A MC68HC16 microcontroller, manufactured by Motorola, Inc.®, may be used for and/or within cryptographic units. The MC68HC16 microcontroller utilizes a 16-bit multiply-and-accumulate instruction in the 16 MHz configuration and requires less than one second to perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other specialized cryptographic processors include: Broadcom's® Crypto NetX and other Security Processors; nCipher's® nShield; Safe Net's® Luna PCI (e.g., 7100) series; Semaphore Communications® 40 MHz Roadrunner 184; Sun's® Cryptographic Accelerators (e.g., Accelerator 6000 PCIe Board, Accelerator 500 Daughtercard); Via Nano® Processor (e.g., L2100, L.2200, U2400) line, which is capable of performing 500+MB/s of cryptographic instructions; VLSI Technology's® 33 MHz 6868; and/or the like.

Memory

Generally, any mechanization and/or embodiment allowing a processor to affect the storage and/or retrieval of information is regarded as memory 2529. The storing of information in memory may result in a physical alteration of the memory to have a different physical state that makes the memory a structure with a unique encoding of the memory stored therein. Often, memory is a fungible technology and resource, thus, any number of memory embodiments may be employed in lieu of or in concert with one another. It is to be understood that the CCTM controller and/or a computer systemization may employ various forms of memory 2529. For example, a computer systemization may be configured to have the operation of on-chip CPU memory (e.g., registers), RAM, ROM, and any other storage devices performed by a paper punch tape or paper punch card mechanism; however, such an embodiment would result in an extremely slow rate of operation. In one configuration, memory 2529 will include ROM 2506, RAM 2505, and a storage device 2514. A storage device 2514 may be any various computer system storage. Storage devices may include: an array of devices (e.g., Redundant Array of Independent Disks (RAID)); a cache memory, a drum; a (fixed and/or removable) magnetic disk drive; a magneto-optical drive; an optical drive (i.e., Blueray, CD ROM/RAM/Recordable (R)/ReWritable (RW), DVD R/RW, HD DVD R/RW etc.); RAN drives; register memory (e.g., in a CPU), solid state memory devices (USB memory, solid state drives (SSD), etc.); other processor-readable storage mediums; and/or other devices of the like. Thus, a computer systemization generally employs and makes use of memory.

Component Collection

The memory 2529 may contain a collection of processor-executable application/library/program and/or database components (e.g., including processor-executable instructions) and/or data such as, but not limited to: operating system component(s) 2515 (operating system); information server component(s) 2516 (information server); user interface component(s) 2517 (user interface); Web browser component(s) 2518 (Web browser); database(s) 2519; mail server component(s) 2521; mail client component(s) 2522; cryptographic server component(s) 2520 (cryptographic server); machine learning component 2523; the CCTM component(s) 2535 (e.g., which may include ECVO, ECM, TCE 2541-2543, and/or the like components); and/or the like (i.e., collectively referred to throughout as a "component collection"). These components may be stored and accessed from the storage devices and/or from storage devices accessible through an interface bus. Although unconventional program components such as those in the component collection may be stored in a local storage device 2514, they may also be loaded and/or stored in memory such as: cache, peripheral devices, processor registers, RAM, remote storage facilities through a communications network, ROM, various forms of memory, and/or the like.

Operating System

The operating system component 2515 is an executable program component facilitating the operation of the CCTM controller. The operating system may facilitate access of I/O, network interfaces, peripheral devices, storage devices, and/or the like. The operating system may be a highly fault tolerant, scalable, and secure system such as: Apple's Macintosh OS X (Server) and macOS®; AT&T Plan 9®; Be OS®; Blackberry's QNX®; Google's Chrome®; Microsoft's Windows® 7/8/10; Unix and Unix-like system distributions (such as AT&T's UNIX®; Berkley Software Distribution (BSD)® variations such as FreeBSD®, NetBSD, OpenBSD, and/or the like; Linux distributions such as Red Hat, Ubuntu, and/or the like); and/or the like operating systems. However, more limited and/or less secure operating systems also may be employed such as Apple Macintosh OS® (i.e., versions 1-9), IBM OS/2®, Microsoft DOS®, Microsoft Windows 2000/2003/3.1/95/98/CE/Millennium/Mobile/NT/Vista/XP/7/X (Server)®, Palm OS®, and/or the like. Additionally, for robust mobile deployment applications, mobile operating systems may be used, such as: Apple's iOS®; China Operating System COS®; Google's Android®; Microsoft Windows RT/Phone®; Palm's WebOS®; Samsung/Intel's Tizen®; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may facilitate the interaction with communications networks, data, I/O, peripheral devices, program components, memory, user input devices, and/or the like. The operating system may provide communications protocols that allow the CCTM controller to communicate with other entities through a communications network 2513. Various communication protocols may be used by the CCTM controller as a subcarrier transport mechanism for interaction, such as, but not limited to: multicast, TCP/IP, UDP, unicast, and/or the like.

Information Server

An information server component 2516 is a stored program component that is executed by a CPU. The information server may be an Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, Ruby, wireless application protocol (WAP), WebObjects®, and/or the like. The information server may support secure communications protocols such as, but not limited to, File Transfer Protocol (FTP(S)); Hyper Text Transfer Protocol (HTTP); Secure Hypertext Transfer Protocol (HTTPS), Secure Socket Layer (SSL) Transport Layer Security (TLS), messaging protocols (e.g., America Online (AOL) Instant Messenger (AIM)®, Application Exchange (APEX), ICQ, Internet Relay Chat (IRC), Microsoft Network (MSN) Messenger® Service, Presence and Instant Messaging Protocol (PRIM), Internet Engineering Task Force's® (IETF's) Session Initiation Protocol (SIP), SIP for Instant Messaging and Presence Leveraging Extensions (SIMPLE), Slack®, open XML-based Extensible Messaging and Presence Protocol (XMPP) (i.e., Jabber® or Open Mobile Alliance's (OMA's) Instant Messaging and Presence Service (IMPS)), Yahoo! Instant Messenger® Service, and/or the like). The information server may provide results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the CCTM controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the CCTM database 2519, operating systems, other program components, user interfaces, Web browsers, and/or the like.

Access to the CCTM database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the CCTM. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in SQL by instantiating a search string with the proper join/select commands based on the tagged text entries, and the resulting command is provided over the bridge mechanism to the CCTM as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as buttons, check boxes, cursors, graphical views, menus, scrollers, text fields, and windows (collectively referred to as widgets) similarly facilitate the access, capabilities, operation, and display of data and computer hardware and operating system resources, and status. Operation interfaces are called user interfaces. Graphical user interfaces (GUIs) such as the Apple's iOS®, Macintosh Operating System's Aqua®; IBM's OS/2®; Google's Chrome® (e.g., and other webbrowser/cloud based client OSs); Microsoft's Windows® 2000/2003/3.1/95/98/CE/Millennium/Mobile/NT/Vista/XP/7/X (Server)® (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface®, and/or the like, any of which may be used and) provide a baseline and mechanism of accessing and displaying information graphically to users.

A user interface component 2517 is a stored program component that is executed by a CPU. The user interface may be a graphic user interface as provided by, with, and/or atop operating systems and/or operating environments, and may provide executable library APIs (as may operating systems and the numerous other components noted in the component collection) that allow instruction calls to generate user interface elements such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2518 is a stored program component that is executed by a CPU. The Web browser may be a hypertext viewing application such as Apple's (mobile) Safari®, Google's Chrome®, Microsoft Internet Explorer®, Mozilla's Firefox®, Netscape Navigator®, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox®, Safari® Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the CCTM enabled nodes. The combined application may be nugatory on systems employing Web browsers.

Mail Server

A mail server component 2521 is a stored program component that is executed by a CPU 2503. The mail server may be an Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects®, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the CCTM. Alternatively, the mail server component may be distributed out to mail service providing entities such as Google's® cloud services (e.g., Gmail and notifications may alternatively be provided via messenger services such as AOL's Instant Messenger®, Apple's iMessage®, Google Messenger®, SnapChat®, etc.).

Access to the CCTM mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2522 is a stored program component that is executed by a CPU 2503. The mail client may be a mail viewing application such as Apple Mail®, Microsoft Entourage®, Microsoft Outlook®, Microsoft Outlook Express®, Mozilla®, Thunderbird®, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2520 is a stored program component that is executed by a CPU 2503, cryptographic processor 2526, cryptographic processor interface 2527, cryptographic processor device 2528, and/or the like. Cryptographic processor interfaces will allow for expedition of encryption and/or decryption requests by the cryptographic component; however, the cryptographic component, alternatively, may run on a CPU and/or GPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., N.509 authentication framework), digital signatures, dual signatures, enveloping, password access protection, public key management, and/or the like. The cryptographic component facilitates numerous (encryption and/or decryption) security protocols such as, but not limited to: checksum, Data Encryption Standard (DES), Elliptical Curve Encryption (ECC), International Data Encryption Algorithm (IDEA), Message Digest 5 (MID5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (ILS), and/or the like. Employing such encryption security protocols, the CCTM may encrypt all incoming and/or outgoing communications and may serve as node within a virtual private network (VPN) with a wider communications network. The cryptographic component facilitates the process of "security authorization" whereby access to a resource is inhibited by a security protocol and the cryptographic component effects authorized access to the secured resource. In addition, the cryptographic component may provide unique identifiers of content, e.g., employing an MD5 hash to obtain a unique signature for a digital audio file. A cryptographic component may communicate to and/or with other components in a component collection, including itself, and/or facilities of the like. The cryptographic component supports encryption schemes allowing for the secure transmission of information across a communications network to allow the CCTM component to engage in secure transactions if so desired. The cryptographic component facilitates the secure accessing of resources on the CCTM and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

Machine Learning (ML)

In one non limiting embodiment, the CCTM includes a machine learning component 2523, which may be a stored program component that is executed by a CPU 2503. The machine learning component, alternatively, may run on a set of specialized processors, ASICs, FPGAs, GPU's, and/or the like. The machine learning component may be deployed to execute serially, in parallel, distributed, and/or the like, such as by utilizing cloud computing. The machine learning component may employ an MI, platform such as Amazon Sage.Maker, Azure Machine Learning, DataRobot AI Cloud, Google AI Platform, IBM Watson® Studio, and/or the like. The machine learning component may be implemented using an MI, framework such as PyTorch, Apache MANet, MathWorks Deep Learning Toolbox, scikit-learn, TensorFlow, XGBoost, and/or the like. The machine learning component facilitates training and/or testing of ML prediction logic data structures (e.g., models) and/or utilizing MI, prediction logic data structures (e.g., models) to output ML, predictions by the CCTM. The machine learning component may employ learning mechanisms such as Reinforcement Learning, Supervised Learning, Unsupervised Learning, and/or the like. The machine learning component may employ ML prediction logic data structure (e.g., model) types such as Bayesian Networks, Classification prediction logic data structures (e.g., models), Decision Trees, Neural Networks (NNs), Regression prediction logic data structures (e.g., models), and/or the like.

The CCTM Database

The CCTM database component 2519 may be embodied in a database and its stored data. The database is a stored program component, which is executed by the CPU; the stored program component portion configuring the CPU to process the stored data. The database may be a fault tolerant, relational, scalable, secure database such as Claris File Maker®, MySQL®, Oracle®, Sybase®, etc. may be used. Additionally, optimized fast memory and distributed databases such as IBM's Netezza®, MongoDB's MongoDB®, opensource Hadoop®, opensource VoltDB, SAP's Hana®, etc. Relational databases are an extension of a flat file. Relational databases include a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the CCTM database may be implemented using various other data-structures, such as an array, hash, (linked) list, struct, structured text file (e.g., XML), table, flat file database, and/or the like. Such data-structures may be stored in memory and/or in (structured) files. In another alternative, an object-oriented database may be used, such as Frontier™, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the CCTM database is implemented as a data-structure, the use of the CCTM database 2519 may be integrated into another component such as the CCTM component 2535. Also, the database may be implemented as a mix of data structures, objects, programs, relational structures, scripts, and/or the like. Databases may be consolidated and/or distributed in countless variations (e.g., see Distributed CCTM below). Portions of databases, e.g., tables, may be exported and/or imported and thus decentralized and/or integrated.

In one embodiment, the database component 2519 includes several tables representative of the schema, tables, structures, keys, entities and relationships of the described database 2519*a-z:*

An accounts table 2519*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routing Number, link WalletsID, accountPriorit AccountRatio, account Address, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2519*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, first Name, middle Name, last Name, nameSuffix, DateOfBirth, userAge, userName, userEmail, userSocialAccountID, contactType, contactRelationship, userPhone, userAddress, userCity, userState, userZIPCode, userCountry, userAuthorizationCode, user AccessPrivilges, userPreferences, userRestrictions, and/or the like (the user table may support and/or track multiple entity accounts on a CCTM);

An devices table 2519*c* includes fields such as, but not limited to: deviceID, sensorIDs, accountID, assetIDs, paymentIDs, deviceType, deviceName, device Manufacturer, device.Model, device Version, deviceSerialNo, deviceIPaddress, device MACaddress, device_ECID, deviceUUID, deviceLocation, deviceCertificate, deviceOS, appIDs, deviceResources, deviceSession, authKey, deviceSecureKey, walletAppInstalledFlag, device AccessPrivileges, devicePreferences, deviceRestrictions, hardware_config, software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published https://www.bluetooth.org/en-us/specification/adopted-specifications, and/or other device specifications, and/or the like;

An apps table 2519*d* includes fields such as, but not limited to: appID, app Name, appType, appDependencies, accountID, deviceIDs, transactionID, userID, appStore AuthKey, appStoreAccountID, appStoreIPaddress, appStoreURLaccessCode, appStorePortNo, appAccess Privileges, appPreferences, appRestrictions, portNum, access_API_call, linked_wallets_list, and/or the like;

An assets table 2519*e* includes fields such as, but not limited to: assetID, accountID, userID, distributorAccountID, distributorPaymentID, distributorOnwerID, assetOwnerID, assetType, assetSourceDeviceID, assetSourceDevice Type, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeries Episode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwner AccountID, subscriptionIDs, assetAuthroizationCode, assetAccessPrivileges, assetPreferences, assetRestrictions, assetAPI, assetAPIconnection Address, and/or the like;

A payments table 2519*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2519*g* includes fields such as, but not limited to: transactionID, accountID, assetIDs, deviceIDs, paymentIDs, transactionIDs, userID, merchantID, transaction Type, transactionDate, transaction Time, transaction Amount, transaction Quantity, transactionDetails, products List, product Type, productTitle, productsSummary, productParamsList, transactionNo, transactionAccessPrivileges, transactionPreferences, transactionRestrictions, merchantAuthKey, merchant AuthCode, and/or the like;

An merchants table 2519*h* includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchant AuthKey, merchantIPaddress, portNum, merchantURLaccessCode, merchantPortNo, merchantAccessPrivileges, merchantPreferences, merchantRestrictions, and/or the like;

An ads table 2519*i* includes fields such as, but not limited to: adID, advertiserID, adMerchantID, adNetworkID, adName, adTags, advertiser Name, adSponsor, adTime, adGeo, adAttributes, adFormat, adProduct, adText, ad.Media, adMediaID, adChannelID, adTagTime, adAudioSignature, adHash, adTemplateID, adTemplateData, adSourceID, adSource Name, adSourceServerIP, adSourceURL, adSourceSecurity Protocol, adSourceFTP, ad AuthKey, adAccessPrivileges, adPreferences, adRestrictions, adNetworkXchangeID, adNetwork XchangeName, adNetwork XchangeCost, adNetworkXchange.MetricType (e.g., CPA, CPC, CPM, CTR, etc.), adNetworkXchange MetricValue, adNetworkXchangeServer, adNetworkXchangePort Number, publisherID, publisher Address, publisherURL, publisher Tag, publisherIndustry, publisher Name, publisherDescription, siteDomain, siteURL, siteContent, siteTag, siteContext, siteImpression, siteVisits, siteHeadline, sitePage, site AdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impression TimeStamp, impressionGeo, impressionAction, impression Type, impression PublisherID, impressionPublisherURL, and/or the like;

An ML, table 2519*j* includes fields such as, but not limited to: MLID, predictionLogicStructureID, prediction LogicStructureType, predictionLogicStructureConfiguration, predictionLogicStructureTrainedStructure, predictionLogicStructureTrainingData, predictionLogicStructureTrainingDataConfiguration, prediction LogicStructureTestingData, predictionLogicStructure TestingDataConfiguration, predictionLogicStructureOutputData, predictionLogicStructureOutputDataConfiguration, and/or the like;

A compliance criteria table 2519*k* includes fields such as, but not limited to: complianceCriterionID, complianceCriterionConfiguration, complianceCriterionDimension, complianceCriterionFactor, is Entity ComplianceEvaluationCriterion, is Entity Compliance.MonitoringCriterion, is TransactionComplianceEvaluationCriterion, isComplianceCriterionCommon, associatedParticipatingProcessorID, associated MerchantBusinessType, associated MerchantSector, associated Merchant.MCC, and/or the like;

An entity compliance files table 25191 includes fields such as, but not limited to:

entityComplianceFileID, entityComplianceFileCryptographicSignature, entityComplianceFileDateTime, associatedEntityID, associatedMerchantID, associatedParticipatingProcessorID, complianceCriterionID, complianceCriterion AssessmentData, complianceCriterion AssessmentDataStatus, complianceCriterionScore, overallComplianceScore, and/or the like;

A transaction compliance files table 2519*m* includes fields such as, but not limited to:

transactionComplianceFileID, transactionComplianceFileCryptographicSignature, transactionComplianceFileDateTime, associatedEntityID, associatedMerchantID, associatedParticipatingProcessorID, associatedTransactionID, transactionProductIDs, transactionProductItemUUIDs, complianceCriterionID, complianceCriterionTransactionInitiation AssessmentData, complianceCriterionTransactionHandlingAssessmentData, complianceCriterion TransactionDelivery AssessmentData, complianceCriterionTransactionReceiptAssessmentData, complianceCriterion AssessmentDataStatus, complianceCriterionScore, overallComplianceScore, and/or the like;

A market_data table 2519*z* includes fields such as, but not limited to: market_data_feed_ID, asset_ID, asset_symbol, asset_name, spot_price, bid_price, ask_price, and/or the like; in one embodiment, the market data table is populated through a market data feed (e.g., Bloomberg's PhatPipe®, Consolidated Quote System® (CQS), Consolidated Tape Association® (CTA), Consolidated Tape System® (CTS), Dun & Bradstreet®, OTC Montage Data Feed® (OMDF), Reuter's Tib®, Triarch®, US equity trade and quote market data®, Unlisted Trading Privileges® (UTP) Trade Data Feed® (UTDF), UTP Quotation Data Feed® (UQDF), and/or the like feeds, e.g., via ITC 2.1 and/or respective feed protocols), for example, through Microsoft's® Active Template Library and Dealing Object Technology's real-time toolkit Rtt.Multi.

In one embodiment, the CCTM database may interact with other database systems. For example, employing a distributed database system, queries and data access by search CCTM component may treat the combination of the CCTM database, an integrated data security layer database as a single database entity (e.g., see Distributed CCTM below).

In one embodiment, user programs may contain various user interface primitives, which may serve to update the CCTM. Also, various accounts may require custom database tables depending upon the environments and the types of clients the CCTM may need to serve. It should be noted that any unique fields may be designated as a key field throughout. In an alternative embodiment, these tables have been decentralized into their own databases and their respective database controllers (i.e., individual database controllers for each of the above tables). The CCTV may also be configured to distribute the databases over several computer systemizations and/or storage devices. Similarly, configurations of the decentralized database controllers may be varied by consolidating and/or distributing the various database components 2519*a-z*. The CCTM may be configured to keep track of various settings, inputs, and parameters via database controllers.

The CCTM database may communicate to and/or with other components in a component collection, including itself, and/or facilities of the like. Most frequently, the CCTM database communicates with the CCTM component, other program components, and/or the like. The database may contain, retain, and provide information regarding other nodes and data.

The CCTMs

The CCTM component 2535 is a stored program component that is executed by a CPU via stored instruction code configured to engage signals across conductive pathways of the CPU and ISICI controller components. In one embodiment, the CCTM component incorporates any and/or all combinations of the aspects of the CCTM that were discussed in the previous figures. As such, the CCTM affects accessing, obtaining and the provision of information, services, transactions, and/or the like across various communications networks. The features and embodiments of the CCTM discussed herein increase network efficiency by reducing data transfer requirements with the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the CCTM's features and facilities, and in many cases reduce the costs, energy consumption/requirements, and extend the life of CCTM's underlying infrastructure; this has the added benefit of making the CCTM more reliable. Similarly, many of the features and mechanisms are designed to be easier for users to use and access, thereby broadening the audience that may enjoy/employ and exploit the feature sets of the CCTM; such ease of use also helps to increase the reliability of the CCTM. In addition, the feature sets include heightened security as noted via the Cryptographic components 2520, 2526, 2528 and throughout, making access to the features and data more reliable and secure The CCTM transforms entity onboarding application input, assessment data, authentication data inputs, via CCTM components (e.g., ECVO, ECM, TCE), into entity onboarding application output, entity compliance datastructure, transaction compliance datastructure outputs.

The CCTM component facilitates access of information between nodes may be developed by employing various development tools and languages such as, but not limited to: Apache® components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, Ruby, shell scripts, SQL commands, web application server extensions, web development environments and libraries (e.g., Microsoft's® ActiveX; Adobe® AIR, FLEX & FLASH; AJAX; (D)HTML; Dojo, Java; JavaScript; jQuery(UI); MooTools; Prototype; script.aculo.us; Simple Object Access Protocol (SOAP); SWFObject; Yahoo!® User Interface; and/or the like), WebObjects®, and/or the like. In one embodiment, the CCTM server employs a cryptographic server to encrypt and decrypt communications. The CCTM component may communicate to and/or with other components in a component collection, including itself, and/or facilities of the like. Most frequently, the CCTM component communicates with the CCTM database, operating systems, other program components, and/or the like. The CCTM may contain, communicate, generate, obtain, and/or provide program component, system, user, and/or data communications, requests, and/or responses.

Distributed CCTMs

The structure and/or operation of any of the CCTM node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such, a combination of hardware may be distributed within a location, within a region and/or globally where logical access to a controller may be abstracted as a singular node, yet where a multitude of private, semiprivate and publicly accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access, etc.).

The component collection may be consolidated and/or distributed in countless variations through various data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so as discussed through the disclosure and/or through various other data processing communication techniques.

The configuration of the CCTM controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services®, Microsoft Azure®, Hewlett Packard Helion®, IBM® Cloud services allow for CCTM controller and/or CCTV component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation (JSON), NeXT Computer, Inc.'s (Dynamic) Object Linking, Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as JSON, lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c -post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the CCTM controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via an SSL connection, parse the data to extract variables, and store the data to a database, is provided below:

```
<? PHP
header('Content-Type: text/plain');
// set ip address and port to listen to for incoming data
$address='192.168.0.100';
$port=255;
// create a server-side SSL socket, listen for/accept incoming communication
$sock=socket_create(AF_INET, SOCK_STREAM, 0);
socket_bind($sock, $address, $port) or die('Could not bind to address');
socket_listen($sock);
$client=socket_accept($sock);
// read input data from client device in 1024 byte blocks until end of message
do {
  $input=" ";
  $input=socket_read($client, 1024);
  $data.=$input;
} while($input !=" ");
// parse data to extract variables
$obj=json_decode($data, true);
// store input data in a database
mysql_connect("201.408.185.132", $DBserver, $password); // access database server
mysql_select("CLIENT_DB.SQL"); // select database to append
mysql_query("INSERT INTO UserTable (transmission)
VALUES ($data)"); // add data to UserTable table in a CLIENT database
mysql_close("CLIENT_DB.SQL"); // close connection to database
?>
```

Also, the following resources may be used to provide example embodiments regarding SOAP parser implementation:

http://www.xav.com/perl/site/lib/SOAP/Parser.html http://publib.boulder.ibm.com/infocenter/tivihelp/v2r1/index.jsp?topic=/com.ibm.IBMDI.doc/referenceguide295.htm and other parser implementations:

http://publib.boulder.ibm.com/infocenter/tivihelp/v2r1/index.jsp?topic=/com.ibm.IBMDI.doc/referenceguide259.htm all of which are hereby expressly incorporated by reference.

In order to address various issues and advance the art, the entirety of this application for Compliance Commerce Transaction Management Apparatuses, Processes and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower", "upper", "horizontal", "vertical", "above", "below", "up", "down", "top" and "bottom" as well as derivatives thereof (e.g., "horizontally", "downwardly", "upwardly", etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached", "affixed", "connected", "coupled", "interconnected", etc. may refer to a relationship where structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, provisionals, re-issues, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a CCTM individual and/or enterprise user, database configuration and/or relational model, data type, data transmission and/or network framework, library, syntax structure, and/or the like, various embodiments of the CCTM, may be implemented that allow a great deal of flexibility and customization. For example, aspects of the CCTM may be adapted for compliance evaluation and/or monitoring of entities and/or transactions in a wide variety of industries such as medicine, machine parts, food, chemicals, etc. While various embodiments and discussions of the CCTM have included inventory tracking, however, it is to be understood that the embodiments described herein may be readily configured and/or customized for a wide variety of other applications and/or implementations, including, e.g., end-to-end commerce compliance as well as transaction tracking, etc.

What is claimed is:

1. An entity compliance data structure generator apparatus, comprising:

at least one memory;

a component collection stored in the at least one memory;

at least one processor disposed in communication with the at least one memory, the at least one processor executing processor-executable instructions from the component collection, the component collection storage structured with processor-executable instructions, comprising:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance data structures to utilize for the entity object;

retrieve, via the at least one processor, a set of previously stored compliance data structures associated with the entity object and matching the determined range;

verify, via the at least one processor, cryptographic signatures associated with each previously stored compliance data structure in the retrieved set of previously stored compliance data structures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance data structures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance data structure for the entity object, in which the entity compliance data structure is structured to specify the calculated overall compliance score;

cryptographically sign, via the at least one processor, the entity compliance data structure using a private key; and store, via the at least one processor, the cryptographically signed entity compliance datastructure.

2. The apparatus of claim 1, in which the set of compliance monitoring criterion objects is determined based on an entity category identifier associated with the entity object.

3. The apparatus of claim 2, in which the entity category identifier is one of: a business type identifier, a sector identifier, a merchant category code.

4. The apparatus of claim 1, in which the set of compliance monitoring criterion objects includes a set of common compliance monitoring criterion objects, and a set of processor-specific compliance monitoring criterion objects associated with a participating processor object associated with the entity object.

5. The apparatus of claim 1, in which the range of previous compliance data structures is structured as one of: a date range, a quantity.

6. The apparatus of claim 1, in which the range of previous compliance data structures is determined based on a compliance review periodicity associated with the entity object.

7. The apparatus of claim 1, in which the range of previous compliance data structures comprises a range for entity compliance data structures and a range for transaction compliance datastructures, and in which the retrieved set of previously stored compliance data structures comprises a set of entity compliance data structures and a set of transaction compliance datastructures.

8. The apparatus of claim 1, in which the instructions to evaluate a factor of compliance rule are structured as instructions to verify the respective applicable subset of entity assessment data using a verification server.

9. The apparatus of claim 8, in which the verification server is one of: a credit bureau server, a government agency server, a data aggregator server, an Ethereum oracle.

10. The apparatus of claim 1, in which the instructions to evaluate a factor of compliance rule are structured as instructions to evaluate the respective factor of compliance rule using a directionality of compliance compatibility calculator.

11. The apparatus of claim 1, in which the compliance verification status associated with a factor of compliance rule includes a level of verification score, and in which the dimension compliance score of the dimension of compliance data channel associated with the respective factor of compliance rule is calculated based on the level of verification score.

12. The apparatus of claim 1, in which the calculated overall compliance score associated with the entity object is a trending score that includes a value component and a directionality component.

13. The apparatus of claim 1, in which the component collection storage is further structured with processor-executable instructions, comprising:

determine, via the at least one processor, that the calculated overall compliance score associated with the entity object is below a specified threshold; and set, via the at least one processor, a suspend flag for the entity object.

14. The apparatus of claim 13, in which the calculated overall compliance score associated with the entity object is below the specified threshold due to an individual dimension compliance score below a specified threshold.

15. The apparatus of claim 13, in which the setting of the suspend flag initiates a countdown timer, and in which the entity object is disassociated from a participating processor object associated with the entity object upon expiration of the countdown timer.

16. An entity compliance data structure generator processor-readable, non-transient medium, the medium storing a component collection, the component collection storage structured with processor-executable instructions comprising:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance data structures to utilize for the entity object;

retrieve, via the at least one processor, a set of previously stored compliance data structures associated with the entity object and matching the determined range;

verify, via the at least one processor, cryptographic signatures associated with each previously stored compliance data structure in the retrieved set of previously stored compliance data structures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance data structures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance data structure for the entity object, in which the entity compliance data structure is structured to specify the calculated overall compliance score;

cryptographically sign, via the at least one processor, the entity compliance data structure using a private key; and store, via the at least one processor, the cryptographically signed entity compliance data structure.

17. An entity compliance data structure generator processor-implemented system, comprising:

means to store a component collection;

means to process processor-executable instructions from the component collection, the component collection storage structured with processor-executable instructions including:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance data structures to utilize for the entity object;

retrieve, via the at least one processor, a set of previously stored compliance data structures associated with the entity object and matching the determined range;

verify, via the at least one processor, cryptographic signatures associated with each previously stored compliance data structure in the retrieved set of previously stored compliance data structures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance data structures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance data structure for the entity object, in which the entity compliance data structure is structured to specify the calculated overall compliance score;

cryptographically sign, via the at least one processor, the entity compliance data structure using a private key; and store, via the at least one processor, the cryptographically signed entity compliance datastructure.

18. An entity compliance data structure generator processor-implemented process, including processing processor-executable instructions via at least one processor from a component collection stored in at least one memory, the component collection storage structured with processor-executable instructions comprising:

obtain, via the at least one processor, an entity object identifier of an entity object flagged for compliance monitoring;

determine, via the at least one processor, a set of compliance monitoring criterion objects to utilize for the entity object, in which each compliance monitoring criterion object is structured to specify a factor of compliance rule that is associated with a dimension of compliance data channel;

determine, via the at least one processor, a range of previous compliance data structures to utilize for the entity object;

retrieve, via the at least one processor, a set of previously stored compliance data structures associated with the entity object and matching the determined range;

verify, via the at least one processor, cryptographic signatures associated with each previously stored compliance data structure in the retrieved set of previously stored compliance data structures using a public key of each signer;

identify, via the at least one processor, a set of deficient entity assessment data associated with the entity object that is outside compliance compatibility tolerances;

obtain, via the at least one processor, updated entity assessment data corresponding to the set of deficient entity assessment data;

evaluate, via the at least one processor, each factor of compliance rule specified in the set of compliance monitoring criterion objects using an applicable subset of entity assessment data associated with the entity object to determine a compliance verification status associated with the respective factor of compliance rule, in which the entity assessment data associated with the entity object includes overall compliance scores specified in the retrieved set of previously stored compliance data structures and the updated entity assessment data;

calculate, via the at least one processor, a dimension compliance score for each dimension of compliance data channel based on the determined compliance verification status of each factor of compliance rule associated with the respective dimension of compliance data channel;

calculate, via the at least one processor, an overall compliance score associated with the entity object as a weighted average of the calculated dimension compliance scores;

generate, via the at least one processor, an entity compliance data structure for the entity object, in which the entity compliance data structure is structured to specify the calculated overall compliance score;

cryptographically sign, via the at least one processor, the entity compliance datastructure using a private key; and store, via the at least one processor, the cryptographically signed entity compliance datastructure.

* * * * *